US011162530B2

(12) United States Patent
Miki et al.

(10) Patent No.: US 11,162,530 B2
(45) Date of Patent: Nov. 2, 2021

(54) GAS LASER APPARATUS AND MAGNETIC BEARING CONTROL METHOD

(71) Applicant: Gigaphoton Inc., Tochigi (JP)

(72) Inventors: Masaharu Miki, Oyama (JP); Osamu Wakabayashi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 279 days.

(21) Appl. No.: 16/568,808

(22) Filed: Sep. 12, 2019

(65) Prior Publication Data

US 2020/0025247 A1    Jan. 23, 2020

Related U.S. Application Data

(63) Continuation of application No. PCT/JP2017/015630, filed on Apr. 18, 2017.

(51) Int. Cl.
*F16C 32/04* (2006.01)
*H01S 3/036* (2006.01)
(Continued)

(52) U.S. Cl.
CPC ........ *F16C 32/0476* (2013.01); *F16D 27/004* (2013.01); *F16D 27/14* (2013.01);
(Continued)

(58) Field of Classification Search
CPC .............. F16C 32/0476; F16C 2380/26; F16C 32/0489; F16D 27/004; F16D 27/14;
(Continued)

(56) References Cited

U.S. PATENT DOCUMENTS 4,899,363 A * 2/1990 Murray .................. H01S 3/036
372/37
5,848,089 A * 12/1998 Sarkar ................ G03F 7/70575
372/58
(Continued)

FOREIGN PATENT DOCUMENTS

GN    103084327 A    5/2013
GN    104184286 A    12/2014
(Continued)

OTHER PUBLICATIONS

An Office Action issued by the China National Intellectual Property Administration dated Oct. 28, 2020, which corresponds to Chinese Patent Application No. 201780087865.8 and is related to U.S. Appl. No. 16/568,808 with English language translation.
(Continued)

*Primary Examiner* — Xinning(Tom) Niu
(74) *Attorney, Agent, or Firm* — Studebaker & Brackett PC

(57) ABSTRACT

A gas laser apparatus includes: a magnetic bearing including an electromagnet capable of controlling a magnetic force, and configured to rotatably support a rotary shaft of a fan in a magnetically levitated state by the magnetic force, the fan being configured to supply a laser gas; an electromagnet control unit configured to control the magnetic force of the electromagnet based on displacement of a levitated position of the rotary shaft and adjust the levitated position; a motor configured to generate torque for rotating the fan; a magnetic coupling configured to couple the rotary shaft and a drive shaft of a motor with a magnetic attractive force and transmit the torque of the motor to the rotary shaft; an attractive force estimating sensor configured to detect a parameter that enables an attractive force of the magnetic coupling to be estimated; an attractive force measuring unit configured to measure the attractive force of the magnetic coupling based
(Continued)

on the detected parameter; and a correction unit configured to correct the magnetic force of the electromagnet according to a variation in the attractive force measured by the attractive force measuring unit.

21 Claims, 65 Drawing Sheets

(51) Int. Cl.
*F16D 27/00* (2006.01)
*F16D 27/14* (2006.01)
*H02K 7/09* (2006.01)
*H02K 49/10* (2006.01)
*H01S 3/038* (2006.01)

(52) U.S. Cl.
CPC .............. *H01S 3/036* (2013.01); *H02K 7/09* (2013.01); *H02K 49/108* (2013.01); *H01S 3/038* (2013.01)

(58) Field of Classification Search
CPC .......... F16D 27/06; H01S 3/036; H01S 3/038; H01S 3/225; H02K 7/09; H02K 49/108; H02K 7/003
See application file for complete search history.

(56) References Cited

U.S. PATENT DOCUMENTS

| | | | | |
|---|---|---|---|---|
| 6,104,735 A * | 8/2000 | Webb | .................... | F16C 32/047 372/37 |
| 2001/0050940 A1 * | 12/2001 | Ooyama | ............. | F16C 32/0489 372/61 |
| 2004/0263011 A1 * | 12/2004 | Barada | ................ | F16C 32/0451 310/90.5 |
| 2011/0318203 A1 | 12/2011 | Ozaki et al. | | |
| 2013/0328455 A1 | 12/2013 | Wu | | |
| 2014/0105238 A1 * | 4/2014 | Kurosu | .................. | H01S 3/041 372/58 |
| 2017/0338616 A1 | 11/2017 | Kurosu et al. | | |

FOREIGN PATENT DOCUMENTS

| | | |
|---|---|---|
| JP | 2000216460 A | 8/2000 |
| JP | 2001027238 A | 1/2001 |
| JP | 2002204013 A | 7/2002 |
| JP | 2005036973 A | 2/2005 |
| JP | 2006-216460 A | 8/2006 |
| JP | 2010113192 A | 5/2010 |
| JP | 2010209691 A | 9/2010 |
| JP | 2014082243 A | 5/2014 |
| WO | 2010/0101107 A1 | 9/2010 |
| WO | 2016/143135 A1 | 9/2016 |

OTHER PUBLICATIONS

An Office Action mailed by the Japanese Patent Office dated Feb. 2, 2021, which corresponds to Japanese Patent Application No. 2019-513121 and is related to U.S. Appl. No. 16/568,808; with English language translation.
International Search Report issued in PCT/JP2017/015630; dated Jun. 20, 2017.
International Preliminary Report on Patentability and Written Opinion issued in PCT/JP2017/015630; dated Oct. 22, 2019.

* cited by examiner

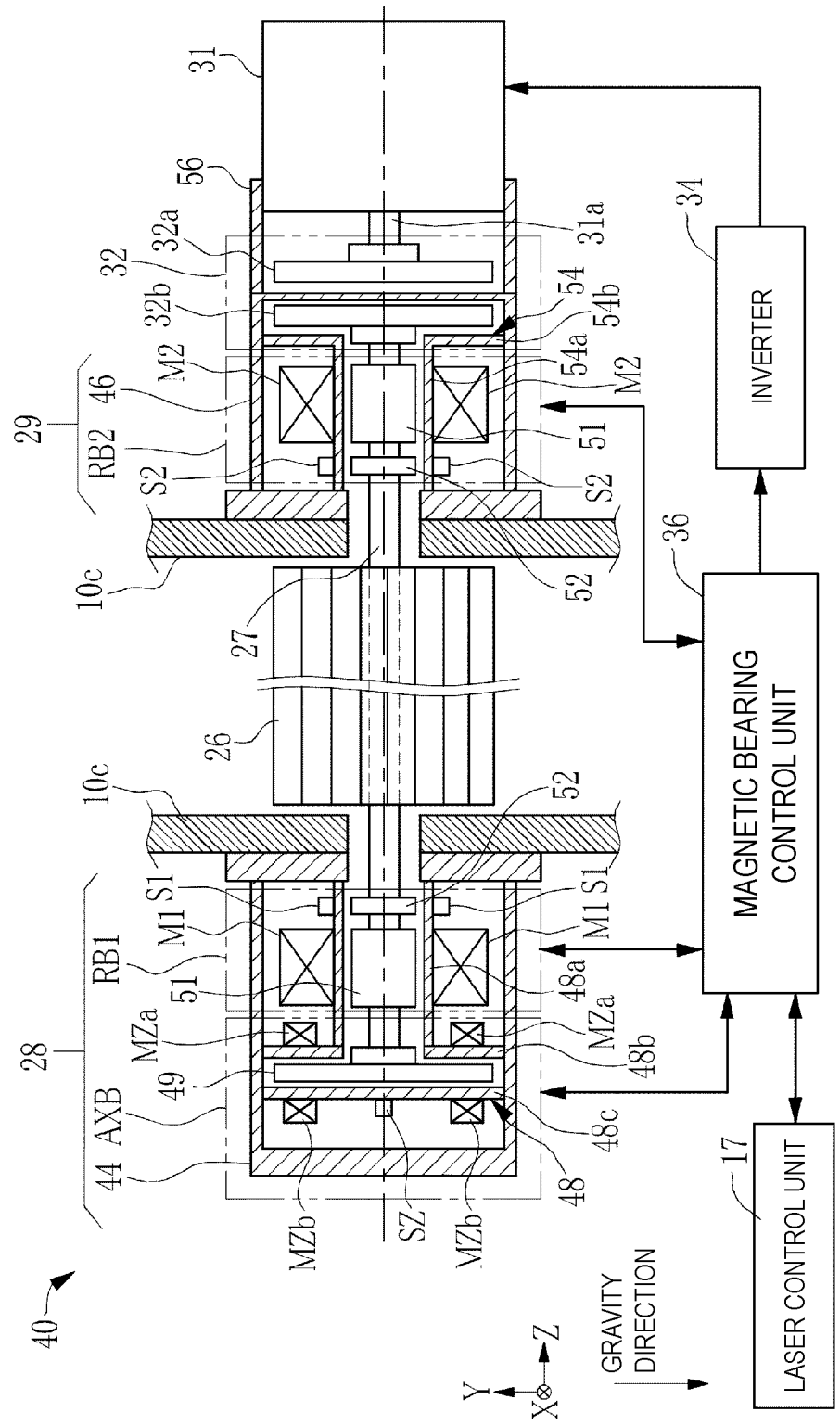

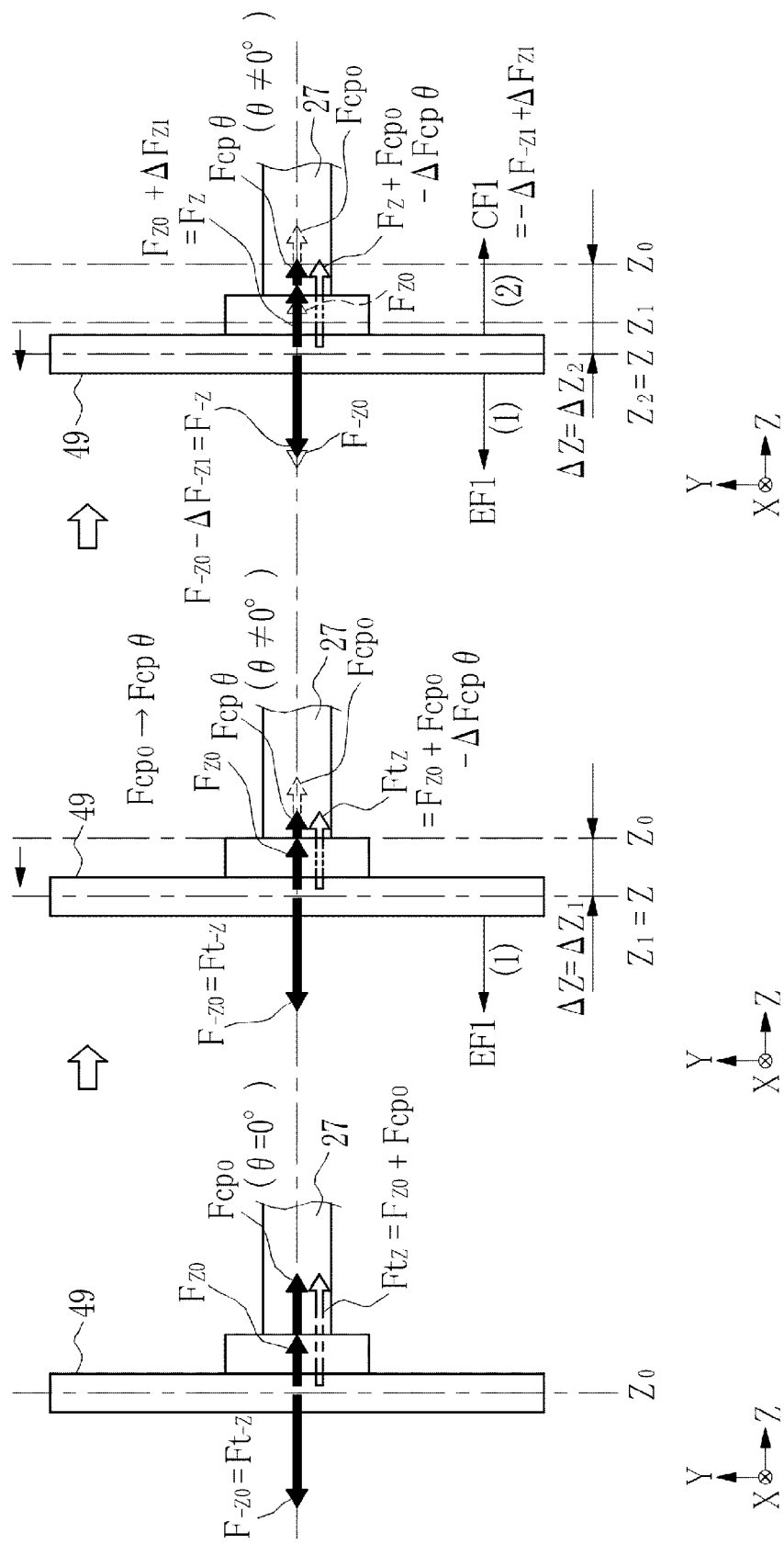

Fig. 28A
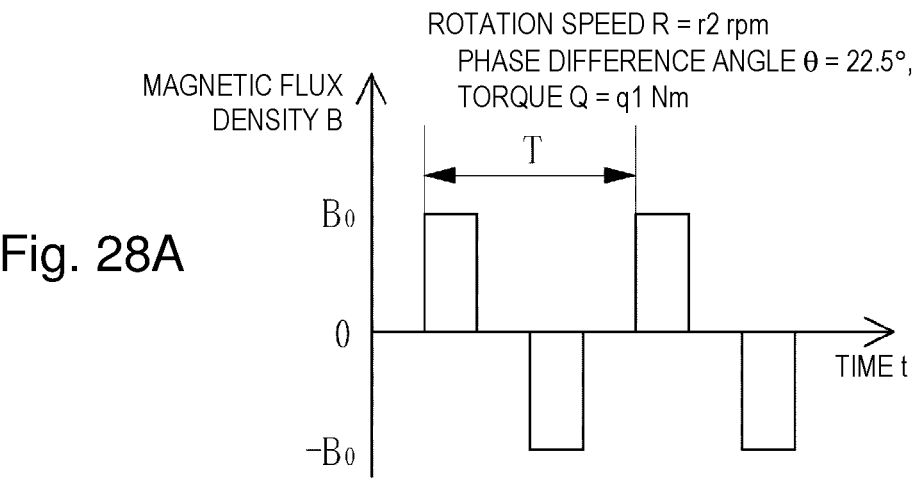
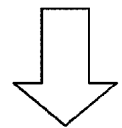
Fig. 28B
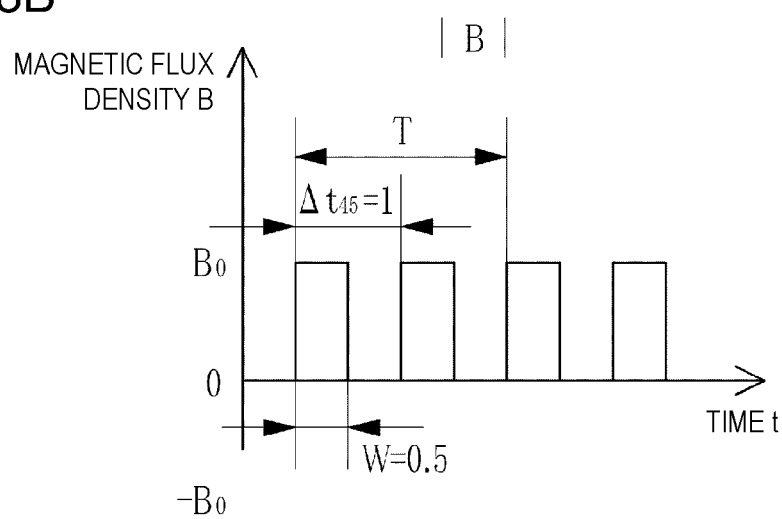

Fig. 46

| PHASE DIFFERENCE ANGLE θ | CP ATTRACTIVE FORCE Fcpθ |
|---|---|
| 0 | Fcpθ(0) |
| 1 | Fcpθ(1) |
| 2 | Fcpθ(2) |
| 3 | Fcpθ(3) |
| 4 | Fcpθ(4) |
| 5 | Fcpθ(5) |
| 6 | Fcpθ(6) |
| 7 | Fcpθ(7) |
| 8 | Fcpθ(8) |
| 9 | Fcpθ(9) |
| 10 | Fcpθ(10) |
| 11 | Fcpθ(11) |
| 12 | Fcpθ(12) |
| 13 | Fcpθ(13) |
| 14 | Fcpθ(14) |
| 15 | Fcpθ(15) |
| 16 | Fcpθ(16) |
| 17 | Fcpθ(17) |
| 18 | Fcpθ(18) |
| 19 | Fcpθ(19) |
| 20 | Fcpθ(20) |
| 21 | Fcpθ(21) |
| 22 | Fcpθ(22) |

Fig. 65A

<CONTROL FLOW OF AXIAL ELECTROMAGNET CONTROL UNIT CZD>

START

S3000ZD
SUPPLY CURRENT OF INITIAL VALUE $I_{-Z0}$ TO AXIAL ELECTROMAGNET MZb TO START MAGNETIC LEVITATION

S3010Z
MEASURE PRESENT POSITION Z OF ROTARY SHAFT IN Z-AXIS DIRECTION BASED ON DETECTION SIGNAL FROM AXIAL DISPLACEMENT SENSOR SZ

S3020Z
CALCULATE DIFFERENCE $\Delta Z$ BETWEEN TARGET POSITION $Z_0$ AND PRESENT POSITION Z: $\Delta Z = Z - Z_0$ S3030Z
TRANSMIT DATA ON $\Delta Z$ TO INTEGRATED CONTROL UNIT S3040ZD
CALCULATE AMOUNT OF CHANGE $\Delta F_{-z}$ IN EM ATTRACTIVE FORCE OF ELECTROMAGNET MZb FOR BRINGING $\Delta Z$ CLOSE TO 0

(52)

(51)

GAS LASER APPARATUS AND MAGNETIC BEARING CONTROL METHOD

CROSS-REFERENCE TO RELATED APPLICATIONS

The present application is a continuation application of International Application No. PCT/JP2017/015630 filed on Apr. 18, 2017. The content of the application is incorporated herein by reference in its entirety.

BACKGROUND

1. Technical Field

The present disclosure relates to a gas laser apparatus and a magnetic bearing control method.

2. Related Art

Improvements in resolution of semiconductor exposure apparatuses (hereinafter simply referred to as "exposure apparatuses") have been desired due to miniaturization and high integration of semiconductor integrated circuits. For this purpose, exposure light sources that emit light with shorter wavelengths have been developed. As the exposure light source, a gas laser apparatus is used instead of a conventional mercury lamp. As the gas laser apparatus for exposure, a KrF excimer laser apparatus that outputs ultraviolet light with a wavelength of 248 nm and an ArF excimer laser apparatus that outputs ultraviolet light with a wavelength of 193 nm are currently used.

As the present exposure technology, immersion exposure is practically used in which a space between a projection lens of an exposure apparatus and a wafer is filled with a liquid to change a refractive index of the space, thereby reducing an apparent wavelength of light from an exposure light source. When the immersion exposure is performed using the ArF excimer laser apparatus as the exposure light source, the wafer is irradiated with ultraviolet light with a wavelength of 134 nm in water. This technology is referred to as ArF immersion exposure (also referred to as ArF immersion lithography).

The KrF and ArF excimer laser apparatuses have a large spectrum line width of spontaneous oscillation in the range of about 350 to 400 pm. Thus, chromatic aberration of a laser beam (ultraviolet light) reduced projected on a wafer by the projection lens of the exposure apparatus occurs to reduce resolution. Thus, the spectrum line width (also referred to as spectrum width) of the laser beam output from the gas laser apparatus needs to be narrowed to the extent that the chromatic aberration can be ignored. For this purpose, a line narrowing module having a line narrowing element is provided to narrow the spectrum width in a laser resonator of the gas laser apparatus. The line narrowing element may be etalon, grating, or the like. Such a laser apparatus in which a spectrum width is narrowed is referred to as a line narrowing laser apparatus.

LIST OF DOCUMENTS

Patent Documents

Patent Document 1: Japanese Unexamined Patent Application Publication No. 2000-216460
Patent Document 2: WO2010/101107
Patent Document 3: Japanese Unexamined Patent Application Publication No. 2010-113192

SUMMARY

A gas laser apparatus according to an aspect of the present disclosure includes:
A. a laser chamber in which a laser gas is encapsulated;
B. a pair of discharge electrodes arranged in the laser chamber to oppose each other;
C. a fan configured to supply the laser gas between the discharge electrodes;
D. a magnetic bearing including an electromagnet capable of controlling a magnetic force, and configured to rotatably support a rotary shaft of the fan in a magnetically levitated state by the magnetic force;
E. an electromagnet control unit configured to control the magnetic force of the electromagnet based on displacement of a levitated position of the rotary shaft and adjust the levitated position;
F. a motor configured to generate torque for rotating the fan;
G. a magnetic coupling configured to couple the rotary shaft and a drive shaft of the motor with a magnetic attractive force and transmit the torque of the motor to the rotary shaft;
H. an attractive force estimating sensor configured to detect a parameter that enables an attractive force of the magnetic coupling to be estimated;
I. an attractive force measuring unit configured to measure the attractive force of the magnetic coupling based on the detected parameter; and
J. a correction unit configured to correct the magnetic force of the electromagnet according to a variation in the attractive force measured by the attractive force measuring unit.

A magnetic bearing control method according to an aspect of the present disclosure used in a gas laser apparatus including a laser chamber in which a laser gas is encapsulated, a pair of discharge electrodes arranged in the laser chamber to oppose each other, and a fan configured to supply the laser gas between the discharge electrodes, the magnetic bearing control method being used for controlling a magnetic bearing including an electromagnet capable of controlling a magnetic force, and configured to rotatably support a rotary shaft of the fan in a magnetically levitated state by the magnetic force, includes:
A. an electromagnet control step of controlling the magnetic force of the electromagnet based on displacement of a levitated position of the rotary shaft and adjusting the levitated position;
B. a fan rotating step of using a magnetic coupling to couple the rotary shaft of the fan and a drive shaft of a motor with a magnetic attractive force and transmitting torque of the motor to the rotary shaft to rotate the fan;
C. a parameter detecting step of detecting a parameter that enables an attractive force of the magnetic coupling to be estimated;
D. an attractive force measuring step of measuring the attractive force of the magnetic coupling based on the detected parameter; and
E. a correction step of correcting the magnetic force of the electromagnet according to a variation in the attractive force measured in the attractive force measuring step.

BRIEF DESCRIPTION OF THE DRAWINGS

With reference to the accompanying drawings, some embodiments of the present disclosure will be described below merely by way of example.

FIG. 2 illustrates a configuration of a magnetic bearing system of the comparative example.

FIG. 3A is a cross sectional view perpendicular to a rotary shaft, and FIG. 3B is a vertical sectional view parallel to the rotary shaft.

FIG. 4A shows arrangement of a first radial displacement sensor of a first magnetic bearing, FIG. 4B shows arrangement of a first radial electromagnet of the first magnetic bearing, FIG. 4C shows arrangement of a second radial displacement sensor of a second magnetic bearing, and FIG. 4D shows arrangement of a second radial electromagnet of the second magnetic bearing.

FIG. 14A is a perspective view of an initial opposing state of the rotors, and FIG. 14B is a schematic diagram of the initial opposing state.

FIG. 19A shows an initial state when the rotary shaft is in a target position, FIG. 19B shows the rotary shaft being displaced by the external force, and FIG. 19C shows control to bring the rotary shaft close to the target position being performed.

FIGS. 20A to 20C illustrate an operation of position adjustment of the comparative example, and illustrates control of the position adjustment when the rotary shaft is displaced by an external force in the case with a phase difference, FIG. 20A shows an initial state when the rotary shaft is in a target position, FIG. 20B shows the rotary shaft being displaced by the external force, and FIG. 20C shows control to bring the rotary shaft close to the target position being performed.

FIG. 22A shows arrangement in an X-Y plane, and FIG. 22B shows arrangement in a Y-Z plane.

FIG. 23A shows changes in detection signal from the magnetic flux density sensor with time, and FIG. 23B shows an opposing state of a drive side rotor and a driven side rotor.

FIG. 24A shows changes in detection signal from the magnetic flux density sensor with time, and FIG. 24B shows an opposing state of the drive side rotor and the driven side rotor.

FIG. 25A shows changes in detection signal from the magnetic flux density sensor with time, and FIG. 25B shows an opposing state of the drive side rotor and the driven side rotor.

FIG. 27A shows changes in detection signal from the magnetic flux density sensor with time, and FIG. 27B shows the detection signal having been converted into the absolute value.

FIGS. 28A and 28B illustrate the detection signal from the magnetic flux density sensor in the case with a phase difference when the motor is rotated at relatively high speed being converted into an absolute value, FIG. 28A shows changes in detection signal from the magnetic flux density sensor with time, and FIG. 28B shows the detection signal having been converted into the absolute value.

FIG. 32A shows an initial state when the rotary shaft is in a target position, FIG. 32B shows the rotary shaft being displaced by the external force, and FIG. 32C shows control to bring the rotary shaft close to the target position being performed.

FIG. 36A shows arrangement in an X-Y plane, and FIG. 36B shows arrangement in a Y-Z plane.

FIG. 38A shows output from a magnetic flux density sensor, and FIG. 38B shows output from the magnetic flux density change sensor corresponding to FIG. 38A.

FIG. 39A shows output from the magnetic flux density sensor, and FIG. 39B shows output from the magnetic flux density change sensor corresponding to FIG. 39A.

FIG. 40A shows output from the magnetic flux density sensor, and FIG. 40B shows output from the magnetic flux density change sensor corresponding to FIG. 40A.

FIG. 41A shows the output in FIG. 39B, FIG. 41B shows an output having been converted into an absolute value, and FIG. 41C shows output from a comparator.

FIG. 42A shows the output in FIG. 40B, FIG. 42B shows an output having been converted into an absolute value, and FIG. 42C shows output from the comparator.

FIG. 46 illustrates table data showing a correspondence relationship between the phase difference angle $\theta$ and the CP attractive force $Fcp\theta$.

FIG. 49A shows output from the magnetic flux density sensor, and FIG. 49B shows output from the differentiating circuit.

FIG. 51A shows arrangement in an X-Y plane, and FIG. 51B shows arrangement in a Y-Z plane.

FIG. 52A shows a rotation detection signal of a drive side rotor, and FIG. 52B shows a rotation detection signal of a driven side rotor.

FIG. 54A shows a cross section perpendicular to a rotary shaft, and FIG. 54B shows a vertical section parallel to the rotary shaft.

FIG. 65A shows a former half of a flowchart of a control flow of an axial electromagnet control unit according to the fourth embodiment.

DESCRIPTION OF EMBODIMENTS

Figure 1:
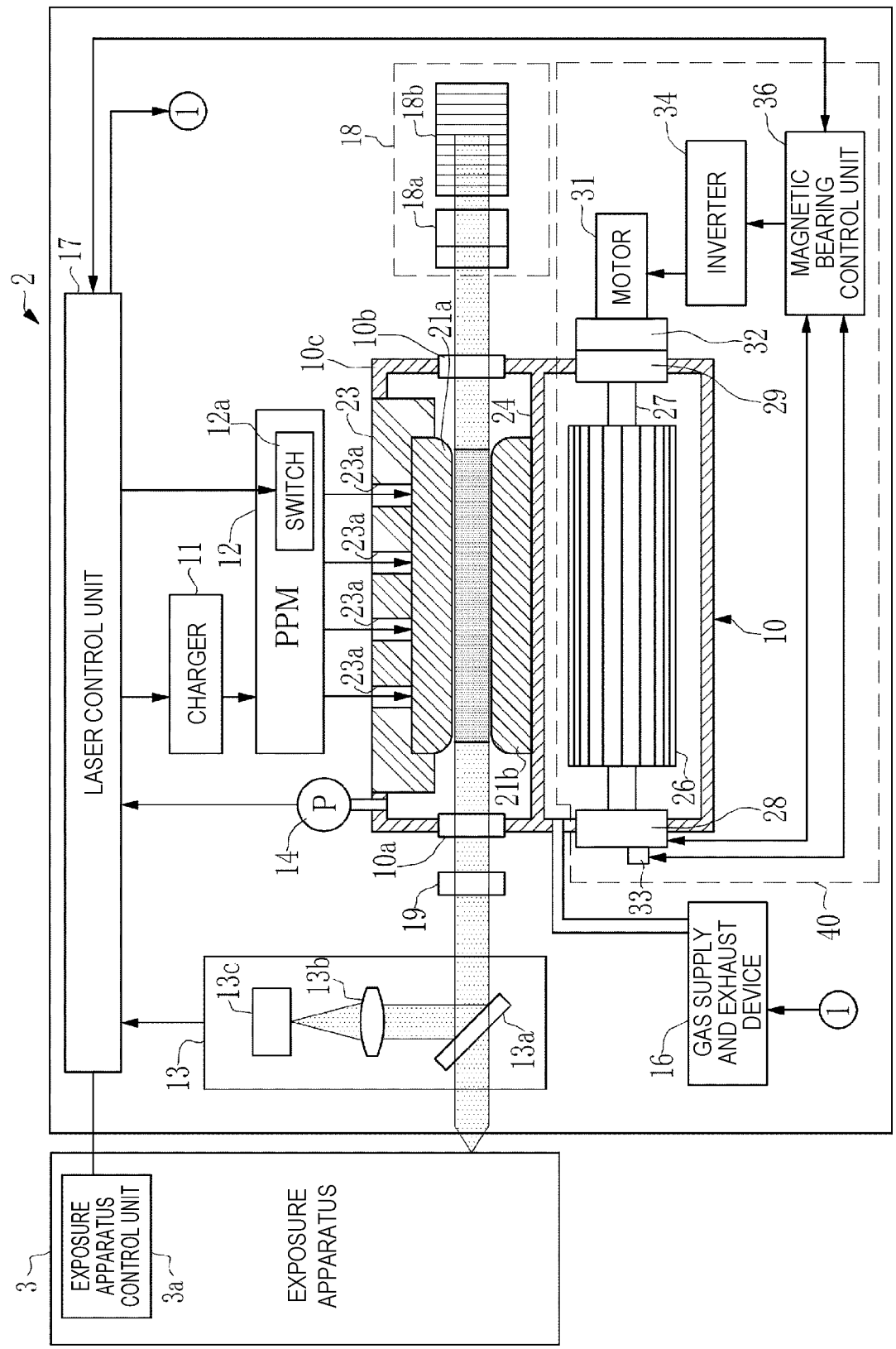
FIG. 1 schematically illustrates a configuration of a gas laser apparatus according to a comparative example.

<Contents>
1. Outline
2. Gas laser apparatus according to comparative example
  2.1 Overall configuration of gas laser apparatus
  2.2 Configuration of magnetic bearing system of fan
    2.2.1 Details of magnetic coupling
    2.2.2 Arrangement of electromagnets and balance of forces in radial bearing portion
    2.2.3 Arrangement of electromagnets and balance of forces in axial bearing portion
    2.2.4 Configuration of magnetic bearing control unit
  2.3 Operation of magnetic bearing system 2.3.1 Control flow of radial electromagnet control unit
2.3.1.1 Control flow of first radial electromagnet control unit C1X
2.3.1.2 Control flow of first radial electromagnet control unit C1Y
2.3.1.3 Control flow of second radial electromagnet control unit C2X
2.3.1.4 Control flow of second radial electromagnet control unit C2Y
2.3.2 Control flow of axial electromagnet control unit
2.3.3 Control flow of integrated control unit
2.4 Laser oscillation operation of gas laser apparatus
2.5 Problem
3. Gas laser apparatus of first embodiment
3.1 Configuration of magnetic bearing system of fan
3.1.1 Magnetic flux density sensor
3.1.2 Configuration of magnetic bearing control unit
3.1.3 CP attractive force measuring method
3.2 Operation of magnetic bearing system
3.2.1 Control flow of radial electromagnet control unit
3.2.2 Processing of CP attractive force measuring unit
3.2.3 Control flow of axial electromagnet control unit CZA
3.3 Effect
3.3.1 First effect
3.3.2 Second effect
3.3.3 Third effect
3.4 Abnormality determination of CP attractive force
3.5 Variant of magnetic coupling
3.6 PID control
3.7 Others
4. Gas laser apparatus of second embodiment
4.1 Configuration of magnetic bearing system of fan
4.1.1 Magnetic flux density change sensor
4.1.2 CP attractive force measuring method
4.2 Operation of magnetic bearing system
4.2.1 Processing of CP attractive force measuring unit
4.3 Effect
4.4 Variant of abnormality determination processing of CP attractive force
4.5 Variant of phase difference sensor
4.5.1 Variant 1
4.5.2 Variant 2
5. Gas laser apparatus of third embodiment
5.1 Configuration of magnetic bearing system of fan
5.1.1 Magnetic coupling
5.1.2 Configuration of magnetic bearing control unit
5.1.3 Radial CP attractive force of magnetic coupling
5.1.4 Balance of forces in radial bearing portion
5.2 Operation of magnetic bearing system
5.2.5 Control flow of second radial electromagnet control unit
5.2.5.1 Control flow of second radial electromagnet control unit C2XC
5.2.5.2 Control flow of second radial electromagnet control unit C2YC
5.3 Effect
5.4 Others
6. Gas laser apparatus of fourth embodiment
6.1 Configuration of magnetic bearing system of fan
6.1.1 Configuration of magnetic bearing control unit
6.1.2 Balance of axial forces
6.2 Operation of magnetic bearing system
6.2.1 Control flow of axial electromagnet control unit
6.3 Effect
7. Analog circuit
8. Others Now, with reference to the drawings, embodiments of the present disclosure will be described in detail. The embodiments described below illustrate some examples of the present disclosure, and do not limit contents of the present disclosure. Also, all configurations and operations described in the embodiments are not necessarily essential as configurations and operations of the present disclosure. The same components are denoted by the same reference numerals, and overlapping descriptions are omitted.

1. Outline

The present disclosure relates to a gas laser apparatus including a magnetic bearing system of a cross flow fan arranged in a laser chamber.

2. Gas Laser Apparatus According to Comparative Example 2.1 Overall Configuration of Gas Laser Apparatus FIG. 1 schematically shows an overall configuration of a gas laser apparatus 2 according to a comparative example. The gas laser apparatus 2 is a laser beam source that generates a pulse laser beam. The pulse laser beam generated by the gas laser apparatus 2 is supplied to, for example, an exposure apparatus 3. The gas laser apparatus 2 is a discharge excited gas laser apparatus. The gas laser apparatus 2 is an excimer laser apparatus using, for example, an ArF laser gas containing argon (Ar) and fluorine (F) as a laser gas that is a laser medium. The laser gas may contain krypton, xenon, or the like besides argon as a rare gas, and may contain chlorine or the like besides fluorine as a halogen gas. As a buffer gas, neon, helium, or a mixed gas thereof is used.

The gas laser apparatus 2 includes a laser chamber 10, a charger 11, a pulse power module (PPM) 12, a laser resonator, a pulse energy measuring device 13, a pressure sensor 14, a gas supply and exhaust device 16, a laser control unit 17, and a magnetic bearing system 40.

The laser gas is encapsulated in the laser chamber 10. A wall 10c that forms an internal space of the laser chamber 10 is made of a metal material such as aluminum metal. A surface of the metal material is plated with, for example, nickel. The laser chamber 10 includes a pair of discharge electrodes 21a, 21b, an electrical insulator 23, a conductive holder 24, and a fan 26.

The discharge electrodes 21a, 21b excite the laser gas by discharge. The discharge electrodes 21a, 21b are each made of, for example, a metal material containing copper when the halogen gas contains fluorine, and made of a metal material containing nickel when the halogen gas contains chlorine. The discharge electrodes 21a, 21b are arranged to oppose each other with a predetermined space therebetween and substantially parallel to each other in a longitudinal direction.

The electrical insulator 23 is arranged to close an opening formed in the laser chamber 10. The electrical insulator 23 is made of an insulating material having low reactivity with the laser gas. For example, when the halogen gas contains fluorine or chlorine, the electrical insulator 23 is made of high purity alumina ceramics. The electrical insulator 23 supports the discharge electrode 21a. Conductive elements 23a are embedded in the electrical insulator 23. The conductive elements 23a electrically connect a high voltage terminal of the pulse power module 12 and the discharge electrode 21a so that a high voltage supplied from the pulse power module 12 is applied to the discharge electrode 21a.

The conductive holder 24 supports the discharge electrode 21b. The conductive holder 24 is secured to the wall 10c of the laser chamber 10 and electrically connected to the wall 10c. The conductive holder 24 is made of, for example, a metal material containing aluminum or copper, and a surface of the metal material is plated with nickel.

The fan 26 is a cross flow fan that circulates the laser gas in the laser chamber 10 to produce a high speed laser gas flow between the discharge electrodes 21a, 21b. The fan 26 is arranged in substantially parallel with the discharge electrodes 21a, 21b in the longitudinal direction.

The magnetic bearing system 40 magnetically levitates a rotary shaft 27 of the fan 26 with a magnetic force, and rotates the fan 26 via a motor 31 in that state. The magnetic bearing system 40 includes a first magnetic bearing 28, a second magnetic bearing 29, the motor 31, a magnetic coupling 32, a rotation detection unit 33, an inverter 34, and a magnetic bearing control unit 36.

Opposite ends of the rotary shaft 27 of the fan 26 are supported by the first magnetic bearing 28 and the second magnetic bearing 29. The first magnetic bearing 28 and the second magnetic bearing 29 generate magnetic forces, magnetically levitate the rotary shaft 27 with the generated magnetic forces, and rotatably support the rotary shaft 27 without being in contact with the rotary shaft 27.

On a side of the second magnetic bearing 29 in an axial direction of the rotary shaft 27, the motor 31 that generates torque for rotating the fan 26 is provided. The motor 31 is, for example, an induction motor. The magnetic coupling 32 is arranged between the second magnetic bearing 29 and the motor 31. The magnetic coupling 32 uses a magnetic attractive force to transmit the torque of the motor 31 to the rotary shaft 27 of the fan 26 as described later. The rotation detection unit 33 is provided in the first magnetic bearing 28.

The rotation detection unit 33 detects a rotation speed of the fan 26. The rotation detection unit 33 includes, for example, a rotation sensor and a counting circuit. The rotation sensor is provided in the first magnetic bearing 28, and outputs a detection signal for each rotation of the rotary shaft 27. The counting circuit counts the number of detection signals within a predetermined time to detect the rotation speed of the fan 26. The rotation detection unit 33 transmits the detected rotation speed to the magnetic bearing control unit 36. The inverter 34 converts DC supplied from a DC power supply or a converter (not shown) into AC having a desired output frequency and an output voltage, and supplies the AC to the motor 31.

The magnetic bearing control unit 36 receives, from the laser control unit 17, a signal to instruct magnetic levitation of the rotary shaft 27 of the fan 26 or start of rotation of the fan 26, and actuates the first magnetic bearing 28 and the second magnetic bearing 29 or the motor 31.

The magnetic bearing control unit 36 controls a rotation speed and torque of the motor 31 through the inverter 34. The magnetic bearing control unit 36 receives, from the laser control unit 17, data on a target rotation speed Rt of the fan 26, and receives, from the rotation detection unit 33, an actually measured value of the rotation speed of the fan 26. The magnetic bearing control unit 36 controls the inverter 34 so that the actually measured value of the rotation speed of the fan 26 is brought close to the target rotation speed Rt. Specifically, the magnetic bearing control unit 36 uses a control method such as V/f control as control of the inverter 34 to control an output frequency and an output voltage of the inverter 34. Thus, the rotation speed and the torque of the motor 31 are controlled. A detailed configuration of the magnetic bearing system 40 will be described later with reference to FIG. 2.

The charger 11 and the pulse power module 12 constitute a power supply device. The pulse power module 12 includes a charging capacitor (not shown) and a switch 12a. The charger 11 is connected to the charging capacitor and charges the charging capacitor with a predetermined voltage. When the switch 12a is turned on by the control of the laser control unit 17, the pulse power module 12 discharges the charging capacitor. This generates a pulsed high voltage, and the high voltage is applied between the discharge electrodes 21a, 21b.

When the high voltage is applied between the discharge electrodes 21a, 21b, discharge occurs between the discharge electrodes 21a, 21b. The laser gas in the laser chamber 10 is excited by energy of the discharge and transfers to a high energy level. When transferring to a low energy level thereafter, the excited laser gas emits light with a wavelength according to the energy level difference.

Windows 10a, 10b are provided at opposite ends of the laser chamber 10. Light generated in the laser chamber 10 is emitted through the windows 10a, 10b out of the laser chamber 10.

The laser resonator includes a line narrowing module (LNM) 18 and an output coupler (OC) 19. The line narrowing module 18 includes a prism 18a and a grating 18b. The prism 18a expands a beam width of the light emitted from the laser chamber 10 through the window 10b, and transmits the expanded light to the grating 18b.

The grating 18b is a wavelength dispersion element including multiple grooves formed in its surface at predetermined intervals. The grating 18b is provided in a Littrow arrangement with an incident angle being equal to a diffraction angle. The grating 18b selectively extracts light with a wavelength around a specific wavelength from the light having passed through the prism 18a according to the difraction angle, and returns the light into the laser chamber 10. This narrows a spectrum width of the light returned from the grating 18b to the laser chamber 10.

A surface of the output coupler 19 is coated with a partial reflection film. Thus, the output coupler 19 transmits one part of the light emitted from the laser chamber 10 through the window 10a, and reflects and returns the other part into the laser chamber 10.

The light emitted from the laser chamber 10 reciprocates between the line narrowing module 18 and the output coupler 19, and is amplified every time it passes through a laser gain space between the discharge electrodes 21a, 21b. Part of the amplified light is output as a pulse laser beam through the output coupler 19.

The pulse energy measuring device 13 includes a beam splitter 13a, a light focusing optical system 13b, and an optical sensor 13c. The beam splitter 13a is arranged on an optical path of the pulse laser beam. The beam splitter 13a transmits the pulse laser beam having passed through the output coupler 19 toward the exposure apparatus 3 with high transmittance, and reflects part of the pulse laser beam toward the light focusing optical system 13b. The light focusing optical system 13b focuses the beam reflected by the beam splitter 13a on a light receiving surface of the optical sensor 13c. The optical sensor 13c detects the pulse laser beam focused on the light receiving surface, and measures pulse energy of the detected pulse laser beam. The optical sensor 13c outputs data on the measured pulse energy to the laser control unit 17.

The pressure sensor 14 detects gas pressure in the laser chamber 10. The pressure sensor 14 outputs data on the detected gas pressure to the laser control unit 17.

The gas supply and exhaust device 16 is connected to the laser chamber 10 by a gas pipe, and supplies the laser gas into the laser chamber 10 and exhausts the laser gas in the laser chamber 10 out of the laser chamber 10 through the gas pipe.

The laser control unit 17 transmits and receives various signals to and from an exposure apparatus control unit 3a provided in the exposure apparatus 3. The various signals include a signal to instruct the laser control unit 17 to prepare for laser oscillation, data on target pulse energy Et of the pulse laser beam, an oscillation trigger signal that is a timing signal for oscillating the laser beam, or the like.

The laser control unit 17 integrally controls operations of the components of the gas laser apparatus based on the various signals transmitted from the exposure apparatus control unit 3a. For example, the laser control unit 17 transmits a setting signal of a charge voltage to the charger 11, or transmits an oscillation trigger signal to turn on or off the switch to the pulse power module 12. The laser control unit 17 further controls the gas supply and exhaust device 16 based on a detection value of the pressure sensor 14 to control pressure of the laser gas in the laser chamber 10.

The laser control unit 17 refers to the data on the pulse energy received from the pulse energy measuring device 13 and controls the charge voltage of the charger 11 or the pressure of the laser gas, thereby controlling the pulse energy of the pulse laser beam.

As described above, the laser control unit 17 transmits, to the magnetic bearing control unit 36, the signal to instruct magnetic levitation of the rotary shaft 27 of the fan 26 or start of rotation of the fan 26 or the data on the target rotation speed Rt of the fan 26. The magnetic bearing control unit 36 controls rotation of the fan 26 based on the signal or the data received from the laser control unit 17.

2.2 Configuration of Magnetic Bearing System of Fan

FIG. 2 illustrates a configuration of the magnetic bearing system 40. As described above, the magnetic bearing system 40 magnetically levitates the rotary shaft 27 of the fan 26, and controls rotation of the fan 26. Adopting the magnetic bearing system 40 can increase lifetime as compared to when adopting a ball bearing because of no friction due to contact between the rotary shaft 27 and the ball bearing. Also, impurity from a lubricant used in the ball bearing is not mixed in the laser gas, thereby preventing a reduction in output of the pulse laser beam.

The first magnetic bearing 28 includes a first radial bearing portion RB1, an axial bearing portion AXB, and a first case 44. The second magnetic bearing 29 includes a second radial bearing portion RB2 and a second case 46. "Radial" means a radial direction of the rotary shaft 27 including an X-axis direction and a Y-axis direction. "Axial" means an axial direction of the rotary shaft 27 parallel to a Z-axis direction.

The first radial bearing portion RB1 includes a first radial electromagnet M1 and a first radial displacement sensor S1. The second radial bearing portion RB2 includes a second radial electromagnet M2 and a second radial displacement sensor S2. The axial bearing portion AXB includes an axial electromagnet MZ and an axial displacement sensor SZ. The axial electromagnet MZ includes an axial electromagnet MZa and an axial electromagnet MZb.

The first case 44 houses one end of the rotary shaft 27 protruding from the laser chamber 10. A can 48 is provided in the first case 44. In the first case 44, the can 48 is a partition wall that separates an internal space communicating with an inside of the laser chamber 10 from an external space outside thereof. The can 48 includes cans 48a, 48b, 48c. The can 48 is made of a metal material hardly reactive with the laser gas. An example of the metal material includes stainless having a surface plated with nickel. However, stainless corrosive resistant to halogen (for example, SUS316L) does not need to be plated with nickel.

The can 48a is a cylindrical partition wall arranged around the rotary shaft 27 so as to cover the rotary shaft 27. The cans 48b, 48c are disk-shaped partition walls arranged perpendicularly to the rotary shaft 27, and have diameters according to an inner diameter of the first case 44. A target disk 49 is mounted to an edge of the rotary shaft 27 in the first case 44. The cans 48b, 48c are arranged to oppose each other with the target disk 49 therebetween in the axial direction of the rotary shaft 27, and define a space housing the target disk 49.

The first radial electromagnet M1 and the first radial displacement sensor S1 that constitute the first radial bearing portion RB1 are housed in an external space outside the can 48a in the first case 44. The first radial electromagnet M1 and the first radial displacement sensor S1 are arranged around the rotary shaft 27, and secured to an outer surface of the can 48a. In a position opposing the first radial electromagnet M1 on the rotary shaft 27, an electromagnet target 51 is provided, and in a position opposing the first radial displacement sensor S1, a sensor target 52 is provided. The electromagnet target 51 opposes the first radial electromagnet M1 with the can 48a therebetween, and the sensor target 52 opposes the first radial displacement sensor S1 with the can 48a therebetween. The electromagnet target 51 and the sensor target 52 are cylindrical so as to cover an entire circumference of the rotary shaft 27.

The first radial electromagnet M1 generates a magnetic force by energization, and attracts the electromagnet target 51. The electromagnet target 51 is made of a magnetic material hardly reactive with the laser gas. An example of the magnetic material includes permalloy. The electromagnet target 51 is secured to the rotary shaft 27, and thus the magnetic force of the first radial electromagnet M1 acts as an attractive force for attracting the rotary shaft 27. The first radial electromagnet M1 can control the magnetic force by changing a magnitude of a supplied current.

A plurality of first radial electromagnets M1 are arranged around the rotary shaft 27 in opposing positions with the rotary shaft 27 therebetween. The plurality of opposing first radial electromagnets M1 attract the rotary shaft 27 to magnetically levitate the rotary shaft 27 in the radial direction.

The first radial displacement sensor S1 detects a radially levitated position of the rotary shaft 27 that is magnetically levitated by the first radial electromagnets M1. The first radial displacement sensor S1 is, for example, an eddy current displacement sensor that can contactlessly detect a position of the sensor target 52 to be measured.

The eddy current displacement sensor includes a sensor head including a sensor coil, and a driver including an oscillator, a resonator circuit, a detector circuit, a linearizer, or the like. The eddy current displacement sensor supplies a high frequency current to the sensor coil to generate high frequency magnetic flux. The magnetic flux passes through the can 48a and generates an eddy current on a surface of the sensor target 52. A magnitude of the eddy current changes according to a distance between the sensor coil and the sensor target 52. As the distance between the sensor coil and the sensor target 52 changes, impedance of the sensor coil changes and an output voltage output from the resonator circuit changes. The output voltage is converted into a DC voltage proportional to the distance by the detector circuit and the linearizer. The voltage is output, to the magnetic bearing control unit 36, as a detection signal indicating the radially levitated position of the rotary shaft 27 to which the sensor target 52 is secured.

As the displacement sensor that can contactlessly detect the position of the sensor target 52, an inductance change displacement sensor may be used instead of the eddy current displacement sensor. The inductance change displacement sensor includes a sensor head constituted by an iron core around which a coil is wound. With the sensor head, the inductance change displacement sensor detects inductance of the coil that changes according to a size of a gap between the sensor head and the sensor target 52, thereby detecting a distance between the sensor head and the sensor target 52.

The sensor target 52 is made of a metal material hardly reactive with the laser gas and through which the current passes. Examples of the metal material include at least one of copper, nickel, gold, aluminum, and permalloy, and a surface of the metal material may be plated with nickel. The first radial displacement sensor S1 is not limited to the eddy current displacement sensor, but may be a contactless displacement sensor such as an inductance displacement sensor or a capacitive displacement sensor.

The axial electromagnet MZ and the displacement sensor SZ that constitute the axial bearing portion AXB are housed in the external space outside the can 48 in the first case 44. Similarly to the first radial electromagnet M1, the axial electromagnet MZ can control a magnetic force by generating a magnetic force by energization and changing a magnitude of a current. The target disk 49 serves as a target of the axial electromagnet MZ, and the axial electromagnet MZ attracts the target disk 49 with the generated magnetic force. Similarly to the electromagnet target 51, the target disk 49 is made of a magnetic material hardly reactive with the laser gas, and an example of the magnetic material includes permalloy. The target disk 49 is secured to the rotary shaft 27, and thus the magnetic force of the axial electromagnet MZ acts as an attractive force for attracting the rotary shaft 27.

The axial electromagnets MZa, MZb are annular electromagnets, and a total of two axial electromagnets (one for each) are provided. The axial electromagnets MZa, MZb are arranged in opposing positions with the target disk 49 therebetween in the axial direction of the rotary shaft 27. The axial electromagnets MZa, MZb are secured to outer surfaces of the cans 48b, 48c arranged on opposite sides of the target disk 49. The opposing axial electromagnets MZa, MZb attract the rotary shaft 27 to magnetically levitate the rotary shaft 27 in the axial direction.

The displacement sensor SZ is, for example, an eddy current displacement sensor similar to the first radial displacement sensor S1, and detects an axially levitated position of the rotary shaft 27. The target disk 49 serves as a sensor target of the displacement sensor SZ. In the target disk 49, for example, a material that serves as a sensor target is embedded in a position opposing the displacement sensor SZ. The displacement sensor SZ outputs a voltage proportional to a distance from the target disk 49. The voltage is output, to the magnetic bearing control unit 36, as a detection signal indicating the axially levitated position of the rotary shaft 27 to which the target disk 49 is secured.

Configurations of a second radial bearing portion RB2 and a second case 46 that constitute the second magnetic bearing 29 are similar to those of the first magnetic bearing 28, and thus differences will be mainly described. The second case 46 houses one end of the rotary shaft 27 protruding from the laser chamber 10. In the second case 46, a can 54 separates an internal space communicating with the inside of the laser chamber 10 from an external space outside thereof.

Similarly to the can 48a, a can 54a is a cylindrical partition wall arranged around the rotary shaft 27. A can 54b is a disk-shaped partition wall arranged perpendicularly to the rotary shaft 27, and has a diameter according to an inner diameter of the second case 46. A driven side rotor 32b of a magnetic coupling 32 described later is mounted to an edge of the rotary shaft 27 in the second case 46. The driven side rotor 32b is housed in a space between the can 54b and an end wall of the second case 46.

A second radial electromagnet M2 and a second radial displacement sensor S2 that constitute the second radial bearing portion RB2 is housed in an external space outside the can 54a in the second case 46 and secured to an outer surface of the can 54a. In a position opposing the second radial electromagnet M2 on the rotary shaft 27, the electromagnet target 51 is provided, and in a position opposing the second radial displacement sensor S2, the sensor target 52 is provided. The electromagnet target 51 opposes the second radial electromagnet M2 with the can 54a therebetween, and the sensor target 52 opposes the second radial displacement sensor S2 with the can 54a therebetween.

Similarly to the first radial electromagnet M1, the second radial electromagnet M2 generates a magnetic force by energization, and can control the magnetic force by changing a magnitude of a supplied current. The magnetic force of the second radial electromagnet M2 acts as an attractive force for attracting the rotary shaft 27. A plurality of second radial electromagnets M2 are arranged around the rotary shaft 27 in opposing positions with the rotary shaft 27 therebetween. The plurality of opposing second radial electromagnets M2 attract the rotary shaft 27 to magnetically levitate the rotary shaft 27 in the radial direction.

The second radial displacement sensor S2 detects a radially levitated position of the rotary shaft 27 that is magnetically levitated by the second radial electromagnet M2. The second radial displacement sensor S2 is an eddy current displacement sensor similar to the first radial displacement sensor S1.

A motor securing portion 56 for securing the motor 31 to the second case 46 is mounted to an end surface of the second case 46. The motor securing portion 56 is a cylindrical member. One end of the motor securing portion 56 is mounted to an outer periphery of a body of the motor 31, and the other end is secured to the end surface of the second case 46. The motor securing portion 56 houses a drive shaft 31a of the motor 31 and a drive side rotor 32a that constitutes the magnetic coupling 32.

The magnetic coupling 32 includes the drive side rotor 32a and the driven side rotor 32b. The drive side rotor 32a is mounted and secured to the drive shaft 31a of the motor 31, and the driven side rotor 32b is mounted and secured to the rotary shaft 27 of the fan 26. The drive side rotor 32 and the driven side rotor 32b are arranged to oppose each other with an end wall of the second case 46 therebetween.

The magnetic coupling 32 generates a magnetic attractive force between the drive side rotor 32a and the driven side rotor 32b, and couples the rotary shaft 27 of the fan 26 and the drive shaft 31a of the motor 31 with the attractive force to transmit the torque of the motor 31 to the rotary shaft 27 of the fan 26.

2.2.1 Details of Magnetic Coupling

Figures 3A, 3B:
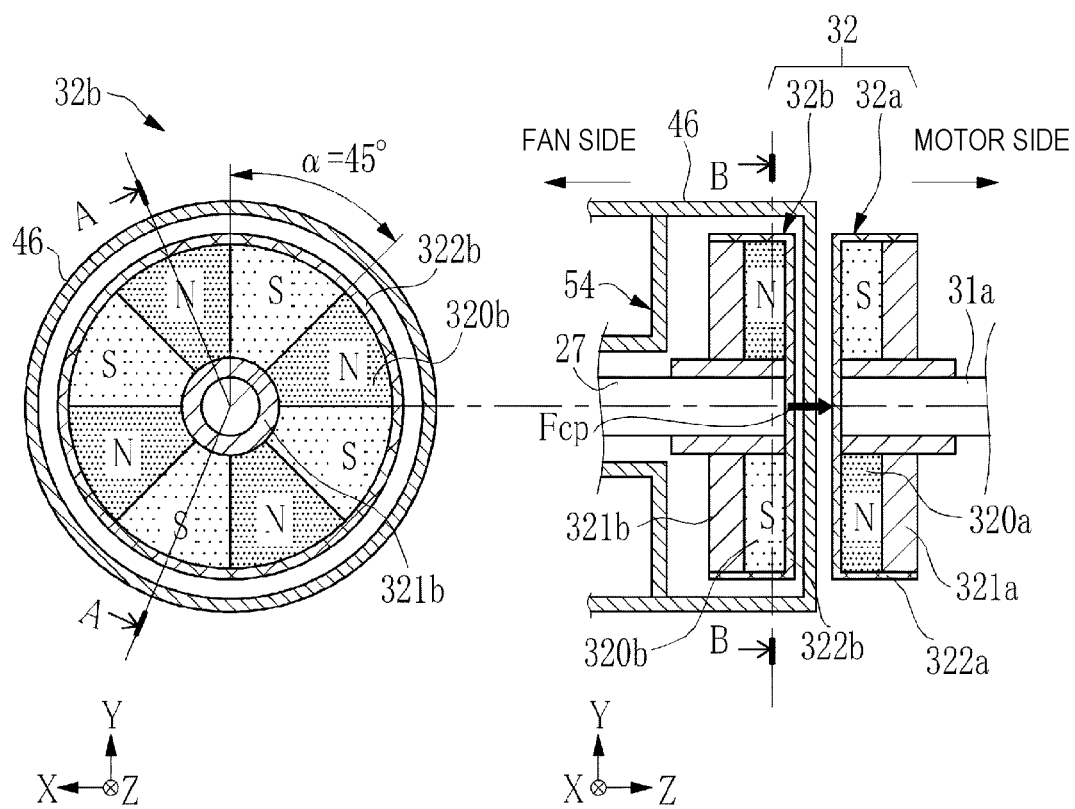
FIGS. 3A and 3B illustrate a configuration of a magnetic coupling.

FIGS. 3A and 3B show details of the magnetic coupling. FIG. 3A shows a section of the magnetic coupling 32 in an X-Y plane perpendicular to the axial direction of the rotary shaft 27, and FIG. 3B shows a section of the magnetic coupling 32 in a Y-Z plane parallel to the axial direction of the rotary shaft 27. FIG. 3A shows a section taken along the line B-B in FIG. 3B, FIG. 3B shows a section taken along the line A-A in FIG. 3A. FIG. 3A shows the driven side rotor 32b, but the drive side rotor 32a has a similar configuration.

As shown in FIGS. 3A and 3B, the drive side rotor 32a and the driven side rotor 32b each have a disk-shaped plane, and include disk-shaped magnet portions 320a, 320b, supports 321a, 321b, and cases 322a, 322b, respectively. The magnet portions 320a, 320b are, for example, of eight-pole type including eight sector magnetic poles with a central angle α of 45°. The magnetic poles are north and south poles of permanent magnets, and the permanent magnets of the north and south poles are alternately arranged circumferentially of the magnet portions 320a, 320b. The supports 321a, 321b each include a circular disk and a rotary shaft securing portion provided at a center of the circular disk. The circular disks support the magnet portions 320a, 320b. The rotary shaft securing portion of the support 321a has a hole through which the drive shaft 31a is inserted. The rotary shaft securing portion of the support 321b has a hole through which the rotary shaft 27 is inserted. The cases 322a, 322b each have a closed-end cylindrical shape, and are mounted to the supports 321a, 321b so as to cover the magnet portions 320a, 320b.

As shown in FIG. 3B, the drive side rotor 32a and the driven side rotor 32b are arranged so that the north pole and the south pole oppose each other. The north pole and the south pole oppose each other to generate, between the drive side rotor 32a and the driven side rotor 32b, an attractive force Fcp that is a magnetic force for attracting each other in the axial direction. A position in the Z-axis direction of the drive shaft 31a to which the drive side rotor 32a is mounted is fixed. Thus, the attractive force Fcp is applied in a direction to bring the driven side rotor 32b close to the drive side rotor 32a, that is, positively in the Z-axis direction that is the axial direction.

When the drive shaft 31a of the motor 31 rotates, the drive side rotor 32a rotates around the Z axis. When the drive side rotor 32a starts rotation, the driven side rotor 32b starts rotation following the rotation of the drive side rotor 32a because the driven side rotor 32b is attracted toward the drive side rotor 32a by the attractive force Fcp. Thus, torque of the drive shaft 31a of the motor 31 is contactlessly transmitted to the rotary shaft 27 of the fan 26.

Figure 4A:
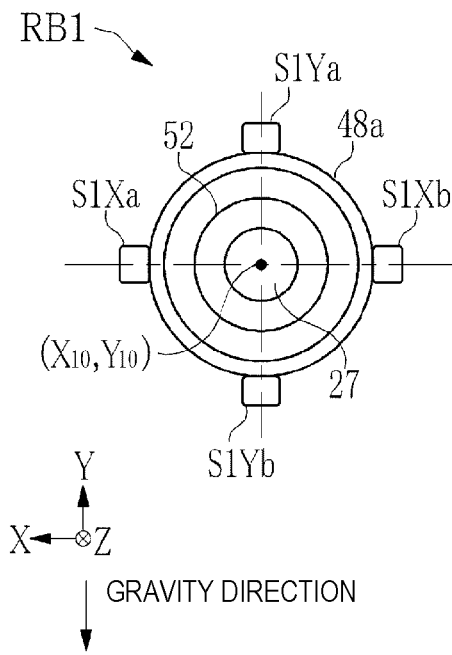
FIGS. 4A to 4D illustrate arrangement of a radial displacement sensor and a radial electromagnet.

2.2.2 Arrangement of Electromagnets and Balance of Forces in Radial Bearing Portion FIGS. 4A to 4D show arrangement of the electromagnets and relationships of balance of forces between the electromagnets in the first radial bearing portion RB1 and the second radial bearing portion RB2. As shown in FIG. 4A, four first radial displacement sensors S1 of the first radial bearing portion RB1 are arranged circumferentially of the rotary shaft 27. Specifically, the first radial displacement sensor S1 includes two first radial displacement sensors S1Xa, S1Xb arranged in opposing positions with the rotary shaft 27 therebetween in the X-axis direction, and two first radial displacement sensors S1Ya, S1Yb arranged in opposing positions with the rotary shaft 27 therebetween in the Y-axis direction. The X-axis direction is a horizontal direction, the Y-axis direction is a vertical direction, and a negative direction in the Y-axis direction is a gravity direction.

The first radial displacement sensors S1Xa, S1Xb each transmit, to the magnetic bearing control unit 36, a detection signal indicating a distance from the rotary shaft 27 in the X-axis direction. The first radial displacement sensors S1Ya, S1Yb each transmit, to the magnetic bearing control unit 36, a detection signal indicating a distance from the rotary shaft 27 in the Y-axis direction.

The magnetic bearing control unit 36 stores, in an internal memory, data on a target position $X_{10}$, $Y_{10}$ in the X-Y plane as a target of a levitated position of the rotary shaft 27. Examples of the data on the target position $X_{10}$, $Y_{10}$ include output values of detection signals from the first radial displacement sensors S1Xa, S1Xb, S1Ya, S1Yb when the rotary shaft 27 is in the target position $X_{10}$, $Y_{10}$. The magnetic bearing control unit 36 evaluates an amount of displacement of the present levitated position of the rotary shaft 27 from the target position $X_{10}$, $Y_{10}$ based on the data on the target position $X_{10}$, $Y_{10}$ and the detection signals from the first radial displacement sensors S1Xa, S1Xb, S1Ya, S1Yb. The amount of displacement is calculated as described below.

The magnetic bearing control unit 36 measures the present position $X_1$ of the levitated position of the rotary shaft 27 based on the detection signals from the first radial displacement sensors S1Xa, S1Xb. The magnetic bearing control unit 36 calculates a difference $\Delta X_1$ between the present position $X_1$ in the X-axis direction and the target position $X_{10}$ in the X-axis direction of the levitated position of the rotary shaft 27 according to the following expression (1).

$$\Delta X_1 = X_1 - x_{10} \tag{1}$$

The magnetic bearing control unit 36 measures the present position $Y_1$ of the levitated position of the rotary shaft 27 based on the detection signals from the first radial displacement sensors S1Ya, S1Yb. The magnetic bearing control unit 36 calculates a difference $\Delta Y_1$ between the present position $Y_1$ in the Y-axis direction and the target position $Y_{10}$ in the Y-axis direction of the levitated position of the rotary shaft 27 according to the following expression (2).

$$\Delta Y_1 = Y_1 - Y_{10} \tag{2}$$

The difference $\Delta X_1$ and the difference $\Delta Y_1$ represent the amounts of displacement of the present levitated position of the rotary shaft 27 from the target position $X_{10}$, $Y_{10}$ in the X-axis direction and the Y-axis direction. The magnetic bearing control unit 36 adjusts the levitated position of the rotary shaft 27 so as to be brought close to the target position $X_{10}$, $Y_{10}$, that is, so that $\Delta X_1$ and $\Delta Y_1$ become 0.

Figure 4B:
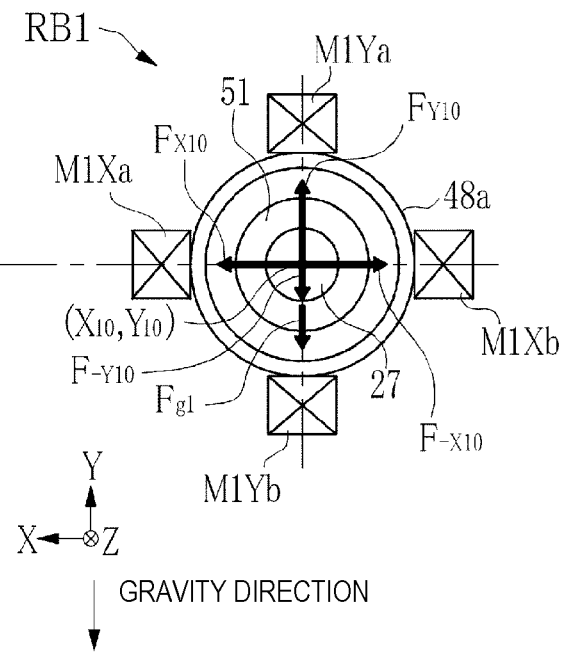

As shown in FIG. 4B, four first radial electromagnets M1 of the first radial bearing portion RB1 are arranged circumferentially of the rotary shaft 27. Specifically, the first radial electromagnet M1 includes two first radial electromagnets M1Xa, M1Xb arranged in opposing positions with the rotary shaft 27 therebetween in the X-axis direction, and two first radial electromagnets M1Ya, M1Yb arranged in opposing positions with the rotary shaft 27 therebetween in the Y-axis direction.

FIG. 4B shows a relationship of balance of forces of the first radial electromagnet M1 applied to the rotary shaft 27 in the first radial bearing portion RB1. The relationship of balance of forces of the first radial electromagnet M1 to adjust the rotary shaft 27 to the target position $X_{10}$, $Y_{10}$ is expressed by the following expressions (3), (4).

$$F_{X10} = F_{-X10} \tag{3}$$

$$F_{Y10} = F_{g1} + F_{-Y10} \tag{4}$$

$F_{X10}$ is an attractive force of the first radial electromagnet M1Xa positively generated in the X-axis direction, and $F_{-X10}$ is an attractive force of the first radial electromagnet M1Xb negatively generated in the X-axis direction.

$F_{Y10}$ is an attractive force of the first radial electromagnet M1Ya positively generated in the Y-axis direction, $F_{-Y10}$ is an attractive force of the first radial electromagnet M1Yb negatively generated in the Y-axis direction. $F_{g1}$ is gravity applied to the rotary shaft 27 in the gravity direction that is the negative direction in the Y-axis direction. $F_{-Y10}$ is smaller than $F_{Y10}$ by the gravity $F_{g1}$.

Current values when the first radial electromagnets M1Xa, M1Xb generate the attractive forces $F_{X10}$, $F_{-X10}$ are $I_{X10}$, $I_{-X10}$. The current values $I_{X10}$, $I_{-X10}$ are values of bias currents supplied to the first radial electromagnets M1Xa, M1Xb. Current values when the first radial electromagnets M1Ya, M1Yb generate the attractive forces $F_{Y10}$, $F_{-Y10}$ are $I_{Y10}$, $I_{-Y10}$. The current values $I_{Y10}$, $I_{-Y10}$ are values of bias currents supplied to the first radial electromagnets M1Ya, M1Yb. The bias currents are currents of initial values supplied when magnetic levitation is started. The bias currents are supplied to the radial electromagnets M1Xa, M1Xb, M1Ya, M1Yb when the rotary shaft 27 starts magnetic levitation.

Figure 4C:
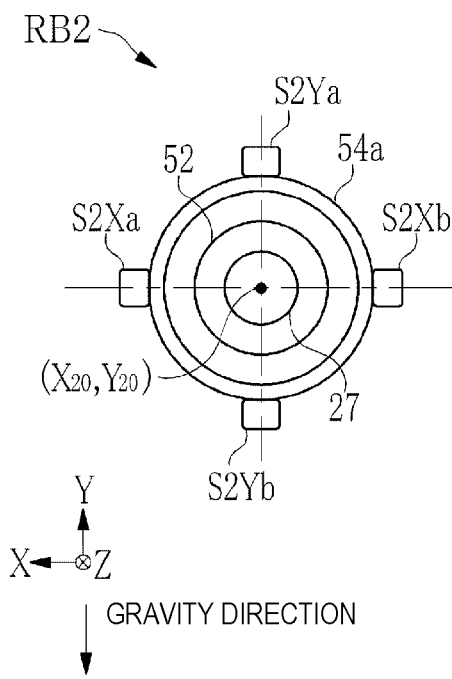

As shown in FIG. 4C, similarly to the first radial bearing portion RB1, four second radial displacement sensors S2 of the second radial bearing portion RB2 are arranged circumferentially of the rotary shaft 27. The second radial displacement sensor S2 includes two second radial displacement sensors S2Xa, S2Xb arranged to oppose each other with the rotary shaft 27 therebetween in the X-axis direction, and two second radial displacement sensors S2Ya, S2Yb arranged to oppose each other with the rotary shaft 27 therebetween in the Y-axis direction.

The second radial displacement sensors S2Xa, S2Xb each transmit, to the magnetic bearing control unit 36, a detection signal indicating a distance from the rotary shaft 27 in the X-axis direction. The second radial displacement sensors S2Ya, S2Yb each transmit, to the magnetic bearing control unit 36, a detection signal indicating a distance from the rotary shaft 27 in the Y-axis direction.

The magnetic bearing control unit 36 stores, in the internal memory, data on a target position $X_{20}$, $Y_{20}$ in the X-Y plane as a target of the levitated position of the rotary shaft 27. Examples of the data on the target position $X_{20}$, $Y_{20}$ include output values of detection signals from the second radial displacement sensors S2Xa, S2Xb, S2Ya, S2Yb when the rotary shaft 27 is in the target position $X_{20}$, $Y_{20}$. The magnetic bearing control unit 36 grasps an amount of displacement of the present levitated position of the rotary shaft 27 from the target position $X_{20}$, $Y_{20}$ based on the data on the target position $X_{20}$, $Y_{20}$ and the detection signals from the second radial displacement sensors S2Xa, S2Xb, S2Ya, S2Yb. The amount of displacement is calculated as described below.

The magnetic bearing control unit 36 measures the present position $X_2$ of the levitated position of the rotary shaft 27 based on the detection signals from the second radial displacement sensors S2Xa, S2Xb. The magnetic bearing control unit 36 calculates a difference $\Delta X_2$ between the present position $X_2$ in the X-axis direction and the target position $X_{20}$ in the X-axis direction of the levitated position of the rotary shaft 27 according to the following expression (5).

$$\Delta X_2 = X_2 - X_{20} \tag{5}$$

The magnetic bearing control unit 36 measures the present position $Y_2$ of the levitated position of the rotary shaft 27 based on the detection signals from the second radial displacement sensors S2Ya, S2Yb. The magnetic bearing control unit 36 calculates a difference $\Delta Y_2$ between the present position $Y_2$ in the Y-axis direction and the target position $Y_{20}$ in the Y-axis direction of the levitated position of the rotary shaft 27 according to the following expression (6).

$$\Delta Y_2 = Y_2 - Y_{20} \tag{6}$$

The difference $\Delta X_2$ and the difference $\Delta Y_2$ represent amounts of displacement of the present levitated position of the rotary shaft 27 from the target position $X_{20}$, $Y_{20}$ in the X-axis direction and the Y-axis direction. The magnetic bearing control unit 36 adjusts the levitated position of the rotary shaft 27 so as to be brought close to the target position $X_{20}$, $Y_{20}$, that is, so that $\Delta X_2$ and $\Delta Y_2$ become 0.

Figure 4D:
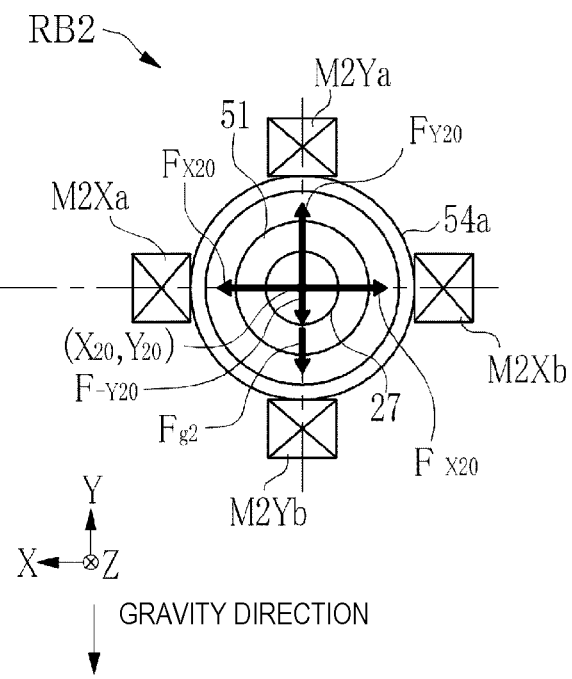

As shown in FIG. 4D, four second radial electromagnets M2 of the second radial bearing portion RB2 are arranged circumferentially of the rotary shaft 27. Specifically, the second radial electromagnet M2 includes two second radial electromagnets M2Xa, M2Xb arranged to oppose each other with the rotary shaft 27 therebetween in the X-axis direction, and two second radial electromagnets M2Ya, M2Yb arranged to oppose each other with the rotary shaft 27 therebetween in the Y-axis direction.

FIG. 4D shows a relationship of balance of forces of the second radial electromagnet M2 applied to the rotary shaft 27 in the second radial bearing portion RB2. The relationship of balance of forces of the second radial electromagnet M2 to adjust the rotary shaft 27 to the target position $X_{20}$, $Y_{20}$ is expressed by the following expressions (7), (8).

$$F_{X20} = F_{-X20} \tag{7}$$

$$F_{Y20} = F_{g2} + F_{-Y20} \tag{8}$$

$F_{X20}$ is an attractive force of the second radial electromagnet M2Xa positively generated in the X-axis direction, and $F_{X20}$ is an attractive force of the second radial electromagnet M2Xb negatively generated in the X-axis direction.

$F_{Y20}$ is an attractive force of the second radial electromagnet M2Ya positively generated in the Y-axis direction, and $F_{-Y20}$ is an attractive force of the second radial electromagnet M2Yb negatively generated in the Y-axis direction. $F_{g2}$ is gravity applied to the rotary shaft 27 in the gravity direction that is the negative direction in the Y-axis direction. $F_{-Y20}$ is smaller than $F_{Y20}$ by the gravity $F_{g2}$.

Current values when the second radial electromagnets M2Xa, M2Xb generate the attractive forces $F_{X20}$, $F_{-X20}$ are $I_{X20}$, $I_{-X20}$. The current values $I_{X20}$, $I_{-X20}$ are values of bias currents supplied to the second radial electromagnets M2Xa, M2Xb. Current values when the second radial electromagnet M2Ya, M2Yb generate the attractive forces $F_{Y20}$, $F_{-Y20}$ are $I_{Y20}$, $I_{-Y20}$. The current values $I_{Y20}$, $I_{-Y20}$ are values of bias currents supplied to the second radial electromagnets M2Ya, M2Yb.

Figure 5:
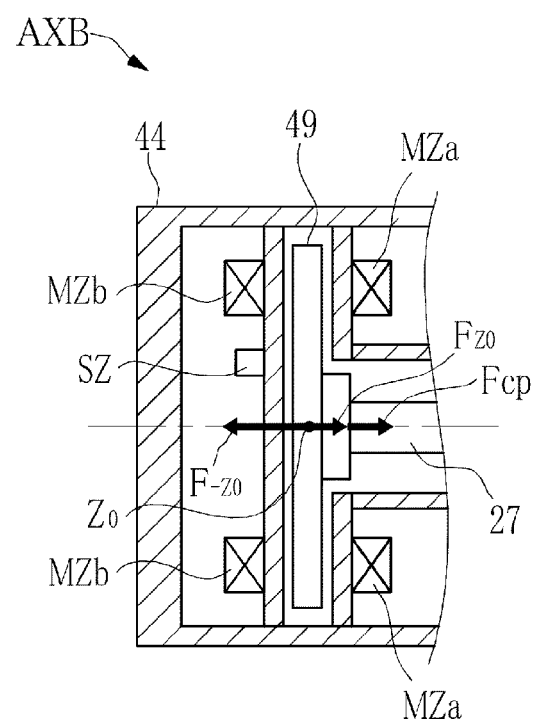
FIG. 5 illustrates a configuration of an axial bearing portion.

2.2.3 Arrangement of Electromagnets and Balance of Forces in Axial Bearing Portion FIG. 5 shows details of the axial bearing portion AXB. The axial displacement sensor SZ of the axial bearing portion AXB transmits, to the magnetic bearing control unit 36, a detection signal indicating a distance in the Z-axis direction from the target disk 49 secured to the rotary shaft 27.

The magnetic bearing control unit 36 stores, in the internal memory, data on a target position $Z_0$ in the Z-axis direction as a target of the levitated position of the rotary shaft 27. Examples of the data on the target position $Z_0$ include an output value of a detection signal from the axial displacement sensor SZ when the rotary shaft 27 is in the target position $Z_0$. The magnetic bearing control unit 36 grasps an amount of displacement of the present levitated position of the rotary shaft 27 from the target position $Z_0$ based on the data on the target position $Z_0$ and the detection signal from the axial displacement sensor SZ. The amount of displacement is calculated as described below.

The magnetic bearing control unit 36 measures the present position Z of the levitated position of the rotary shaft 27 based on the detection signal from the axial displacement sensor SZ. The magnetic bearing control unit 36 calculates a difference $\Delta Z$ between the present position Z in the Z-axis direction and the target position $Z_0$ in the Z-axis direction of the levitated position of the rotary shaft 27 according to the following expression (9).

$$\Delta Z = Z - Z_0 \quad (9)$$

The difference $\Delta Z$ represents the amount of displacement of the present levitated position of the rotary shaft 27 from the target position $Z_0$ in the Z-axis direction. The magnetic bearing control unit 36 adjusts the levitated position of the rotary shaft 27 so as to be brought close to the target position $Z_0$, that is, so that $\Delta Z_1$ becomes 0.

As described above, one axial electromagnets MZ is provided on each side of the target disk 49, and a total of two axial electromagnets MZ are provided. The axial electromagnet MZa arranged on the side of the fan 26 in the positive direction in the Z-axis direction with the target disk 49 between the axial electromagnets MZ generates an attractive force positively in the Z-axis direction. The axial electromagnets MZb arranged in the negative direction with the target disk 49 between the axial electromagnets MZ negatively generates an attractive force in the Z-axis direction.

The axial electromagnet MZa corresponds to a first axial electromagnet that generates an attractive force in the positive direction that is a first direction like the attractive force Fcp of the magnetic coupling 32, and the axial electromagnet MZb corresponds to a second axial electromagnet that generates an attractive force in the negative direction opposite to the first direction.

FIG. 5 shows a relationship of balance of forces of the axial electromagnets MZa, MZb applied to the rotary shaft 27 in the axial bearing portion AXB, the axial electromagnets MZa, MZb being arranged to oppose each other with the target disk 49 therebetween. The relationship of balance of forces of the axial electromagnets MZa, MZb to adjust the rotary shaft 27 to the target position $Z_0$ is expressed by the following expression (10).

$$F_{-Z0} = F_{Z0} + Fcp \quad (10)$$

$F_{Z0}$ is an attractive force of the axial electromagnet MZa positively generated in the Z-axis direction, and $F_{-Z0}$ is an attractive force of the axial electromagnet MZb negatively generated in the Z-axis direction.

Fcp is an attractive force of the magnetic coupling 32 applied to the rotary shaft 27 positively in the Z-axis direction. $F_{Z0}$ is smaller than $F_{-Z0}$ by Fcp.

Current values when the axial electromagnets MZa, MZb generate the attractive forces $F_{Z0}$, $F_{-Z0}$ are $I_{Z0}$, $I_{-Z0}$. The current values $I_{Z0}$, $I_{-Z0}$ are values of bias currents supplied to the axial electromagnets MZa, MZb.

To differentiate the attractive forces generated by the electromagnets M1, M2, MZ from the attractive force generated by the magnetic coupling 32, hereinafter, the attractive forces of the electromagnets M1, M2, MZ are referred to as EM attractive forces, and the attractive force of the magnetic coupling 32 is referred to as a CP attractive force.

2.2.4 Configuration of Magnetic Bearing Control Unit

Figure 6:
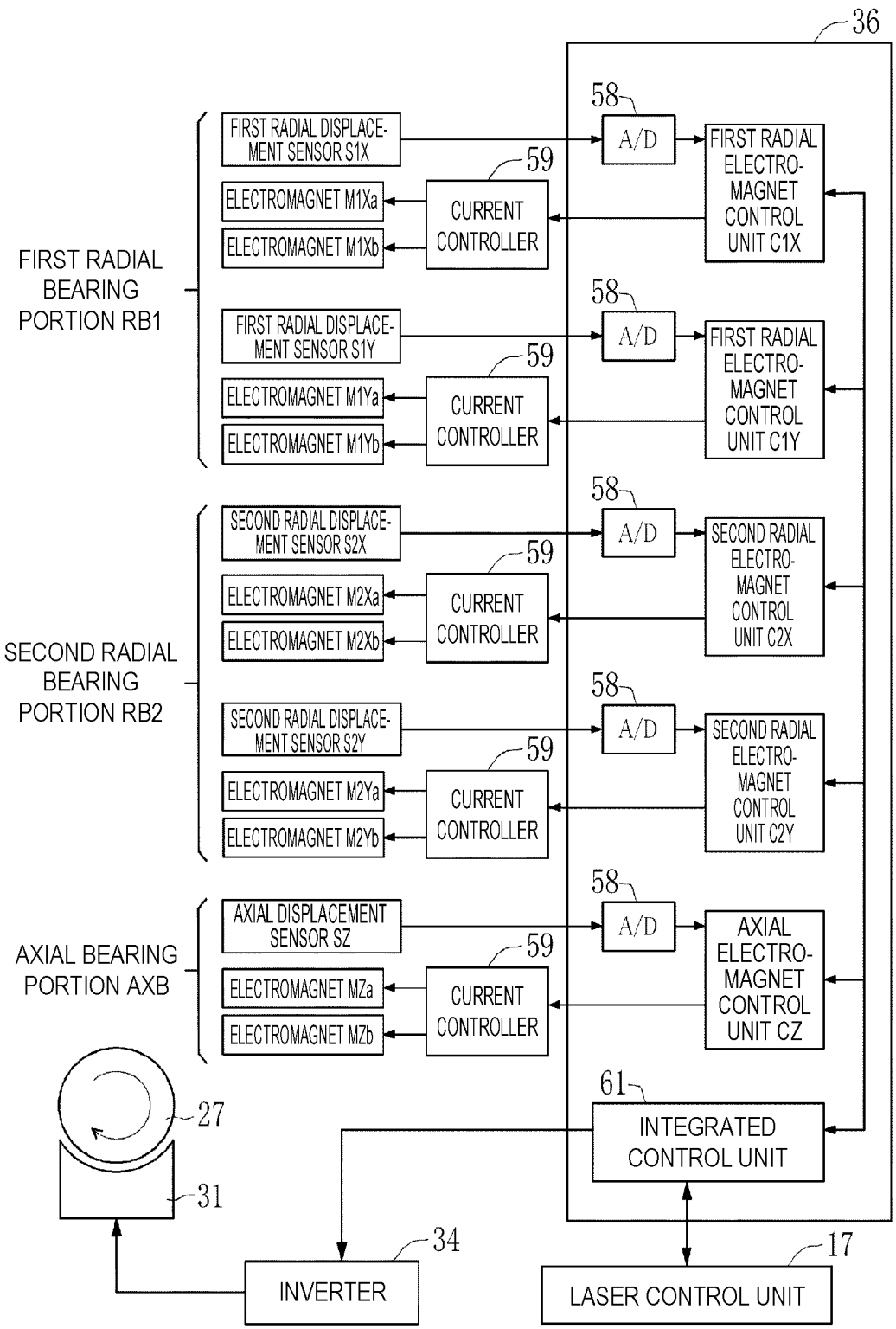
FIG. 6 is a schematic block diagram of an electric configuration of a magnetic bearing control unit according to the comparative example.

FIG. 6 is a schematic block diagram of an electric configuration of the magnetic bearing control unit 36. In FIG. 6, blocks and descriptions of the displacement sensors and the electromagnets are partially omitted for convenience. For example, the first radial displacement sensors S1X, S1Y and the second radial displacement sensors S2X, S2Y are collectively shown by one block, but actually each include the plurality of sensors as shown in FIGS. 4A to 4D.

Further, the first radial electromagnets M1a, M1b, the second radial electromagnets M2a, M2b, and the axial electromagnets MZa, MZb are simply described as "electromagnets" in the blocks without "radial" and "axial". In FIG. 6 and thereafter, the descriptions of "radial" and "axial" are sometimes omitted due to limitations of space or the like.

The magnetic bearing control unit 36 includes first radial electromagnet control units C1X, C1Y, second radial electromagnet control units C2X, C2Y, an axial electromagnet control unit CZ, an A/D converter 58, and an integrated control unit 61. The A/D converter 58 converts analog detection signals output from the displacement sensors S1, S2, SZ to digital data. To the first radial electromagnets M1X, M1Y, the second radial electromagnets M2X, M2Y, and the axial electromagnet MZ, a current controller 59 that controls a current to be supplied to the electromagnets is connected as a drive unit.

The electromagnet control units C1X, C1Y, C2X, C2Y, CZ determine an amount of change in the EM attractive force so that the rotary shaft 27 is brought close to the target positions in the radial direction and the axial direction based on the detection signals input from the displacement sensors S1X, S1Y, S2X, S2Y, SZ. Then, the electromagnet control units C1X, C1Y, C2X, C2Y, CZ determine values of currents to be supplied to the electromagnets M1X, M1Y, M2X, M2Y, MZ based on the determined amount of change in the EM attractive force, and controls the EM attractive force through the current controller 59. The electromagnet control units C1X, C1Y, C2X, C2Y, CZ control the EM attractive force in this manner to adjust the levitated position of the rotary shaft 27.

The integrated control unit 61 is communicably connected to the laser control unit 17 and the electromagnet control units C1X, C1Y, C2X, C2Y, CZ. The integrated control unit 61 receives, from the laser control unit 17, signals to instruct to start and stop magnetic levitation of the rotary shaft 27, and instructs the electromagnet control units C1X, C1Y, C2X, C2Y, CZ to start and stop magnetic levitation. The integrated control unit 61 determines whether or not the levitated position of the rotary shaft 27 is proper based on the signals from the electromagnet control units C1X, C1Y, C2X, C2Y, CZ, and transmits a determination result to the laser control unit 17.

The integrated control unit 61 performs control so that the rotation speed of the motor 31 reaches the target rotation speed Rt through the inverter 34 based on the target rotation speed Rt transmitted from the laser control unit 17.

2.3 Operation of Magnetic Bearing System

When receiving, from the exposure apparatus control unit 3a, the instruction to prepare for laser oscillation of the gas laser apparatus 2, the laser control unit 17 controls the gas supply and exhaust device 16 and supplies the laser gas into the laser chamber 10 up to predetermined pressure. Then, the laser control unit 17 instructs the magnetic bearing control unit 36 to magnetically levitate the rotary shaft 27 of the fan 26. When receiving the instruction to magnetically levitate the rotary shaft 27, the magnetic bearing control unit 36 performs bearing control according to control flows described below.

Figure 7:
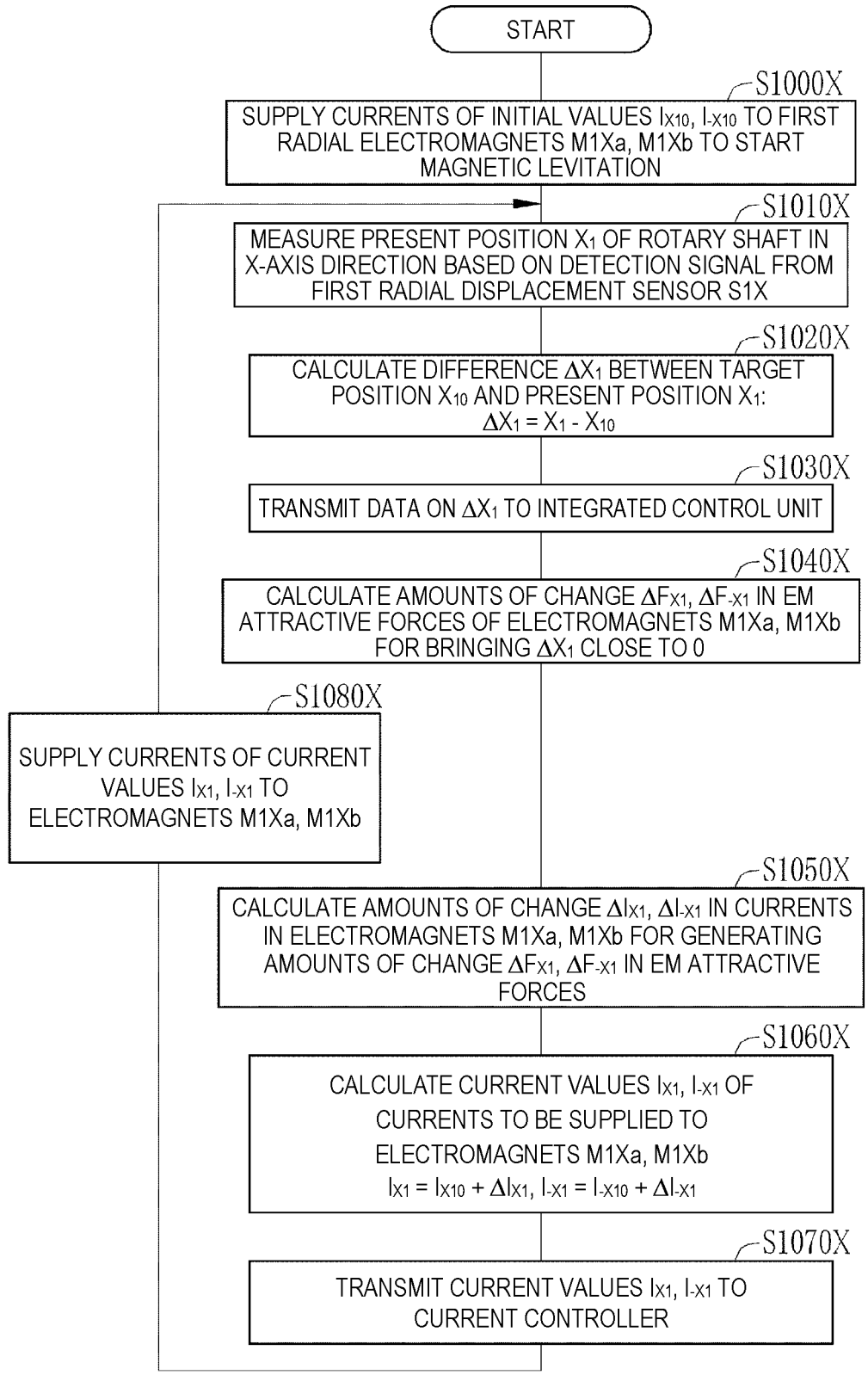
FIG. 7 is a flowchart of a control flow of a first radial electromagnet control unit C1X.

2.3.1 Control Flow of Radial Electromagnet Control Unit 2.3.1.1 Control Flow of First Radial Electromagnet Control Unit C1X FIG. 7 is a flowchart of a control flow of the first radial electromagnet control unit C1X. When receiving the instruction to start magnetic levitation of the rotary shaft 27, in S1000X, the first radial electromagnet control unit C1X supplies bias currents of the initial values $I_{X10}$, $I_{-X10}$ to the first radial electromagnets M1Xa, M1Xb to start magnetic levitation. The initial values $I_{X10}$, $I_{-X10}$ are current values required for the first radial electromagnets M1Xa, M1Xb to generate the EM attractive forces $F_{X10}$, $F_{-X10}$ to adjust the rotary shaft 27 to the target position $X_{10}$ as described above. Thus, unless an external force other than the EM attractive forces $F_{X10}$, $F_{-X10}$ is applied to the rotary shaft 27, the rotary shaft 27 is magnetically levitated near the target position X10. After the start of magnetic levitation, output of the detection signal from the first radial displacement sensor S1X to the first radial electromagnet control unit C1X is started.

In S1010X, the first radial electromagnet control unit C1X measures the present position $X_1$ of the levitated position of the rotary shaft 27 in the X-axis direction based on the detection signal from the first radial displacement sensor S1X. In S1020X, the first radial electromagnet control unit C1X calculates a difference $\Delta X_1$ between the target position $X_{10}$ and the present position $X_1$ according to the expression (1). The difference $\Delta X_1$ is an amount of displacement of the rotary shaft 27 from the target position $X_{10}$. The difference $\Delta X_1$ may be a positive value or a negative value according to whether the present position $X_1$ is on a positive side or a negative side of the target position $X_{10}$. Specifically, from the expression (1), when the present position $X_1$ is on the positive side of the target position $X_{10}$, the difference $\Delta X_1$ is a positive value, while when the present position $X_1$ is on the negative side of the target position $X_{10}$, the difference $\Delta X_1$ is a negative value. When the present position $X_1$ matches the target position $X_{10}$, the difference $\Delta X_1$ is 0.

In S1030X, the first radial electromagnet control unit C1X transmits data on the difference $\Delta X_1$ to the integrated control unit 61.

In S1040X, the first radial electromagnet control unit C1X calculates amounts of change $\Delta F_{X1}$, $\Delta F_{-X1}$ in the EM attractive forces of the first radial electromagnets M1Xa, M1Xb for bringing the difference $\Delta X_1$ close to 0 based on the difference $\Delta X_1$.

Specifically, the first radial electromagnet control unit C1X increases the EM attractive force of one of the first radial electromagnets M1Xa, M1Xb and decreases the EM attractive force of the other to bring the rotary shaft 27 close to the target position $X_{10}$ according to an amount of positive or negative displacement of the rotary shaft 27 from the target position $X_{10}$. For this purpose, the first radial electromagnet control unit C1X calculates the amounts of change $\Delta F_{X1}$, $\Delta F_{-X1}$ for the first radial electromagnets M1Xa, M1Xb.

The amounts of change $\Delta F_{X1}$, $\Delta F_{-X1}$ in the EM attractive forces refer to amounts of forces assigned to the electromagnets M1Xa, M1Xb arranged to oppose each other. The change $\Delta F_{X1}$, $\Delta F_{-X1}$ are equal in amount but different in direction. The amounts of change $\Delta F_{X1}$, $\Delta F_{-X1}$ in the EM attractive forces are increased or decreased in the X-axis direction from the initial attractive forces $F_{X10}$, $F_{-X10}$ to bring the rotary shaft 27 displaced from the target position $X_{10}$ by the difference $\Delta X_1$ close to the target position $X_{10}$.

For example, in FIG. 4B, when the present position $X_1$ of the rotary shaft 27 is positively displaced from the target position $X_{10}$ in the X-axis direction, that is, when the difference $\Delta X_1$ is a positive value, the rotary shaft 27 needs to be negatively moved to be returned to the target position $X_{10}$. For this purpose, the first radial electromagnet control unit C1X decreases the positive EM attractive force $F_{X10}$ of the first radial electromagnet M1Xa by $\Delta F_{X1}$, and increases the negative EM attractive force $F_{-X10}$ of the first radial electromagnet M1Xb by $\Delta F_{-X1}$. Specifically, when the difference $\Delta X_1$ is the positive value, the amount of change $\Delta F_{-X1}$ in the negative EM attractive force $F_{-X10}$ is the positive value, and the amount of change $\Delta F_{X1}$ in the positive EM attractive force $F_{X10}$ is the negative value.

On the other hand, when the present position $X_1$ of the rotary shaft 27 is negatively displaced from the target position $X_{10}$ in the X-axis direction, that is, when the difference $\Delta X_1$ is a negative value, the rotary shaft 27 needs to be positively moved to be brought close to the target position $X_{10}$. For this purpose, the first radial electromagnet control unit C1X decreases the negative EM attractive force $F_{-X10}$ by $\Delta F_{-X1}$, and increases the positive EM attractive force $F_{X10}$ by $\Delta F_{X1}$. Specifically, when the difference $\Delta X_1$ is the negative value, the amount of change $\Delta F_{-X1}$ in the negative EM attractive force $F_{-X10}$ is the negative value, and the amount of change $\Delta F_{X1}$ in the positive EM attractive force $F_{X10}$ is the positive value.

As such, when one of the amount of change $\Delta F_{X1}$ and the amount of change $\Delta F_{-X1}$ is the positive value, the other is the negative value. When the difference $\Delta X_1$ is 0, the amounts of change $\Delta F_{X1}$, $\Delta F_{-X1}$ are also 0.

When the rotary shaft 27 is moved in one direction, the equal amounts of change $\Delta F_{X1}$, $\Delta F_{-X1}$ are assigned to the electromagnets M1Xa, M1Xb arranged to oppose each other to expand a control range of forces of the electromagnets M1Xa, M1Xb. For example, as a method for assigning the amount of change in force to move the rotary shaft 27 in one direction, a total amount of change may be assigned to one of the first radial electromagnets M1Xa, M1Xb. However, since the control range of force of each electromagnet is limited, assigning the amount of change in a distributed manner to both the electromagnets can prevent saturation of the control range of force of one electromagnet. This can expand the total control range of force of the electromagnets.

In S1050X, the first radial electromagnet control unit C1X calculates amounts of change $\Delta I_{X1}$, $\Delta I_{-X1}$ in currents in the first radial electromagnets M1Xa, M1Xb for generating the amounts of change $\Delta F_{X1}$, $\Delta F_{-X1}$ in the EM attractive forces. The amount of change $\Delta I_{X1}$ in the current is a positive value when the amount of change $\Delta F_{X1}$ in the positive EM attractive force is positive, and a negative value when the amount of change $\Delta F_{X1}$ is negative. Similarly, the amount of change $\Delta I_{-X1}$ in the current is a positive value when the amount of change $\Delta F_{-X1}$ in the negative EM attractive force is positive, and a negative value when the amount of change $\Delta F_{-X1}$ is negative. When the difference $\Delta X_1$ is 0, the amounts of change $\Delta I_{X1}$, $\Delta I_{X1}$ are also 0.

As such, the amounts of change $\Delta F_{X1}$, $\Delta F_{X1}$ have the same positive and negative signs as the amounts of change $\Delta I_{X1}$, $\Delta I_{-X1}$ in the currents. As described above, when one of the amounts of change $\Delta F_{X1}$, $\Delta F_{-X1}$ is a positive value, the other is a negative value. Thus, when one of the amounts of change $\Delta I_{X1}$, $\Delta I_{-X1}$ in the currents is a positive value, the other is also a negative value.

In S1060X, the first radial electromagnet control unit C1X calculates current values $I_{X1}$, $I_{-X1}$ of the currents to be supplied to the first radial electromagnets M1Xa, M1Xb according to the following expressions (11), (12).

$$I_{X1} = I_{X10} + \Delta I_{X1} \tag{11}$$

$$I_{-X1} = I_{-X10} + \Delta I_{-X1} \tag{12}$$

When one of the amounts of change $\Delta I_{X1}$, $\Delta I_{-X1}$ in the currents is a positive value, the other is a negative value. Thus, in the calculations by the expressions (11), (12), one of an absolute value of the amount of change $\Delta I_{X1}$ and an absolute value of the amount of change $\Delta I_{-X1}$ is added, and the other is subtracted. Thus, from the calculations by the expressions (11), (12), when the difference $\Delta X_1$ is positive and the rotary shaft 27 is negatively moved, the absolute value of the amount of change $\Delta I_{X1}$ in the current is subtracted from the initial value $I_{X10}$ of the current in the electromagnet M1Xa for generating the positive EM attractive force $F_{X10}$. On the other hand, the absolute value of the amount of change $\Delta I_{-X1}$ in the current is added to the initial value $I_{-X10}$ of the current in the electromagnet M1Xb for generating the negative EM attractive force $F_{-X10}$. The current values $I_{X1}$, $I_{-X1}$ are calculated in this manner.

Conversely, when the difference $\Delta X_1$ is negative and the rotary shaft 27 is positively moved, the absolute value of the amount of change $\Delta I_{X1}$ in the current is added to the initial value $I_{X10}$ of the current in the electromagnet M1Xa for generating the positive EM attractive force $F_{X10}$. On the other hand, the absolute value of the amount of change $\Delta I_{-X1}$ in the current is subtracted from the initial value $I_{-X10}$ of the current in the electromagnet M1Xb for generating the negative EM attractive force $F_{-X10}$. The absolute values of the current value $I_{X1}$ and the current value $I_{-X1}$ are calculated in this manner.

As shown in FIG. 4B, the first radial electromagnets M1Xa, M1Xb are arranged to oppose each other, and thus one generates the positive EM attractive force and the other generates the negative EM attractive force in the X-axis direction. Thus, as shown in the control flow in FIG. 7, when the rotary shaft 27 is displaced in one direction in the X-axis direction, the first radial electromagnet control unit C1X performs control to increase one of the current values $I_{X1}$, $I_{-X1}$ and decrease the other so as to increase the EM attractive force of one of the first radial electromagnets M1Xa, M1Xb and decrease the EM attractive force of the other. Which of the current values $I_{X1}$, $I_{-X1}$ is increased and decreased depends on the direction of displacement of the rotary shaft 27 from the target position $X_{10}$.

In S1070X, the first radial electromagnet control unit C1X transmits the calculated current values $I_{X1}$, $I_{-X1}$ to the current controller 59 connected thereto. Thus, the first radial electromagnet control unit C1X supplies the currents of the calculated current values through the current controller 59 to the electromagnets M1Xa, M1Xb (S1080X).

The first radial electromagnet control unit C1X repeats steps S1010X to S1080 until an instruction to stop magnetic levitation is provided.

2.3.1.2 Control Flow of First Radial Electromagnet Control Unit C1Y

Figure 8:
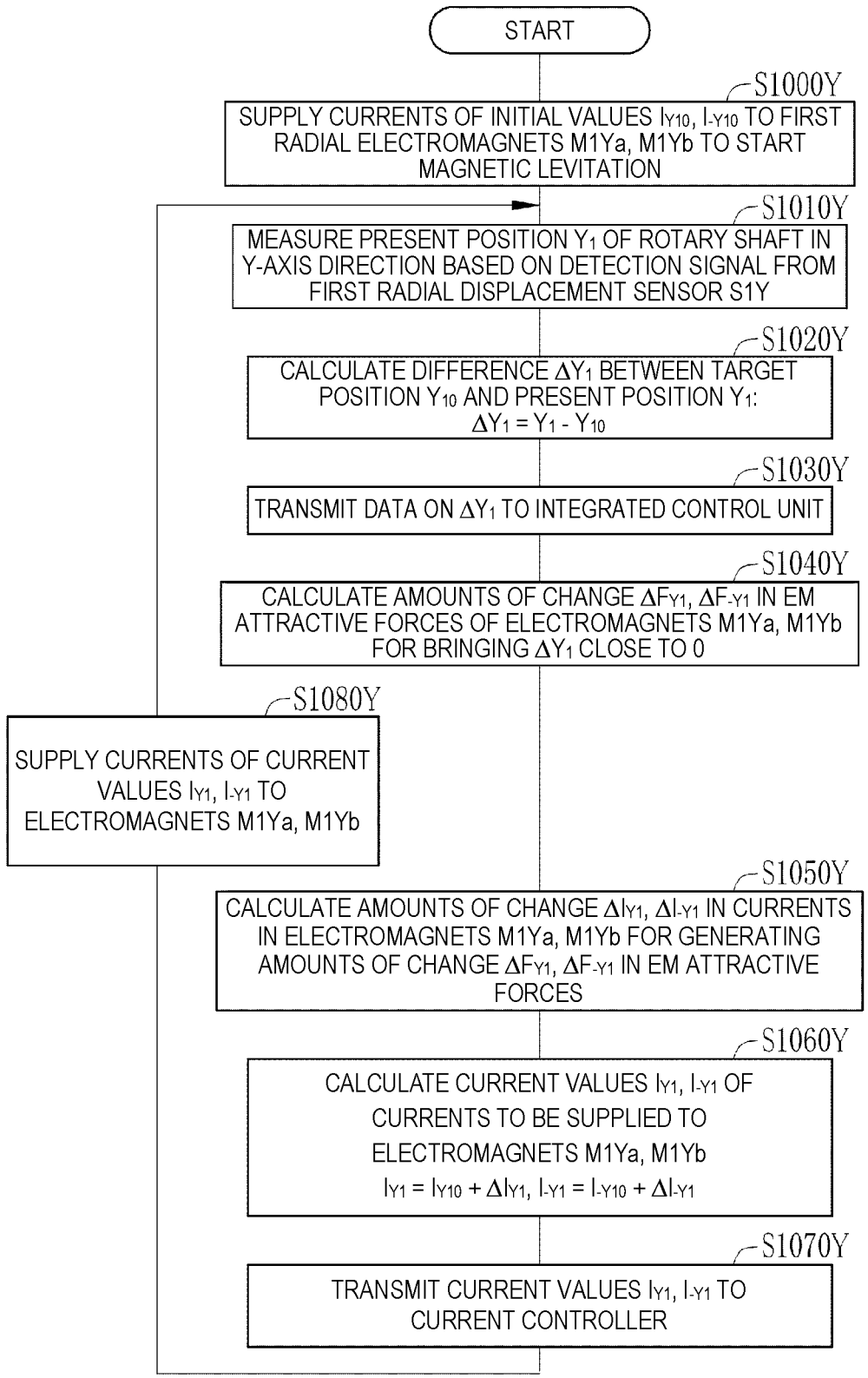
FIG. 8 is a flowchart of a control flow of a first radial electromagnet control unit C1Y.

FIG. 8 is a flowchart of a control flow of the first radial electromagnet control unit C1Y. The control flow of the first radial electromagnet control unit C1Y is similar to that of the first radial electromagnet control unit C1X in FIG. 7 except that the control direction is the Y-axis direction instead of the X-axis direction, and thus similar descriptions are omitted as required.

In S1000Y, the first radial electromagnet control unit C1Y supplies bias currents of the initial values $I_{Y10}$, $I_{-Y10}$ to the first radial electromagnets M1Ya, M1Yb to start magnetic levitation. Thus, unless an external force other than the EM attractive forces $F_{Y10}$, $F_{-Y10}$ is applied to the rotary shaft 27, the rotary shaft 27 is magnetically levitated near the target position $Y_{10}$. In S1010Y, the first radial electromagnet control unit C1Y measures the present position $Y_1$ of the levitated position of the rotary shaft 27 in the Y-axis direction based on the detection signal input from the first radial displacement sensor S1Y. In S1020Y, the first radial electromagnet control unit C1Y calculates a difference $\Delta Y_1$ between the target position $Y_{10}$ and the present position $Y_1$ according to the expression (2).

In S1030Y, the first radial electromagnet control unit C1Y transmits data on the difference $\Delta Y_1$ to the integrated control unit 61.

In S1040Y, the first radial electromagnet control unit C1Y calculates amounts of change $\Delta F_{Y1}$, $F_{-Y1}$ in the EM attractive forces of the first radial electromagnets M1Ya, M1Yb for bringing the difference $\Delta Y_1$ close to 0. The amounts of change $\Delta F_{Y1}$, $\Delta F_{-Y1}$ in the EM attractive forces are increased or decreased in the Y-axis direction from the initial attractive forces $F_{Y10}$, $F_{-Y10}$ to bring the rotary shaft 27 displaced from the target position $Y_{10}$ by the difference $\Delta Y_1$ close to the target position $Y_{10}$.

In S1050Y, the first radial electromagnet control unit C1Y calculates amounts of change $\Delta I_{Y1}$, $\Delta I_{-Y1}$ in currents in the first radial electromagnets M1Ya, M1Yb for generating the amounts of change $\Delta F_{Y1}$, $\Delta F_{-Y1}$ in the EM attractive forces.

In S1060Y, the first radial electromagnet control unit C1Y calculates current values $I_{Y1}$, $I_{-Y1}$ of the currents to be supplied to the first radial electromagnets M1Ya, M1Yb according to the following expressions (13), (14).

$$I_{Y1} = I_{Y10} + \Delta I_{Y1} \tag{13}$$

$$I_{-Y1} = I_{-Y10} + \Delta I_{-Y1} \tag{14}$$

As shown in FIG. 4B, the first radial electromagnets M1Ya, M1Yb are arranged to oppose each other, and thus one generates a positive EM attractive force and the other generates a negative EM attractive force in the Y-axis direction. Thus, as shown in the control flow in FIG. 8, when the rotary shaft 27 is displaced in one direction in the Y-axis direction, the first radial electromagnet control unit C1Y performs control to increase one of the current values $I_{Y1}$, $I_{-Y1}$ and decrease the other so as to increase the EM attractive force of one of the first radial electromagnets M1Ya, M1Yb and decrease the EM attractive force of the other. Which of the current values $I_{Y1}$, $I_{-Y1}$ is increased and decreased depends on the direction of displacement of the rotary shaft 27 from the target position $Y_{10}$.

In S1070Y, the first radial electromagnet control unit C1Y transmits the calculated current values $I_{Y1}$, $I_{-Y1}$ to the current controller 59 connected thereto. Thus, the first radial electromagnet control unit C1Y supplies the currents of the calculated current values $I_{Y1}$, $I_{-Y1}$ through the current controller 59 to the electromagnets M1Ya, M1Yb (S1080Y).

The first radial electromagnet control unit C1Y repeats steps S1010Y to S1080Y until an instruction to stop magnetic levitation is provided.

2.3.1.3 Control Flow of Second Radial Electromagnet Control Unit C2X

Figure 9:
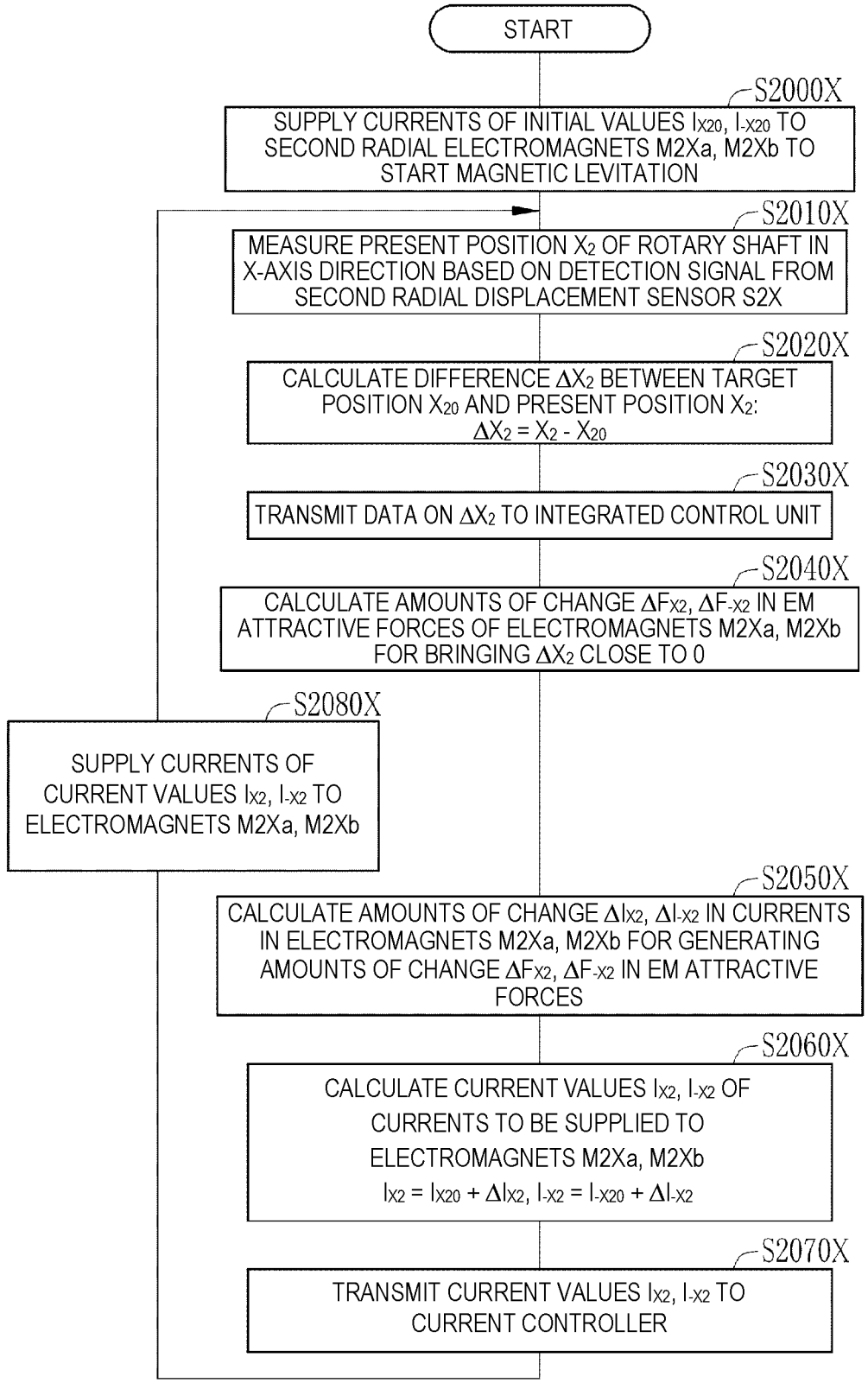
FIG. 9 is a flowchart of a control flow of a second radial electromagnet control unit C2X.

FIG. 9 is a flowchart of a control flow of the second radial electromagnet control unit C2X. The control flow of the second radial electromagnet control unit C2X is also similar to that of the first radial electromagnet control unit C1X in FIG. 7, and thus similar descriptions are omitted as required.

In S2000X, the second radial electromagnet control unit C2X supplies bias currents of the initial values $I_{X20}$, $I_{-X20}$ to the second radial electromagnets M2Xa, M2Xb to start magnetic levitation. Thus, unless an external force other than the EM attractive forces $F_{X20}$, $F_{-X20}$ is applied to the rotary shaft 27, the rotary shaft 27 is magnetically levitated near the target position $X_{20}$. In S2010X, the second radial electromagnet control unit C2X measures the present position $X_2$ of the levitated position of the rotary shaft 27 in the X-axis direction based on the detection signal input from the second radial displacement sensor S2X. In S2020X, the second radial electromagnet control unit C2X calculates a difference $\Delta X_2$ between the target position $X_{20}$ and the present position $X_2$ according to the expression (5).

In S2030X, the second radial electromagnet control unit C2X transmits data on the difference $\Delta X_2$ to the integrated control unit 61.

In S2040X, the second radial electromagnet control unit C2X calculates amounts of change $\Delta F_{X2}$, $\Delta F_{-X2}$ in the EM attractive forces of the second radial electromagnets M2Xa, M2Xb for bringing the difference $\Delta X_2$ close to 0. The amounts of change $\Delta F_{X2}$, $\Delta F_{-X2}$ in the EM attractive forces are increased or decreased in the X-axis direction from the initial attractive forces $F_{X20}$, $F_{-X20}$ to bring the rotary shaft 27 displaced from the target position $X_{20}$ by the difference $\Delta X_2$ close to the target position $X_{20}$.

In S2050X, the second radial electromagnet control unit C2X calculates amounts of change $\Delta I_{X2}$, $I_{-X2}$ in currents in the second radial electromagnets M2Xa, M2Xb for generating the amounts of change $\Delta F_{X2}$, $\Delta F_{-X2}$ in the EM attractive forces.

In S2060X, the second radial electromagnet control unit C2X calculates current values $I_{X2}$, $I_{-X2}$ of the currents to be supplied to the second radial electromagnets M2Xa, M2Xb according to the following expressions (15), (16).

$$I_{X2} = I_{X20} + \Delta I_{X2} \quad (15)$$

$$I_{-X2} = I_{-X20} + \Delta I_{-X2} \quad (16)$$

As shown in FIG. 4D, the second radial electromagnets M2Xa, M2Xb are arranged to oppose each other, and thus one generates a positive EM attractive force and the other generates a negative EM attractive force in the X-axis direction. Thus, as shown in the control flow in FIG. 9, when the rotary shaft 27 is displaced in one direction in the X-axis direction, the second radial electromagnet control unit C2X performs control to increase one of the current values $I_{X2}$, $I_{-X2}$ and decrease the other so as to increase the EM attractive force of one of the second radial electromagnets M2Xa, M2Xb and decrease the EM attractive force of the other. Which of the current values $I_{X2}$, $I_{-X2}$ is increased and decreased depends on the direction of displacement of the rotary shaft 27 from the target position $X_{20}$.

In S2070X, the second radial electromagnet control unit C2X transmits the calculated current values $I_{X2}$, $I_{-X2}$ to the current controller 59 connected thereto. Thus, the second radial electromagnet control unit C2X supplies the currents of the calculated current values $I_{X2}$, $I_{-X2}$ through the current controller 59 to the electromagnets M2Xa, M2Xb (S2080X).

The second radial electromagnet control unit C2X repeats steps S2010X to S2080X until an instruction to stop magnetic levitation is provided.

2.3.1.4 Control Flow of Second Radial Electromagnet Control Unit C2Y

Figure 10:
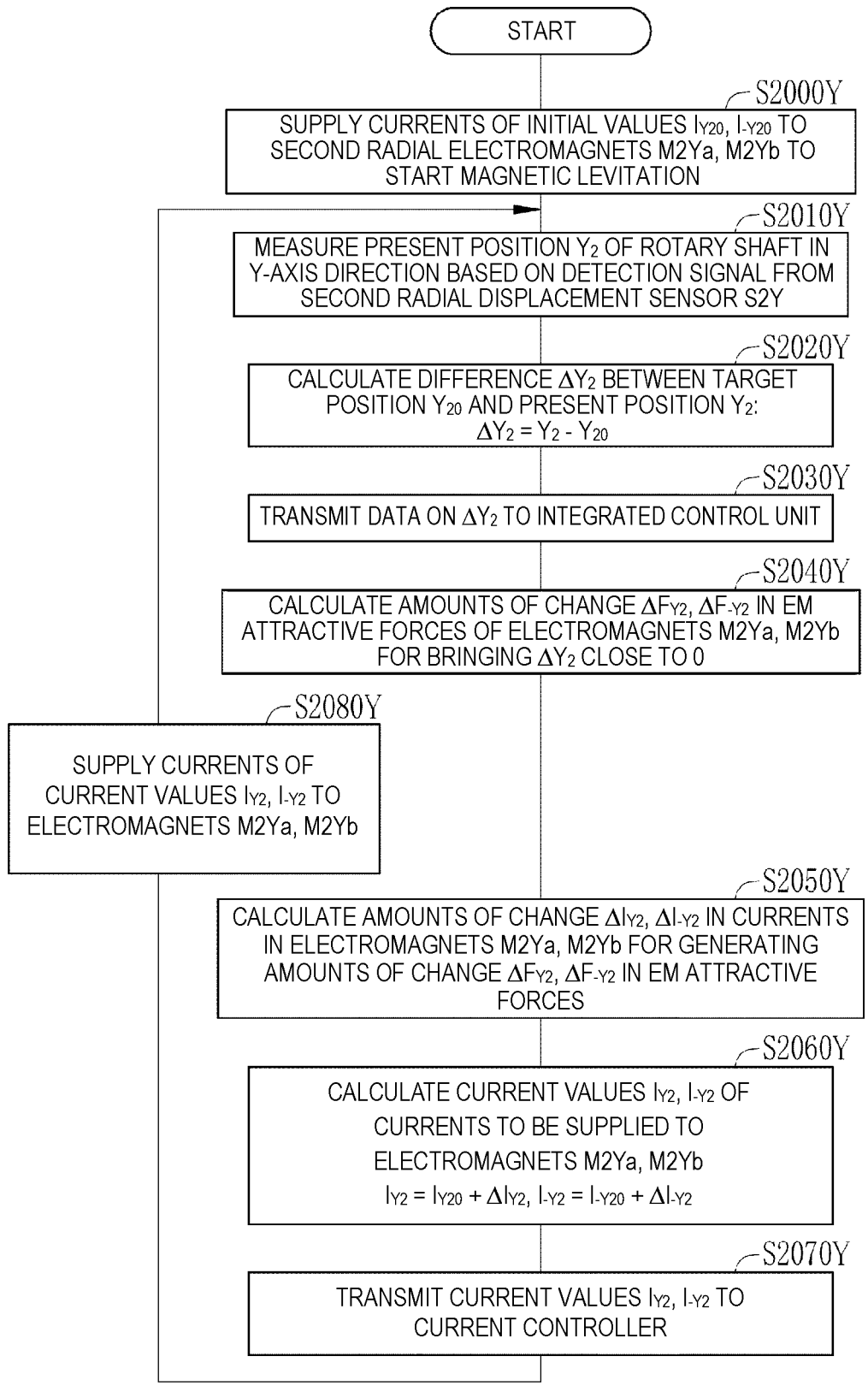
FIG. 10 is a flowchart of a control flow of a second radial electromagnet control unit C2Y.

FIG. 10 is a flowchart of a control flow of the second radial electromagnet control unit C2Y. The control flow of the second radial electromagnet control unit C2Y is also similar to that of the first radial electromagnet control unit C1X in FIG. 7, and thus similar descriptions are omitted as required.

In S2000Y, the second radial electromagnet control unit C2Y supplies bias currents of the initial values $I_{Y20}$, $I_{-Y20}$ to the second radial electromagnets M2Ya, M2Yb to start magnetic levitation. Thus, unless an external force other than the EM attractive forces $F_{Y20}$, $F_{-Y20}$ is applied to the rotary shaft 27, the rotary shaft 27 is magnetically levitated near the target position $Y_{20}$. In S2010Y, the second radial electromagnet control unit C2Y measures the present position $Y_2$ of the rotary shaft 27 in the Y-axis direction based on the detection signal input from the second radial displacement sensor S2Y. In S2020Y, the second radial electromagnet control unit C2Y calculates a difference $\Delta Y_2$ between the target position $Y_{20}$ and the present position $Y_2$ according to the expression (6).

In S2030Y, the second radial electromagnet control unit C2Y transmits data on the difference $\Delta Y_2$ to the integrated control unit 61.

In S2040Y, the second radial electromagnet control unit C2Y calculates amounts of change $\Delta F_{Y2}$, $\Delta F_{-Y2}$ in the EM attractive forces of the second radial electromagnets M2Ya, M2Yb for bringing the difference $\Delta Y_2$ close to 0. The amounts of change $\Delta F_{Y2}$, $\Delta F_{-Y2}$ in the EM attractive forces are increased or decreased in the Y-axis direction from the initial attractive forces $F_{Y20}$, $F_{-Y20}$ to bring the rotary shaft 27 displaced from the target position $Y_{20}$ by the difference $\Delta Y_2$ close to the target position $Y_{20}$.

In S2050Y, the second radial electromagnet control unit C2Y calculates amounts of change $\Delta I_{Y2}$, $\Delta I_{-Y2}$ in currents in the second radial electromagnets M2Ya, M2Yb for generating the amounts of change $\Delta F_{Y2}$, $\Delta F_{-Y2}$ in the EM attractive forces.

In S2060Y, the second radial electromagnet control unit C2Y calculates current values $I_{Y2}$, $I_{-Y2}$ of the currents to be supplied to the second radial electromagnets M2Ya, M2Yb according to the following expressions (17), (18).

$$I_{Y2} = I_{Y20} + \Delta I_{Y2} \quad (17)$$

$$I_{-Y2} = I_{-Y20} + \Delta I_{-Y2} \quad (18)$$

As shown in FIG. 4D, the second radial electromagnets M2Ya, M2Yb are arranged to oppose each other, and thus one generates a positive EM attractive force and the other generates a negative EM attractive force in the Y-axis direction. Thus, as shown in the control flow in FIG. 10, when the rotary shaft 27 is displaced in one direction in the Y-axis direction, the second radial electromagnet control unit C2Y performs control to increase one of the current values $I_{Y2}$, $I_{-Y2}$ and decrease the other so as to increase the EM attractive force of one of the second radial electromagnets M2Ya, M2Yb and decrease the EM attractive force of the other. Which of the current values $I_{Y2}$, $I_{-Y2}$ is increased and decreased depends on the direction of displacement of the rotary shaft 27 from the target position $Y_{20}$.

In S2070Y, the second radial electromagnet control unit C2Y transmits the calculated current values $I_{Y2}$, $I_{-Y2}$ to the current controller 59 connected thereto. Thus, the second radial electromagnet control unit C2Y supplies the currents of the calculated current values $I_{Y2}$, $I_{-Y2}$ through the current controller 59 to the electromagnets M2Ya, M2Yb (S2080Y).

The second radial electromagnet control unit C2Y repeats steps S2010Y to S2080Y until an instruction to stop magnetic levitation is provided.

2.3.2 Control Flow of Axial Electromagnet Control Unit

Figure 11:
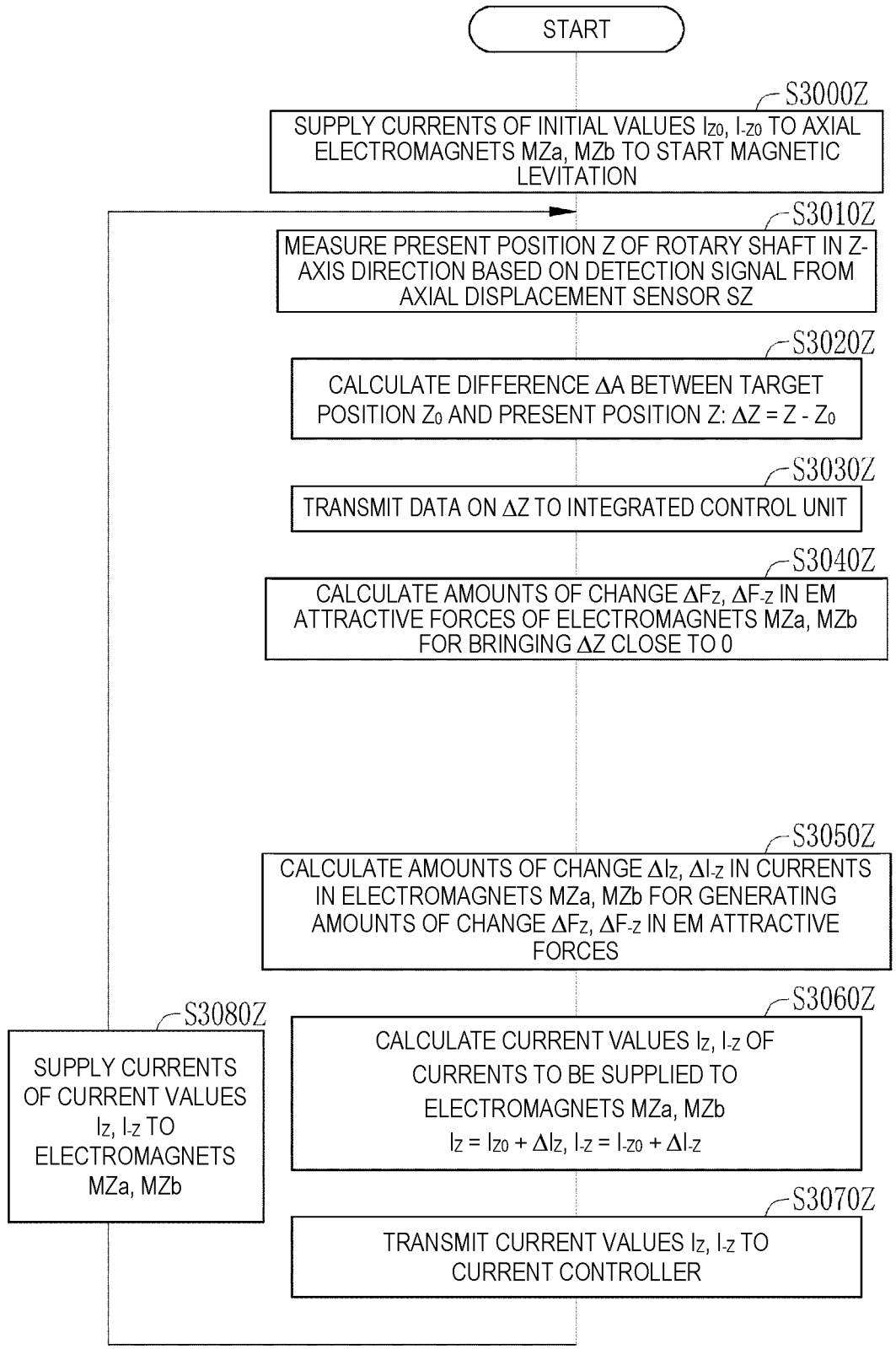
FIG. 11 is a flowchart of a control flow of an axial electromagnet control unit CZ.

FIG. 11 is a flowchart of a control flow of the axial electromagnet control unit CZ. The control flow of the axial electromagnet control unit CZ is also similar to that of the first radial electromagnet control unit C1X in FIG. 7 except that the control direction is the Z-axis direction instead of the X-axis direction, and thus similar descriptions are omitted as required.

In S3000Z, the axial electromagnet control unit CZ supplies bias currents of the initial values $I_{Z0}$, $I_{-Z0}$ to the axial electromagnets MZa, MZb to start magnetic levitation. Thus, unless an external force other than the EM attractive forces $F_{Z0}$, $F_{-Z0}$ is applied to the rotary shaft 27, the rotary shaft 27 is magnetically levitated near the target position $Z_0$. In S3010Z, the axial electromagnet control unit CZ measures the present position Z of the rotary shaft 27 in the Z-axis direction based on the detection signal input from the axial displacement sensor SZ. In S3020Z, the axial electromagnet control unit CZ calculates a difference $\Delta Z$ between the target position $Z_0$ and the present position Z according to the expression (9).

In S3030Z, the axial electromagnet control unit CZ transmits data on the difference $\Delta Z$ to the integrated control unit 61.

In S3040Z, the axial electromagnet control unit CZ calculates amounts of change $\Delta F_Z$, $\Delta F_{-Z}$ in the EM attractive forces of the axial electromagnets MZa, MZb for bringing the difference $\Delta Z$ close to 0. The amounts of change $\Delta F_Z$, $\Delta F_{-Z}$ in the EM attractive forces are increased or decreased in the Z-axis direction from the initial attractive forces $F_{Z0}$, $F_{-Z0}$ to bring the rotary shaft 27 displaced from the target position $Z_0$ by the difference $\Delta Z$ close to the target position $Z_0$.

In S3050Z, the axial electromagnet control unit CZ calculates amounts of change $\Delta I_Z$, $\Delta I_{-Z}$ in currents in the axial electromagnets MZa, MZb for generating the amounts of change $\Delta F_Z$, $\Delta F_{-Z}$ in the EM attractive forces.

In S3060Z, the axial electromagnet control unit CZ calculates current value $I_Z$, $I_{-Z}$ of the currents to be supplied to the axial electromagnets MZa, MZb according to the following expressions (19), (20).

$$I_Z = I_{Z0} + \Delta I_Z \quad (19)$$

$$I_{-Z} = I_{-Z0} + \Delta I_{-Z} \quad (20)$$

As shown in FIG. 5, the axial electromagnets MZa, MZb are arranged to oppose each other, and thus one generates a positive EM attractive force and the other generates a negative EM attractive force in the Z-axis direction. Thus, as shown in the control flow in FIG. 11, when the rotary shaft 27 is displaced in one direction in the Z-axis direction, the axial electromagnet control unit CZ performs control to increase one of the current values $I_Z$, $I_{-Z}$ and decrease the other so as to increase the EM attractive force of one of the axial electromagnets MZa, MZb and decrease the EM attractive force of the other. Which of the current values $I_Z$, $I_{-Z}$ is increased and decreased depends on the direction of displacement of the rotary shaft 27 from the target position $Z_0$.

In S3070Z, the axial electromagnet control unit CZ transmits the calculated current values $I_Z$, $I_{-Z}$ to the current controller 59 connected thereto. Thus, the axial electromagnet control unit CZ supplies the currents of the calculated current values $I_Z$, $I_{-Z}$ through the current controller 59 to the electromagnets MZa, MZb (S3080Z).

The axial electromagnet control unit CZ repeats steps S3010Z to S3080Z until an instruction to stop magnetic levitation is provided.

2.3.3 Control Flow of Integrated Control Unit

Figure 12:
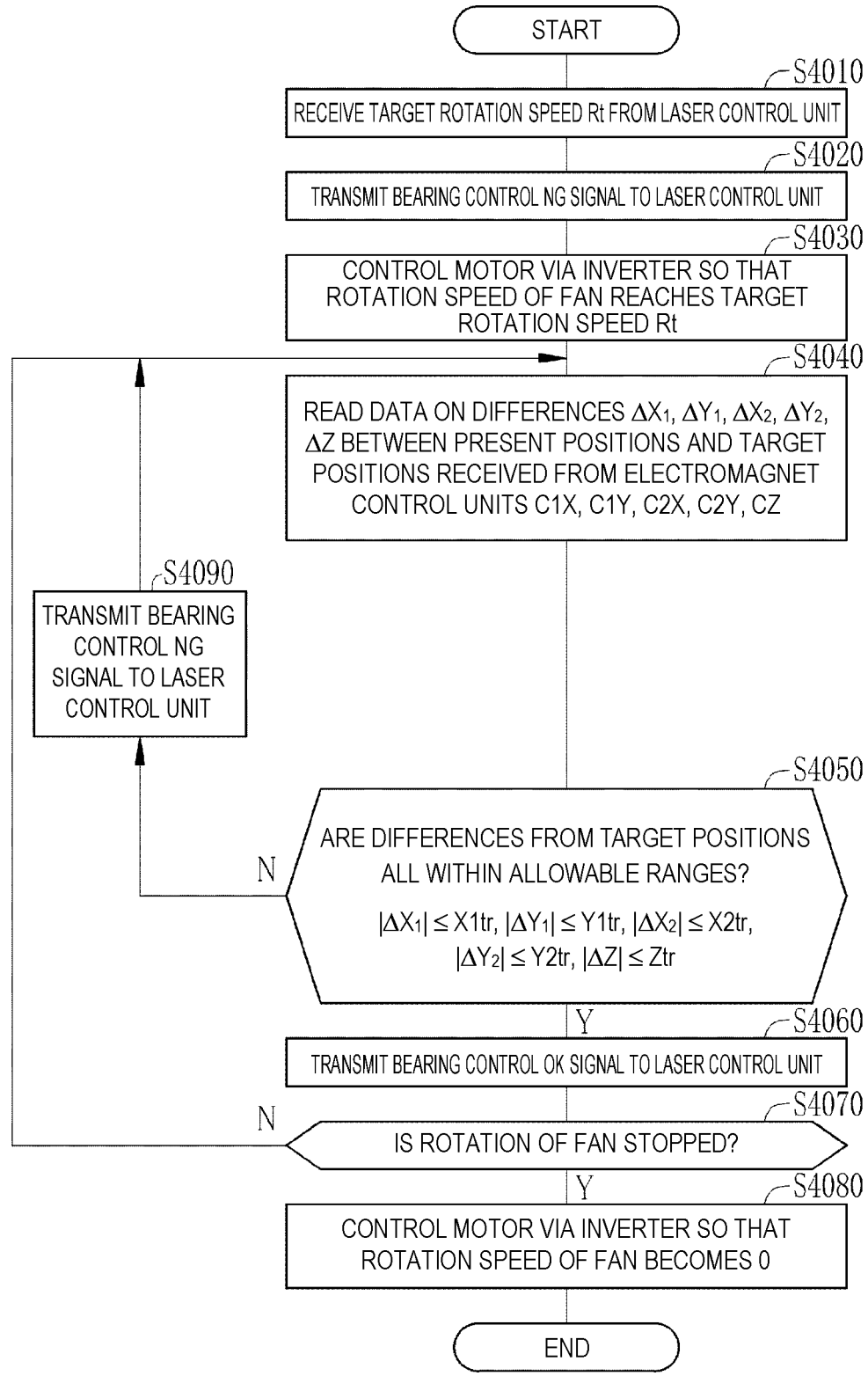
FIG. 12 is a flowchart of a control flow of an integrated control unit.

FIG. 12 is a flowchart of a control flow of the integrated control unit 61. In FIG. 12, the integrated control unit 61 receives, from the laser control unit 17, an instruction to start rotation of the fan 26 and the target rotation speed Rt (S4010). When receiving the target rotation speed Rt, in S4020, the integrated control unit 61 transmits, to the laser control unit 17, a bearing control NG signal indicating that bearing control has not been completed, and starts monitoring whether or not the rotary shaft 27 is appropriately magnetically levitated and control to rotate the fan 26 at the target rotation speed Rt.

In S4030, the integrated control unit 61 controls the motor 31 via the inverter 34 so that the rotation speed of the fan 26 reaches the target rotation speed Rt.

In S4040, the integrated control unit 61 reads data on differences $\Delta X_1$, $\Delta Y_1$, $\Delta X_2$, $\Delta Y_2$, $\Delta Z$ between the present positions of the levitated position of the rotary shaft 27 in the X, Y, and Z-axis directions and the target positions received from the first radial electromagnet control units C1X, C1Y, the second radial electromagnet control units C2X, C2Y, and the axial electromagnet control unit CZ.

In S4050, the integrated control unit 61 determines whether or not the differences $\Delta X_1$, $\Delta Y_1$, $\Delta X_2$, $\Delta Y_2$, $\Delta Z$ from the target positions are all within allowable ranges. Specifically, the integrated control unit 61 determines whether or not the absolute values of the differences $\Delta X_1$, $\Delta Y_1$, $\Delta X_2$, $\Delta Y_2$, $\Delta Z$ satisfy the following conditional expressions (21) to (25).

$$|\Delta X_1| \leq X1tr \quad (21)$$

$$|\Delta Y_1| \leq Y1tr \quad (22)$$

$$|\Delta X_2| \leq X2tr \quad (23)$$

$$|\Delta Y_2| \leq Y2tr \quad (24)$$

$$|\Delta Z| \leq Ztr \quad (25)$$

where X1tr, Y1tr, X2tr, Y2tr, Ztr are ranges of allowable errors in the positive and negative directions with reference to the target positions.

When determining that all the values of the differences $\Delta X_1$, $\Delta Y_1$, $\Delta X_2$, $\Delta Y_2$, $\Delta Z$ are within the allowable ranges (Y in S4050), in S4060, the integrated control unit 61 transmits, to the laser control unit 17, a bearing control OK signal indicating that the rotary shaft 27 is rotating at the target rotation speed Rt in a proper levitated position. In S4050, when determining that at least one of the values of the differences $\Delta X_1$, $\Delta Y_1$, $\Delta X_2$, $\Delta Y_2$, $\Delta Z$ is out of the allowable ranges (N in S4050), the integrated control unit 61 goes to S4090, and transmits the bearing control NG signal to the laser control unit 17. After transmitting the bearing control NG signal, the integrated control unit 61 repeats steps S4040 and S4050, and monitors that all the values of the differences $\Delta X_1$, $\Delta Y_1$, $\Delta X_2$, $\Delta Y_2$, $\Delta Z$ fall within the allowable ranges.

After transmitting the bearing control OK signal to the laser control unit 17, the integrated control unit 61 repeats steps S4040 and thereafter until receiving, from the laser control unit 17, an instruction to stop rotation of the fan 26 (N in S4070), and continues monitoring whether or not the levitated position of the rotary shaft 27 is within an allowable range.

When receiving, from the laser control unit 17, the instruction to stop rotation of the fan 26 (Y in S4070), in S4080, the integrated control unit 61 controls the motor 31 via the inverter 34 so that the rotation speed of the fan 26 becomes 0 to stop rotation of the fan 26.

2.4 Laser Oscillation Operation of Gas Laser Apparatus

As shown in FIG. 1, when the laser control unit 17 receives the data on the target pulse energy Et and the oscillation trigger signal from the exposure apparatus control unit 3a after receiving the bearing control OK signal from the integrated control unit 61, the laser control unit 17 sets a predetermined charge voltage Vhv for the charger 11 so as to reach the target pulse energy Et. Then, the laser control unit 17 operates the switch 12a in the pulse power module 12 in synchronization with the oscillation trigger signal to apply a high voltage between the discharge electrodes 21a, 21b. As a result, discharge occurs between the discharge electrodes 21a, 21b, and the laser gas is excited to release the pulse laser beam.

The pulse laser beam released from the laser gas is reflected by the line narrowing module 18 and the output coupler 19 that constitute the laser resonator to cause laser oscillation in the laser resonator. A line width of the pulse laser beam reciprocating in the laser resonator is narrowed by the line narrowing module 18, and part of the pulse laser beam is output from the output coupler 19.

The part of the pulse laser beam output from the output coupler 19 enters the pulse energy measuring device 13, and is partially reflected by the beam splitter 13a, passes through the light focusing optical system 13b, and enters the optical sensor 13c. The optical sensor 13c detects pulse energy of the pulse laser beam. The pulse laser beam having passed through the beam splitter 13a enters the exposure apparatus 3.

The pulse energy measuring device 13 transmits data on the detected pulse energy to the laser control unit 17. The laser control unit 17 performs feedback control of the charge voltage Vhv so as to reach the target pulse energy Et based on a difference ΔE between the target pulse energy Et and actually output pulse energy E.

When the newly set charge voltage Vhv becomes higher than a maximum value in an allowable range, the laser control unit 17 controls the gas supply and exhaust device 16 to supply the laser gas into the laser chamber 10 to reach predetermined gas pressure. When the newly set charge voltage Vhv becomes lower than a minimum value in the allowable range, the laser control unit 17 controls the gas supply and exhaust device 16 to exhaust the laser gas out of the laser chamber 10 to reach the predetermined gas pressure.

If the gas pressure in the laser chamber 10 increases, a load on the motor 31 increases, and the rotation speed of the fan 26 sometimes cannot be maintained at the target rotation speed Rt. In this case, the magnetic bearing control unit 40 measures the rotation speed of the fan 26 based on the detection signal from the rotation detection unit 33, and controls an output frequency and an output voltage of the inverter 34 so that the rotation speed of the fan 26 reaches the target rotation speed Rt to control the rotation speed and the torque of the motor 31.

Thus, even if the gas pressure in the laser chamber 10 changes, the magnetic bearing control unit 36 can maintain the rotation speed of the fan 26 at the target rotation speed Rt.

2.5 Problem

The gas laser apparatus 2 according to the comparative example uses, in combination, the magnetic coupling 32 that transmits the torque from the drive shaft 31a of the motor 31 to the rotary shaft 27 of the fan 26, and the magnetic bearing system 40 that adjusts the levitated position of the rotary shaft 27 based on the displacement of the rotary shaft 27. The gas laser apparatus 2 according to the comparative example performs position adjustment of the rotary shaft 27 in the Z-axis direction in which the CP attractive force Fcp of the magnetic coupling 32 is applied, based on only the displacement of the rotary shaft 27. In this case, control of the position adjustment of the levitated position of the rotary shaft 27 is difficult as described below.

As described above, when the magnetic coupling 32 that generates the CP attractive force Fcp in the axial direction is used, as shown in FIG. 5, the CP attractive force Fcp has an influence on the relationship of balance of forces in the axial bearing portion AXB. Actually, the CP attractive force Fcp is not constant but varies according to the torque generated by the motor 31. Specifically, the CP attractive force Fcp varies according to a phase difference angle θ that is an angle of a phase difference between the drive side rotor 32a and the driven side rotor 32b of the magnetic coupling 32.

Figures 13A, 13B:
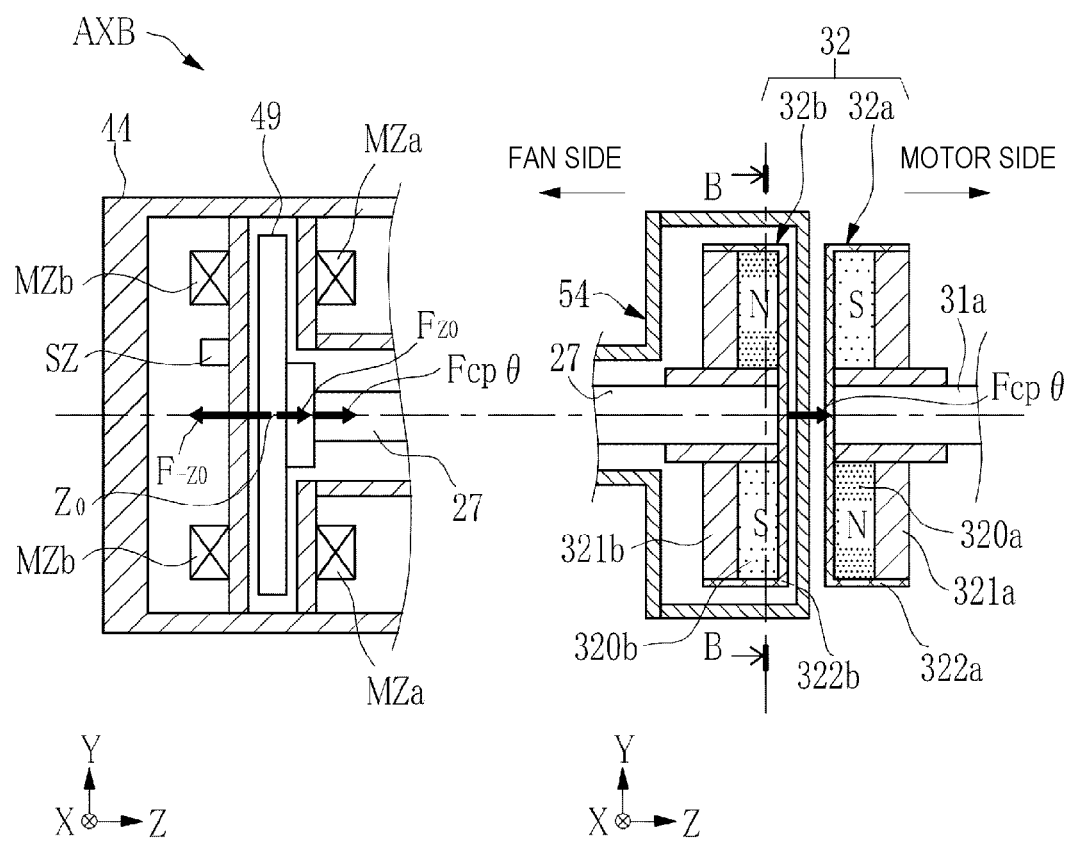
FIGS. 13A and 13B illustrate an influence of a variation in CP attractive force of the magnetic coupling on an axial electromagnet.

Specifically, as shown in FIGS. 13A and 13B, the magnetic coupling 32 generates a CP attractive force Fcpθ that varies according to the phase difference angle θ, and the variation in the CP attractive force Fcpθ has an influence on the relationship of balance of forces in the axial bearing portion AXB.

Figure 14A:
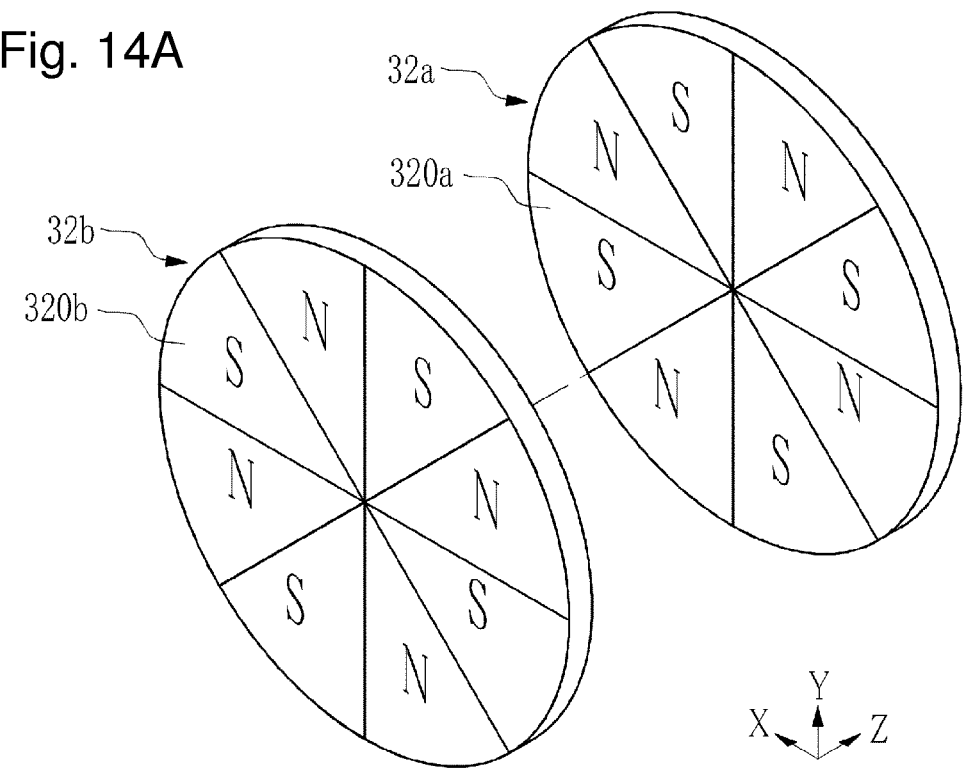
FIGS. 14A and 14B illustrate a phase difference between a drive side rotor and a driven side rotor of the magnetic coupling.
Figure 14B:
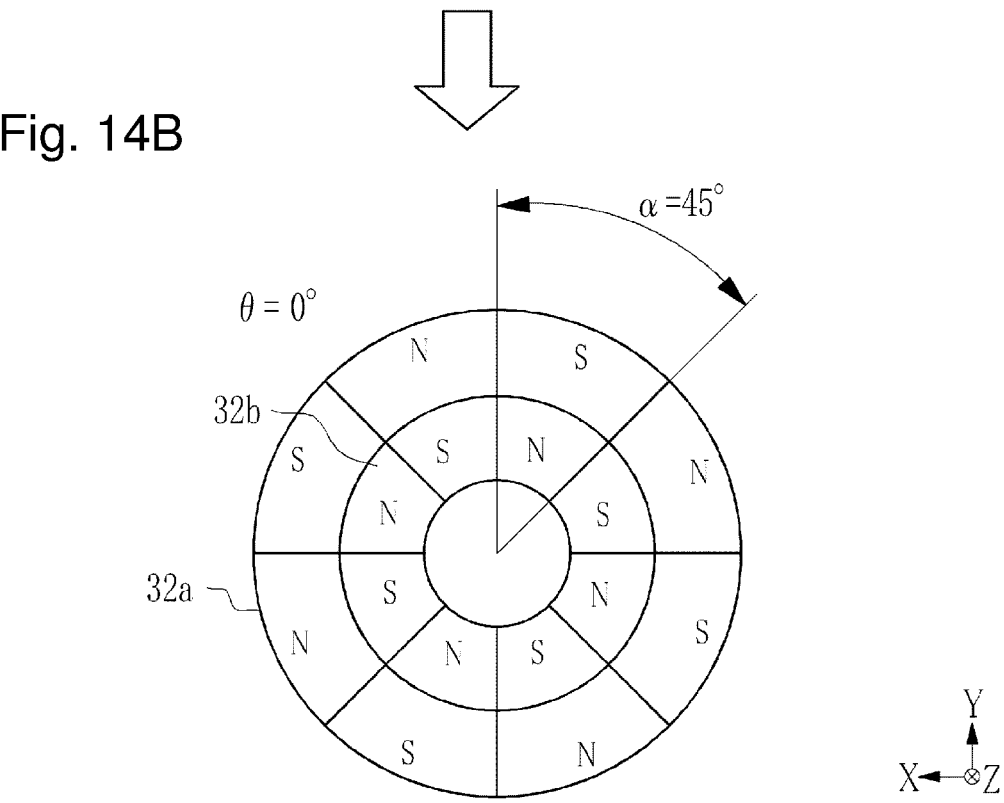
Figure 15:
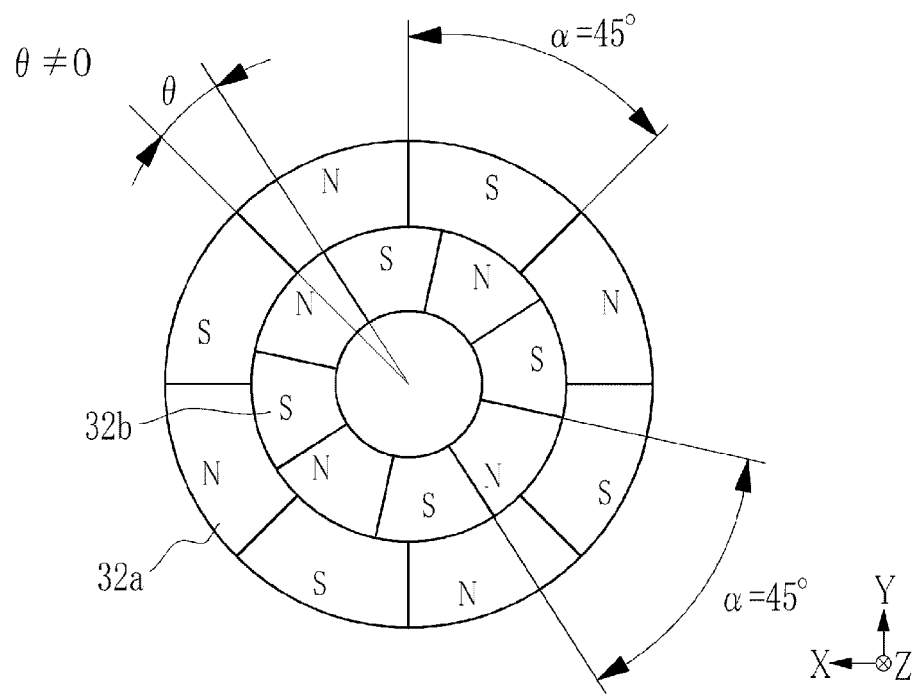
FIG. 15 is a schematic diagram of an opposing state of the rotors in a case with a phase difference.

FIGS. 14A, 14B and 15 are schematic diagrams illustrating the phase difference angle θ. As shown in FIG. 14A, the drive side rotor 32a and the driven side rotor 32b are arranged so that circumferentially arranged north poles and south poles oppose each other. FIGS. 14B and 15 are schematic diagrams showing concentric circles of the drive side rotor 32a in an outer ring and the driven side rotor 32b in an inner ring so as to clearly show opposing states of the magnetic poles of the drive side rotor 32a and driven side rotor 32b.

FIG. 14B shows an opposing state of the magnetic poles in a case without a phase difference, that is, when the phase difference angle θ is 0. With the motor 31 being stopped, the torque is 0. Thus, for all the magnetic poles of the drive side rotor 32a and the driven side rotor 32b, the north pole and the south pole attracting each other oppose each other, and there is no portion where the same poles, i.e., two north poles or two south poles, oppose each other. Such a state is the opposing state when the phase difference angle θ is 0, which is an initial position of the drive side rotor 32a and the driven side rotor 32b.

On the other hand, FIG. 15 shows an opposing state of the magnetic poles in a case with a phase difference, that is, when the phase difference angle θ is not 0. With the motor 31 being rotated, the torque is generated from the drive side rotor 32a to cause the driven side rotor 32b to rotate following the drive side rotor 32a. The torque is generated when the rotational speed of the motor 31 changes and also when the motor 31 rotates at constant speed. This is because the fan 26 to which the driven side rotor 32b is coupled rotates in the laser chamber 10 in which the laser gas is encapsulated and thus a load is applied to the fan 26.

If such torque occurs, the drive side rotor 32a and the driven side rotor 32b cannot maintain the initial opposing state in FIG. 14B, and as shown in FIG. 15, a phase difference occurs in the opposing state. The phase difference angle θ is an angle of shift from the initial opposing state without a phase difference in the opposing state of the north poles and the south poles of the drive side rotor 32a and the driven side rotor 32b. In FIG. 15, with reference to the drive side rotor 32a in the outer ring, the driven side rotor 32b in the inner ring is rotated clockwise by about 10° from the initial opposing state, and the phase difference angle θ in this case is about 10°.

Figure 16:
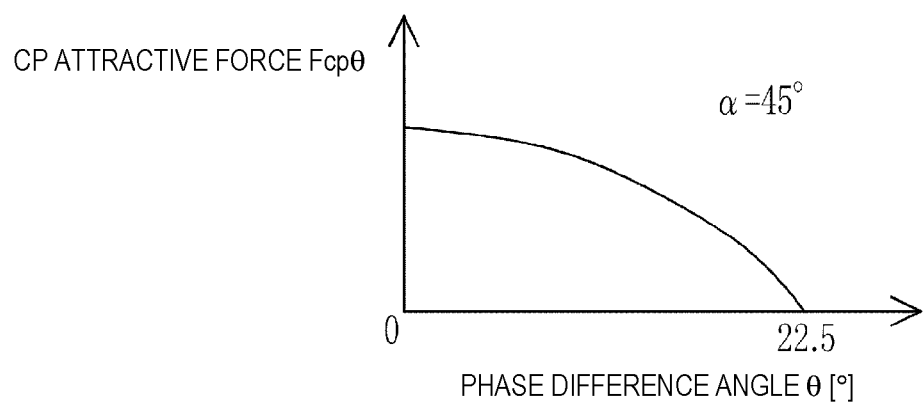
FIG. 16 is a graph showing a correspondence relationship between a phase difference angle θ and a CP attractive force Fcpθ.

FIG. 16 is a graph showing a correspondence relationship between the CP attractive force Fcpθ and the phase difference angle θ. As shown in FIG. 16, the attractive force Fcpθ of the magnetic coupling 32 reaches maximum in the state without a phase difference, that is, in the initial opposing state when the phase difference angle θ is 0, and decreases with increasing phase difference angle θ. The CP attractive force Fcpθ is the sum of the attractive forces generated between the magnetic poles of the drive side rotor 32a and the driven side rotor 32b. Thus, when the north poles and the south poles oppose each other in the state without a phase difference, the CP attractive force Fcpθ reaches maximum. When a phase difference occurs, the same poles partially oppose each other. The opposing part of the same poles generates a repulsive force, thereby decreasing the CP attractive force Fcpθ. The graph in FIG. 16 shows such a relationship.

The magnetic coupling 32 of this example is of eight-pole type including the magnetic poles with a central angle α of 45°. Thus, as shown in the graph in FIG. 16, when the phase difference angle θ is half the central angle α, that is, θ is ½·α (=22.5°), the CP attractive force Fcpθ becomes 0. This is because when the phase difference angle θ is 22.5°, the opposing part of the different poles generating an attractive force and the opposing part of the same poles generating a repulsive force are half-and-half. If the phase difference angle θ exceeds ½·α (=22.5°), the repulsive force increases and the CP attractive force Fcpθ turns negative, and thus the magnetic coupling 32 no longer functions.

Figure 17:
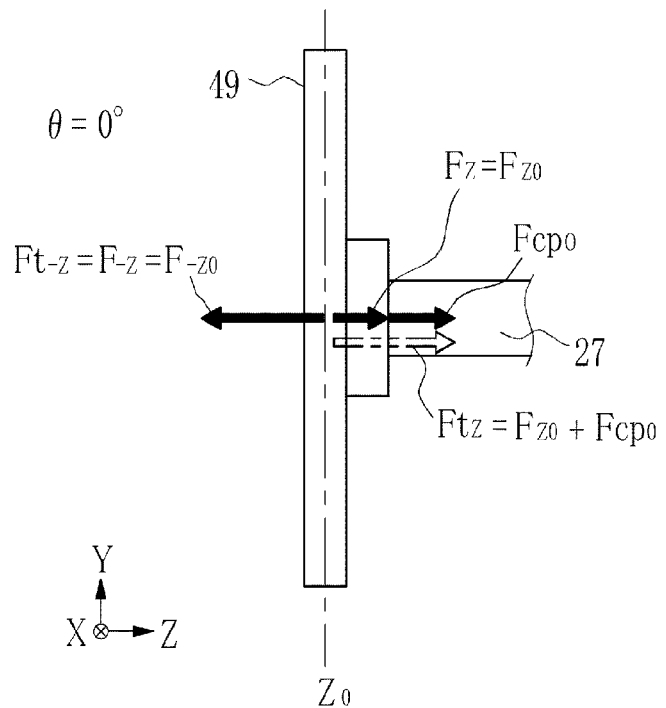
FIG. 17 illustrates a relationship of balance of forces applied to the rotary shaft in a Z-axis direction in a case without a phase difference.
Figure 18:
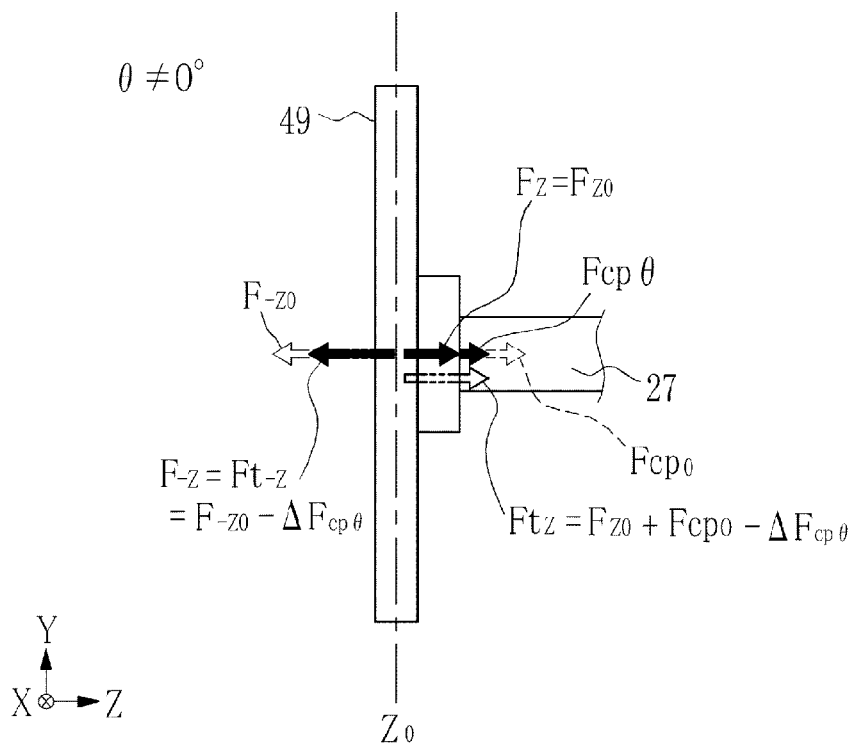
FIG. 18 illustrates a relationship of balance of forces applied to the rotary shaft in the Z-axis direction in the case with a phase difference.

FIGS. 17 and 18 show relationships of balance of forces in the axial bearing portion AXB when the CP attractive force Fcpθ varies. FIG. 17 shows a relationship of balance of forces when the rotary shaft 27 is adjusted to the target position $Z_0$ with the phase difference angle θ of 0°. The CP attractive force Fcpθ when the phase difference angle θ is 0° is particularly referred to as a CP attractive force Fcp0 or an initial value Fcp0.

As shown in FIG. 17, when the axial electromagnet MZa generates an EM attractive force $F_Z$ of an initial value $F_{Z0}$ according to a bias current, the EM attractive force $F_{Z0}$ and the CP attractive force Fcp0 are applied positively in the Z-axis direction. A total force $Ft_Z$ thereof is balanced with an EM attractive force $F_{-Z}$ having the same magnitude as the force $Ft_Z$ and being a negative EM attractive force $F_{-Z0}$ generated by the opposing axial electromagnet MZb. The negative force is only the EM attractive force generated by the axial electromagnet MZb, and thus the EM attractive force $F_{-Z0}$ is a total negative force $Ft_{-Z}$. Unless a force other than the forces $Ft_Z$, $Ft_{-Z}$ is applied, the rotary shaft 27 can be adjusted to the target position $Z_0$. The relationship of balance in this case is expressed by the following expressions (26), (27).

$$Ft_Z = F_{Z0} + Fcp0 \quad (26)$$

$$Ft_Z = Ft_{-Z} = F_{-Z0} \quad (27)$$

On the other hand, as shown in FIG. 18, when the phase difference occurs and the phase difference angle θ is not equal to 0°, the CP attractive force Fcpθ varies from the initial value Fcp0 of the CP attractive force Fcp. Specifically, the initial value Fcp0 is a maximum value of the CP attractive force Fcp, and thus decreases according to the phase difference angle θ. Specifically, when the initial value Fcp0 is a reference value of the CP attractive force, an amount of variation from the reference value is a decrease ΔFcpθ from the initial value Fcp0. Thus, when the phase difference occurs, the positive force applied to the rotary shaft 27 in the Z-axis direction decreases by ΔFcpθ, and the total positive force $Ft_Z$ positively applied also decreases by ΔFcpθ.

In this case, if the EM attractive force $F_{-Z}$ of the axial electromagnet MZb remains at the initial EM attractive force $F_{-Z0}$, the rotary shaft 27 cannot be adjusted to the target position $Z_0$, and thus needs to be corrected to be equal to the negative force $Ft_{-Z}$ opposite to the total force $Ft_Z$. The relationship of balance of forces in this case is expressed by the following expressions (28), (29).

$$Ft_Z = F_{Z0} + Fcpθ = F_{Z0} + Fcp0 - ΔFcpθ \quad (28)$$

$$Ft_Z = Ft_{-Z} = F_{-Z0} - ΔFcpθ \quad (29)$$

As such, the variation in the CP attractive force of the magnetic coupling 32 has an influence on the balance of forces on the rotary shaft 27.

Figures 19A, 19B, 19C:
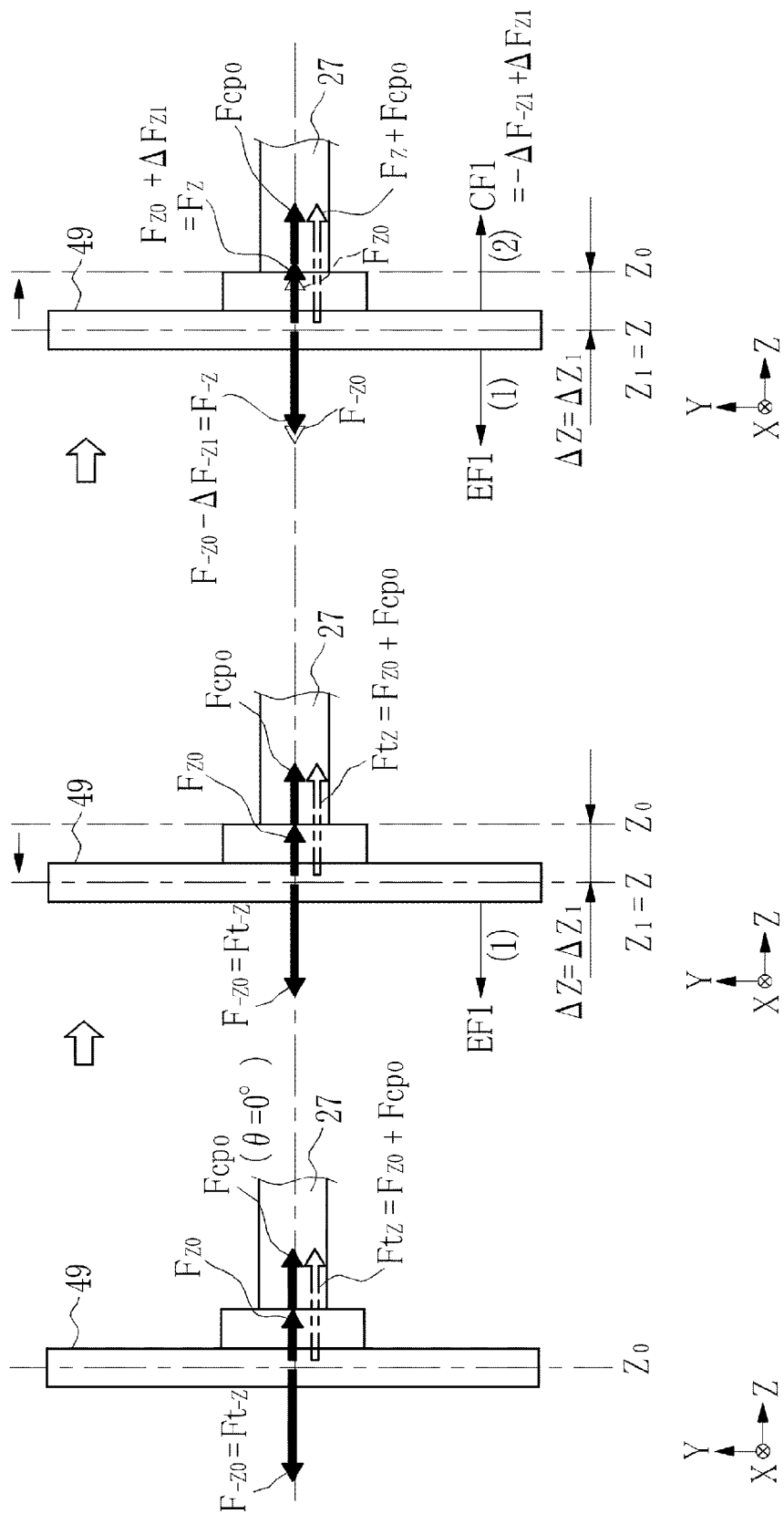
FIGS. 19A to 19C illustrate an operation of position adjustment of the comparative example, and illustrates control of the position adjustment when the rotary shaft is displaced by an external force in the case without a phase difference.

FIGS. 19A to 20C show examples of control performed by the axial electromagnet control unit CZ to bring the rotary shaft 27 close to the target position $Z_0$ when an external force is applied to the rotary shaft 27 to displace the target position $Z_0$. FIGS. 19A to 19C show an example when the CP attractive force Fcp is the initial value Fcp0, and FIGS. 20A to 20C show an example when a phase difference of the phase difference angle θ occurs in the magnetic coupling 32 in addition to the external force, and the CP attractive force Fcp decreases from the initial value Fcp0 to Fcpθ.

FIG. 19A shows a state where the CP attractive force Fcp is the initial value Fcp0, the rotary shaft 27 is in the target position $Z_0$, and the forces $Ft_Z$, $Ft_{-Z}$ applied to the rotary shaft 27 are balanced in the relationships in the expressions (26), (27) as in FIG. 17.

In this state, as shown in FIG. 19B, a case where an external force EF1 is negatively applied to the rotary shaft 27 is assumed. In this case, the external force EF1 negatively moves the rotary shaft 27 from the target position $Z_0$ to displace the present position Z of the levitated position to $Z_1$. An amount of displacement ΔZ of the rotary shaft 27 is $ΔZ_1$ (=$Z_1$-$Z_0$). When the rotary shaft 27 is displaced from the target position $Z_0$, the axial electromagnet control unit CZ varies the EM attractive forces of the axial electromagnets MZa, MZb so as to bring the rotary shaft 27 close to the target position $Z_0$ as shown in the control flow in FIG. 11.

Specifically, as shown in FIG. 19C, the axial electromagnet control unit CZ calculates a positive force CF1 opposite to the negative external force EF1 to bring the rotary shaft 27 close to the target position $Z_0$. As shown in step S3040Z in FIG. 11, the force CF1 is calculated as amounts of change $ΔF_{Z1}$, $ΔF_{-Z1}$ in the EM attractive forces $F_Z$, $F_{-Z}$ of the axial electromagnets MZa, MZb. The axial electromagnet control unit CZ controls the EM attractive forces $F_Z$, $F_{-Z}$ of the axial electromagnets MZa, MZb so that the amount of change $ΔF_{Z1}$ is added to the positive initial EM attractive force $F_{Z0}$, and the amount of change $ΔF_{-Z1}$ is subtracted from the negative initial EM attractive force $F_{-Z0}$. The EM attractive forces $F_Z$, $F_{-Z}$ are controlled by controlling the values of the currents supplied to the axial electromagnets MZa, MZb as shown in S3050Z, S3060Z in FIG. 11.

When the CP attractive force Fcp does not vary from the initial value Fcp0, the relationship of balance of forces on the rotary shaft 27 does not change. Thus, the axial electromagnet control unit CZ can perform control to bring the rotary shaft 27 close to the target position $Z_0$ by calculating the amounts of change $\Delta F_{Z1}$, $\Delta F_{-Z1}$ based on only the displacement of the rotary shaft 27.

On the other hand, as shown in FIGS. 20A to 20C, when the phase difference occurs and the CP attractive force Fcp varies from the initial value Fcp0 to Fcpθ, the axial electromagnet control unit CZ sometimes cannot perform appropriate control only by control based on the displacement of the rotary shaft 27.

Similarly to FIG. 19A, FIG. 20A shows a state where the CP attractive force Fcp is the initial value Fcp0, the rotary shaft 27 is in the target position $Z_0$, and the forces $Ft_Z$, $Ft_{-Z}$ applied to the rotary shaft 27 are balanced in the relationships in the expressions (26), (27).

In this state, as shown in FIG. 20B, a case where an external force EF1 as in FIG. 19B is negatively applied to the rotary shaft 27 is assumed. In this case, the external force EF1 negatively moves the rotary shaft 27 from the target position $Z_0$ to displace the present position Z of the levitated position to $Z_1$. An amount of displacement $\Delta Z$ of the rotary shaft 27 is $\Delta Z_1$ ($=Z_1-Z_0$). When the rotary shaft 27 is displaced from the target position $Z_0$, the axial electromagnet control unit CZ varies the EM attractive forces of the axial electromagnets MZa, MZb so as to bring the rotary shaft 27 close to the target position $Z_0$ according to the control flow in FIG. 11.

With the same amount of displacement $\Delta Z_1$ as in FIG. 19B, the axial electromagnet control unit CZ calculates amounts of change $\Delta F_{Z1}$, $\Delta F_{-Z1}$ in the EM attractive forces $F_Z$, $F_{-Z}$ of the axial electromagnets MZa, MZb as a force CF1 for returning the rotary shaft 27 to the target position $Z_0$.

In FIG. 20B, unlike in FIG. 19B, the CP attractive force Fcp is assumed to decrease from the initial value Fcp0 to Fcpθ at the timing of such control. Then, as shown in FIG. 20C, only by adding the amount of change $\Delta F_{Z1}$ to the EM attractive force $F_Z$ of the axial electromagnet MZa and subtracting the amount of change $\Delta F_{-Z1}$ from the EM attractive force $F_{-Z0}$ of the axial electromagnet MZb, the force CF1 opposite to the external force EF1 becomes insufficient by the decrease $\Delta Fcp\theta$ ($=Fcp0-Fcp\theta$) in the CP attractive force Fcp as compared to the case in FIG. 19C.

In this case, if the EM attractive force $F_{-Z}$ of the axial electromagnet MZb negatively applied to the rotary shaft 27 is larger than the positive force with the force CF1 ($F_Z$+ Fcp0-$\Delta Fcp\theta$) applied to the rotary shaft 27, the rotary shaft 27 does not return to the target position $Z_0$ but may be displaced to a levitated position $Z_2$ in a more negative direction than the present levitated position $Z_1$.

Alternatively, even if the positive force with the force CF1 is larger than the EM attractive force $F_{-Z}$ of the axial electromagnet MZb negatively applied, with a small difference thereof, it takes time to bring the rotary shaft 27 close to the target position $Z_0$.

The variation in the CP attractive force Fcp has an influence on the relationship of balance of forces on the rotary shaft 27, and thus appears as displacement of the rotary shaft 27. If the rotary shaft 27 is displaced, the axial electromagnet control unit CZ controls the position adjustment of the rotary shaft 27. In other words, if the rotary shaft 27 is not displaced from the target position $Z_0$, the position adjustment is not controlled. Absorbing the variation in the CP attractive force Fcp based on the displacement of the rotary shaft 27 causes a time delay.

As such, the variation in the CP attractive force Fcp has an influence on the control of the position adjustment of the rotary shaft 27 using the electromagnet in the magnetic bearing system. Thus, performing the position adjustment of the rotary shaft 27 based on only the displacement of the rotary shaft 27 as in the gas laser apparatus 2 according to the comparative example may prevent the rotary shaft 27 from being brought close to the target position $Z_0$ or cause a delay in control to bring the rotary shaft 27 to the target position $Z_0$ due to the variation in the CP attractive force Fcp, and thus control of the position adjustment is difficult.

If the control of the position adjustment is difficult, the rotation of the fan 26 or the axial levitated position of the rotary shaft 27 may be unstable. The first magnetic bearing 28 and the second magnetic bearing 29 each include a touch-down bearing that functions in the case of an emergency stop in addition to the components in FIG. 2. If the rotation of the fan 26 or the axial position of the rotary shaft 27 is unstable, the first magnetic bearing 28 or the second magnetic bearing 29 including the touch-down bearing may be damaged. In particular, in the gas laser apparatus 2, the position adjustment of the rotary shaft 27 of the fan 26 is controlled in the order of several hundred microns, and quick and highly accurate control is desired.

3. Gas Laser Apparatus of First Embodiment

With reference to FIGS. 21 to 34B, a gas laser apparatus of a first embodiment will be described. An overall configuration of the gas laser apparatus of the first embodiment is similar to the gas laser apparatus 2 according to the comparative example. A difference is a magnetic bearing system 40A of a fan 26, and descriptions on an overall configuration of the gas laser apparatus and an overall operation such as a laser oscillation operation are omitted. For the magnetic bearing system 40A, the same components as those of the magnetic bearing system 40 according to the comparative example are denoted by the same reference numerals, descriptions are omitted as required, and differences will be mainly described.

3.1 Configuration of Magnetic Bearing System of Fan

Figure 21:
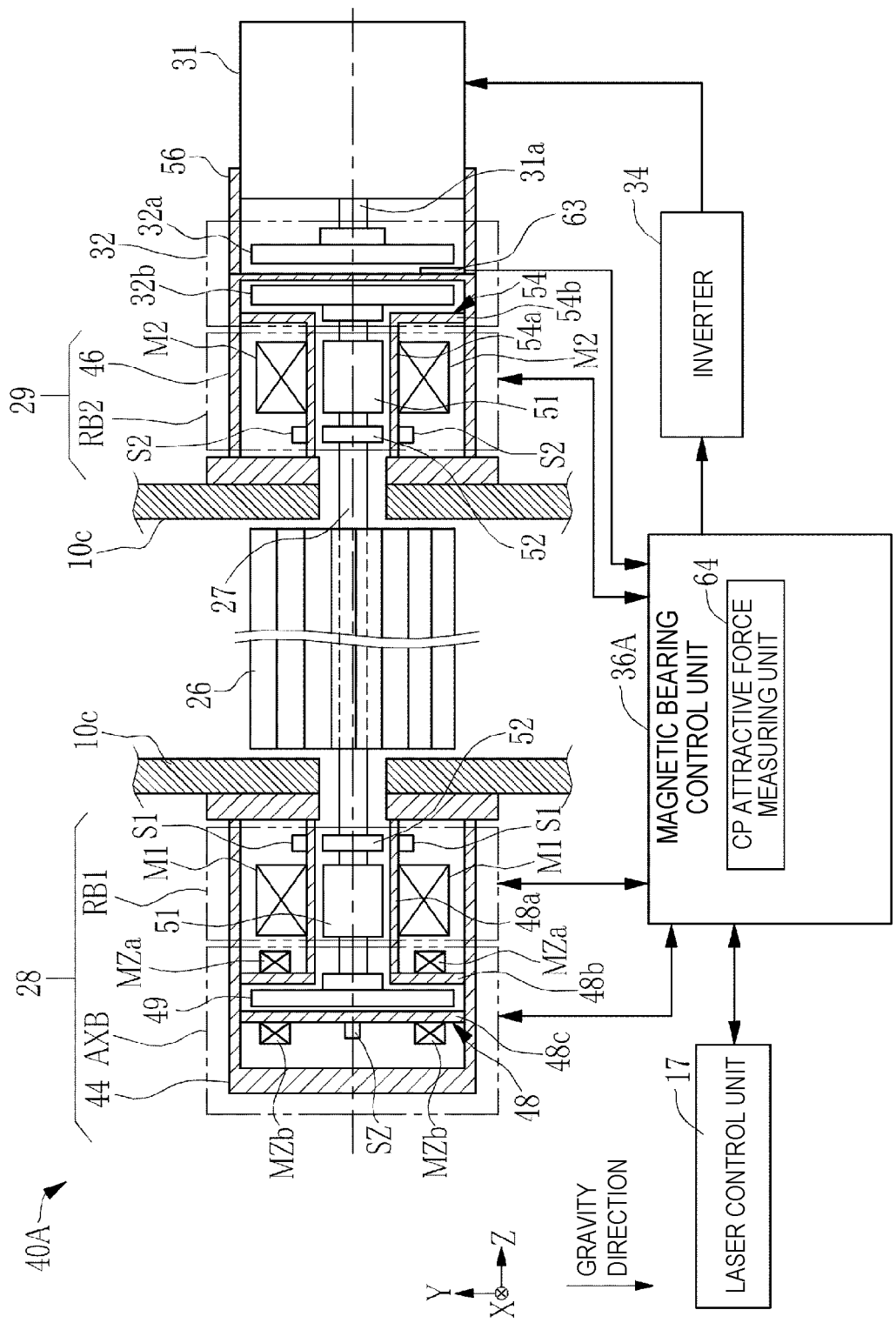
FIG. 21 illustrates a configuration of a magnetic bearing system according to a first embodiment.

FIG. 21 shows a configuration of the magnetic bearing system 40A according to the first embodiment. In the magnetic bearing system 40A according to the first embodiment, differences in configuration from the comparative example in FIG. 2 are a magnetic flux density sensor 63 provided in a magnetic coupling 32, a magnetic bearing control unit 36A provided instead of the magnetic bearing control unit 36, and a CP attractive force measuring unit 64 provided in the magnetic bearing control unit 36A.

3.1.1 Magnetic Flux Density Sensor

The magnetic flux density sensor 63 detects a magnetic flux density between magnetic poles of a drive side rotor 32a and a driven side rotor 32b, and transmits the magnetic flux density to the magnetic bearing control unit 36A. The magnetic flux density is a parameter that enables a CP attractive force Fcp of the magnetic coupling 32 to be estimated. The magnetic flux density sensor 32 that detects the parameter corresponds to an attractive force estimating sensor.

A CP attractive force measuring unit 64 measures the CP attractive force Fcp based on the magnetic flux density received from the magnetic flux density sensor 63. The magnetic bearing control unit 36A controls EM attractive forces $F_Z$, $F_{-Z}$ of axial electromagnets MZa, MZb based on displacement of a rotary shaft 27 detected by an axial displacement sensor SZ and also the measured CP attractive force Fcp, and performs position adjustment of the rotary shaft 27 in a Z-axis direction.

Figures 22A, 22B:
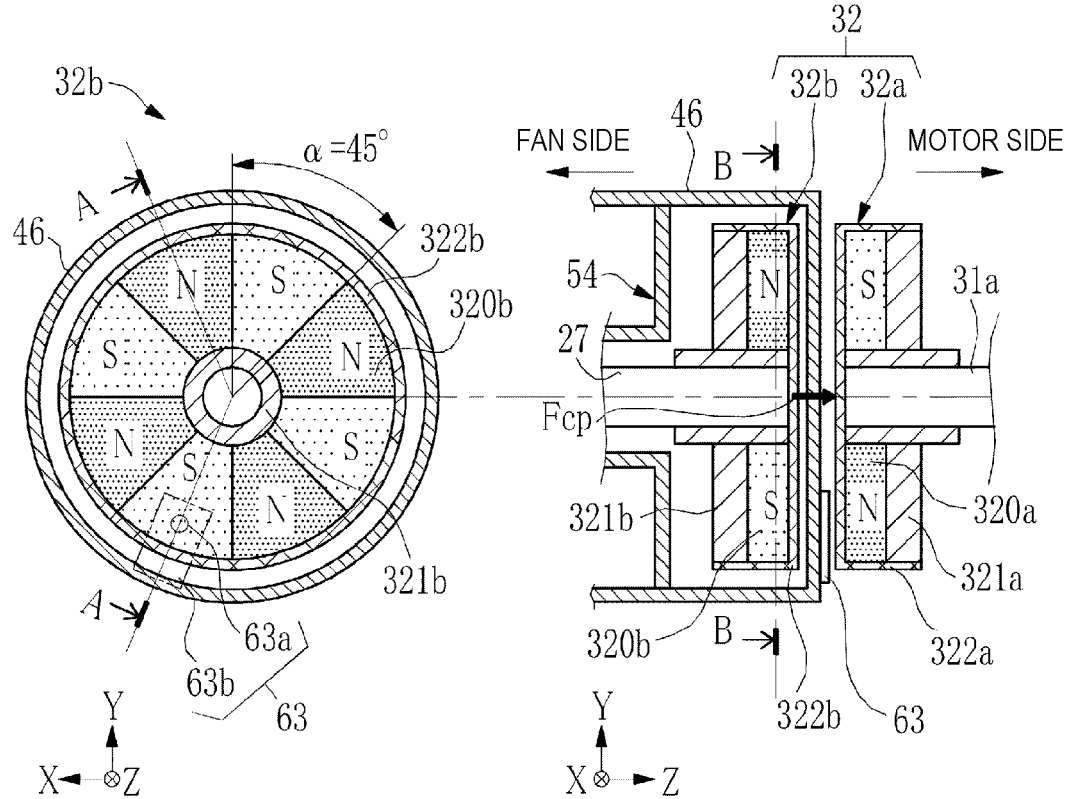
FIGS. 22A and 22B illustrate arrangement of a magnetic flux density sensor.

As shown in FIG. 22A, the magnetic flux density sensor 63 includes a sensor body 63a and a support case 63b that supports the sensor body 63a. As shown in FIG. 22B, the magnetic flux density sensor 63 is arranged between the magnetic poles of the drive side rotor 32a and the driven side rotor 32b. The magnetic flux density sensor 63 is, for example, housed in a motor securing portion 56 (see FIG. 21) together with the drive side rotor 32a, and arranged in the air. The magnetic flux density sensor 63 is, for example, mounted to an outer wall surface of a second case 46 housing the driven side rotor 32b. The magnetic flux density sensor 63 is, for example, a Hall element or a magnetoresistive element.

Figure 23A:
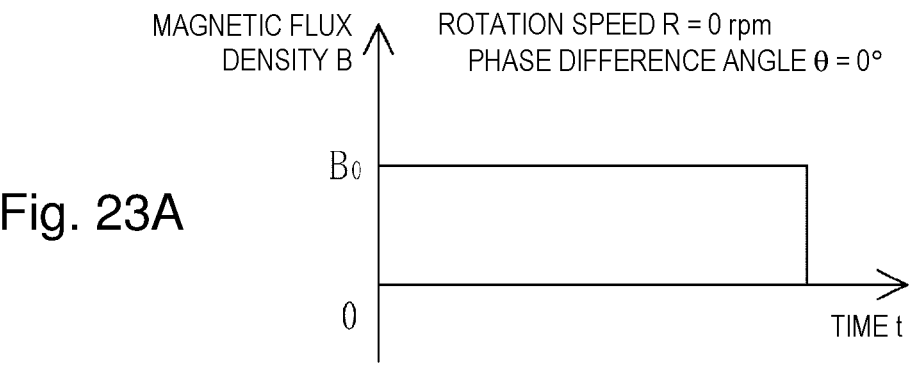
FIGS. 23A and 23B illustrate output from the magnetic flux density sensor in a case without a phase difference when a motor is stopped.
Figure 23B:
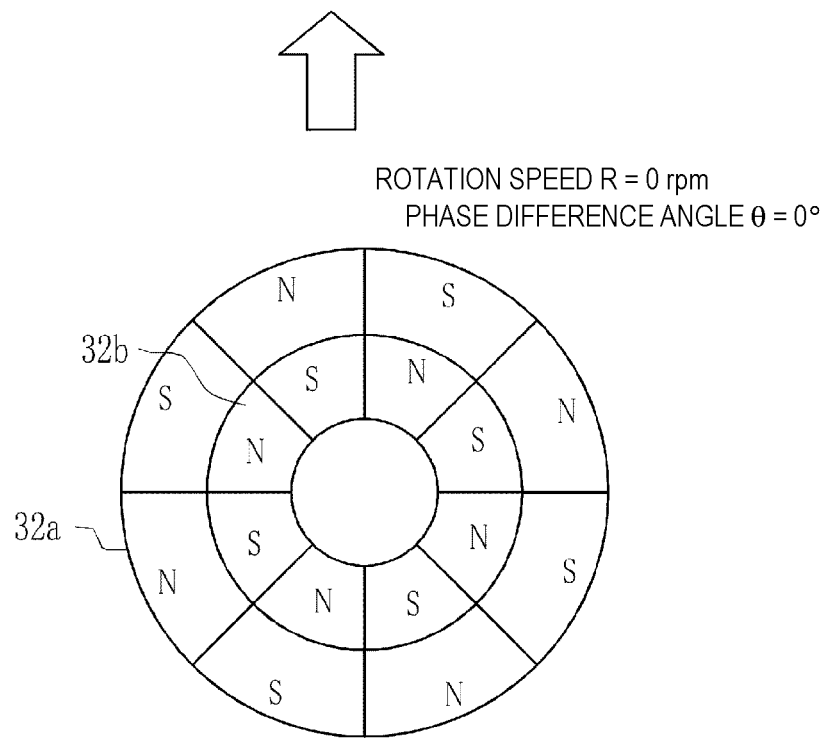

FIG. 23B shows an opposing state of the magnetic poles of the drive side rotor 32a and the driven side rotor 32b when rotation of a motor 31 is stopped, that is, when a rotation speed R of the motor 31 is 0 rpm. FIG. 23B is a schematic diagram similar to FIGS. 14B and 15. FIG. 23A is a graph showing changes in magnetic flux density B with time in the opposing state in FIG. 23B.

As shown in FIG. 23B, when the rotation speed R of the motor 31 is 0 rpm, the opposing state of the drive side rotor 32a and the driven side rotor 32b is a state without a phase difference between the magnetic poles, that is, a state where a phase difference angle θ is 0°. In this case, as shown in FIG. 23A, the magnetic flux density B is constant at a maximum value $B_0$.

Figure 24A:
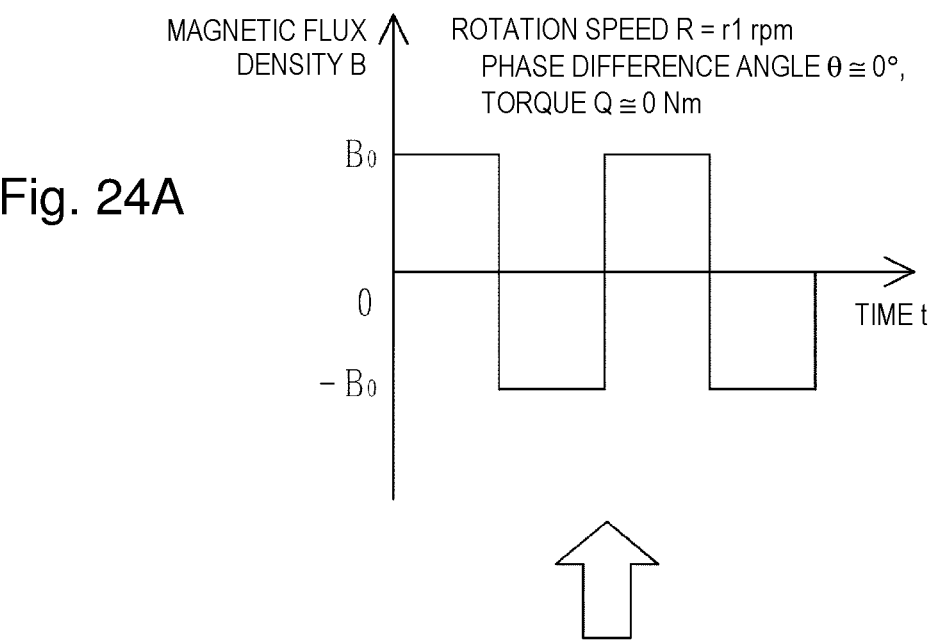
FIGS. 24A and 24B illustrate output from the magnetic flux density sensor in a case with little phase difference when the motor is rotated at low speed.
Figure 24B:
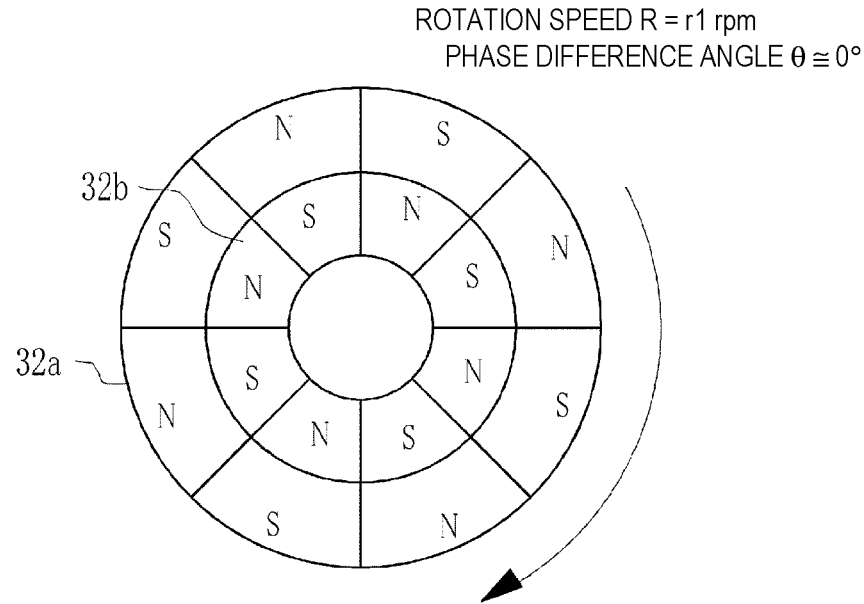

FIGS. 24A and 24B show an example of a case where the motor 31 starts rotation and rotates at a relatively low constant rotation speed R of r1 rpm. In this example, an ideal state is assumed where the rotation speed R is relatively low and little torque Q is generated. Thus, as shown in FIG. 24B, there is little phase difference, and the phase difference angle θ is nearly equal to 0.

In this case, the drive side rotor 32a and the driven side rotor 32b rotate while keeping the initial opposing state. Thus, an opposing part of a north pole of the drive side rotor 32a and a south pole of driven side rotor 32b and an opposing part of a south pole of the drive side rotor 32a and a north pole of the driven side rotor 32b alternately pass through the position of the magnetic flux density sensor 63. This means that in the position of the magnetic flux density sensor 63, a direction of the magnetic flux changes 180° at regular intervals. Thus, as shown in FIG. 24A, in a detection signal from the magnetic flux density sensor 63, a positive output value and a negative output value are alternately repeated at regular intervals, and absolute values of the output values correspond to the magnetic flux density $B_0$.

Figure 25A:
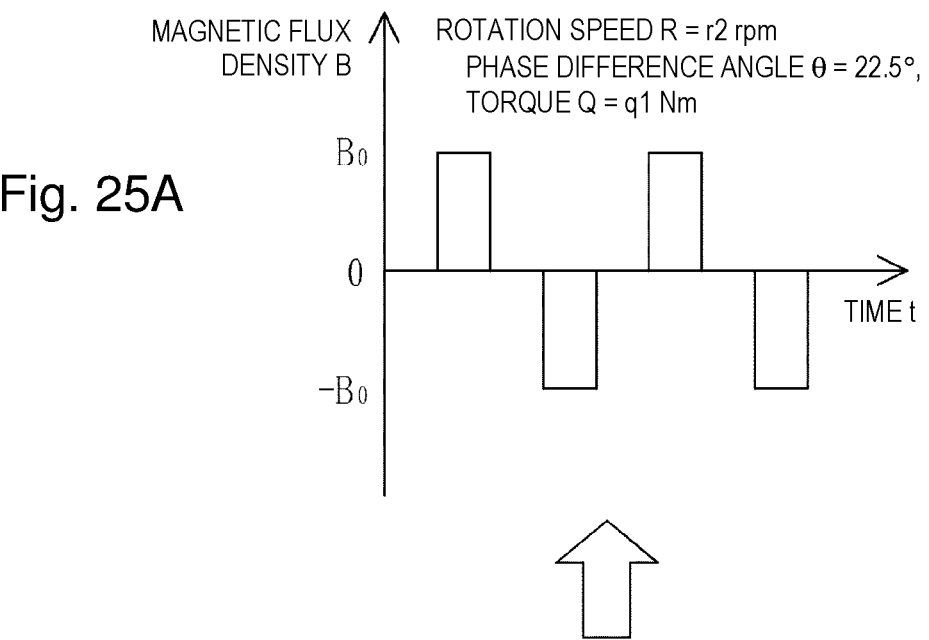
FIGS. 25A and 25B illustrate output from the magnetic flux density sensor in a case with a phase difference when the motor is rotated at relatively high speed.
Figure 25B:
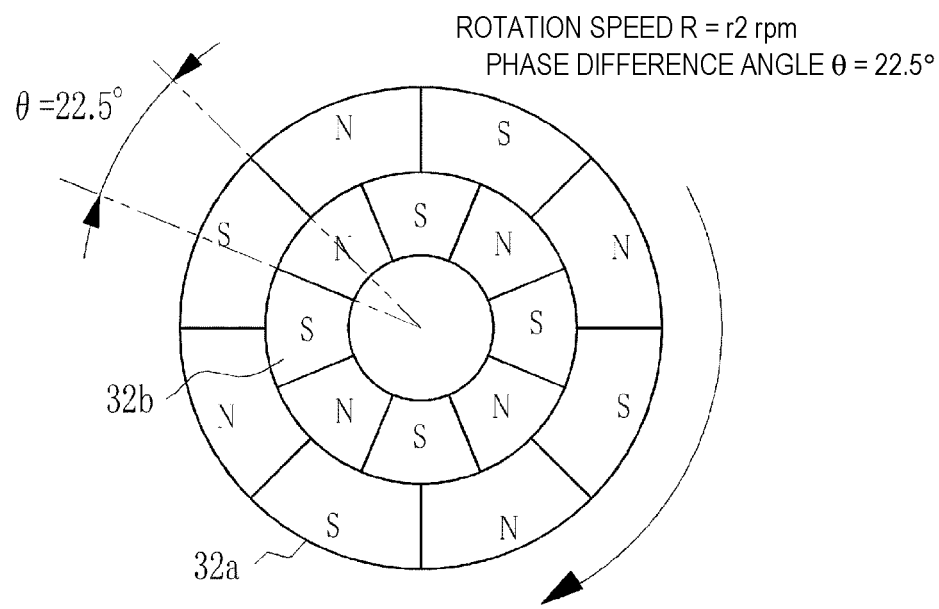

FIGS. 25A and 25B show an example of a case where the motor 31 rotates at a constant rotation speed R of r2 rpm higher than r1 rpm. In this example, torque Q of q1 Nm is generated, and thus as shown in FIG. 25B, a phase difference occurs, and a phase difference angle θ is, for example, ½·45° (=22.5°) that is half of a central angle α.

In this case, the magnetic coupling 32 rotates with a north pole of one of the drive side rotor 32a and the driven side rotor 32b opposes halves of a north pole and a south pole of the other. Thus, when an opposing part of the north pole of one of the rotors and the south pole of the other passes through the position of the magnetic flux density sensor 63, the magnetic flux density sensor 63 detects the magnetic flux density B. However, in an opposing part of the north pole of one of the rotors and the north pole of the other, that is, the same poles, the magnetic flux to couple the magnetic poles is not generated, and thus the magnetic flux density sensor 63 arranged between the magnetic poles does not detect the magnetic flux density B.

Thus, as shown in FIG. 25A, in the change in magnetic flux density B with time, a state is repeated where a positive magnetic flux density $B_0$ is detected, then the magnetic flux density B once becomes 0, and then a negative magnetic flux density $B_{-0}$ is detected. The time when the magnetic flux density B is 0 increases with increasing opposing parts of the same poles, that is, increasing phase difference angle θ.

The opposing part of the same poles generates a repulsive force. Thus, as shown in FIGS. 25A and 25B, when the phase difference angle θ is ½·α (=22.5°), the opposing part of the same poles generating the repulsive force and the opposing part of the different poles generating an attractive force are of the same sizes, and thus the sum of the attractive force and the repulsive force of the magnetic poles is 0. Thus, as shown in the graph in FIG. 16, the CP attractive force Fcpθ of the magnetic coupling 32 is 0. As described above, in this state, the magnetic coupling 32 does not function. Thus, an integrated control unit 61A controls the rotary shaft 27 so as to prevent the phase difference angle θ from reaching a predetermined angle smaller than 22.5° to provide a CP attractive force Fcpθ equal to or smaller than a predetermined lower limit value Fcpth.

3.1.2 Configuration of Magnetic Bearing Control Unit

Figure 26:
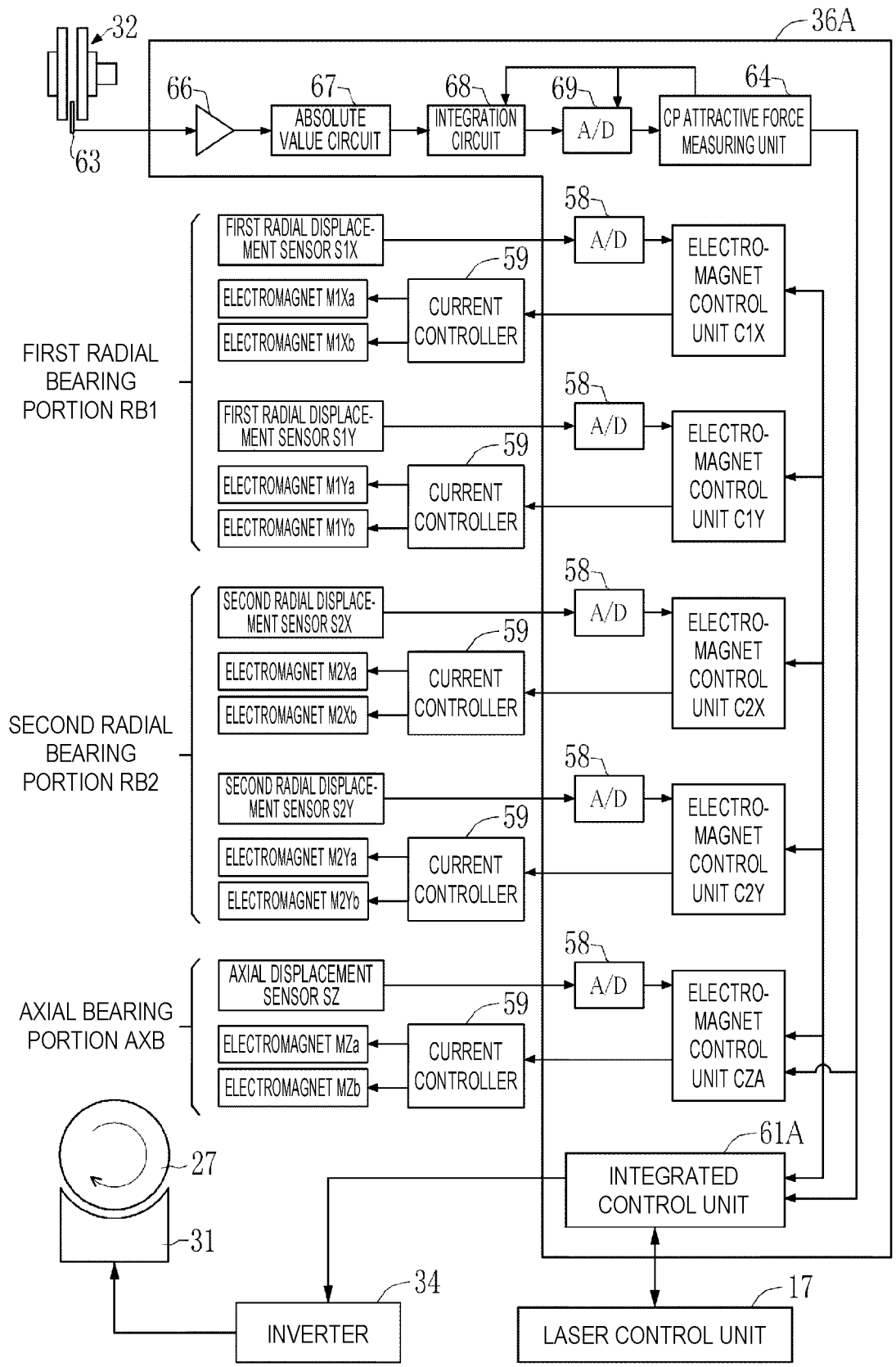
FIG. 26 is a schematic block diagram of an electric configuration of a magnetic bearing control unit according to the first embodiment.

As shown in FIG. 26, the magnetic bearing control unit 36A according to the first embodiment includes, in addition to the CP attractive force measuring unit 64, an amplifier 66, an absolute value circuit 67, an integration circuit 68, and an A/D converter 69. The magnetic bearing control unit 36A includes an axial electromagnet control unit CZA instead of the axial electromagnet control unit CZ.

The amplifier 66 amplifies the detection signal from the magnetic flux density sensor 63. The absolute value circuit 67 converts the output value of the detection signal received from the magnetic flux density sensor 63 into an absolute value. The integration circuit 68 integrates the output value of the detection signal and outputs an integrated value as a voltage signal. The A/D converter 69 converts the analog voltage signal output from the integration circuit 68 into a digital signal, and outputs the digital signal as an AD conversion value Ad. The CP attractive force measuring unit 64 calculates an average magnetic flux density Bav based on the AD conversion value Ad input from the A/D converter 69, and measures a CP attractive force Fcp from the calculated average magnetic flux density Bav. Specifically, processing as described below is performed.

3.1.3 CP Attractive Force Measuring Method

Figure 27A:
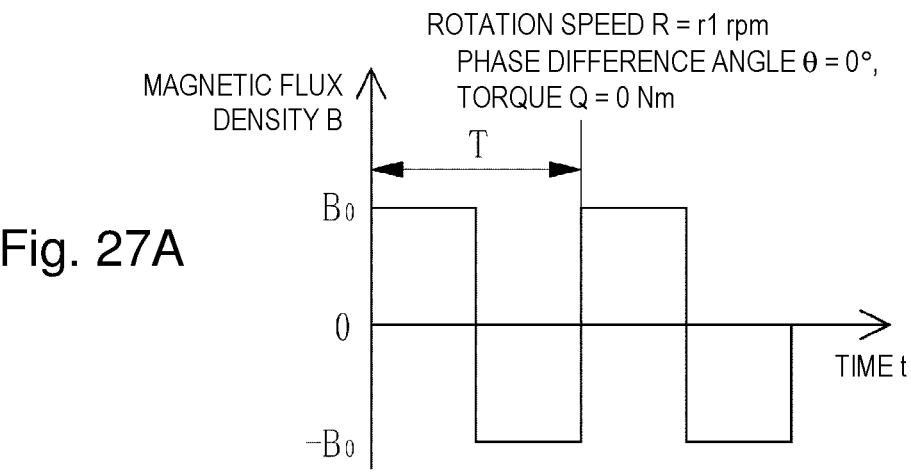
FIGS. 27A and 27B illustrate the detection signal from the magnetic flux density sensor in the case with little phase difference when the motor is rotated at low speed being converted into an absolute value.
Figure 27B:
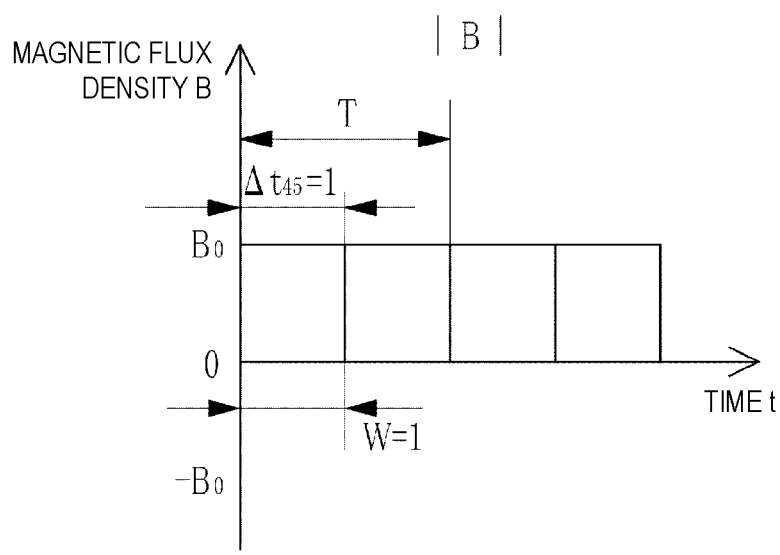

FIGS. 27A and 27B show the detection signal of the magnetic flux density B in the example in FIGS. 24A and 24B being converted into an absolute value |B|. As shown in FIG. 27B, the absolute value circuit 67 positively converts the output values of the detection signal of the magnetic flux density $B_0$ alternately positively and negatively output as shown in FIG. 27A. FIGS. 28A and 28B show the detection signal of the magnetic flux density B in the example in FIGS. 25A and 25B as shown in FIG. 28A being converted into an absolute value |B| as shown in FIG. 28B.

The integration circuit 68 integrates the absolute value |B| of the magnetic flux density B and outputs an analog voltage signal indicating the average magnetic flux density Bav. The average magnetic flux density Bav when the magnetic coupling 32 is rotating is a value obtained by integrating the absolute value |B| with time and dividing the integrated value by an integration time T, and calculated by the following expression (30).

[Expression 1]

$$Bav = \int_0^T |B| dt / T \qquad (30)$$

The integration time T is a time interval of at least one cycle as shown in FIGS. 27A and 28A. One cycle is a time interval after the north pole or the south pole of one of the drive side rotor 32*a* and the driven side rotor 32*b* starts entering the position of the magnetic flux density sensor 63 and immediately before the same pole enters the position of the magnetic flux density sensor 63 again. When the central angle α of the magnetic pole is 45° as in the magnetic coupling 32 of this example, the integration time T is a time when the magnetic coupling 32 rotates 90° and two magnetic poles pass through the position of the magnetic flux density sensor 63.

As shown in FIGS. 27B, 28B, W is a rate of time when the opposing part of the different poles of the drive side rotor 32*a* and the driven side rotor 32*b* passes through the position of the magnetic flux density sensor 63 with a time $\Delta t_{45}$ when the magnetic coupling 32 rotates 45° being 1.

The time rate W is calculated from the average magnetic flux density Bav by the following expression (31).

$$W = Bav/B_0 \tag{31}$$

The time rate W and the average magnetic flux density Bav decrease with increasing phase difference angle θ.

The CP attractive force Fcp of the opposing part of the different poles of the drive side rotor 32*a* and the driven side rotor 32*b* is proportional to a square of an absolute value $|B_0|$ of the maximum value $B_0$ of the magnetic flux density B, and the magnetic flux density B is 0 in the opposing part of the same poles. Thus, a repulsive force is generated of the same magnitude as the CP attractive force Fcp generated in the opposing part of the different poles.

Thus, the CP attractive force Fcpθ is calculated by the following expression (32).

$$Fcp\theta = Kcp(B_0^2 \cdot W - B_0^2(1-W)) \tag{32}$$
$$= Kcp \cdot B_0^2(2W - 1)$$
$$= Kcp \cdot B_0(2Bav - B_0)$$

where Kcp is a proportional constant.

From the expression (32), as shown in FIGS. 27A and 27B, when the phase difference angle θ is 0°, W is 1, and thus, Fcp0 is equal to $Kcp \cdot B_0^2$. Also, as shown in FIGS. 28A and 28B, when the phase difference angle θ is 22.5°, W is 0.5, and thus Fcpθ (=22.5°) is 0. When the phase difference angle θ is 45° (not shown), all the opposing magnetic poles of the drive side rotor 32*a* and the driven side rotor 32*b* are the same poles. In this case, W is 0, and thus Fcpθ is $-Kcp \cdot B_0^2$, and thus the repulsive force becomes maximum.

3.2 Operation of Magnetic Bearing System 3.2.1 Control Flow of Radial Electromagnet Control Unit In the magnetic bearing system 40A according to the first embodiment, control flows of first radial electromagnet control units C1X, C1Y and second radial electromagnet control unit C2X, C2Y are similar to the control flows according to the comparative example in FIGS. 7 to 10, and thus descriptions are omitted.

3.2.2 Processing of CP Attractive Force Measuring Unit

Figure 29:
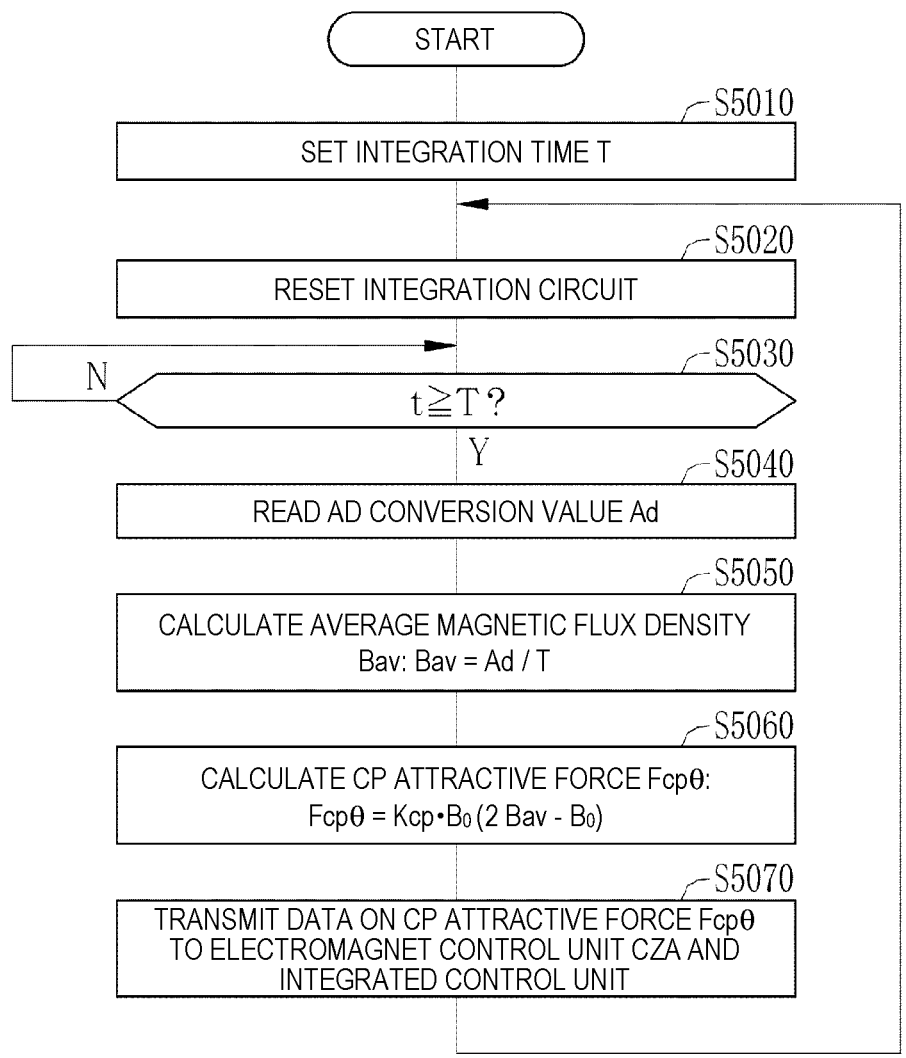
FIG. 29 is a flowchart of processing of a CP attractive force measuring unit.

In the magnetic bearing system 40A, when the axial electromagnet control unit CZA controls the axial bearing portion AXB, the CP attractive force measuring unit 64 measures the CP attractive force Fcpθ in the procedure in FIG. 29.

In S5010, the CP attractive force measuring unit 64 sets, in the integration circuit 68, an integration time T for measuring an average magnetic flux density Bav. In S5020, the CP attractive force measuring unit 64 resets the integration circuit 68 and starts a timer. When a time t of the timer reaches the integration time T (Y in S5030), the CP attractive force measuring unit 64 reads an AD conversion value Ad from the A/D converter 69 (S5040). The AD conversion value Ad is a digital signal indicating an integrated value of the integration circuit 68 when the time t reaches the integration time T. In S5050, the CP attractive force measuring unit 64 divides the AD conversion value Ad by T, and calculates the average magnetic flux density Bav according to the expression (30).

In S5060, the CP attractive force measuring unit 64 calculates a CP attractive force Fcpθ based on the calculated average magnetic flux density Bav according to the expression (32). In S5070, the CP attractive force measuring unit 64 transmits data on the measured CP attractive force Fcpθ to the electromagnet control unit CZA and the integrated control unit 61A.

3.2.3 Control Flow of Axial Electromagnet Control Unit CZA

Figure 30A:
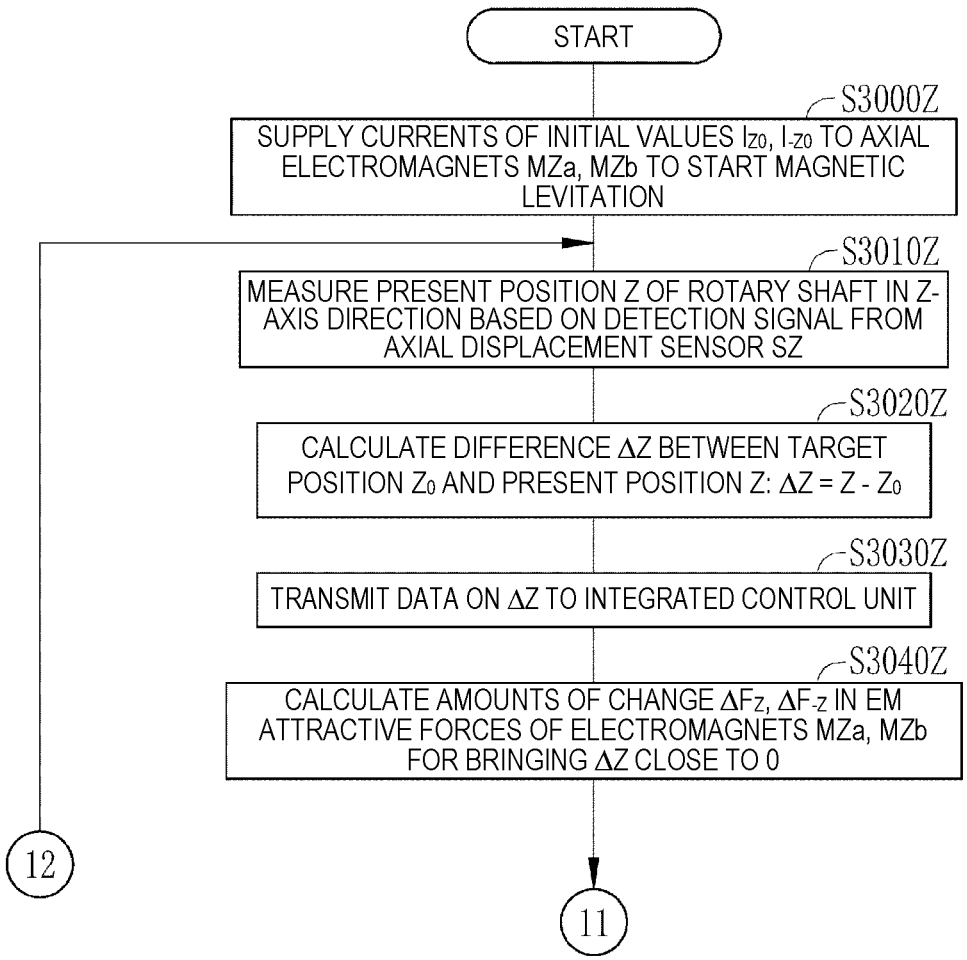
FIG. 30A shows a former half of a flowchart of a control flow of an axial electromagnet control unit according to the first embodiment.
Figure 30B:
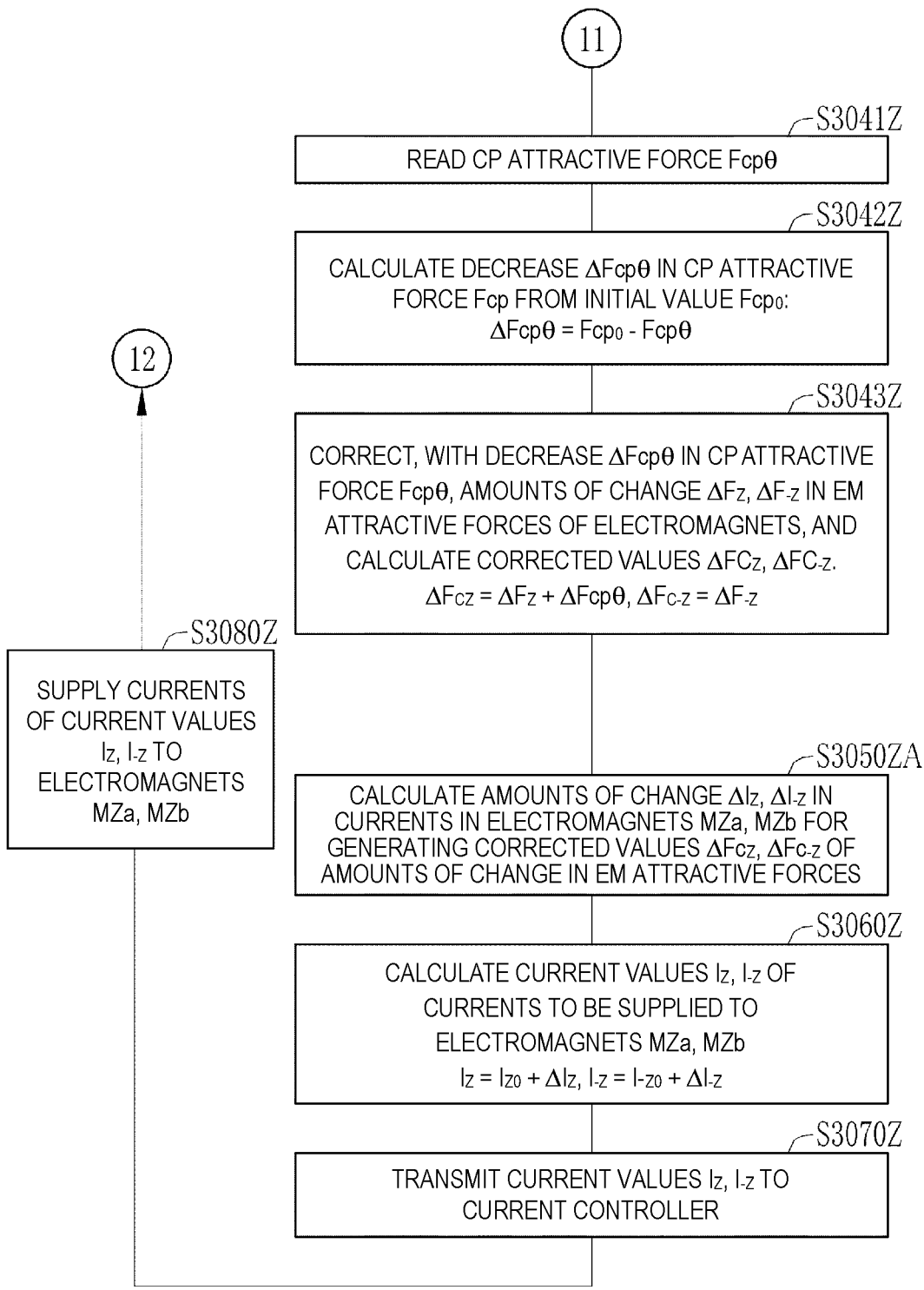
FIG. 30B shows a latter half of the flowchart of the control flow of the axial electromagnet control unit according to the first embodiment.

FIGS. 30A and 30B show a control flow of the axial electromagnet control unit CZA according to the first embodiment. Steps S3000Z to S3040Z in a former half in FIG. 30A are similar to those in the control flow of the axial electromagnet control unit CZ according to the comparative example in FIG. 11. In step S3040Z, when the rotary shaft 27 is displaced from a target position $Z_0$, the axial electromagnet control unit CZA calculates, based on a difference ΔZ from the present position Z, amounts of change $\Delta F_Z$, $\Delta F_{-Z}$ in EM attractive forces $F_Z$, $F_{-Z}$ of the electromagnets MZa, MZb for bringing the difference ΔZ close to 0.

In FIG. 30B, after S3040Z, in S3041Z, the axial electromagnet control unit CZA reads the CP attractive force Fcpθ measured by the CP attractive force measuring unit 64. Then, in S3042Z, the axial electromagnet control unit CZA calculates a decrease ΔFcpθ from an initial value Fcp0 of the CP attractive force Fcp according to the following expression (33).

$$\Delta Fcp\theta = Fcp0 - Fcp\theta \tag{33}$$

In S3043Z, the axial electromagnet control unit CZA corrects, with the decrease ΔFcpθ, the amounts of change $\Delta F_Z$, $\Delta F_{-Z}$ in the EM attractive forces $F_Z$, $F_{-Z}$ calculated based on the displacement of the rotary shaft 27 according to the following expressions (34), (35), and calculates corrected values $\Delta Fc_Z$, $\Delta Fc_{-Z}$.

$$\Delta Fc_Z = \Delta F_Z + \Delta Fcp\theta \tag{34}$$

$$\Delta Fc_{-Z} = \Delta F_{-Z} \tag{35}$$

In S3050ZA, the axial electromagnet control unit CZA calculates amounts of change $\Delta I_Z$, $\Delta I_{-Z}$ in currents in the electromagnets MZa, MZb for generating the corrected values $\Delta Fc_Z$, $\Delta Fc_{-Z}$ of the amounts of change in the EM attractive forces $F_Z$, $F_{-Z}$. As such, the axial electromagnet control unit CZA corresponds to a correction unit that corrects the EM attractive forces $F_Z$, $F_{-Z}$ that are magnetic forces of the axial electromagnets MZa, MZb according to the variation in the measured CP attractive force Fcpθ. In this example, the axial electromagnet control unit CZA corrects the EM attractive forces $F_Z$, $F_{-Z}$ based on the decrease ΔFcpθ that is a difference between the measured CP attractive force Fcpθ and the initial value Fcp0 that is a preset reference value.

After S3050ZA, steps S3060Z to S3080Z are similar to those in the comparative example in FIG. 11. Specifically, in S3060Z, the axial electromagnet control unit CZA calculates current values $I_Z$, $I_{-Z}$ of the axial electromagnets MZa, MZb according to the expressions (19), (20). In S3070Z and S3080Z, currents of the current values $I_Z$, $I_{-Z}$ are supplied through the current controller 59 to the axial electromagnets MZa, MZb.

In the control flow, even if the present position Z of the levitated position of the rotary shaft 27 matches the target position $Z_0$ and $\Delta Z$ is 0, steps S3030Z to S3080Y are performed. Specifically, if the CP attractive force Fcpθ varies even with $\Delta Z$ being 0, the EM attractive forces $F_Z$, $F_{-Z}$ of the axial electromagnets MZa, MZb are corrected based on the decrease $\Delta$Fcpθ. In this case, in S3043Z, the amounts of change $\Delta F_Z$, $\Delta F_{-Z}$ are 0, and thus only the decrease $\Delta$Fcpθ is a corrected value $\Delta Fc_Z$. Then, steps S3050ZA to S3080Z are performed, and as a result, the amount of change $\Delta Fc_Z$ in force corresponding to the decrease $\Delta$Fcpθ is added to the EM attractive force $F_Z$.

3.3 Effect

The magnetic bearing control unit 36A according to the first embodiment performs such control and thus provides the following effects.

3.3.1 First Effect

Figure 31:
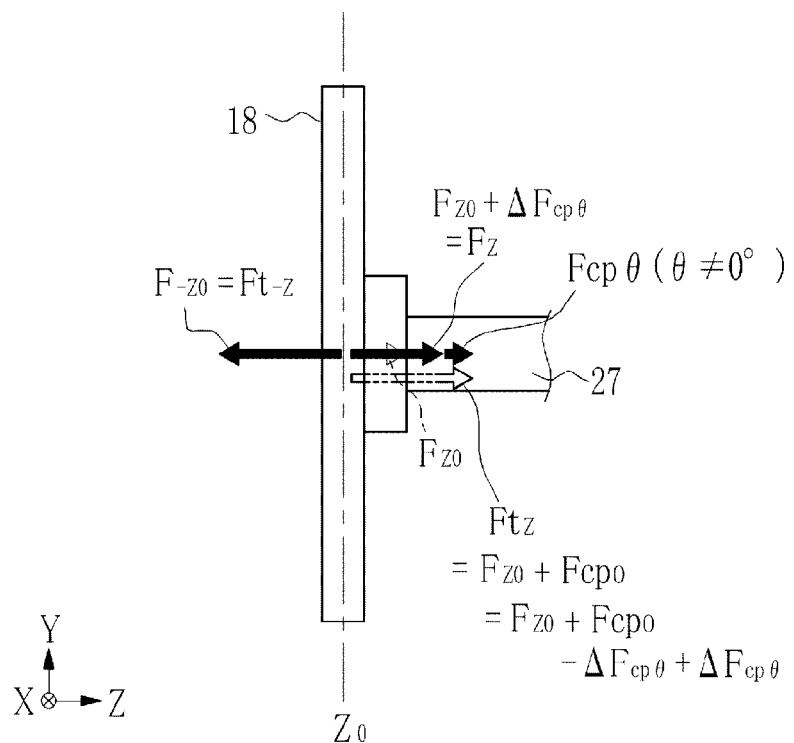
FIG. 31 illustrates a relationship of balance of forces applied to a rotary shaft 27 in a Z-axis direction in the first embodiment.
Figure 32:
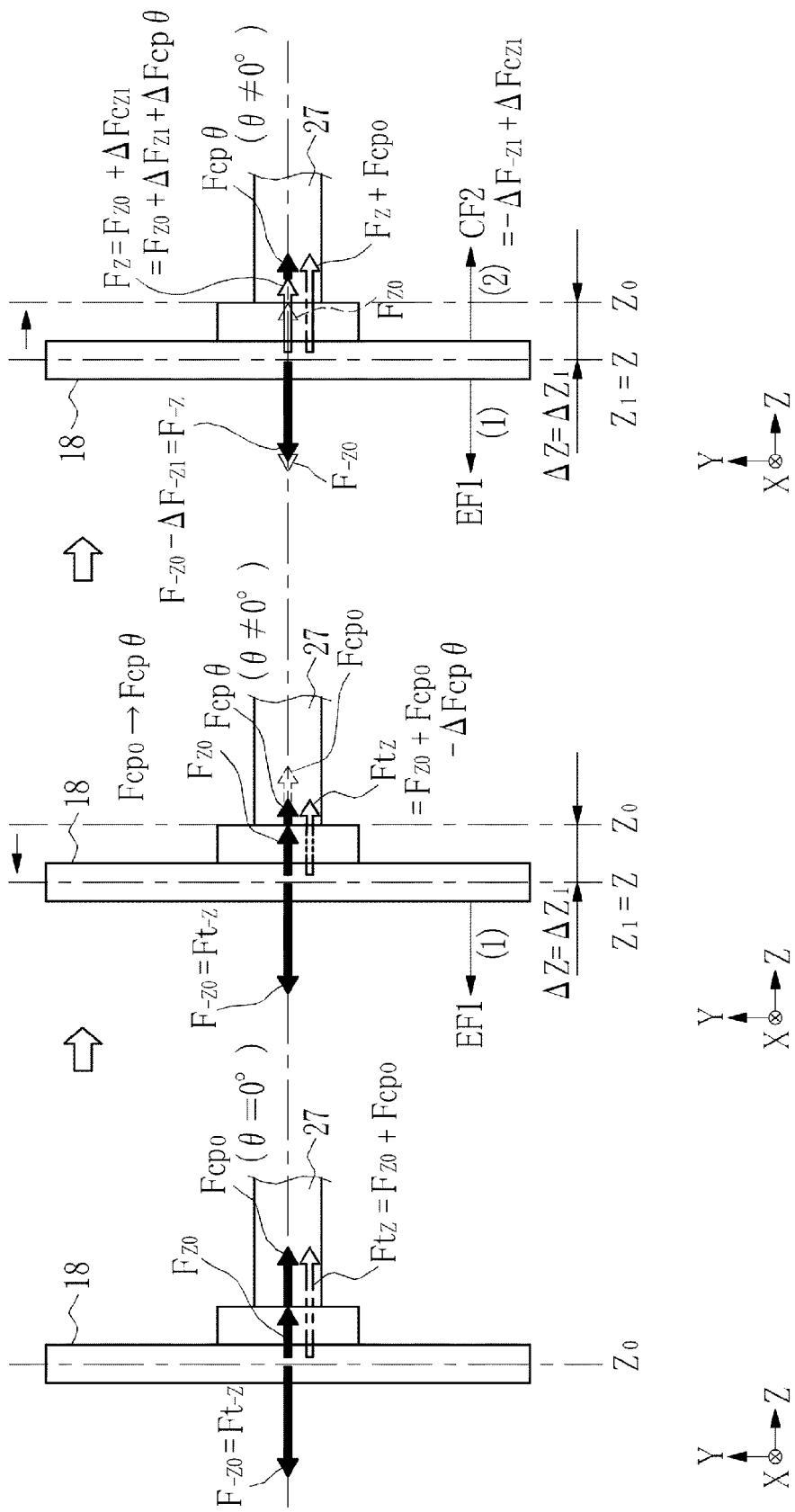
FIGS. 32A to 32C illustrate an operation of position adjustment of the first embodiment, and illustrates control of the position adjustment when the rotary shaft is displaced by an external force in the case with a phase difference in the control of the first embodiment.

As shown in FIG. 31, when the CP attractive force Fcp varies and has the decrease $\Delta$Fcpθ, the axial electromagnet control unit CZA corresponding to the correction unit corrects the total force $Ft_Z$ positively applied in the same direction as the CP attractive force Fcp to compensate for the decrease $\Delta$Fcpθ. Specifically, the decrease $\Delta$Fcpθ is added to the EM attractive force $F_{Z0}$ of the axial electromagnet MZa. For this correction, the CP attractive force measuring unit 64 measures the CP attractive force Fcpθ based on the detection signal from the magnetic flux density sensor 63.

The relationship of balance of forces in this case is expressed by the following expressions (36), (37).

$$Ft_Z = F_Z + Fcp0 = F_{Z0} + Fcp0 - \Delta Fcp\theta + Fcp\theta = F_{Z0} + Fcp0 \quad (36)$$

$$Ft_Z = Ft_{-Z} = F_{-Z0} \quad (37)$$

As shown in FIG. 31, the axial electromagnet control unit CZA corrects, based on the amount of variation $\Delta$Fcpθ of the CP attractive force Fcp, the EM attractive force $F_Z$ that is the magnetic force of the axial electromagnet MZa so that the total force $Ft_Z$ corresponding to a positive first force and a force $Ft_{-Z}$ corresponding to a negative second force applied to the rotary shaft 27 are balanced in the Z-axis direction. The total force $Ft_Z$ corresponding to the first force includes the CP attractive force Fcp and the EM attractive force $F_Z$ that is the magnetic force of the axial electromagnet MZa, and the force $Ft_{-Z}$ corresponding to the second force includes the EM attractive force $F_{-Z}$ that is the magnetic force of the axial electromagnet MZb.

To perform correction according to the variation in the CP attractive force Fcp, the gas laser apparatus of the first embodiment can reduce an influence of the variation in the CP attractive force Fcp on the relationship of balance of forces of the rotary shaft 27 of the fan 26 and control of position adjustment of the rotary shaft 27 using the axial electromagnets MZa, MZb. This facilitates the control of the position adjustment of the rotary shaft 27. This can stabilize the rotation of the fan 26 and the levitated position of the rotary shaft 27, and reduce the possibility of damage to the first magnetic bearing 28 and the second magnetic bearing 29.

The CP attractive force Fcpθ used for correction is measured using the detection signal from the magnetic flux density sensor 63 corresponding to an attractive force estimating sensor. This allows accurate measurement of the CP attractive force Fcpθ and increase accuracy of correction. Also, independently of the displacement of the rotary shaft 27, the sensor is used to measure the CP attractive force Fcpθ and correction is performed when the CP attractive force Fcp varies, thereby allowing correction even when the rotary shaft 27 is not displaced from the target position $Z_0$. This reduces a time delay in the control of the position adjustment. As a result, quick and highly accurate control can be expected as compared to the conventional example.

With reference to FIGS. 32A to 32C, the effect will be described based on a specific example. FIGS. 32A to 32C show an example of control of the axial electromagnet control unit CZA when the rotary shaft 27 is displaced. Similarly to FIG. 20A according to the comparative example, FIG. 32A shows a state where the CP attractive force Fcp is the initial value Fcp0, the rotary shaft 27 is in the target position $Z_0$, and the positive force $Ft_Z$ and the negative force $Ft_{-Z}$ are balanced under the conditions in the expressions (26), (27) in FIG. 17.

In this state, as shown in FIG. 32B, a case where an external force EF1 as in FIG. 20B is negatively applied to the rotary shaft 27 is assumed. In this case, the external force EF1 negatively moves the rotary shaft 27 from the target position $Z_0$ to displace the levitated position Z to $Z_1$. An amount of displacement $\Delta Z$ of the rotary shaft 27 is $\Delta Z_1$ ($=Z_1-Z_0$). With the amount of displacement $\Delta Z$ of the rotary shaft 27, the axial electromagnet control unit CZA varies the EM attractive forces of the axial electromagnets MZa, MZb so as to return the rotary shaft 27 to the target position $Z_0$.

With the same amount of displacement $\Delta Z_1$ as in FIG. 20B, the axial electromagnet control unit CZA calculates amounts of change $\Delta F_{Z1}$, $\Delta F_{-Z1}$ in the EM attractive force $F_Z$, $F_{-Z}$ of the axial electromagnets MZa, MZb as a force CF1 for bringing the rotary shaft 27 close to the target position $Z_0$.

In FIG. 32B, the CP attractive force Fcp is assumed to decrease from the initial value Fcp0 to Fcpθ when the amounts of change $\Delta F_{Z1}$, $\Delta F_{-Z1}$ are calculated as in FIG. 20B. In this case, unlike the comparative example in FIGS. 20A to 20C, the axial electromagnet control unit CZA corrects, based on the decrease $\Delta$Fcpθ in the CP attractive force Fcpθ, the amounts of change $\Delta F_{Z1}$, $\Delta F_{-Z1}$ calculated based on the amount of displacement $\Delta Z_1$ of the rotary shaft 27, and calculates the corrected values $\Delta Fc_{Z1}$, $\Delta Fc_{-Z1}$. $\Delta Fc_{-Z1}$ is equal to $\Delta F_{-Z1}$ as expressed by the expression (35).

As shown in FIG. 32C, in the first embodiment, unlike FIG. 20C in the comparative example, a force CF2 opposite to the external force EF1 is $-\Delta F_{Z1}+\Delta Fc_{Z1}$, and the decrease $\Delta$Fcpθ is compensated for with respect to $\Delta Fc_{Z1}$. Thus, the positive force with the force CF1 ($F_Z+$Fcp0) is larger than the negative EM attractive force $F_{-Z}$ of the axial electromagnet MZb, thereby preventing insufficiency of the force by the decrease $\Delta$Fcpθ as shown in FIG. 20C. As such, even if the CP attractive force Fcp varies, the decrease $\Delta$Fcpθ is compensated for, thereby reducing an influence on the control of the position adjustment.

Thus, even if the rotary shaft 27 is displaced from the target position $Z_0$, the amount of change in the force for bringing the rotary shaft 27 close to the target position $Z_0$ can be appropriately provided. This can increase accuracy of the position adjustment, and reduce a time delay of the control of the position adjustment, thereby allowing quick and highly accurate control as compared to the comparative example.

3.3.2 Second Effect

In this example, the axial electromagnet control unit CZA performs correction of the EM attractive force based on the decrease ΔFcpθ so as to maintain an initial condition of the balance of forces applied to the rotary shaft 27. The initial condition refers to the relationship of balance of forces applied to the rotary shaft 27 for adjusting the levitated position of the rotary shaft 27 to the target position $Z_0$ in a state where the motor 31 is stopped and the CP attractive force Fcp is maintained at the initial value Fcp0 as a reference value.

Specifically, in the expressions (36), (37), the relationship of balance of the positive and negative total forces $Ft_Z$, $Ft_{-Z}$ applied to the rotary shaft 27 is the same as the relationship of balance of forces when the magnetic coupling 32 generates the initial CP attractive force Fcp0 as expressed by the expressions (26), (27). Thus, the following effect can be obtained.

The forces applied to the rotary shaft 27 in the Z-axis direction are balanced by the axial electromagnets MZa, MZb arranged to oppose each other attracting the rotary shaft 27 with the positive EM attractive force $F_Z$ and the negative EM attractive force $F_{-Z}$. The relationship of balance of forces by the electromagnets attracting each other is similar to a relationship of balance of forces by springs positively and negatively pulled. For example, similarly to reaction of the spring that changes according to a distance by the Hooke's law during expansion and contraction of the spring, the attractive force applied to the rotary shaft 27 varies according to a distance between the electromagnet and the rotary shaft 27 even if the current supplied to the electromagnet does not change.

Thus, in using the electromagnets, the change in the magnitudes of the total forces $Ft_Z$, $Ft_{-Z}$ to be balanced in the target position $Z_0$ corresponds to the change in spring constant in using the spring. When the spring constant changes, an amount of change in the force differs even with the same amount of displacement. Thus, when the magnitudes of the total forces $Ft_Z$, $Ft_{-Z}$ to be balanced in the target position $Z_0$ changes, the amounts of change in the EM attractive forces for bringing the rotary shaft 27 close to the target position $Z_0$ change even with the same amount of displacement of the rotary shaft 27.

The initial EM attractive forces $F_{Z0}$, $F_{-Z0}$ of the axial electromagnets MZa, MZb are set based on the fact that the magnetic coupling 32 generates the CP attractive force Fcp of the initial value Fcp0. For the axial electromagnet control unit CZA, optimum values of a gain and the like of a control circuit are set based on the initial value Fcp0 of the CP attractive force Fcp. For example, based on the fact that the CP attractive force Fcp is the initial value Fcp0, an amount of displacement of the rotary shaft 27 from the target position $Z_0$, a magnitude of force to be generated to bring the rotary shaft 27 close to the target position $Z_0$ in the case of the displacement, an amount of current to be supplied to generate the force, or the like are calculated, and optimum values according thereto are set.

Thus, if the CP attractive force Fcp varies to change the initial condition of the balance of forces, the optimum values set in the axial electromagnet control unit CZA are deviated. Then, the amount of change in the EM attractive force for returning the rotary shaft 27 to the target position $Z_0$ may be too large or small, which may make appropriate control difficult. In this example, the initial condition of the balance of forces applied to the rotary shaft 27 is maintained, thereby avoiding such inconvenience and allowing more appropriate control.

3.3.3 Third Effect

Further, as shown in the control flow in FIGS. 30A and 30B, the axial electromagnet control unit CZA calculates, based on the difference ΔZ that is the amount of displacement of the rotary shaft 27 detected by the displacement sensor SZ, the amounts of change $\Delta F_Z$, $\Delta F_{-Z}$ in the EM attractive forces $F_{Z0}$, $F_{-Z0}$ for bringing the present position Z close to the target position $Z_0$, and corrects the calculated amounts of change $\Delta F_Z$, $\Delta F_{-Z}$ based on the decrease ΔFcpθ. Thus, the processing of calculating the amounts of change $\Delta F_Z$, $\Delta F_{-Z}$ based on the displacement of the rotary shaft 27 can be the same as in the comparative example, thereby allowing use of conventional circuit components and the like and reducing cost.

3.4 Abnormality Determination of CP Attractive Force

Figure 33:
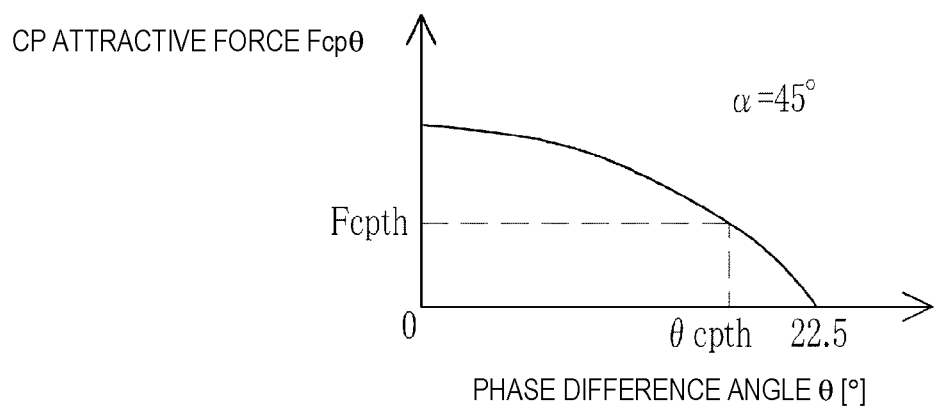
FIG. 33 illustrates a lower limit value of a CP attractive force.

As shown in FIGS. 33 and 34, the integrated control unit 61A monitors the CP attractive force Fcp, and performs control to stop rotation of the motor 31 when the CP attractive force Fcp becomes smaller than the predetermined lower limit value Fcpth. The integrated control unit 61A corresponds to a motor control unit.

As shown in FIG. 33, in a graph showing a correspondence relationship between the CP attractive force Fcpθ and the phase difference angle θ, the lower limit value Fcpth is a CP attractive force corresponding to an upper limit value θcpth of the phase difference angle θ. The upper limit value θcpth is set to a predetermined phase difference angle θ of smaller than 22.5° in the magnetic coupling 32 with the central angle α of 45° in this example. Data on the lower limit value Fcpth is stored in an internal memory (not shown) of the integrated control unit 61A.

Figure 34A:
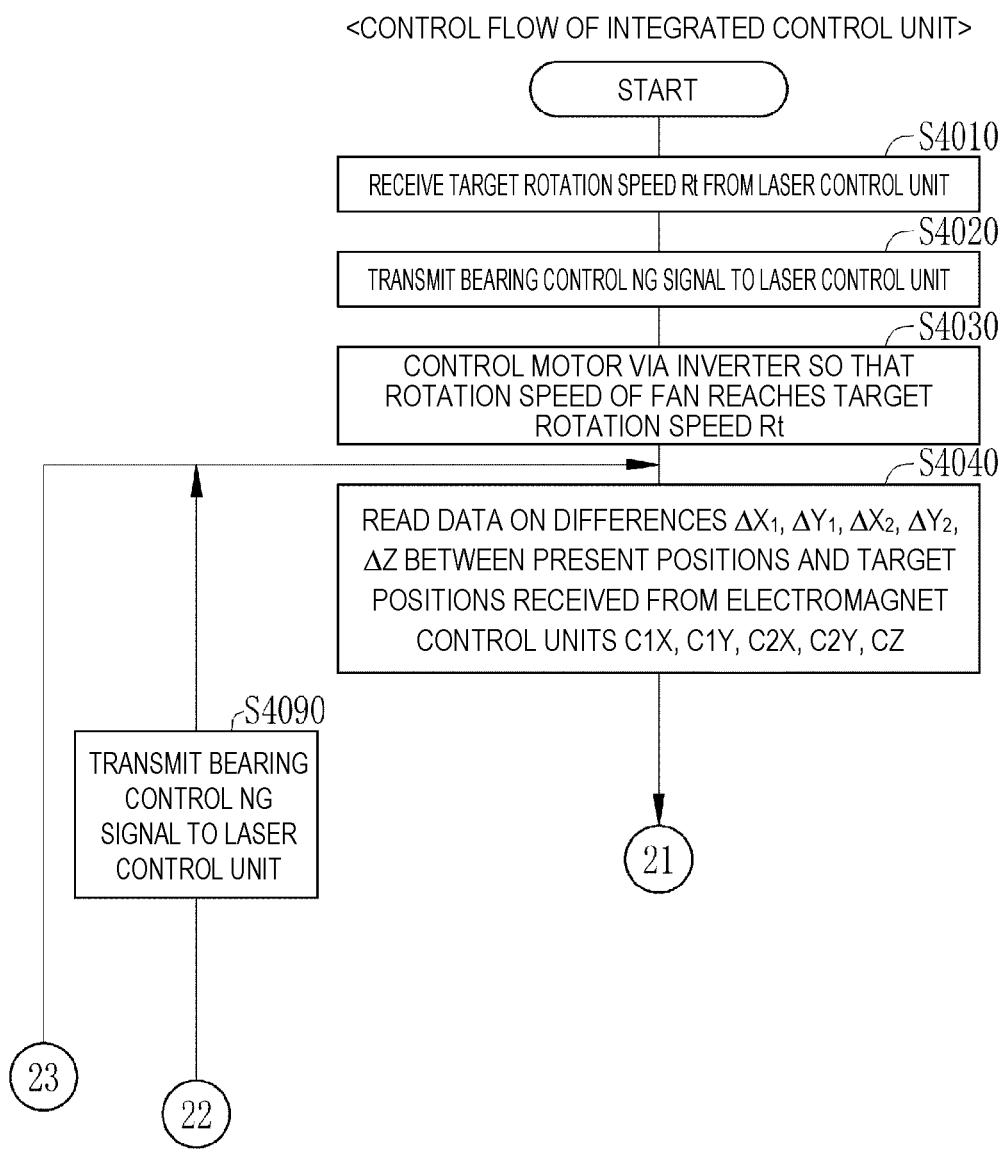
FIG. 34A shows a former half of a flowchart of a control flow of an integrated control unit according to the first embodiment.
Figure 34B:
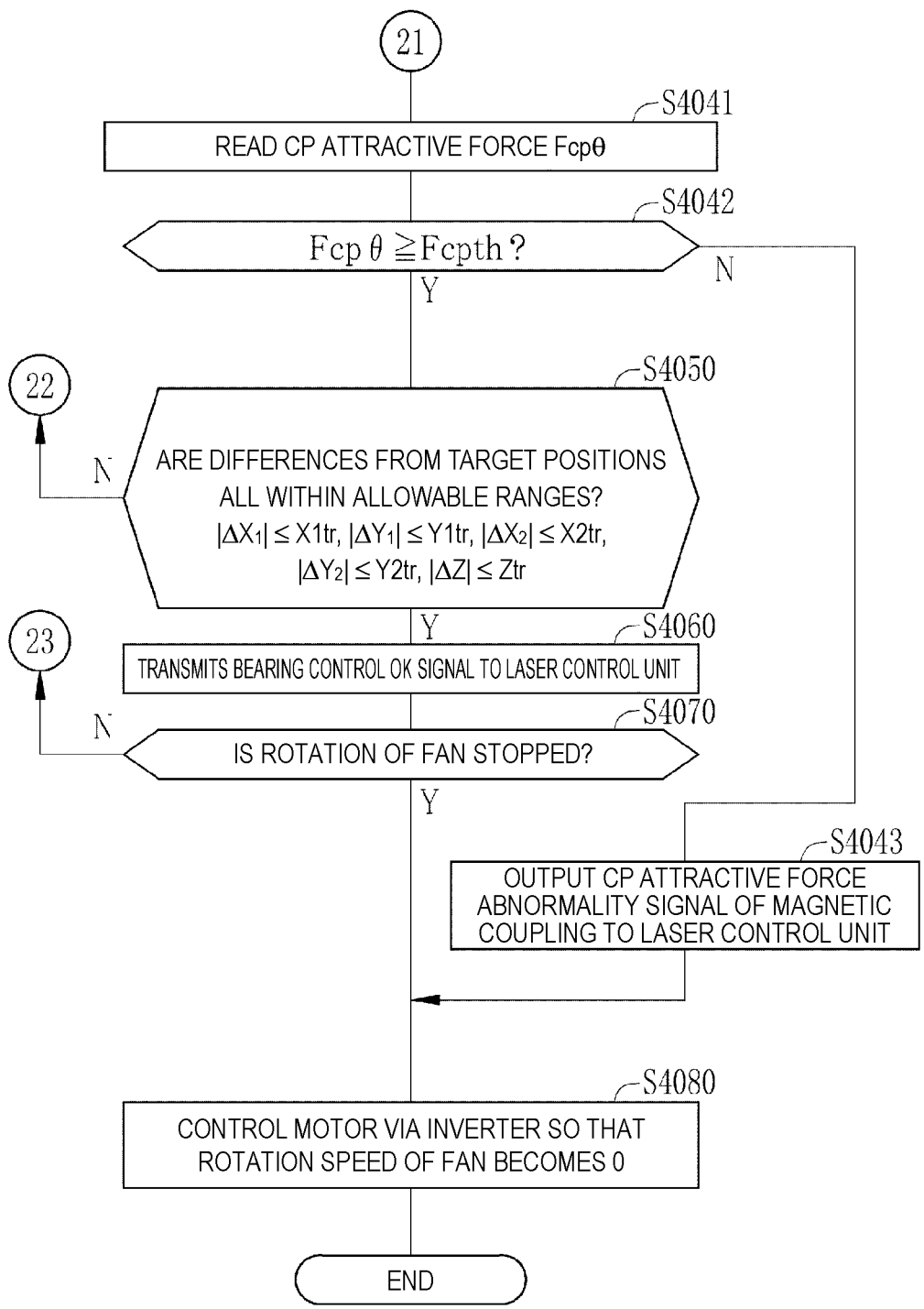
FIG. 34B shows a latter half of the flowchart of the control flow of the integrated control unit according to the first embodiment.

FIGS. 34A and 34B show a control flow of the integrated control unit 61A. Steps S4010 to S4040 in a former half in FIG. 34A are similar to those in the control flow of the comparative example in FIG. 12. Differences from FIG. 12 are steps S4041, S4042, S4043 being added as shown in FIG. 34B.

In S4041, the integrated control unit 61A reads the CP attractive force Fcpθ measured by the CP attractive force measuring unit 64. In S4042, the integrated control unit 61A compares the read CP attractive force Fcpθ with the lower limit value Fcpth, and monitors whether or not the CP attractive force Fcpθ is smaller than the lower limit value Fcpth. When the CP attractive force Fcpθ is equal to or larger than the lower limit value Fcpth (Y in S4042), the integrated control unit 61A goes to step S4050 and thereafter.

When the CP attractive force Fcpθ is smaller than the lower limit value Fcpth (N in S4042), the integrated control unit 61A goes to S4043, and outputs, to the laser control unit 17, a CP attractive force abnormality signal indicating abnormality of the CP attractive force Fcp of the magnetic coupling 32. Then, the integrated control unit 61A goes to S4080, and stops rotation of the motor 31.

If the CP attractive force Fcp is too small, the torque of the motor 31 is not appropriately transmitted to the fan 26, and the fan 26 is unlikely to rotate in synchronization with the motor 31 even when the motor 31 is rotating. If the CP attractive force Fcp is too small, the rotation of the fan 26 and the position of the rotary shaft 27 become unstable, which may damage the first magnetic bearing 28 and the second magnetic bearing 29. As in this example, by monitoring the CP attractive force Fcpθ and outputting the CP attractive force abnormality signal when the CP attractive force Fcpθ is smaller than the lower limit value Fcpth, whether or not the fan 26 is rotating in synchronization with the motor 31 can be detected. Also, damage to the first magnetic bearing 28 and the second magnetic bearing 29 due to the abnormality of the CP attractive force Fcp can be prevented.

3.5 Variant of Magnetic Coupling

In this example, the magnetic coupling 32 of the eight-pole type including the eight magnetic poles with the central angle α of 45° is described by way of example. However, not limited to this example, the number n of the magnetic poles may be two or more. When the number of the magnetic poles is n, the central angle α of each magnetic pole is 360°/n.

3.6 PID Control

In the comparative example and the first embodiment, when the amount of change ΔF in force according to the displacement of the rotary shaft 27 is calculated, PID control is actually performed. The PID control includes proportional (P) control, integral (I) control, and differential (D) control. The proportional control changes the amount of change in force for bringing the rotary shaft 27 close to the target position according to the amount of displacement of the rotary shaft 27 from the target position. The integral control integrates the amount of displacement and adjusts the amount of change in force according to an integrated value. The differential control (D control) compares the former amount of displacement with the present amount of displacement and changes the amount of change in force according to the difference between the amounts of displacement.

The PID control is a known control method for feedback control, and is naturally required for stabilizing the position of the rotary shaft 27 such as attenuating vibration of the rotary shaft 27 particularly in an unstable system such as the magnetic bearing for controlling the position of the rotary shaft 27 using the electromagnet. In the above example, only the proportional control is performed to avoid complicated descriptions, but actually, the PID control including the integral control and the differential control in addition to the proportional control is performed.

The axial electromagnet control unit CZA performs the PID control using the difference ΔZ calculated based on the output from the displacement sensor SZ as the amount of displacement. Performing the PID control allows the rotary shaft 27 to be quickly brought close to the target position $Z_0$ and also reduce vibration of the rotary shaft 27 in the position adjustment for bringing the rotary shaft 27 close to the target position $Z_0$.

3.7 Others

In this example, the example has been described including the absolute value circuit 67 that converts the output from the magnetic flux density sensor 63 into the absolute value, but the absolute value circuit 67 does not need to be provided. As shown in FIGS. 27A and 28A, when the phase difference occurs, a time width of the output signal of the magnetic flux density B changes according to the phase difference angle θ, and thus the CP attractive force Fcpθ can be measured by calculation based on only the positive output signal.

The CP attractive force measuring unit 64 and the electromagnet control units C1X, C1Y, C2X, C2Y, CZA of the magnetic bearing control unit 36A in FIG. 26 may include a field-programmable gate array (FPGA) for high-speed control.

In this example, the preset reference value of the CP attractive force Fcp is the initial value Fcp0. The CP attractive force Fcp is at the maximum value in the initial state where the motor is stopped and there is no phase difference, and the maximum value corresponds to the initial value Fcp0. As shown in this example, if the initial value Fcp0 is set to the reference value, the amount of variation is only the decrease ΔFcpθ from the initial value Fcp0. Thus, there is no need to consider an increase in calculating the amount of variation in the CP attractive force, thereby facilitating calculation. Thus, the initial value Fcp0 is preferably set to the reference value. However, the reference value does not need to be set to the initial value Fcp0.

In this example, the axial electromagnet control unit CZA calculates the correction amounts of the EM attractive forces $F_Z$, $F_{-Z}$ based on the amount of variation that is the difference between the measured CP attractive force Fcp and the preset reference value. However, the axial electromagnet control unit CZA does not need to always calculate the amount of variation in calculating the correction amounts of the EM attractive forces $F_Z$, $F_{-Z}$, but may directly calculate the correction amounts from, for example, the absolute value of the measured CP attractive force Fcp.

4. Gas Laser Apparatus of Second Embodiment

Figure 35:
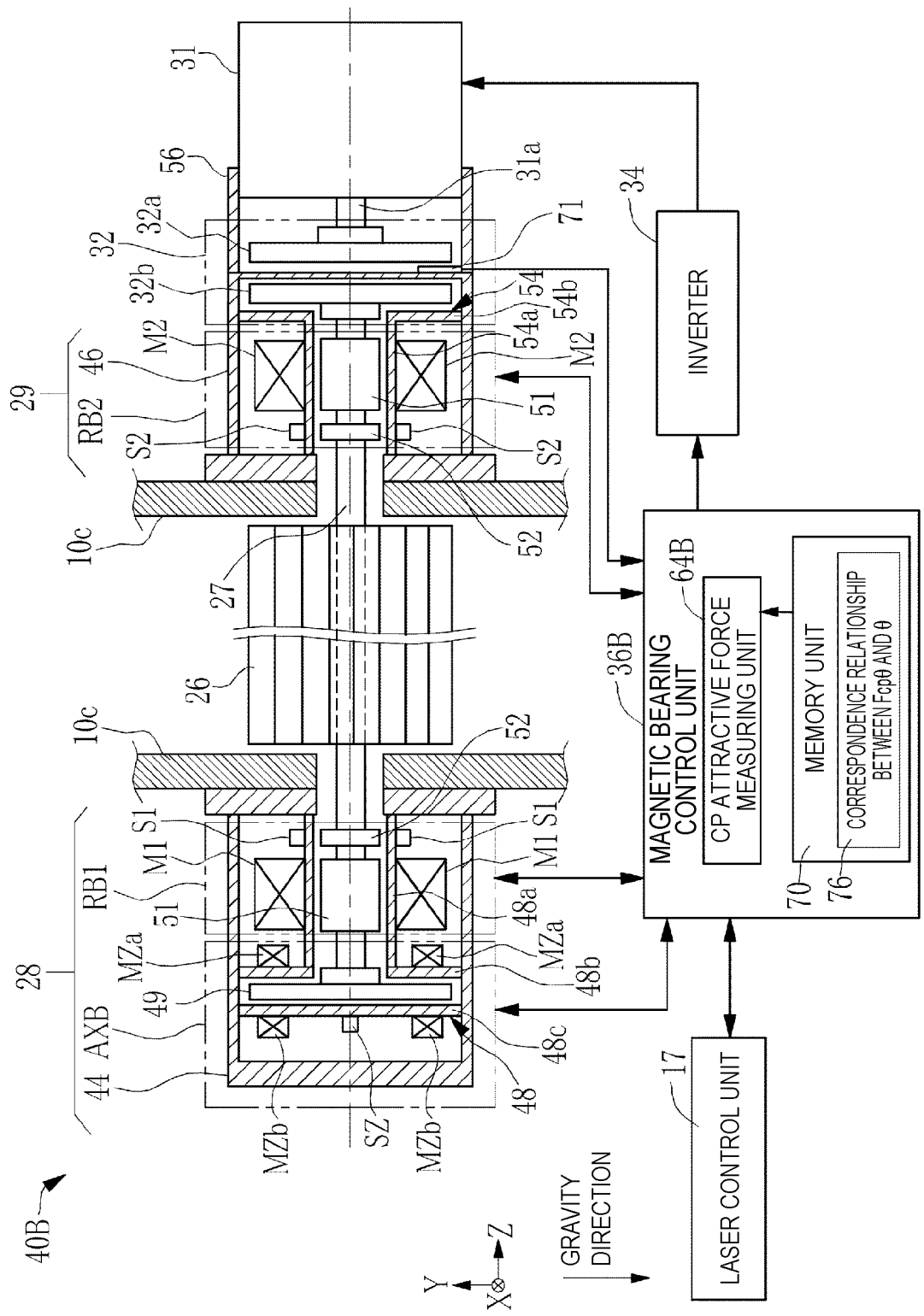
FIG. 35 illustrates a configuration of a magnetic bearing system according to a second embodiment.

With reference to FIGS. 35 to 47, a gas laser apparatus of a second embodiment will be described. An overall configuration of the gas laser apparatus of the second embodiment and a basic configuration of a magnetic bearing system 40B in FIG. 35 are similar to those of the gas laser apparatus of the first embodiment. A difference is a CP attractive force measuring method of the magnetic bearing system 40B. More specifically, the magnetic bearing system 40A according to the first embodiment uses the magnetic flux density sensor 63 as the attractive force estimating sensor, and uses the magnetic flux density sensor 63 to detect the magnetic flux density itself and measure the CP attractive force Fcpθ of the magnetic coupling 32. On the other hand, the magnetic bearing system 40B according to the second embodiment uses a phase difference sensor as the attractive force estimating sensor, and uses the phase difference sensor to detect a phase difference of a magnetic coupling 32 and measure a CP attractive force Fcpθ. The phase difference is a parameter that enables the CP attractive force Fcpθ to be estimated.

The magnetic bearing system 40B according to the second embodiment is similar to the magnetic bearing system 40A according to the first embodiment other than the CP attractive force measuring method. Thus, the same components are denoted by the same reference numerals, descriptions are omitted as required, and differences will be mainly described.

4.1 Configuration of Magnetic Bearing System of Fan

FIG. 35 illustrates a configuration of the magnetic bearing system 40B according to the second embodiment. In the magnetic bearing system 40B according to the second embodiment, differences in configuration from the first embodiment are: first, a magnetic flux density change sensor 71 provided as a phase difference sensor in the magnetic coupling 32; second, a magnetic bearing control unit 36B provided instead of the magnetic bearing control unit 36A; third, a CP attractive force measuring unit 64B provided instead of the CP attractive force measuring unit 64; and fourth, a memory unit 70 that is provided in the magnetic bearing control unit 36B and stores a correspondence relationship 76 between a CP attractive force Fcpθ and a phase difference angle θ.

4.1.1 Magnetic Flux Density Change Sensor

The magnetic flux density change sensor 71 detects a change point of a magnetic flux density between magnetic poles of a drive side rotor 32a and a driven side rotor 32b, and transmits the change point to the magnetic bearing control unit 36B. The change point of the magnetic flux density B is a parameter that enables the CP attractive force Fcpθ of the magnetic coupling 32 to be estimated.

The CP attractive force measuring unit 64B measures the phase difference angle θ based on a signal of the change point of the magnetic flux density B received from the magnetic flux density sensor 63. The correspondence relationship 76 between the CP attractive force Fcpθ and the phase difference angle θ stored in the memory unit 70 is data representing the correspondence relationship in the graph in FIG. 33. The CP attractive force measuring unit 64B calculates, based on the measured phase difference angle θ, the CP attractive force Fcpθ corresponding to the phase difference angle θ with reference to the correspondence relationship 76.

Similarly to the magnetic bearing control unit 36A according to the first embodiment, the magnetic bearing control unit 36B controls EM attractive forces $F_Z$, $F_{-Z}$ of axial electromagnets MZa, MZb based on displacement of a rotary shaft 27 detected by an axial displacement sensor SZ and also the measured CP attractive force Fcpθ. Through the control, the magnetic bearing control unit 36B performs position adjustment of the rotary shaft 27 in a Z-axis direction.

Figures 36A, 36B:
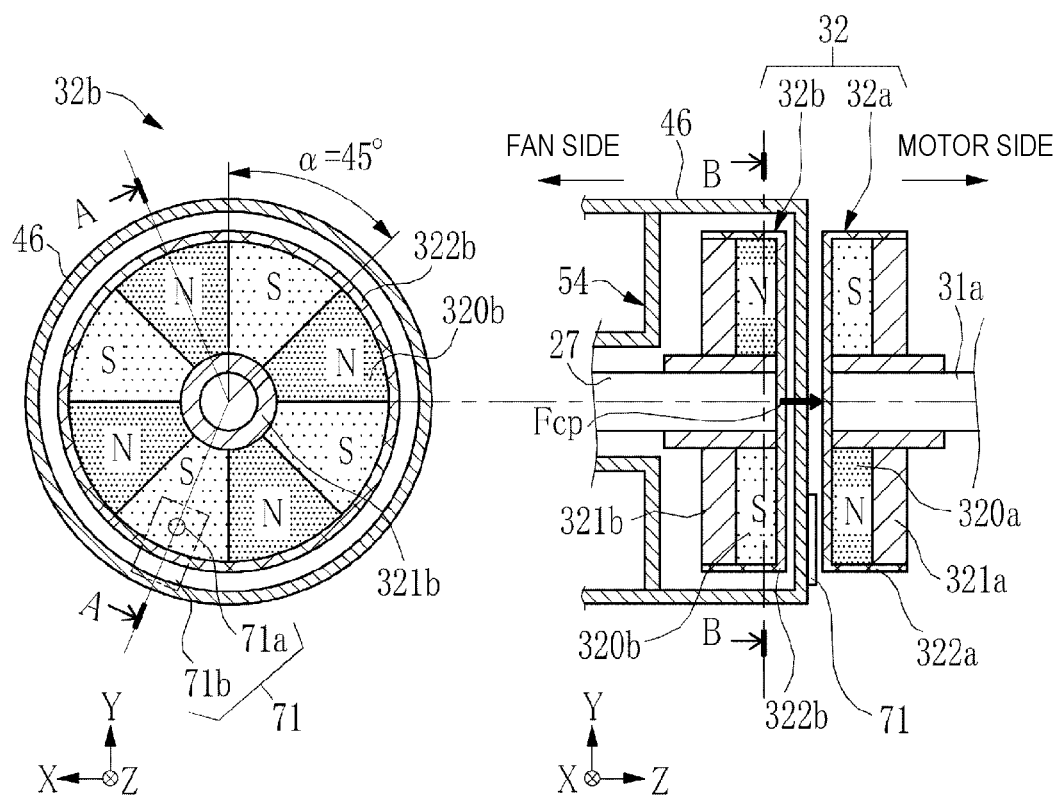
FIGS. 36A and 36B illustrate arrangement of a magnetic flux density change sensor.

As shown in FIG. 36A, the magnetic flux density change sensor 71 includes a sensor body 71a and a support case 71b that supports the sensor body 71a. As shown in FIG. 36B, the magnetic flux density change sensor 71 is arranged between the magnetic poles of the drive side rotor 32a and the driven side rotor 32b similarly to the magnetic flux density sensor 63 according to the first embodiment. The magnetic flux density change sensor 71 is fixed to an outer wall surface of a second case 46 similarly to the magnetic flux density sensor 63 according to the first embodiment. The magnetic flux density change sensor 71 is, for example, a pickup coil.

4.1.2 CP Attractive Force Measuring Method

Figure 37:
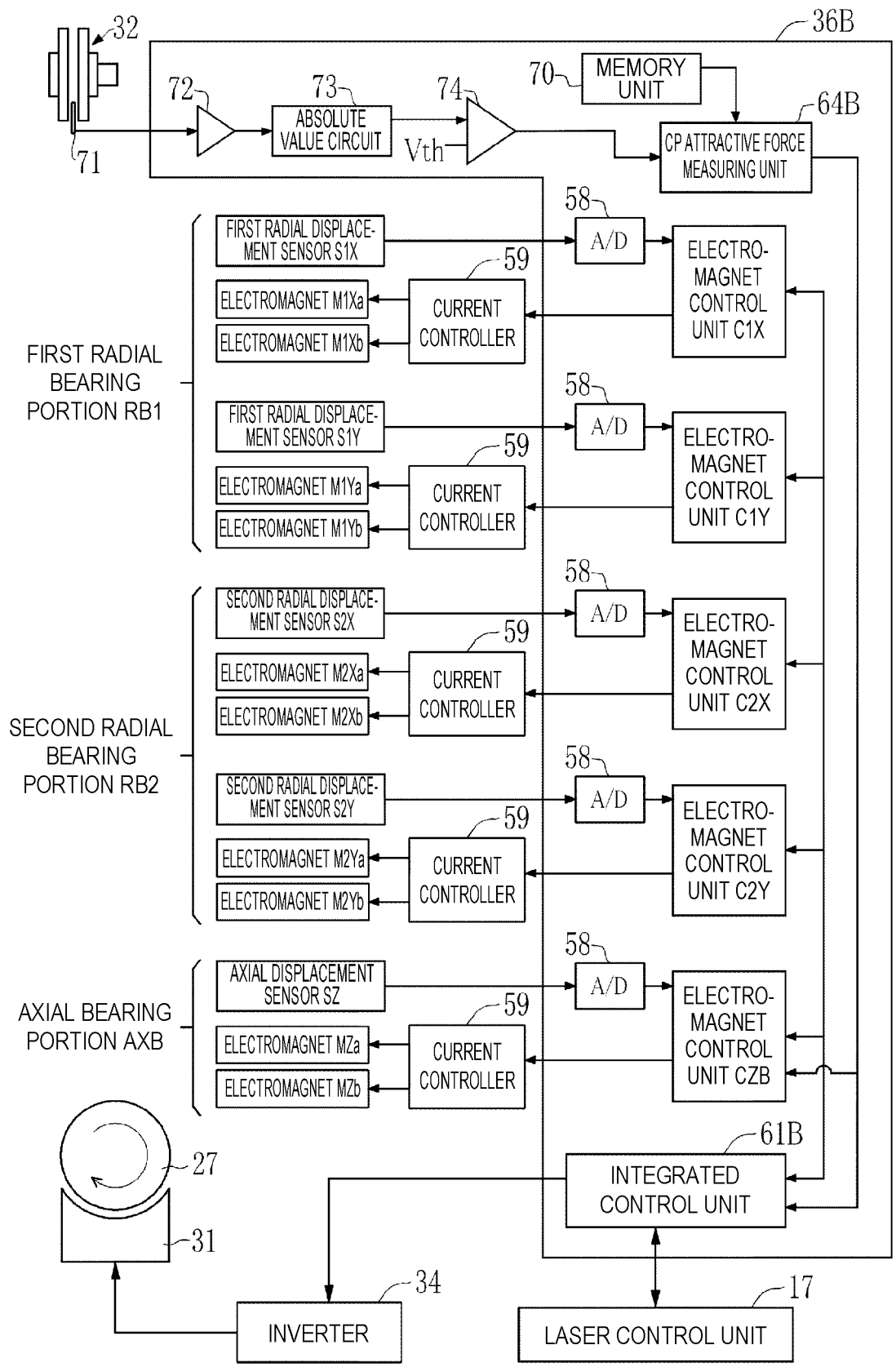
FIG. 37 is a schematic block diagram of an electric configuration of a magnetic bearing control unit according to the second embodiment.

As shown in FIG. 37, the magnetic bearing control unit 36B according to the second embodiment includes an amplifier 72, an absolute value circuit 73, and a comparator 74 in addition to the CP attractive force measuring unit 64B and the memory unit 70. The magnetic bearing control unit 36B includes an axial electromagnet control unit CZB instead of the axial electromagnet control unit CZA.

The amplifier 72 amplifies a detection signal from the magnetic flux density change sensor 71. The absolute value circuit 73 converts an output value of the detection signal received from the magnetic flux density change sensor 71 into an absolute value. The comparator 74 compares an output voltage that is the output value from the magnetic flux density change sensor 71 with a threshold voltage Vth and outputs a comparison result.

The CP attractive force measuring unit 64B measures the phase difference angle θ based on data output from the comparator 74. Specifically, processing as described below is performed.

Figures 38A, 38B:
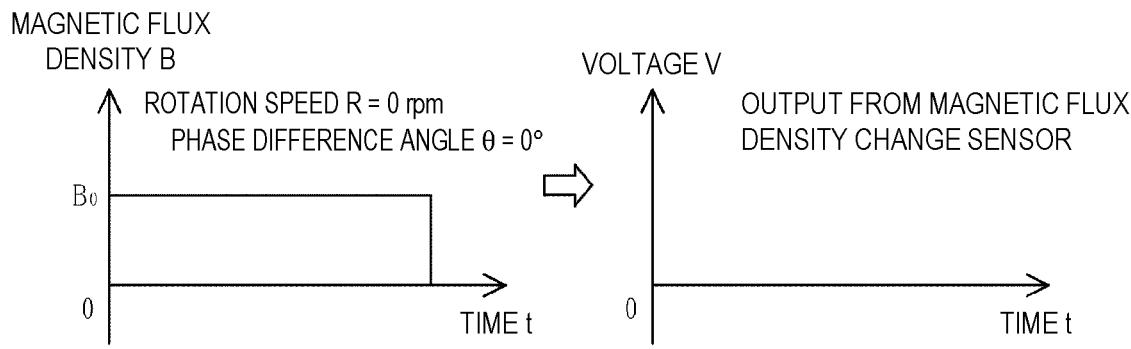
FIGS. 38A and 38B illustrate output from the magnetic flux density change sensor when rotation of a motor is stopped.

FIGS. 38A to 40B illustrate the detection signal from the magnetic flux density change sensor 71. FIG. 38A shows changes in the magnetic flux density B with time in a position of the magnetic flux density change sensor 71 when the phase difference angle θ of the magnetic coupling 32 is 0° and a rotation speed R is 0 rpm, that is, rotation is stopped. In this case, the drive side rotor 32a and the driven side rotor 32b are stopped in an initial opposing state in FIG. 23B, and thus the magnetic flux density B is constant at a maximum value $B_0$ as shown in FIG. 23A. Thus, there is no change point of the magnetic flux density B, and as shown in FIG. 38B, no detection signal is output from the magnetic flux density change sensor 71.

Figures 39A, 39B:
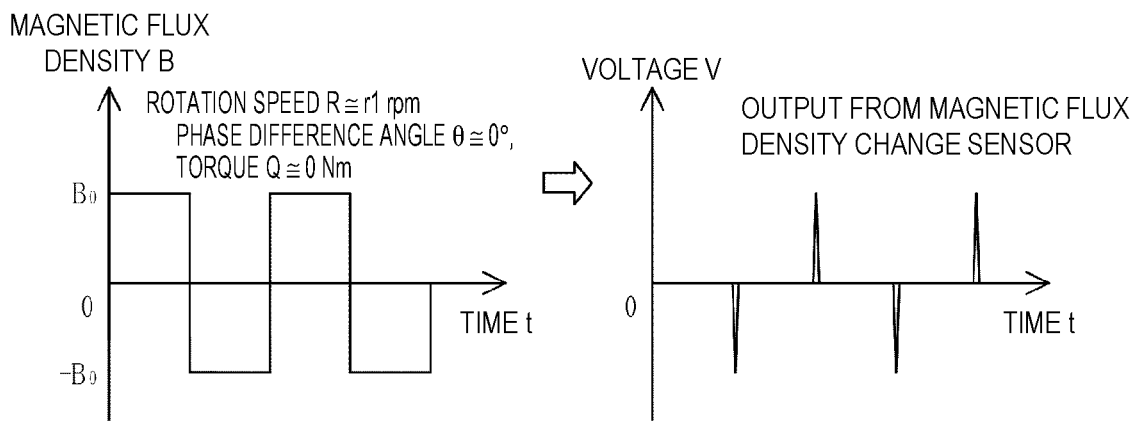
FIGS. 39A and 39B illustrate output from the magnetic flux density change sensor in a case without a phase difference when the motor is rotated at low speed.

FIGS. 39A and 39B show an example of a case where the motor 31 starts rotation and rotates at a relatively low constant rotation speed R of r1 rpm as in FIGS. 24A and 24B. In this example, the rotation speed R is relatively low and little torque Q is generated. Thus, as shown in FIG. 39B, there is little phase difference, and the phase difference angle θ is nearly equal to 0.

In this case, as illustrated in FIGS. 24A and 24B, the drive side rotor 32a and the driven side rotor 32b rotate while keeping the initial opposing state. Thus, in the position of the magnetic flux density change sensor 71, a direction of the magnetic flux changes 180° at regular intervals. Thus, in the detection signal from the magnetic flux density sensor 63, a positive output value and a negative output value are alternately repeated at regular intervals, and absolute values of the output values correspond to the magnetic flux density $B_0$.

In this case, as shown in FIG. 39B, the magnetic flux density change sensor 71 detects a positive rise and a negative fall of the magnetic flux density B as the change points of the magnetic flux density B. At timing corresponding to the change points, the detection signal is positively and negatively output at regular intervals.

Figures 40A, 40B:
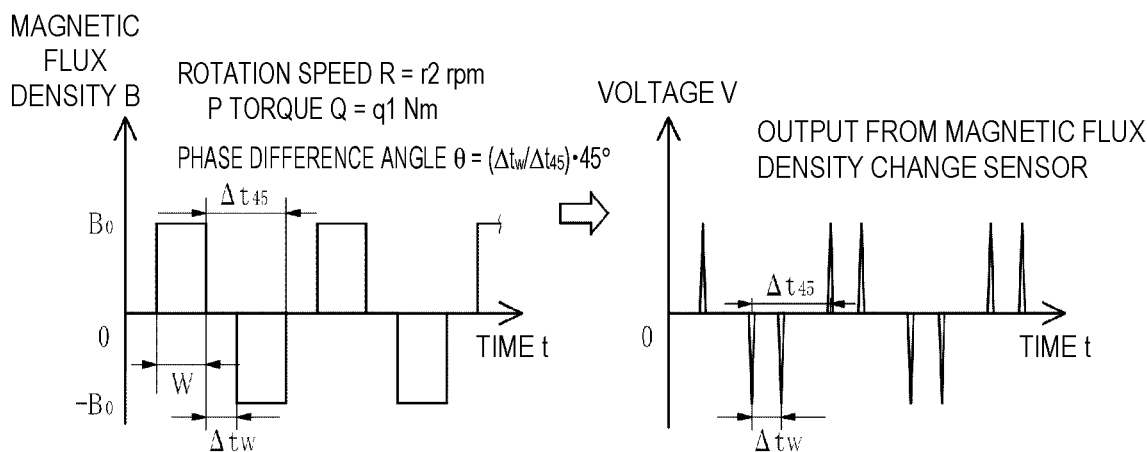
FIGS. 40A and 40B illustrate output from the magnetic flux density change sensor in a case with a phase difference when the motor is rotated at relatively high speed.

FIGS. 40A and 40B show an example of a case where the motor 31 rotates at a constant rotation speed R of r2 rpm higher than r1 rpm. In this example, torque Q of q1 Nm is generated, and thus as shown in FIG. 40A, a phase difference occurs, and a phase difference angle θ is not equal to 0. In this case, as shown in FIG. 40B, the magnetic flux density change sensor 71 detects the positive rise and the negative fall of the magnetic flux density B as the change points of the magnetic flux density B. For the magnetic coupling 32 including the magnetic poles with a central angle α of 45° as in this example, the phase difference angle θ is calculated from the detection signal in FIG. 40B by the following expression (38).

$$\theta = (\Delta t_w / \Delta t_{45}) \cdot 45° \quad (38)$$

In the expression (38), as shown in FIGS. 27A to 28B, W is a rate of time when an opposing part of different poles of the drive side rotor 32a and the driven side rotor 32b passes through the position of the magnetic flux density change sensor 71 with a time $\Delta t_{45}$ when the magnetic coupling 32 rotates 45° being 1. On the other hand, $\Delta t_w$ is a rate of time when an opposing part of the same poles of the drive side rotor 32a and the driven side rotor 32b passes through the position of the magnetic flux density change sensor 71 with the time $\Delta t_{45}$ being 1. Specifically, a relationship of $\Delta t_w = \Delta t_{45} - W = 1 - W$ is satisfied. When the phase difference angle is 0, both $\Delta t_{45}$ and W are 1, and thus $\Delta t_w$ is 0. The phase difference angle θ increases with increasing $\Delta t_w$.

Figure 41A:
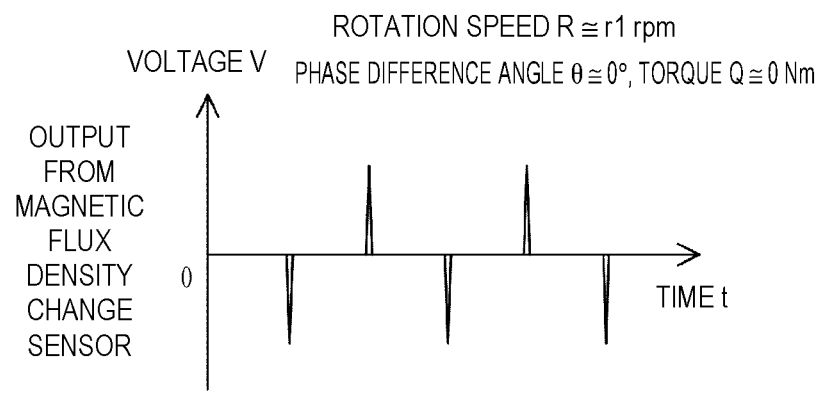
FIGS. 41A to 41C show processing of converting the output from the magnetic flux density change sensor in FIG. 39B.
Figure 41B:
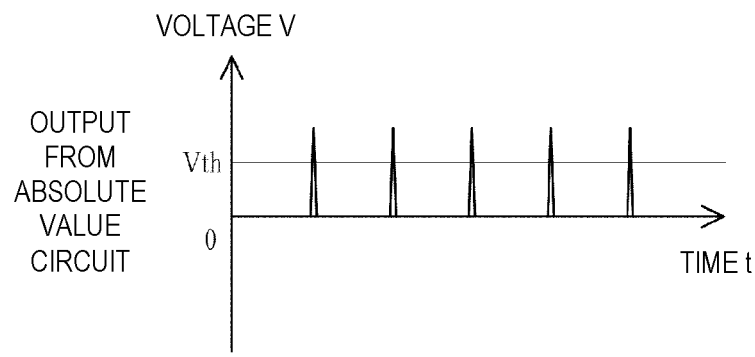
Figure 41C:
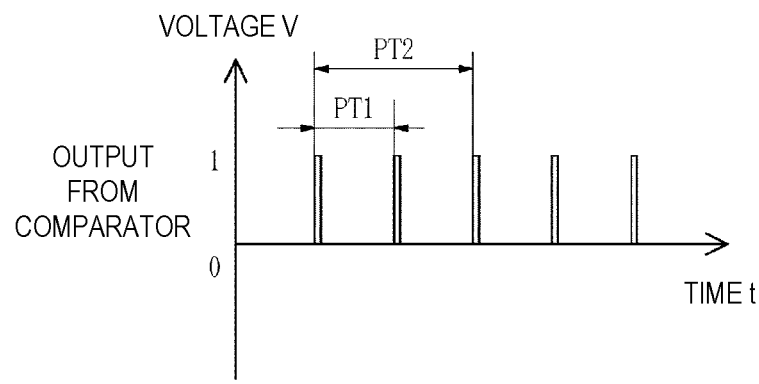

FIGS. 41A to 41C show processing of the absolute value circuit 73 and the comparator 74 when the magnetic flux density change sensor 71 outputs the detection signal in FIG. 39B. When the magnetic flux density change sensor 71 inputs the detection signal in FIG. 41A to the absolute value circuit 73, the absolute value circuit 73 positively converts all output values of the detection signals as shown in FIG. 41B.

The comparator 74 compares the output voltage V output from the absolute value circuit 73 with the threshold voltage Vth, outputs a high-level voltage corresponding to 1 when the output voltage is higher than the threshold voltage Vth, and outputs a low-level voltage corresponding to 0 when the output voltage is equal to or lower than the threshold voltage Vth. The high-level voltage signal is detected as a pulse signal, and the low-level voltage signal is regarded as no output.

As shown in FIG. 41C, PT1 is a pulse interval that is a time interval between two pulse signals continuously output when a plurality of pulse signals are continuously output. PT2 is a pulse interval that is a time interval between the first and third pulse signals among three continuously output pulse signals.

In FIGS. 41A to 41C, the magnetic coupling 32 rotates at a constant speed in a state without a phase difference, and thus in FIG. 41C, the time interval of the plurality of pulse signals continuously output is constant. Thus, a relationship between the pulse intervals PT1, PT2 is expressed by the following expression (39).

$$PT2-2 \cdot PT1=0 \qquad (39)$$

Specifically, twice the pulse interval PT1 is the pulse interval PT2.

Figure 42A:
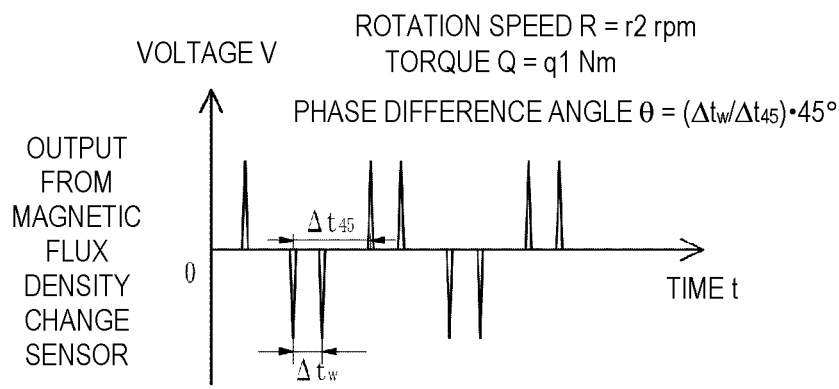
FIGS. 42A to 42C show processing of converting the output from the magnetic flux density change sensor in FIG. 40B.
Figure 42B:
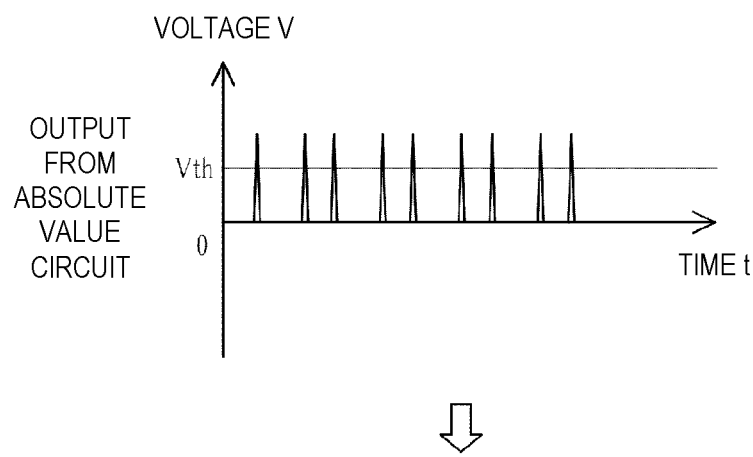
Figure 42C:
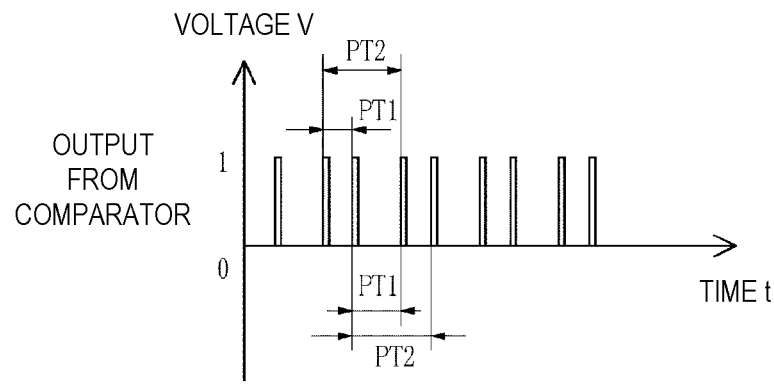

FIGS. 42A to 42C show processing of the absolute value circuit 73 and the comparator 74 when the magnetic flux density change sensor 71 outputs the detection signal in FIG. 40B. As shown in FIG. 42B, the absolute value circuit 73 positively converts all the detection signals in FIG. 42A from the magnetic flux density change sensor 71. As in FIGS. 41A to 41C, the comparator 74 compares the output voltage V output from the absolute value circuit 73 with the threshold voltage Vth, and outputs a pulse signal corresponding to 1 when the output voltage is higher than the threshold voltage Vth.

In FIGS. 42A to 42C, the magnetic coupling 32 rotates at a constant speed in a state with a phase difference, and thus in FIG. 42C, the time interval of the plurality of pulse signals continuously output is not constant. The pulse interval according to $\Delta t_{45}$ and the pulse interval according to $\Delta t_w$ in FIG. 40B are periodically repeated. Thus, the relationship between the pulse intervals PT1, PT2 is not uniquely determined as in the expression (39). Depending on which pulse signal the first pulse signal is, the relationship between the pulse intervals PT1, PT2 changes such that PT2 is shorter than twice PT1, that is, PT2−2·PT1<0 is satisfied, or PT2 is longer than twice PT1, that is, PT2−2·PT1>0 is satisfied.

4.2 Operation of Magnetic Bearing System

For the operation of the magnetic bearing system 40B of the second embodiment, only processing of the CP attractive force measuring unit 64B is different from that in the first embodiment. Control flows of first radial electromagnet control units C1X, C1Y and second radial electromagnet control units C2X, C2Y are similar to the control flows of the comparative example in FIGS. 7 to 10 and the control flows of the first embodiment. A control flow of the axial electromagnet control unit CZB is similar to the control flow of the first embodiment in FIGS. 30A and 30B. A control flow of the integrated control unit 61B is similar to the control flow of the first embodiment in FIGS. 34A, 34B. Thus, the descriptions thereof are omitted, and only the processing of the CP attractive force measuring unit 64B as a difference will be described.

4.2.1 Processing of CP Attractive Force Measuring Unit

Figure 43:
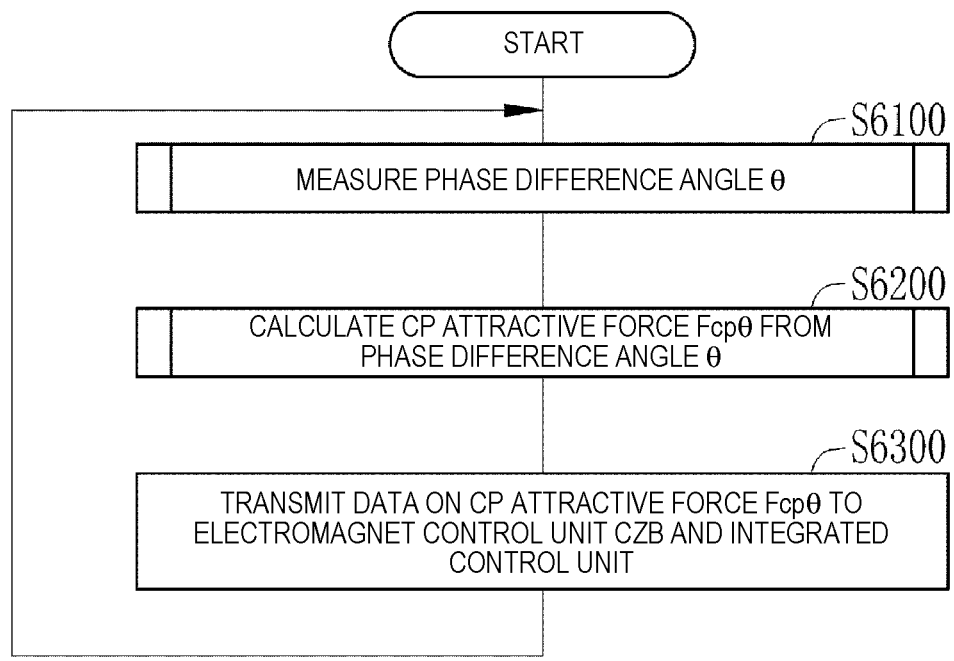
FIG. 43 is a flowchart of processing of a CP attractive force measuring unit.

As shown in FIG. 43, in S6100, the CP attractive force measuring unit 64B measures a phase difference angle θ. Then, in S6200, the CP attractive force measuring unit 64B calculates a CP attractive force Fcpθ from the phase difference angle θ. Finally, in S6300, the CP attractive force measuring unit 64B transmits data on the CP attractive force Fcpθ to the axial electromagnet control unit CZB and the integrated control unit 61B.

Figure 44:
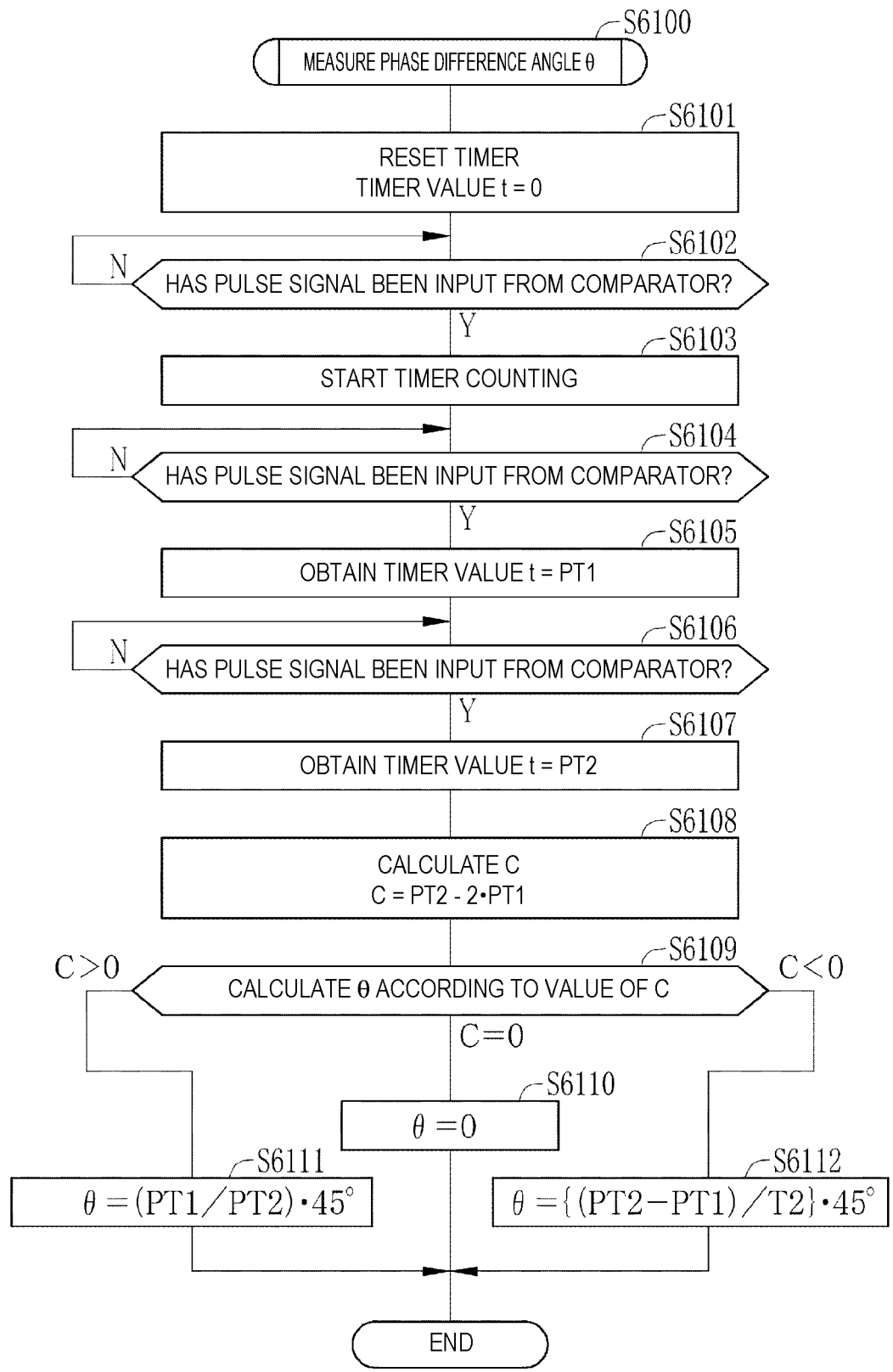
FIG. 44 is a flowchart of processing of measuring a phase difference angle $\theta$.

FIG. 44 shows details of processing of measuring the phase difference angle θ. As shown in FIG. 44, in S6101, the CP attractive force measuring unit 64B resets a timer and sets a timer value t to 0. Then, in S6102, the CP attractive force measuring unit 64B monitors input of the first pulse signal from the comparator 74, and starts timer counting when the first pulse signal is input (S6103).

After the timer counting is started, in S6104, the CP attractive force measuring unit 64B monitors input of the second pulse signal. When the second pulse signal is input (Y in S6104), a time value t at that time is obtained as a pulse interval PT1 (S6105). Further, the CP attractive force measuring unit 64B monitors input of the third pulse signal (S6106), and when the third pulse signal is input (Y in S6106), a timer value t at that time is obtained as a pulse interval PT2 (S6107).

Then, the CP attractive force measuring unit 64B calculates an evaluation value C based on the obtained pulse intervals PT1, PT2 by the following expression (40) (S6108).

$$C=PT2-2 \cdot PT1 \qquad (40)$$

In S6109, the CP attractive force measuring unit 64B calculates the phase difference angle θ according to the value of C. In S6109, when the value of C is 0, it can be evaluated that there is no phase difference as expressed by the expression (39). Thus, the CP attractive force measuring unit 64B goes to S6110, and determines that the phase difference angle θ is 0°.

In S6109, according to whether the value of C is larger or smaller than 0, the CP attractive force measuring unit 64B changes a determination method of the evaluation value C. This is because, as described above, according to which is the first pulse signal, the relationship between the pulse intervals PT1, PT2 changes such that PT2 is shorter than twice PT1, that is, C=PT2−2·PT1<0 is satisfied, or PT2 is longer than twice PT1, that is, C=PT2−2·PT1>0 is satisfied.

In S6109, the CP attractive force measuring unit 64B determines the above inequalities. When the evaluation value C is larger than 0, that is, C=PT2−2·PT1>0 is satisfied, the CP attractive force measuring unit 64B goes to S6111, and calculates the phase difference angle θ according to the following expression (41).

$$\theta=(PT1/PT2) \cdot 45° \qquad (41)$$

In S6109, when the evaluation value C is smaller than 0, that is, C=PT2−2·PT1<0 is satisfied, the CP attractive force measuring unit 64B goes to S6112, and calculates the phase difference angle θ according to the following expression (42).

$$\theta=\{(PT2-PT1)/PT2\} \cdot 45° \qquad (42)$$

Figure 45:
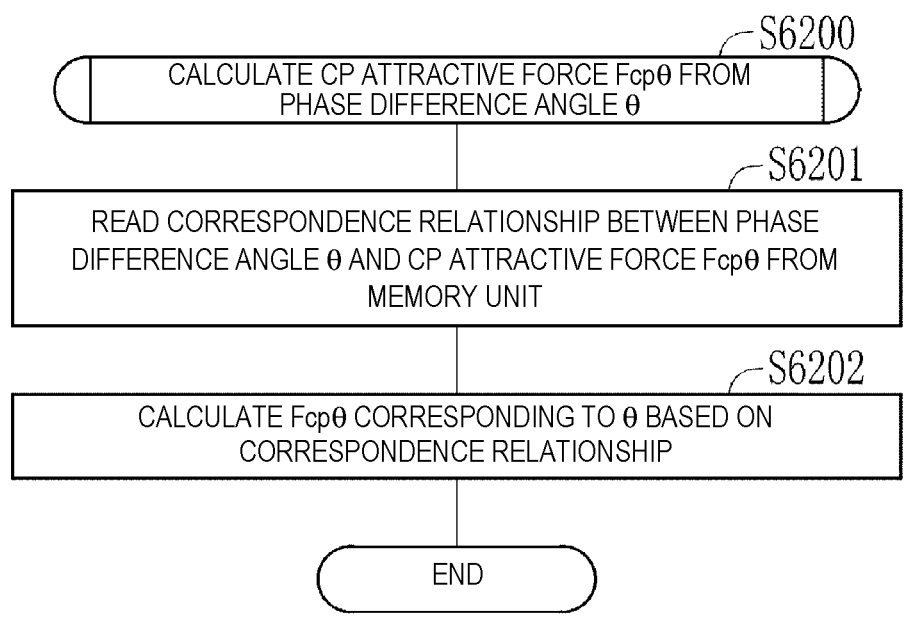
FIG. 45 is a flowchart of processing of calculating a CP attractive force $Fcp\theta$.

FIG. 45 is a flowchart of detailed processing of calculating the CP attractive force Fcpθ from the phase difference angle θ in S6200 in FIG. 43. As shown in FIG. 45, in S6201, the CP attractive force measuring unit 64B reads the correspondence relationship 76 from the memory unit 70. In S6202, the CP attractive force measuring unit 64B calculates the CP attractive force Fcpθ corresponding to the phase difference angle θ based on the correspondence relationship 76.

As shown in FIG. 46, the correspondence relationship 76 is, for example, table data 76A including a record of data on a plurality of phase difference angles θ associated with data on CP attractive forces Fcpθ corresponding to the angles θ. The table data 76A includes a record of data on CP attractive forces Fcpθ corresponding to, for example, phase difference angles θ of 0° to 22° at 1° intervals.

The CP attractive force measuring unit 64B may use the table data 76A including the record of the phase difference angles θ at 1° intervals and interpolation in combination to calculate, for example, data on a CP attractive force Fcpθ corresponding to an intermediate value between two phase difference angles θ recorded at 1° intervals, such as data on a CP attractive force Fcpθ corresponding to 2.5° that is an intermediate value between 2° and 3°. As the correspondence relationship 76, a function may be stored instead of the table data 76A.

Also, for example, to reflect an individual difference for each magnetic coupling 32, a correspondence relationship 76 may be prepared for each magnetic coupling 32, and a correspondence relationship 76 corresponding to a magnetic coupling 32 to be used may be stored in the memory unit 70. In this case, for each magnetic coupling 32 to be used, a CP attractive force Fcpθ is previously measured to prepare a correspondence relationship 76 for each magnetic coupling 32. This allows the CP attractive force Fcpθ to be more accurately measured. The correspondence relationship 76 may be prepared according to the type or specifications of the magnetic coupling 32.

4.3 Effect

Similarly to the first embodiment, the first to third effects are obtained by the magnetic bearing system 40B according to the second embodiment. In the second embodiment, the magnetic flux density change sensor 71 is used to detect the change point of the magnetic flux density B, and output binarized data through the comparator 74 to the CP attractive force measuring unit 64B. Thus, when the CP attractive force measuring unit 64B is constituted by a digital circuit, an integration circuit 68 and an A/D converter 69 are not used, which is advantageous for increasing speed of the processing.

4.4 Variant of Abnormality Determination Processing of CP Attractive Force

Figure 47:
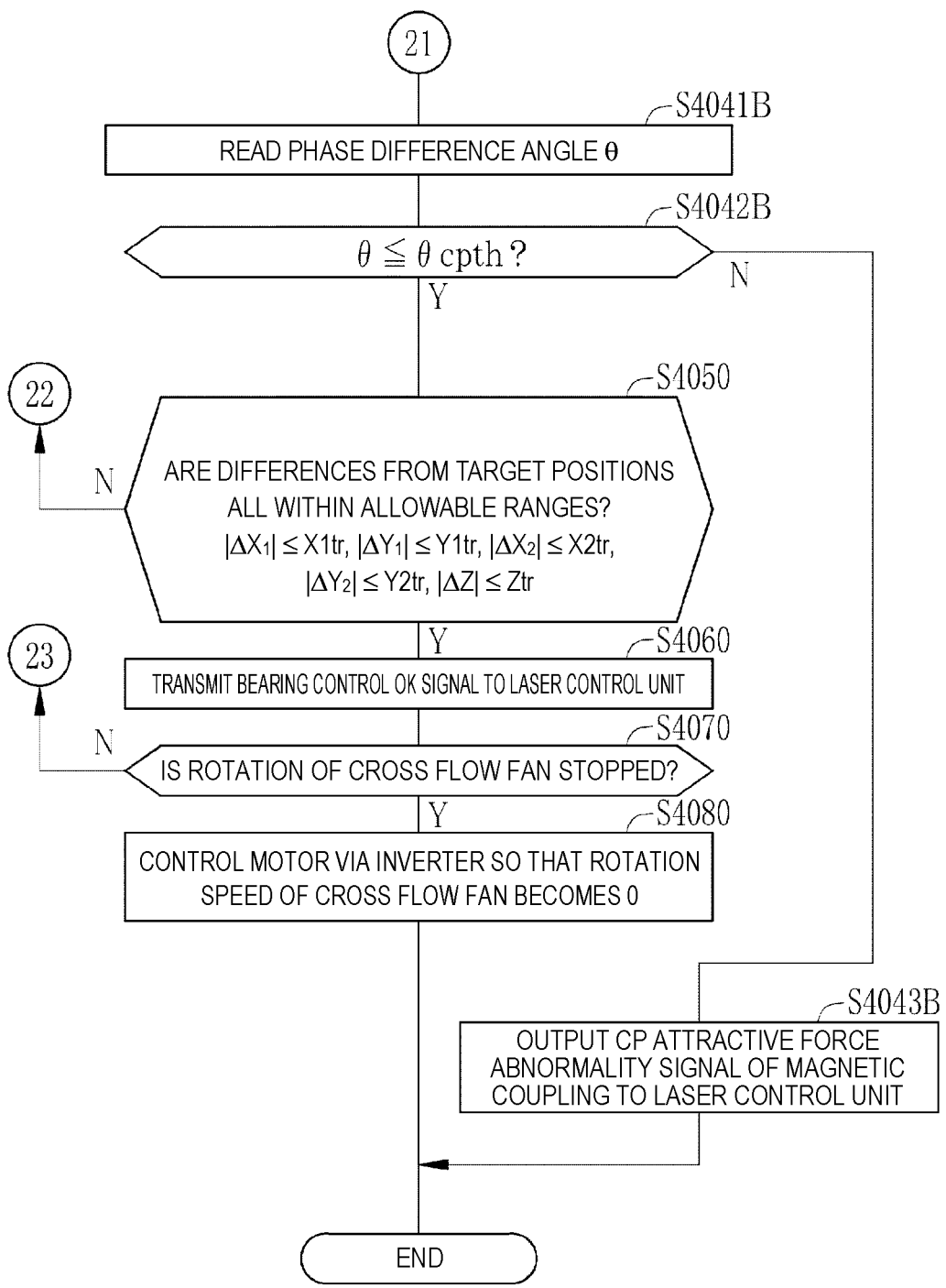
FIG. 47 is a flowchart of a variant of abnormality processing of the CP attractive force.

As shown in FIG. 47, abnormality determination of the CP attractive force Fcp may be performed based on the phase difference angle θ instead of the processing in FIG. 34B.

In this case, the integrated control unit 61B stores an upper limit value θcpth of the phase difference angle θ. Then, in S4041B in FIG. 47, the integrated control unit 61B reads the upper limit value θcpth. In S4042B, when the measured phase difference angle θ is equal to or smaller than the upper limit value θcpth (Y in S4042B), the integrated control unit 61B goes to S4050. When the measured phase difference angle θ is larger than the upper limit value θcpth, the integrated control unit 61B determines that the CP attractive force is abnormal (N in S4042B), and goes to S4043B to output a CP attractive force abnormality signal to the laser control unit 17.

In the example in FIG. 34B, the CP attractive force Fcpθ is directly monitored, while in the example in FIG. 47, the CP attractive force Fcpθ is indirectly monitored using the phase difference angle θ. The CP attractive force Fcpθ and the phase difference angle θ have the correspondence relationship as shown in FIG. 33, and thus the abnormality determination of the CP attractive force Fcp can be performed by such a method.

4.5 Variant of Phase Difference Sensor 4.5.1 Variant 1

Figure 48:
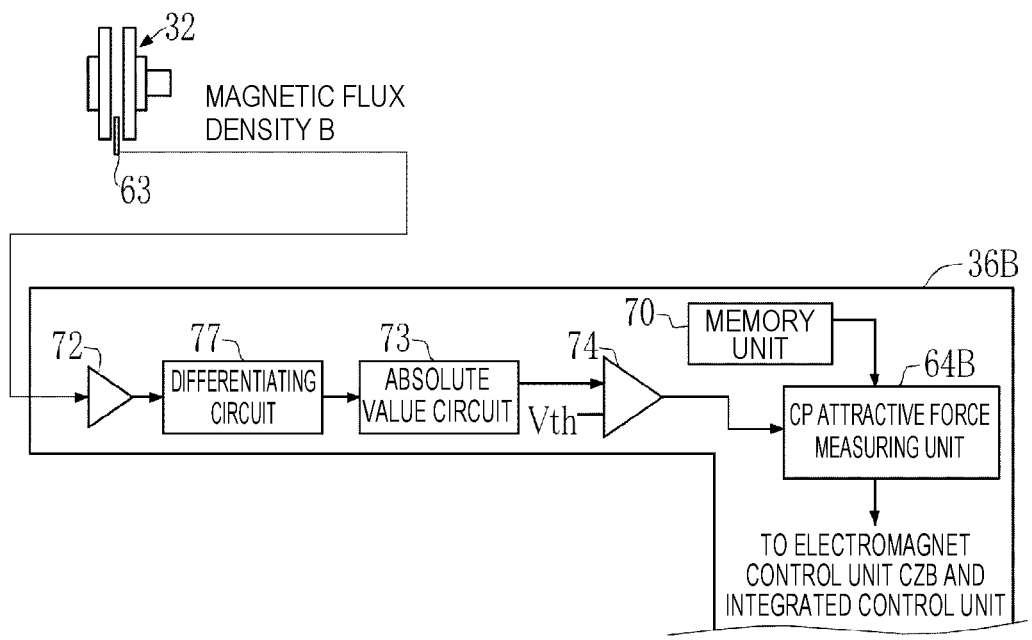
FIG. 48 illustrates a first variant of a phase difference sensor including a magnetic flux density sensor and a differentiating circuit in combination.

In the second embodiment, as shown in FIG. 48, a magnetic flux density sensor 63 may be used instead of the magnetic flux density change sensor 71. The magnetic flux density sensor 63 is similar to that described in the first embodiment. In this case, the magnetic flux density sensor 63 and a differentiating circuit 77 constitute a phase sensor.

Figure 49A:
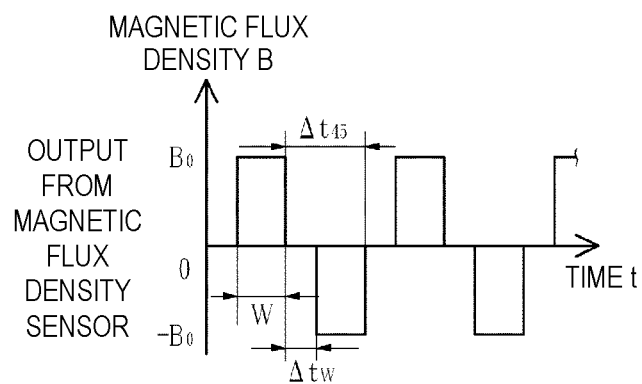
FIGS. 49A and 49B illustrate signal processing of the phase difference sensor in FIG. 48.
Figure 49B:
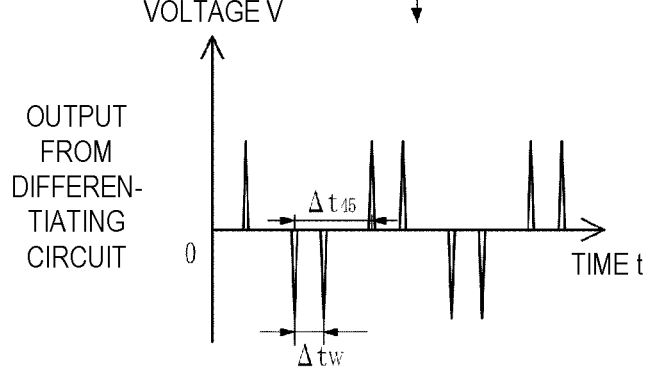

FIG. 49A shows output of a detection signal from the magnetic flux density sensor 63 as in FIGS. 28A, 28B and 40A. The differentiating circuit 77 receives the signal from the magnetic flux density sensor 63, and outputs pulse signals corresponding to rise and fall of signals that are change points of the magnetic flux density B in FIG. 49B. This is the same as the output from the magnetic flux density change sensor 71 in FIG. 40B. As such, the magnetic flux density sensor 63 and the differentiating circuit 77 may constitute the phase difference sensor.

4.5.2 Variant 2

Figure 50:
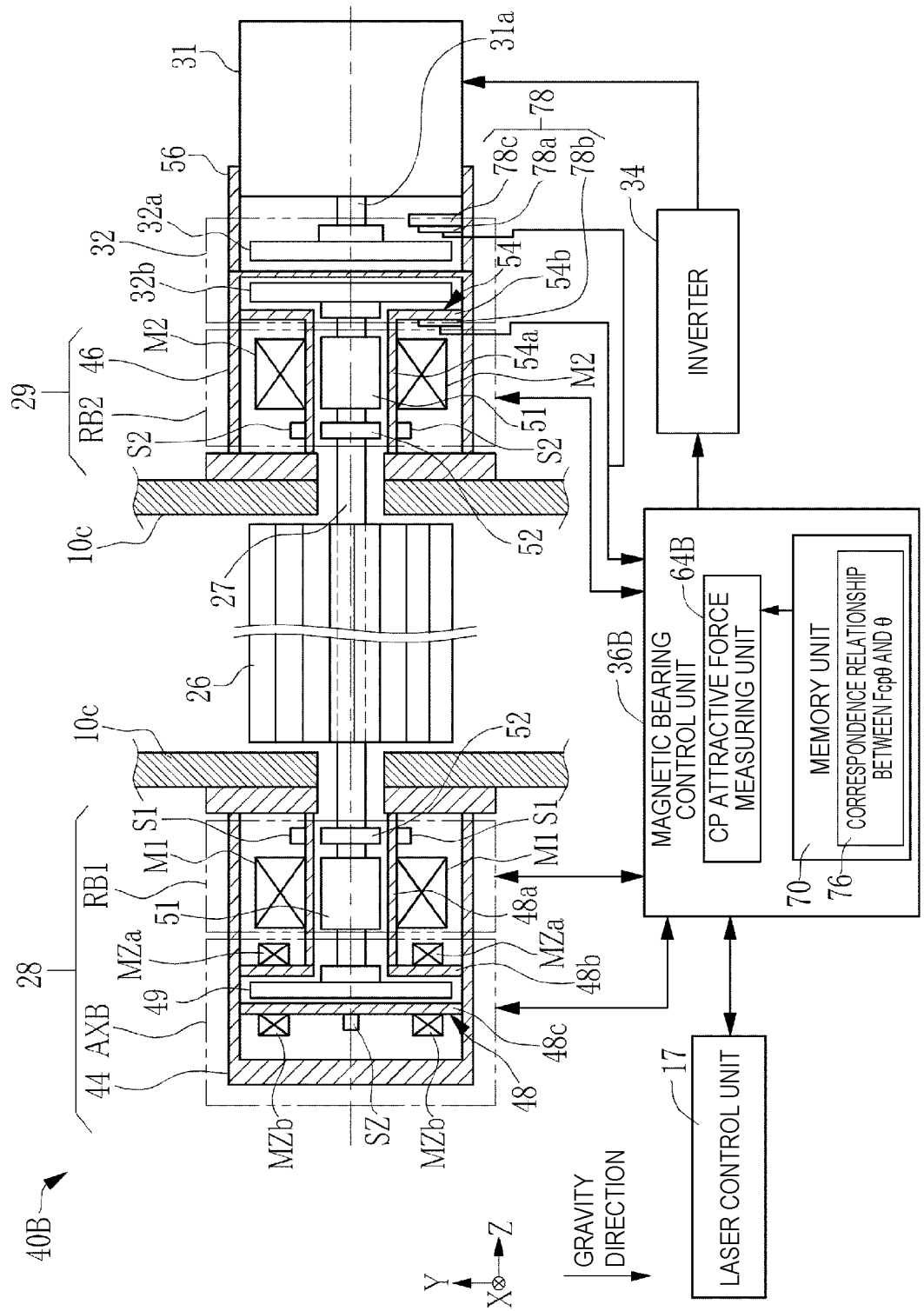
FIG. 50 illustrates a second variant of the phase difference sensor using a rotation sensor.

FIGS. 50 to 52 show Variant 2 of the phase difference sensor. The phase difference sensor of Variant 2 is constituted by a rotation sensor 78 that detects rotation of the drive side rotor 32a and the driven side rotor 32b of the magnetic coupling 32. As shown in FIG. 50, the rotation sensor 78 includes a drive side sensor 78a, a driven side sensor 78b, and a holder 78c. The drive side sensor 78a and the driven side sensor 78b are connected to the magnetic bearing control unit 36B, and output detection signals.

Figures 51A, 51B:
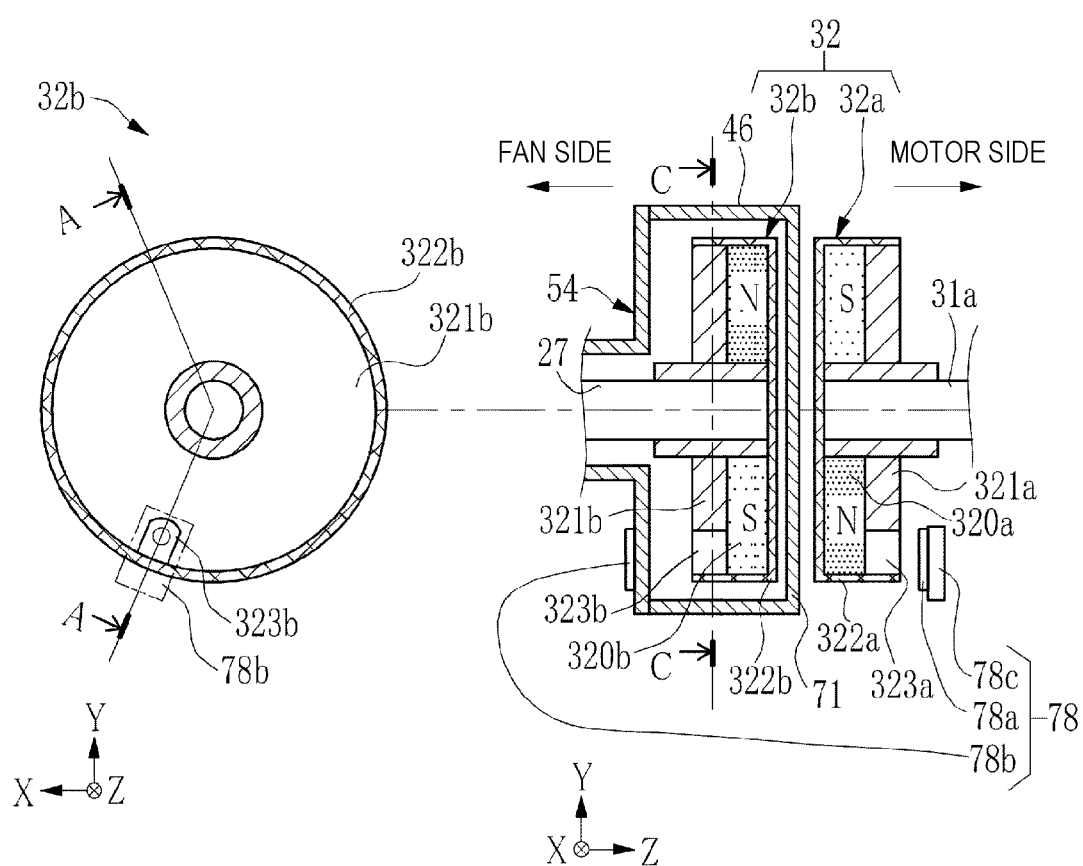
FIGS. 51A and 51B show arrangement of the phase difference sensor in FIG. 50.

As shown in FIG. 51B, the drive side sensor 78a is housed in a motor securing portion 56 together with the drive side rotor 32a, and arranged in the air. The drive side sensor 78a is secured to the holder 78c provided in the motor securing portion 56. The driven side sensor 78b is mounted to an outside of a can 54 that separates an internal space housing the driven side rotor 32b from an external space in the air, and arranged in the air.

As shown in FIGS. 51A, 51B, the drive side rotor 32a has a notch 323a partially formed in a support 321a, and the driven side rotor 32b also has a notch 323b partially formed in a support 321b. The notches 323a, 323b are provided for leaking magnetic flux from magnet portions 320a, 320b. The drive side sensor 78a is radially arranged in a position corresponding to the notch 323a via the holder 78c so as to be able to detect magnetic flux of the magnet portion 320a of the drive side rotor 32a. The driven side sensor 78b is arranged in a position corresponding to the notch 323b so as to be able to detect magnetic flux of the magnet portion 320b of the driven side rotor 32b. As the drive side sensor 78a and the driven side sensor 78b, Hall elements, magnetoresistive elements, magnetic flux density sensors, or the like are used.

The drive side sensor 78a detects the magnetic flux leaking from the notch 323a for each rotation of the drive side rotor 32a to output a rotation detection signal. The driven side sensor 78b detects the magnetic flux leaking from the notch 323b for each rotation of the driven side rotor 32b to output a rotation detection signal.

In an initial opposing state of the drive side rotor 32a and the driven side rotor 32b when the magnetic coupling 32 is not rotating, rotation positions of the drive side rotor 32a and the driven side rotor 32b are adjusted so that the notches 323a, 323b oppose each other. Thus, in a state without a phase difference, rotation detection timings of the drive side sensor 78a and the driven side sensor 78b match.

Figure 52A:
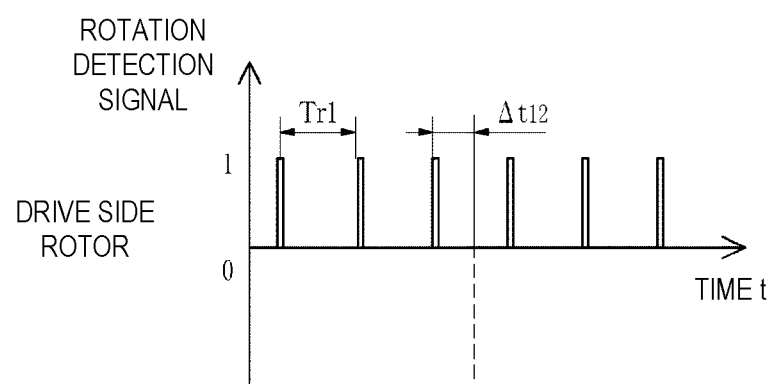
FIGS. 52A and 52B illustrate a phase difference detection method by the phase difference sensor in FIGS. 51A and 51B.
Figure 52B:
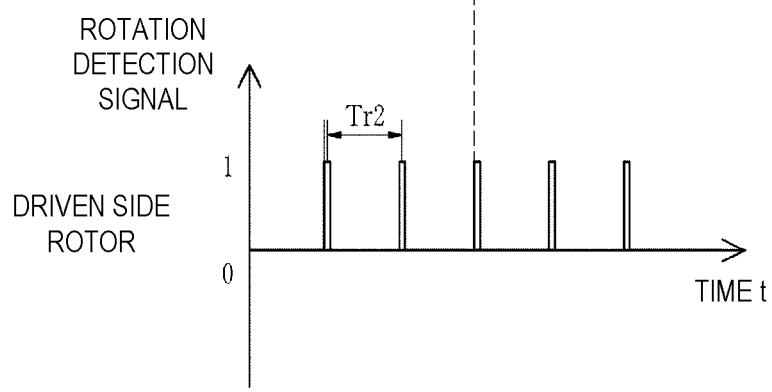
Figure 53:
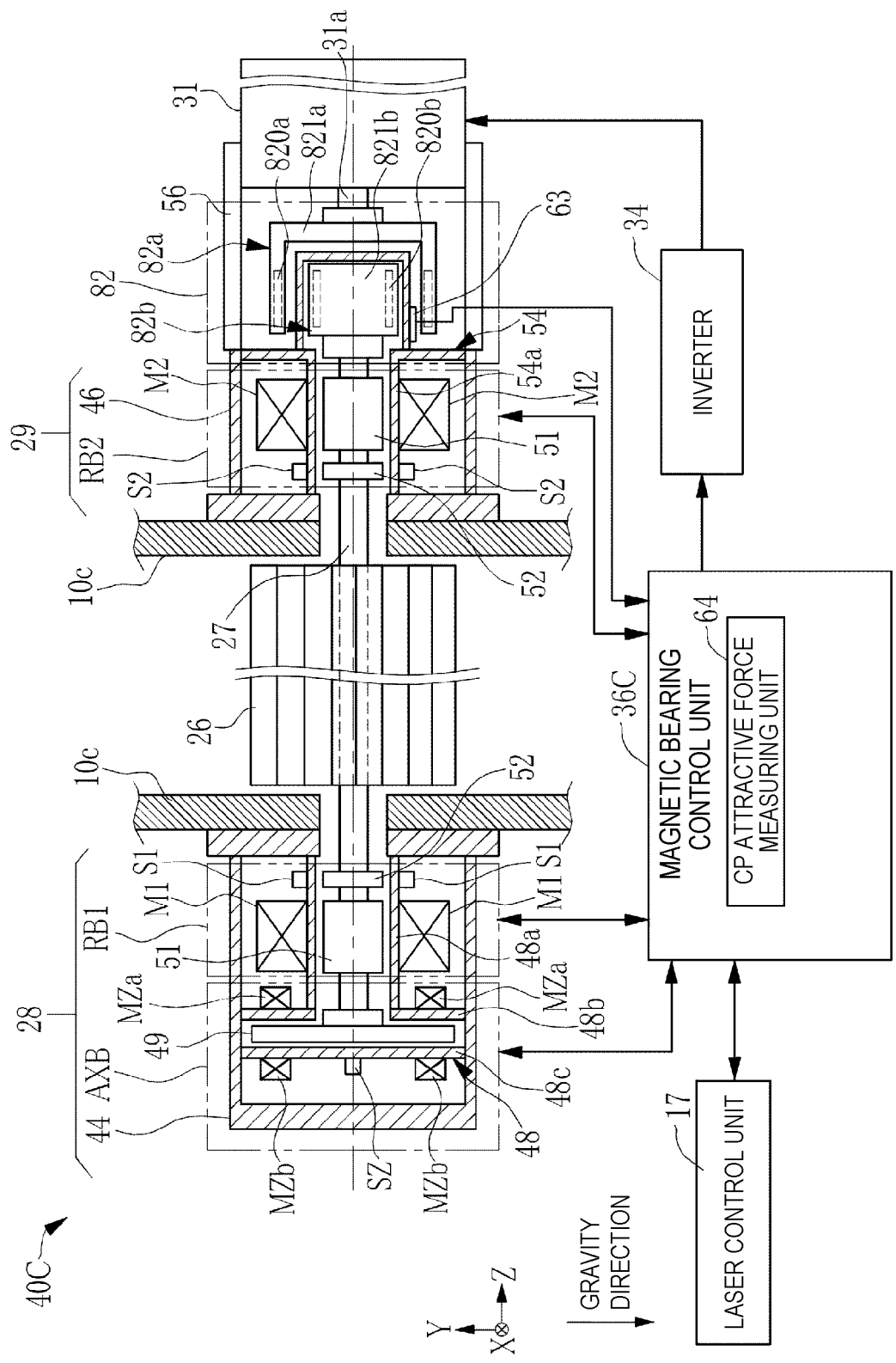
FIG. 53 illustrates a configuration of a magnetic bearing system according to a third embodiment.

As shown in FIGS. 52A and 52B, when a phase difference occurs, the rotation detection timing of the drive side sensor 78a is shifted from the rotation detection timing of the driven side sensor 78b. In FIG. 52A, Tr1 is a rotation period of the drive side rotor 32a detected by the drive side sensor 78a, and in FIG. 52B, Tr2 is a rotation period of the driven side rotor 32b detected by the driven side sensor 78b. The CP attractive force measuring unit 64B measures a difference $\Delta t_{12}$ between the rotation periods Tr1, Tr2. The CP attractive force measuring unit 64B can calculate the phase difference angle θ by the following expression (43).

$$\theta = \Delta t_{12}/Tr1 \cdot 360°\qquad(43)$$

As such, various phase difference sensors are considered and any of the sensors may be used.

5. Gas Laser Apparatus of Third Embodiment

With reference to FIGS. 53 to 60B, a gas laser apparatus of a third embodiment will be described. An overall configuration of the gas laser apparatus of the third embodiment and a laser oscillation operation are similar to those of the gas laser apparatus of the first embodiment. Differences will be mainly described below.

5.1 Configuration of Magnetic Bearing System of Fan

In the third embodiment, a magnetic bearing system 40C is provided instead of the magnetic bearing system 40A. The magnetic bearing system 40C is different from the magnetic bearing system 40A in that, first, a magnetic coupling 82 is provided instead of the magnetic coupling 32. The magnetic coupling 82 does not axially generate a CP attractive force Fcp like the magnetic coupling 32, but radially generates a CP attractive force Fcp.

The second difference is that in the magnetic bearing system 40C according to the third embodiment, the magnetic coupling 82 is provided, and thus an EM attractive force in a second radial bearing portion RB2 arranged adjacent to the magnetic coupling 82 is corrected according to a variation in the radial CP attractive force Fcp. In the third embodiment, a rotary shaft 27 is sufficiently long, and the CP attractive force Fcp of the magnetic coupling 82 is assumed to have an influence only on the second radial bearing portion RB2 and not on the first radial bearing portion RB1.

5.1.1 Magnetic Coupling

Figures 54A, 54B:
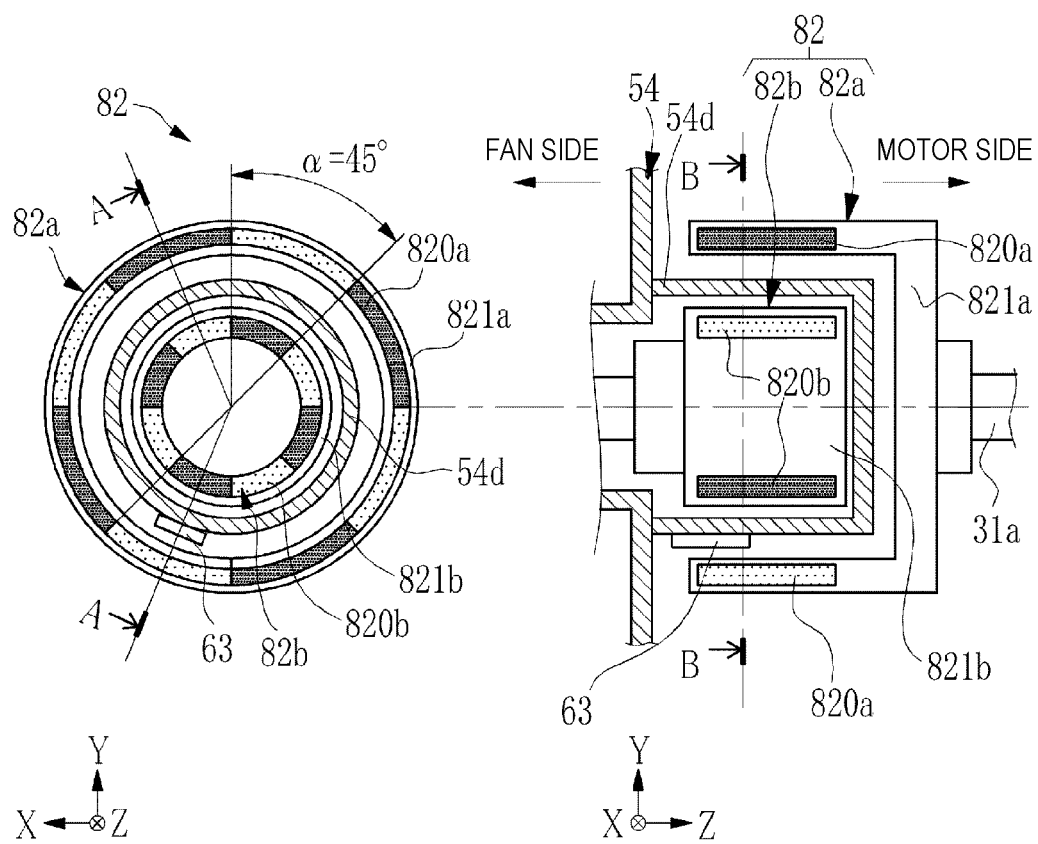
FIGS. 54A and 54B illustrate a magnetic coupling of the third embodiment.

As shown in FIGS. 54A and 54B, the magnetic coupling 82 includes a drive side rotor 82a and a driven side rotor 82b. The drive side rotor 82a is mounted and secured to a drive shaft 31a of a motor 31, and the driven side rotor 82b is mounted and secured to the rotary shaft 27 of a fan 26. The drive side rotor 82a is cylindrical with a rotation axis in a Z-axis direction, and the driven side rotor 82b is also cylindrical with a rotation axis in the Z-axis direction.

As shown in FIG. 54B, an inner diameter of the drive side rotor 82a is larger than an outer diameter of the driven side rotor 82b, and the drive side rotor 82a is arranged to cover an outer periphery of the driven side rotor 82b. The drive side rotor 82a and the driven side rotor 82b are arranged so that an inner peripheral surface of the drive side rotor 82a and an outer peripheral surface of the driven side rotor 82b oppose each other. A cylindrical portion 54d that constitutes a can 54 is arranged between the inner peripheral surface of the drive side rotor 82a and the outer peripheral surface of the driven side rotor 82b. The cylindrical portion 54d is a partition wall that separates an internal space housing the driven side rotor 82b and filled with a laser gas from an external space in which the drive side rotor 82a is arranged.

As shown in FIG. 54A, magnet portions 820a, 820b of the drive side rotor 82a and the driven side rotor 82b are of eight-pole type including eight magnetic poles circumferentially arranged around a Z axis as a rotation axis with a central angle α of 45°. In FIGS. 54A and 54B, for example, magnetic poles darkly hatched are north poles, and magnetic poles lightly hatched are south poles. The drive side rotor 82a and the driven side rotor 82b generate a radial CP attractive force Fcp, and contactlessly transmit torque from the drive side rotor 82a to the driven side rotor 82b. The magnetic flux density sensor 63 is arranged between the magnet portions 820a, 820b and secured to the outer peripheral surface of the cylindrical portion 54d.

5.1.2 Configuration of Magnetic Bearing Control Unit

Figure 55:
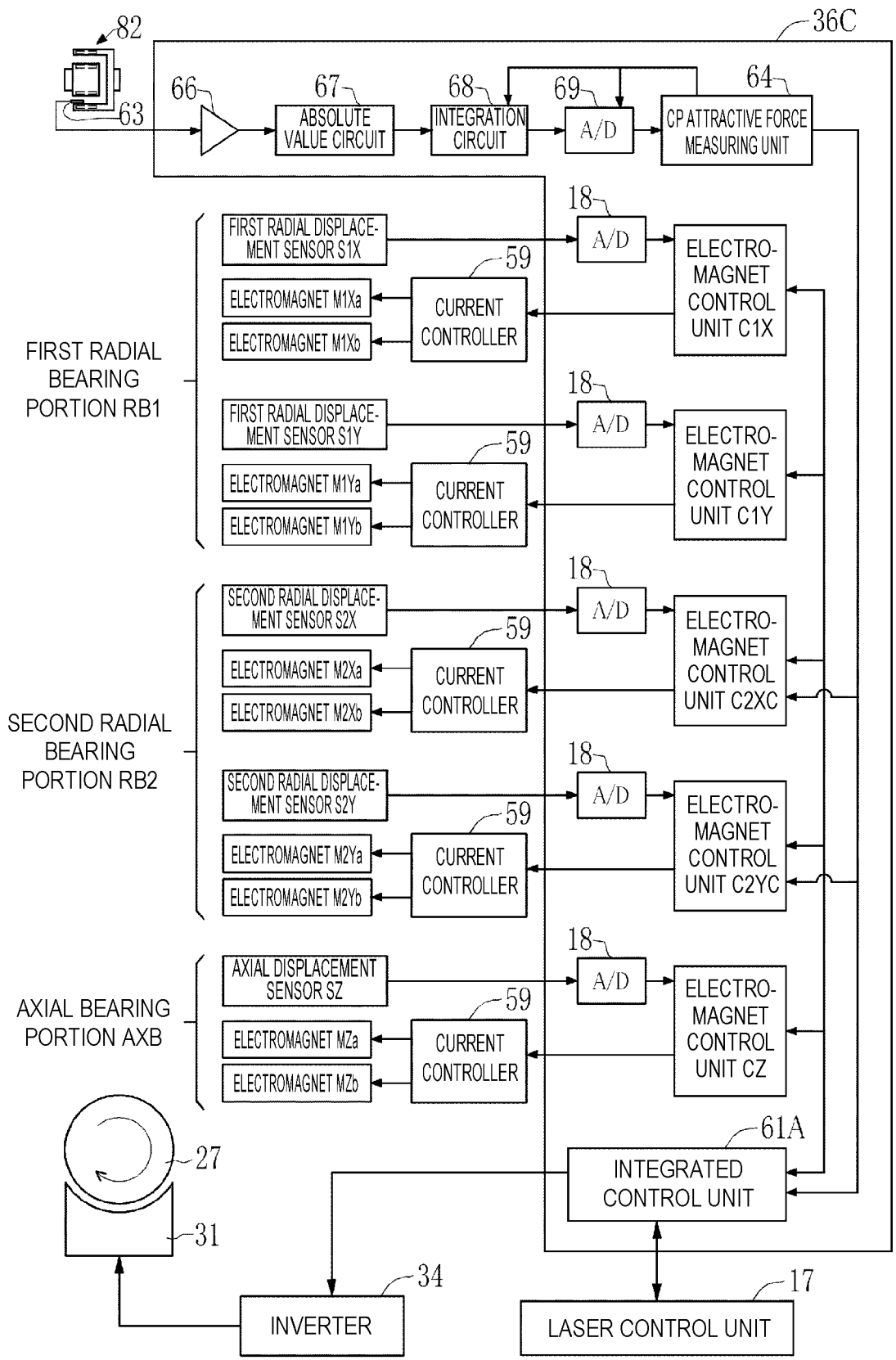
FIG. 55 is a schematic block diagram of an electric configuration of a magnetic bearing control unit according to the third embodiment.

As shown in FIG. 55, a magnetic bearing control unit 36C according to the third embodiment has basically the same configuration as the magnetic bearing control unit 36A according to the first embodiment in FIG. 26. A difference is second radial electromagnet control units C2XC, C2YC provided instead of the second radial electromagnet control units C2X, C2Y. A CP attractive force measuring unit 64 transmits a measured CP attractive force Fcpθ to the second radial electromagnet control units C2XC, C2YC and an integrated control unit 61A.

In the third embodiment, the axial electromagnet control unit CZA according to the first embodiment is not provided, but an axial electromagnet control unit CZ similar to that of the comparative example is provided. This is because in the third embodiment, the CP attractive force Fcp of the magnetic coupling 82 is not axially applied, and the axial electromagnet control unit CZ does not correct an EM attractive force according to a variation in the CP attractive force Fcp.

5.1.3 Radial CP Attractive Force of Magnetic Coupling

Figure 56:
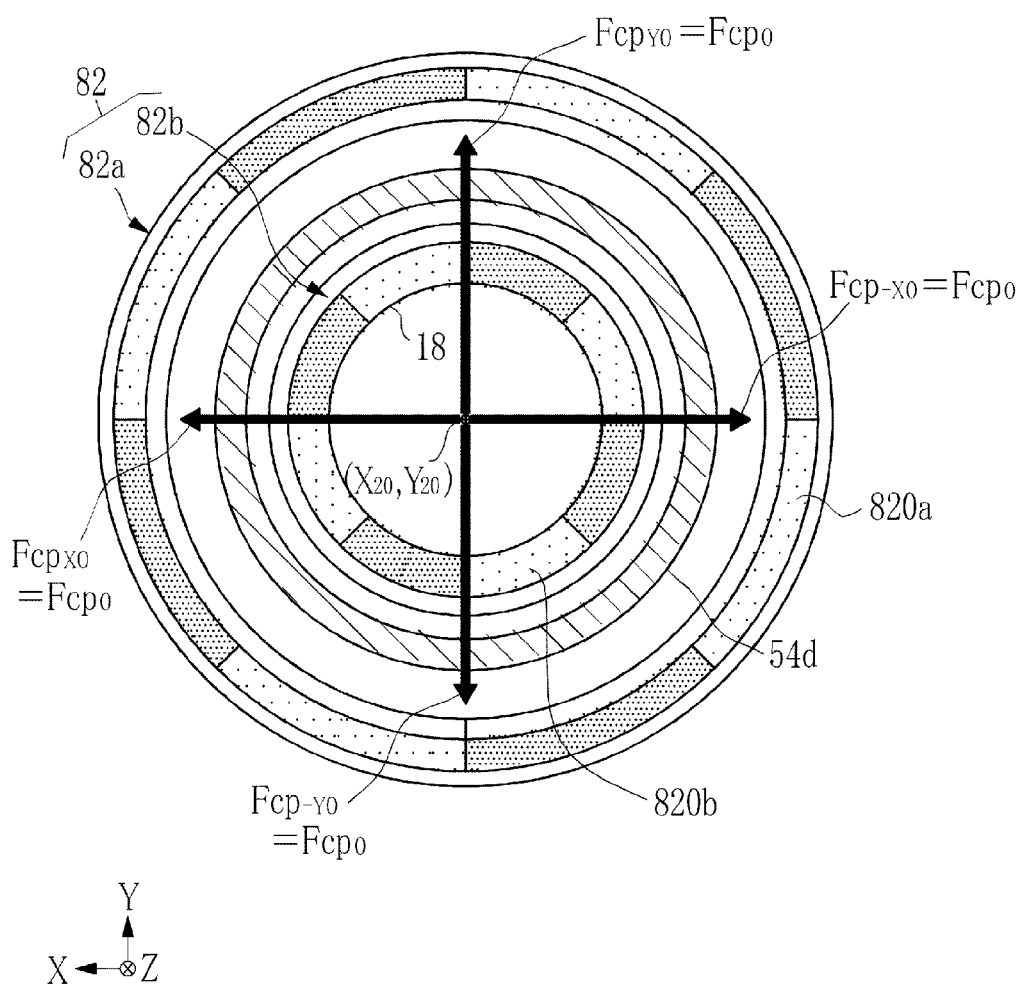
FIG. 56 illustrates a CP attractive force of the magnetic coupling in FIG. 55.

FIG. 56 shows initial values of CP attractive forces Fcp applied in an X-axis direction and a Y-axis direction in the magnetic coupling 82 when a phase difference angle θ is 0°. $Fcp_{X0}$, $Fcp_{-X0}$ are initial values of CP attractive forces Fcp positively and negatively applied in the X-axis direction. $Fcp_{Y0}$, $Fcp_{-Y0}$ are initial values of CP attractive forces Fcp positively and negatively applied in the Y-axis direction.

Magnetic poles of the magnet portions 820a, 820b are circumferentially arranged at regular intervals with the same central angle α, and thus the same radial CP attractive force Fcp is applied to the magnetic poles. Thus, the initial values of the CP attractive forces Fcp positively and negatively applied in the X-axis direction and the Y-axis direction are all the same. This initial value is Fcp0. Specifically, a relationship in the following expression (44) is satisfied.

$$Fcp_{X0} = Fcp_{-X0} = Fcp_{Y0} = Fcp_{-Y0} = Fcp0\qquad(44)$$

5.1.4 Balance of Forces in Radial Bearing Portion

Figure 57:
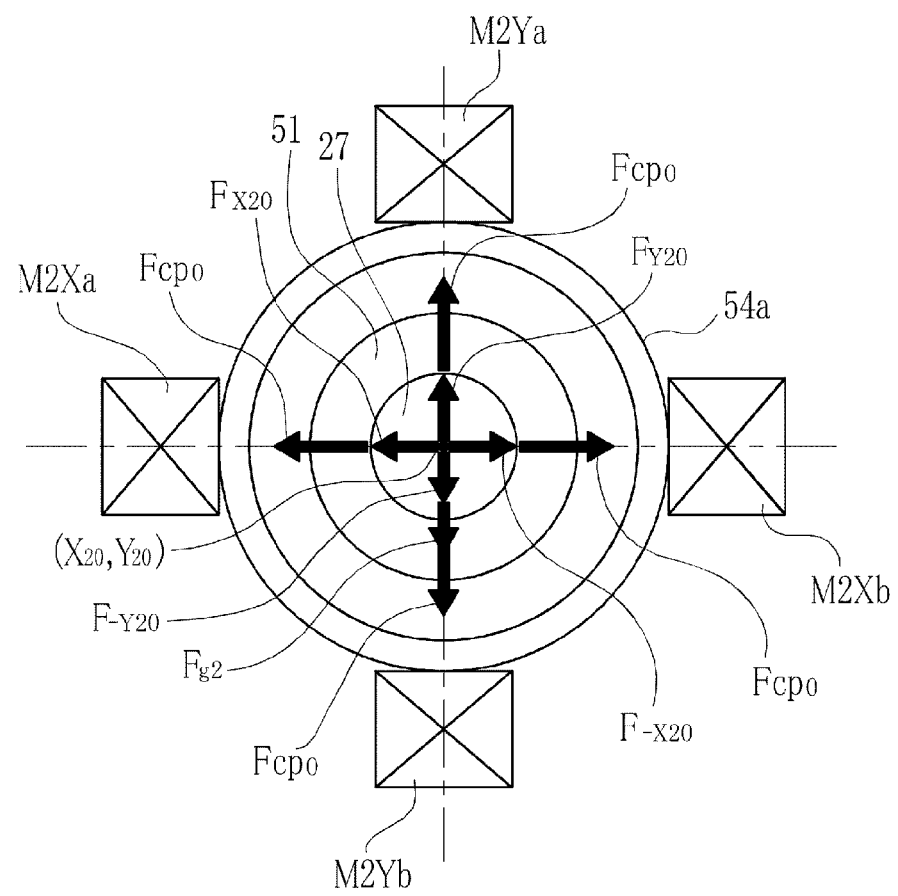
FIG. 57 illustrates a relationship of balance of forces applied to a rotary shaft in an initial state.

FIG. 57 shows a relationship of balance of forces in the second radial bearing portion RB2 when the phase difference angle θ of the magnetic coupling 82 is 0°. The relationship of balance of forces by a second radial electromagnet M2 when the rotary shaft 27 is adjusted to a target position $X_{20}$, $Y_{20}$ is expressed by the following expressions (45) to (50).

$$Ft_X = Ft_{-X}\qquad(45)$$

$$Ft_X = F_{X20} + Fcp0\qquad(46)$$

$$Ft_{-X} = F_{-X20} + Fcp0\qquad(47)$$

$$Ft_Y = Ft_{-Y}\qquad(48)$$

$$Ft_Y = F_{Y20} + Fcp0\qquad(49)$$

$$Ft_{-Y} = F_{-Y20} + Fcp0 + F_{g2}\qquad(50)$$

$F_{X20}$ is an EM attractive force of a second radial electromagnet M2Xa positively generated in the X-axis direction, and $F_{-X20}$ is an EM attractive force of a second radial electromagnet M2Xb negatively generated in the X-axis direction. $Ft_X$ and $Ft_{-X}$ are total forces positively and negatively applied in the X-axis direction, and sums of the EM attractive forces and the CP attractive forces.

$F_{Y20}$ is an attractive force of a second radial electromagnet M2Ya positively generated in the Y-axis direction, and $F_{-Y20}$ is an attractive force of a second radial electromagnet M2Yb negatively generated in the Y-axis direction. $F_{g2}$ is a gravity applied to the rotary shaft 27 in a gravity direction that is the negative direction in the Y-axis direction. $F_{-Y20}$ is smaller than $F_{Y20}$ by the gravity $F_{g2}$. $Ft_Y$ and $Ft_{-Y}$ are total forces positively and negatively applied in the Y-axis direction. The positive total force is a sum of the EM attractive force and the CP attractive force, and the negative total force is a sum of the EM attractive force and the CP attractive force and the gravity.

In the second radial bearing portion RB2, when a phase difference occurs in the magnetic coupling 82 and the phase difference angle θ is not equal to 0°, the CP attractive force Fcp decreases from the initial value Fcp0 by ΔFcpθ to reach Fcpθ. In this case, the relationship of balance of forces by the second radial electromagnet M2 is expressed by the following expressions (51) to (56).

$$Ft_X = Ft_{-X} \quad (51)$$

$$Ft_X = F_{X20} + Fcp\theta = F_{X20} + Fcp0 - \Delta Fcp\theta \quad (52)$$

$$Ft_{-X} = F_{-X20} + Fcp\theta = F_{-X20} + Fcp0 - \Delta Fcp\theta \quad (53)$$

$$Ft_Y = Ft_{-Y} \quad (54)$$

$$Ft_Y = F_{Y20} + Fcp\theta = F_{Y20} + Fcp0 - \Delta Fcp\theta \quad (55)$$

$$Ft_{-Y} = F_{-Y20} + Fcp\theta + F_{g2} = F_{-Y20} + Fcp0 - \Delta Fcp\theta + F_{g2} \quad (56)$$

In the magnetic bearing control unit 36C, the second radial electromagnet control unit C2XC corresponds to a correction unit that corrects EM attractive forces $F_{X2}$, $F_{-X2}$ of the second radial electromagnets M2Xa, M2Xb according to a variation in the measured CP attractive force Fcp. The second radial electromagnet control unit C2YC corresponds to a correction unit that corrects EM attractive force $F_{Y2}$, $F_{-Y2}$ of the second radial electromagnets M2Ya, M2Yb according to a variation in the measured CP attractive force Fcp.

More specifically, when the CP attractive force Fcp decreases, the second radial electromagnet control unit C2XC corrects the EM attractive forces $F_{X2}$, $F_{-X2}$ of the second radial electromagnets M2Xa, M2Xb based on a decrease ΔFcpθ so that the two forces positively and negatively applied to the rotary shaft 27 in the X-axis direction are balanced. Similarly, when the CP attractive force Fcp decreases, the second radial electromagnet control unit C2YC corrects the EM attractive forces $F_{Y2}$, $F_{-Y2}$ of the second radial electromagnets M2Ya, M2Yb based on the decrease ΔFcpθ so that the two forces positively and negatively applied to the rotary shaft 27 in the Y-axis direction are balanced.

Figure 58:
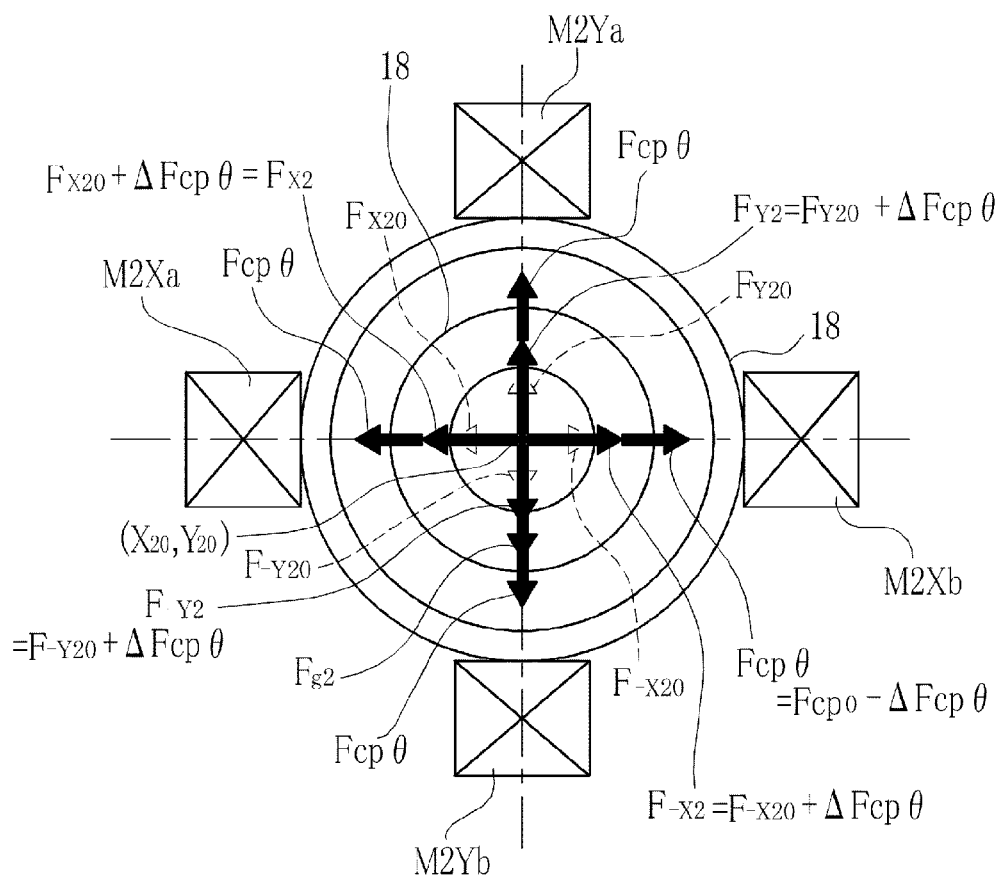
FIG. 58 illustrates a relationship of balance of forces applied to the rotary shaft when correction is performed based on a decrease $\Delta Fcp\theta$ in the CP attractive force.

FIG. 58 shows a relationship of balance of forces in the second radial bearing portion RB2 when the EM attractive forces $F_{X2}$, $F_{-X2}$, $F_{Y2}$, $F_{-Y2}$ are corrected based on the decrease ΔFcpθ. The relationship of balance of forces is expressed by the following expressions (57) to (62).

$$Ft_X = Ft_{-X} \quad (57)$$

$$Ft_X = F_{X2} + Fcp\theta = F_{X20} + \Delta Fcp\theta + Fcp0 - \Delta Fcp\theta = F_{X20} + Fcp0 \quad (58)$$

$$Ft_{-X} = F_{-X2} + Fcp\theta = F_{-X20} + \Delta Fcp\theta + Fcp0 - \Delta Fcp\theta = F_{-X20} + Fcp0 \quad (59)$$

$$Ft_Y = Ft_{-Y} \quad (60)$$

$$Ft_Y = F_{Y2} + Fcp\theta = F_{Y20} + \Delta Fcp\theta + Fcp0 - \Delta Fcp\theta = F_{Y20} + Fcp0 \quad (61)$$

$$Ft_{-Y} = F_{-Y2} + Fcp\theta = F_{-Y20} + \Delta Fcp\theta + Fcp0 - \Delta Fcp\theta = F_{-Y20} + Fcp0 \quad (62)$$

Figure 59A:
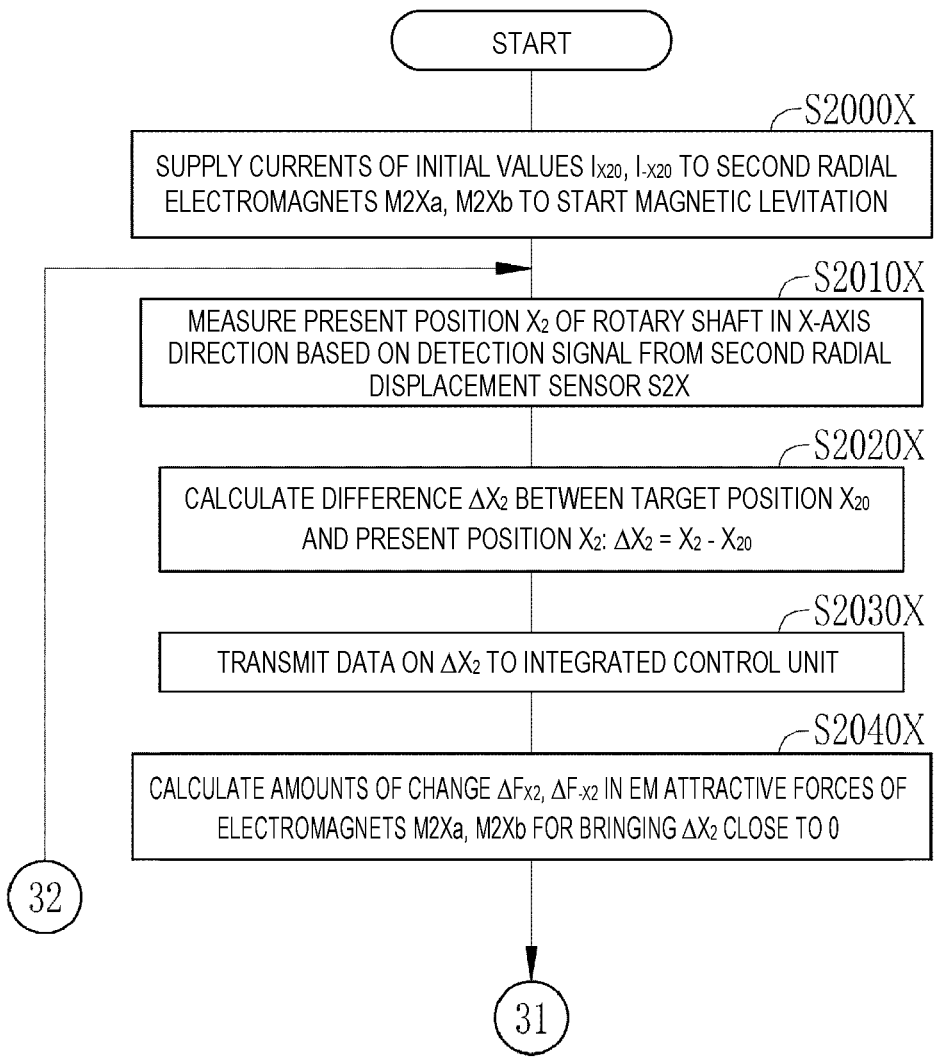
FIG. 59A shows a former half of a flowchart of a control flow of a second radial electromagnet control unit C2XC in the third embodiment.
Figure 59B:
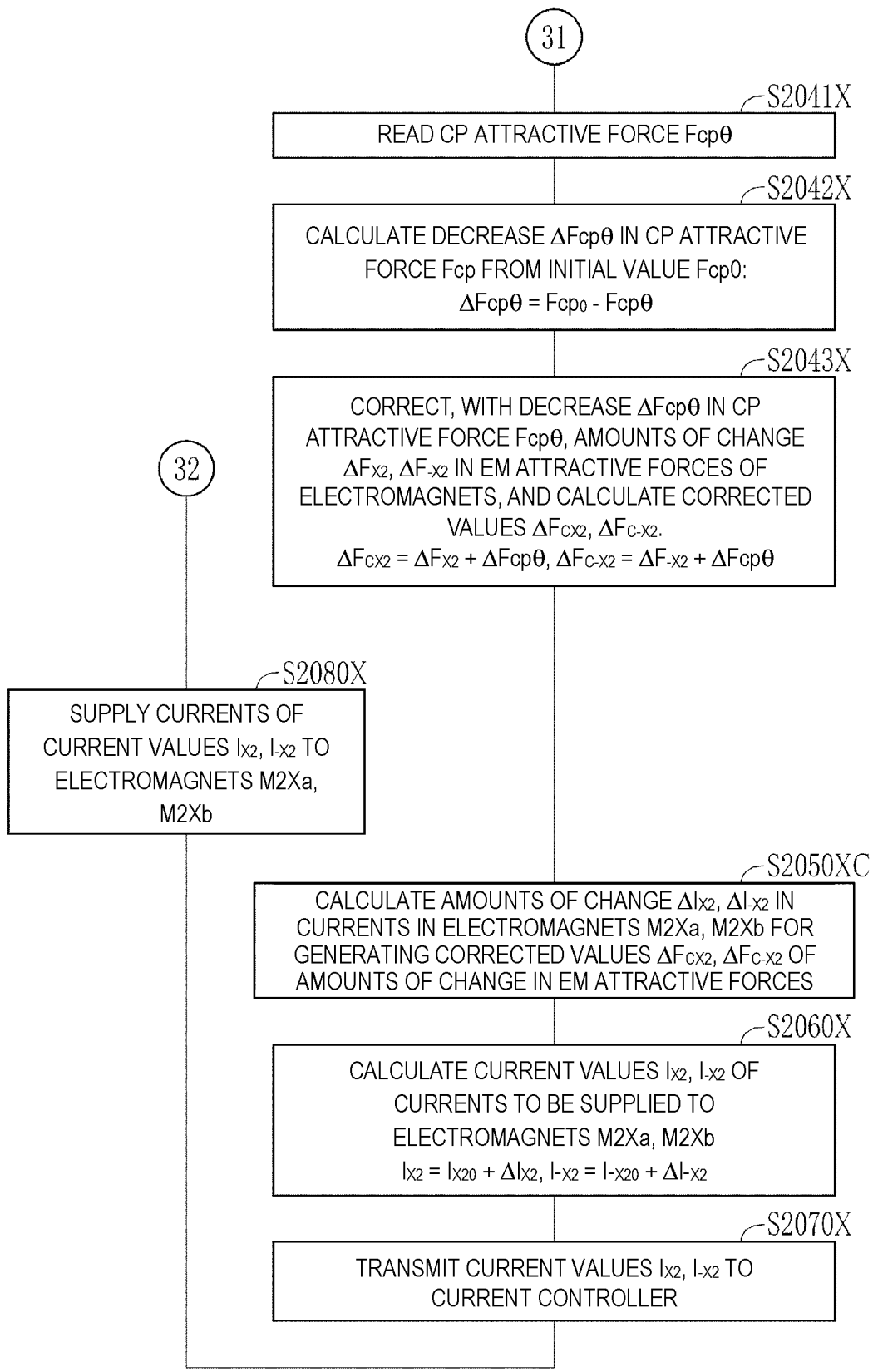
FIG. 59B shows a latter half of the flowchart of the control flow of the second radial electromagnet control unit C2XC in the third embodiment.

5.2 Operation of Magnetic Bearing System 5.2.5 Control Flow of Second Radial Electromagnet Control Unit 5.2.5.1 Control Flow of Second Radial Electromagnet Control Unit C2XC FIGS. 59A and 59B are a flowchart of a control flow of the second radial electromagnet control unit C2XC. Steps S2000X to S2040X in a former half in FIG. 59A are the same as those in the flowchart according to the comparative example in FIG. 9. Differences are, as shown in FIG. 59B, addition of steps S2041X to S2043X, and a change of step S2050X to S2050XC. Processes in steps S2041X to S2043X are similar to those in S3041Z to S3043Z of the first embodiment in FIG. 30B except that a direction of an attractive force applied is different.

In steps up to S2040X in the former half in FIG. 59A, when the rotary shaft 27 is displaced from a target position $X_{20}$ and a difference $\Delta X_2$ occurs between the target position $X_{20}$ and the present position $X_2$, the second radial electromagnet control unit C2XC calculates amounts of change $\Delta F_{X2}$, $\Delta F_{-X2}$ in the EM attractive forces $F_{X2}$, $F_{-X2}$ of the second radial electromagnets M2Xa, M2Xb so as to bring $\Delta X_2$ close to 0.

In S2041X in FIG. 59B, the second radial electromagnet control unit C2XC reads a CP attractive force Fcpθ, and in S2042X, calculates a decrease ΔFcpθ in the CP attractive force Fcp. Then in S2043X, the second radial electromagnet control unit C2XC corrects, with the decrease ΔFcpθ, the amounts of change $\Delta F_{X2}$, $\Delta F_{-X2}$ in the EM attractive forces, and calculates corrected values $\Delta F_{CX2}$, $\Delta F_{C-X2}$. Specifically, the second radial electromagnet control unit C2XC calculates according to the following expressions (63), (64).

$$\Delta F_{CX2} = \Delta F_{X2} + \Delta Fcp\theta \quad (63)$$

$$\Delta F_{C-X2} = \Delta F_{-X2} + \Delta Fcp\theta \quad (64)$$

As shown in FIG. 58, in the radial direction, the CP attractive force Fcp positively and negatively decreases in the X-axis direction. Thus, the decrease ΔFcpθ is added to both the positive and negative amounts of change $\Delta F_{X2}$, $\Delta F_{-X2}$.

In S2050XC, the second radial electromagnet control unit C2XC calculates amounts of change $\Delta I_{X2}$, $\Delta I_{-X2}$ in currents in the second radial electromagnets M2Xa, M2Xb for generating the corrected values $\Delta F_{CX2}$, $\Delta F_{C-X2}$. In S2060X, the second radial electromagnet control unit C2XC adds/subtracts the amounts of change $\Delta I_{X2}$, $\Delta I_{-X2}$ to/from initial bias currents $I_{20}$, $I_{-20}$ in the opposing electromagnets M2Xa, M2Xb to bring the rotary shaft 27 close to the target position $X_{20}$ from the present levitated position, and calculates current values $I_{X2}$, $I_{-X2}$. In S2070X and S2080X, currents of the calculated current values $I_{X2}$, $I_{-X2}$ are supplied to the second radial electromagnets M2Xa, M2Xb. This allows the levitated position of the rotary shaft 27 to be brought close to the target position $X_{20}$. The above processes are repeated according to the displacement of the rotary shaft 27.

In the control flow, even if the present position $X_2$ and the target position $X_{20}$ of the levitated position of the rotary shaft 27 match and $\Delta X_2$ is 0, steps S2030X to S2080X are performed. Specifically, even when $\Delta X_2$ is 0, if the CP attractive force Fcpθ varies, the EM attractive forces $F_{X2}$, $F_{-X2}$ of the second radial electromagnets M2Xa, M2Xb are corrected based on the decrease ΔFcpθ. In this case, in S2043X, the amounts of change $\Delta F_{X2}$, $\Delta F_{-X2}$ are 0, and thus only the decrease ΔFcpθ is the corrected values $\Delta F_{CX2}$, $\Delta F_{C-X2}$. Then, steps S2050XC to S2080X are performed, and as a result, the amounts of change $\Delta F_{CX2}$, $\Delta F_{C-X2}$ in forces corresponding to the decrease ΔFcpθ are added to the EM attractive forces $F_{X2}$, $F_{-X2}$.

5.2.5.2 Control Flow of Second Radial Electromagnet Control Unit C2YC

Figure 60A:
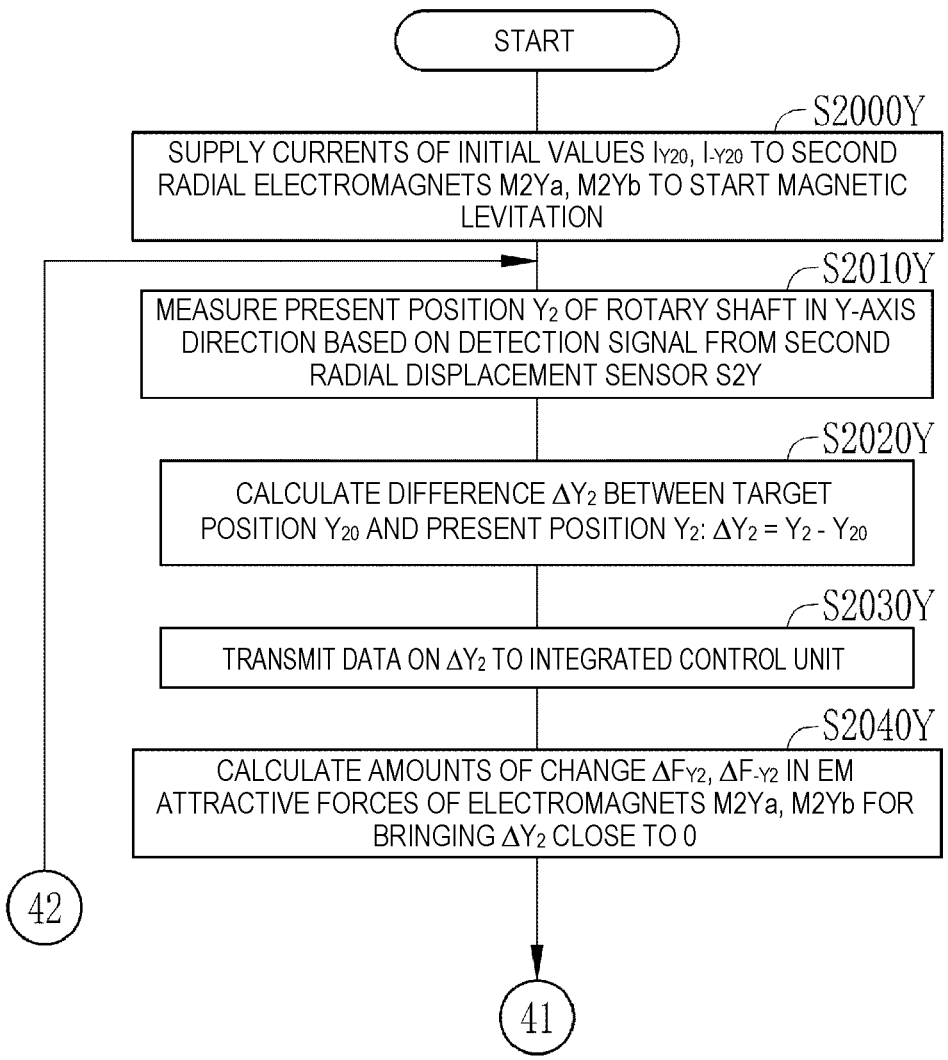
FIG. 60A shows a former half of a flowchart of a control flow of a second radial electromagnet control unit C2YC in the third embodiment.
Figure 60B:
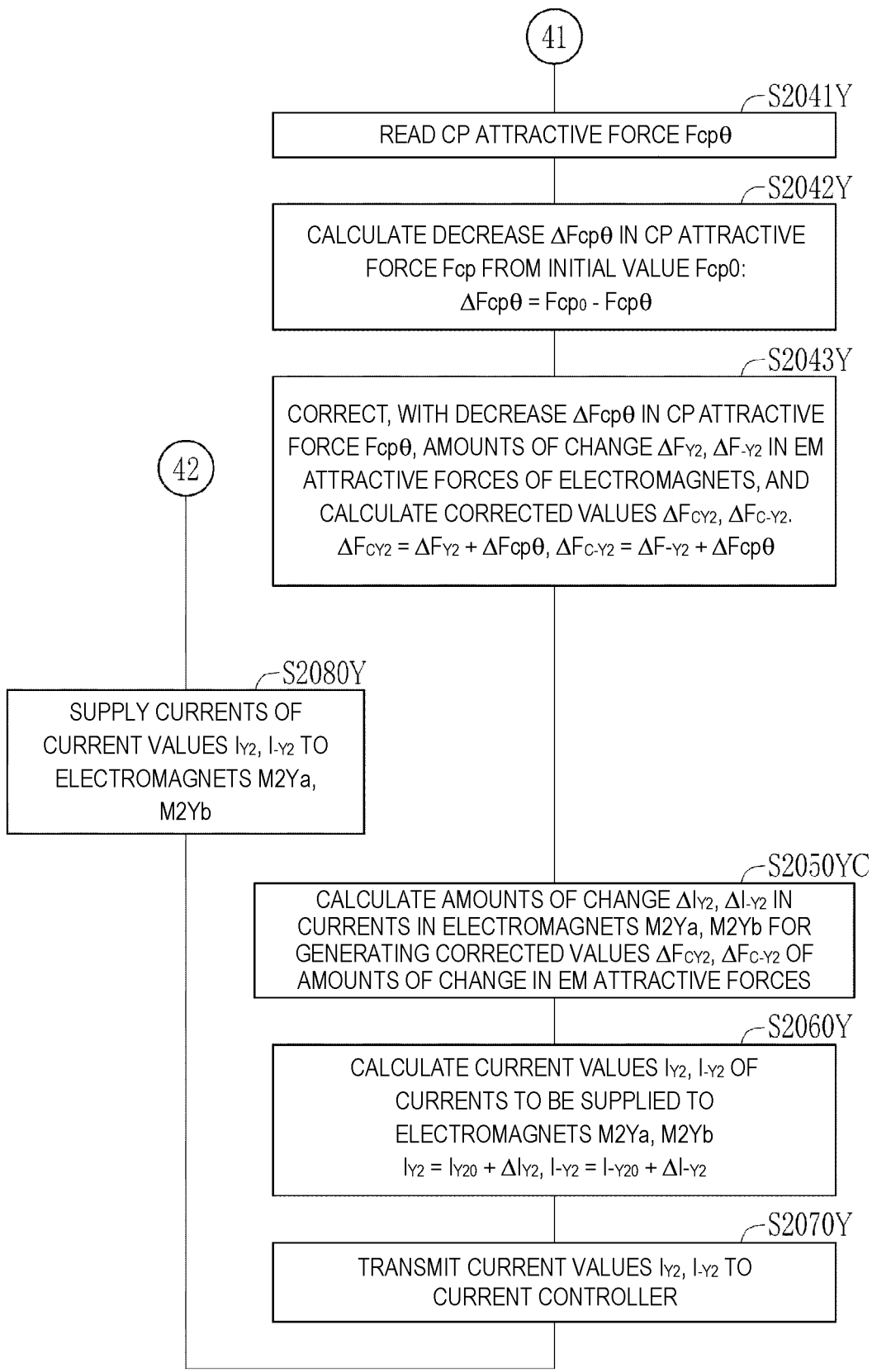
FIG. 60B shows a latter half of the flowchart of the control flow of the second radial electromagnet control unit C2YC in the third embodiment.
Figure 61:
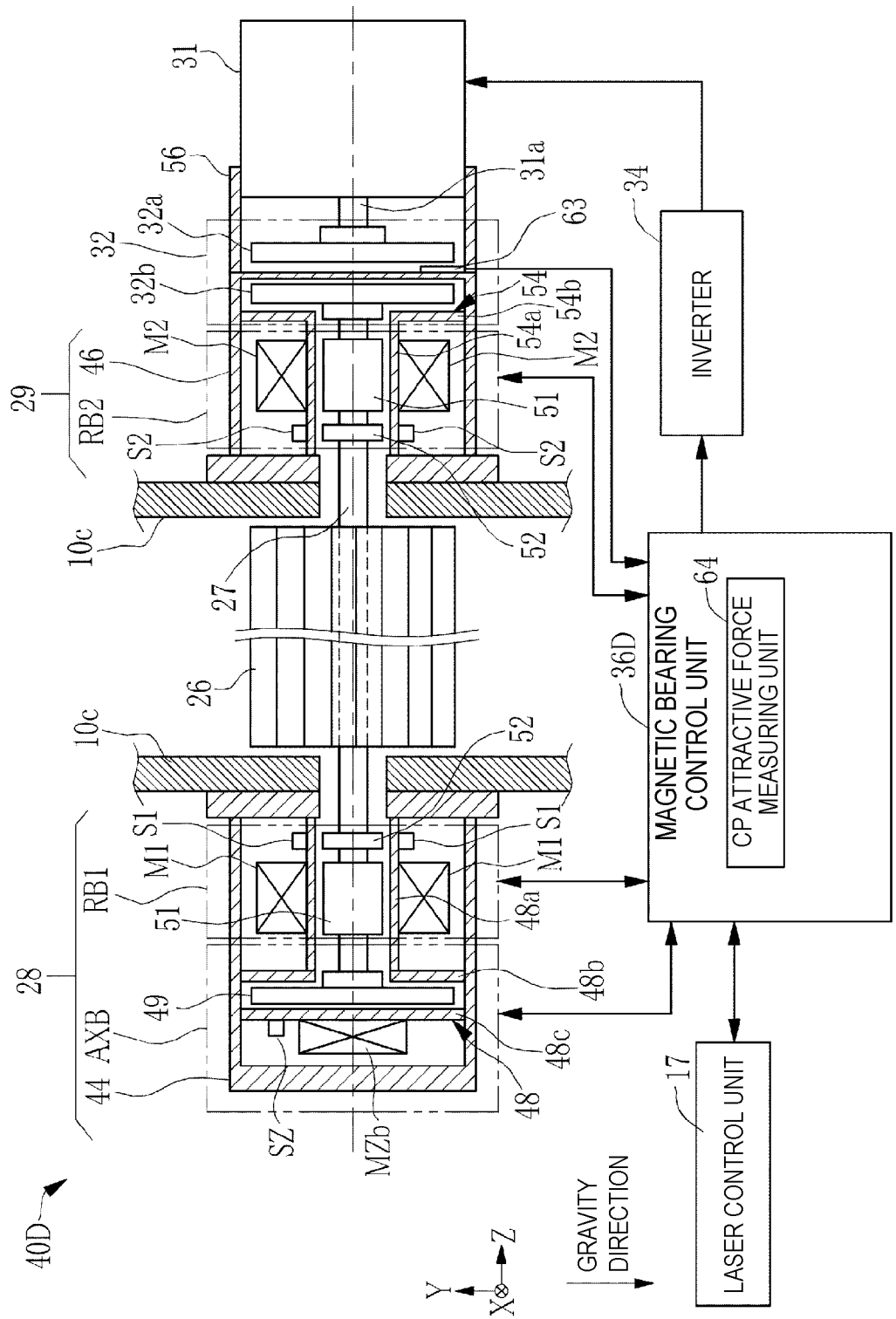
FIG. 61 illustrates a configuration of a magnetic bearing system according to a fourth embodiment.

FIGS. 60A and 60B are a flowchart of a control flow of the second radial electromagnet control unit C2YC. Steps S2000Y to S2040Y in a former half in FIG. 60A are the same as those in the flowchart according to the comparative example in FIG. 10. Differences are, as shown in FIG. 60B, addition of steps S2041Y to S2043Y, and a change of step S2050Y to S2050YC. Processes in steps S2041Y to S2043Y are similar to those in S3041Z to S3043Z of the first embodiment in FIG. 30B and S2041X to S2043X in FIG. 59B except that a direction of an attractive force applied is different.

In steps up to S2040Y in the former half in FIG. 60A, when the rotary shaft 27 is displaced from a target position $Y_{20}$ and a difference $\Delta Y_2$ occurs between the target position $Y_{20}$ and the present position $Y_2$, the second radial electromagnet control unit C2YC calculates amounts of change $\Delta F_{Y2}$, $\Delta F_{-Y2}$ in the EM attractive forces $F_{Y2}$, $F_{-Y2}$ of the second radial electromagnets M2Ya, M2Yb so as to bring $\Delta Y_2$ close to 0.

In S2041Y in FIG. 60B, the second radial electromagnet control unit C2YC reads a CP attractive force Fcpθ, and in S2042Y, calculates a decrease ΔFcpθ in the CP attractive force Fcp. Then, in S2043Y, the second radial electromagnet control unit C2YC corrects, with the decrease ΔFcpθ, the amounts of change $\Delta F_{Y2}$, $\Delta F_{-Y2}$ in the EM attractive forces, and calculates corrected values $\Delta F_{CY2}$, $\Delta F_{C-Y2}$. Specifically, the second radial electromagnet control unit C2YC calculates according to the following expressions (65), (66).

$$\Delta F_{CY2} = \Delta F_{Y2} + \Delta Fcp\theta \quad (65)$$

$$\Delta F_{C-Y2} = \Delta F_{-Y2} + \Delta Fcp\theta \quad (66)$$

As shown in FIG. 58, in the radial direction, the CP attractive force Fcp positively and negatively decreases in the Y-axis direction as in the X-axis direction. Thus, the decrease ΔFcpθ is added to both the positive and negative amounts of change $\Delta F_{Y2}$, $\Delta F_{-Y2}$.

In S2050YC, the second radial electromagnet control unit C2YC calculates amounts of change $\Delta I_{Y2}$, $\Delta I_{-Y2}$ in currents in the second radial electromagnets M2Ya, M2Yb for generating the corrected values $\Delta F_{CY2}$, $\Delta F_{C-Y2}$. In S2060Y, the second radial electromagnet control unit C2YC adds/subtracts the amounts of change $\Delta I_{Y2}$, $\Delta I_{-Y2}$ to/from initial bias currents $I_{20}$, $I_{-20}$ in the opposing electromagnets M2Ya, M2Yb to bring the rotary shaft 27 close to the target position $Y_{20}$ from the present levitated position, and calculates current values $I_{Y2}$, $I_{-Y2}$. In S2070Y and S2080Y, currents of the calculated current values $I_{Y2}$, $I_{-Y2}$ are supplied to the second radial electromagnets M2Ya, M2Yb. This allows the levitated position of the rotary shaft 27 to be brought close to the target position $Y_{20}$. The above processes are repeated according to the displacement of the rotary shaft 27.

In the control flow, even if the present position $Y_2$ and the target position $Y_{20}$ of the levitated position of the rotary shaft 27 match and $\Delta Y_2$ is 0, steps S2030Y to S2080Y are performed. Specifically, even when $\Delta Y_2$ is 0, if the CP attractive force Fcpθ varies, the EM attractive forces $F_{Y2}$, $F_{-Y2}$ of the second radial electromagnets M2Ya, M2Yb are corrected based on the decrease ΔFcpθ. In this case, in S2043Y, the amounts of change $\Delta F_{Y2}$, $\Delta F_{-Y2}$ are 0, and thus only the decrease ΔFcpθ is the corrected values $\Delta F_{CY2}$, $\Delta F_{C-Y2}$. Then, steps S2050YC to S2080Y are performed, and as a result, the amounts of change $\Delta F_{CY2}$, $\Delta F_{C-Y2}$ in forces corresponding to the decrease ΔFcpθ are added to the EM attractive forces $F_{Y2}$, $F_{-Y2}$.

In the second embodiment, the second radial electromagnet control units C2XC, C2YC correspond to correction units that correct the EM attractive forces $F_{X2}$, $F_{-X2}$, $F_{Y2}$, $F_{-Y2}$ of the second radial electromagnets M2Xa, M2Xb, M2Ya, M2Yb based on the decrease ΔFcpθ.

5.3 Effect

As such, even when the CP attractive force Fcp varies, the decrease ΔFcpθ in the CP attractive force Fcp is compensated for with respect to the EM attractive forces $F_{X2}$, $F_{-X2}$, $F_{Y2}$, $F_{-Y2}$ so that the positive and negative total forces applied to the rotary shaft 27 are balanced. Thus, in the third embodiment, as in the first embodiment, an influence of the variation in the CP attractive force Fcp on control of position adjustment of the rotary shaft 27 using the second radial electromagnets M2Xa, M2Xb, M2Ya, M2Yb can be reduced. This facilitates the control of the position adjustment of the rotary shaft 27.

However, unlike in the axial direction, in the radial direction, the CP attractive force Fcp positively and negatively varies by the same magnitude. Thus, even if the CP attractive force Fcp varies, the balance of forces applied to the rotary shaft 27 is maintained unless an external force other than the EM attractive force and the CP attractive force Fcp is applied. Thus, unlike the first embodiment in which the CP attractive force is axially applied, in the third embodiment, even if the CP attractive force Fcp varies, the levitated position of the rotary shaft 27 is not displaced from the target position $X_{20}$, $Y_{20}$ unless the external force is applied.

However, as described above, in using the electromagnets, the change in the magnitudes of the total forces $Ft_X$, $Ft_{-X}$, $Ft_Y$, $Ft_{-Y}$ to balance the forces applied to the rotary shaft 27 in the target position $X_{20}$, $Y_{20}$ corresponds to the change in spring constant in using a spring. This causes the change in the initial condition of the balance of forces, which may make appropriate control of the position adjustment difficult.

In the third embodiment, as in the first embodiment, even if the CP attractive force Fcp varies, the initial condition of the balance of forces applied to the rotary shaft 27 in the expressions (45) to (50) is maintained. Thus, also in the third embodiment, the second effect described in the first embodiment is obtained.

Also, the control flows of the third embodiment in FIGS. 59A, 59B, 60A, and 60B are similar to the control flow of the first embodiment in FIGS. 30A and 30B, and thus the third effect described in the first embodiment can be expected.

5.4 Others

In this example, it has been described that the control of only the second radial bearing portion RB2 is performed based on the fact that the CP attractive force Fcp has no influence on the first radial bearing portion RB1. However, if the influence of the CP attractive force Fcp is significant also in the first radial bearing portion RB1, similar control of the first radial bearing portion RB1 may be performed.

6. Gas Laser Apparatus of Fourth Embodiment

With reference to FIGS. 61 to 65B, a gas laser apparatus of a fourth embodiment will be described. An overall configuration of the gas laser apparatus of the fourth embodiment and a laser oscillation operation are similar to those of the gas laser apparatus of the first embodiment. Differences will be mainly described below.

6.1 Configuration of Magnetic Bearing System of Fan

In the fourth embodiment, a magnetic bearing system 40D is provided instead of the magnetic bearing system 40A. The magnetic bearing system 40D is different from the magnetic bearing system 40A in that an axial bearing portion AXB does not include an axial electromagnet MZa but includes only an axial electromagnet MZb. The axial electromagnet MZb generates an EM attractive force $F_{-Z}$ negatively applied in a Z-axis direction.

Without using the axial electromagnet MZa, the axial bearing portion AXB of the fourth embodiment balances axial forces applied to the rotary shaft 27 with a negative EM attractive force $F_{-Z}$ generated by the axial electromagnet MZb and a positive CP attractive force Fcp generated by a magnetic coupling 32.

6.1.1 Configuration of Magnetic Bearing Control Unit

Figure 62:
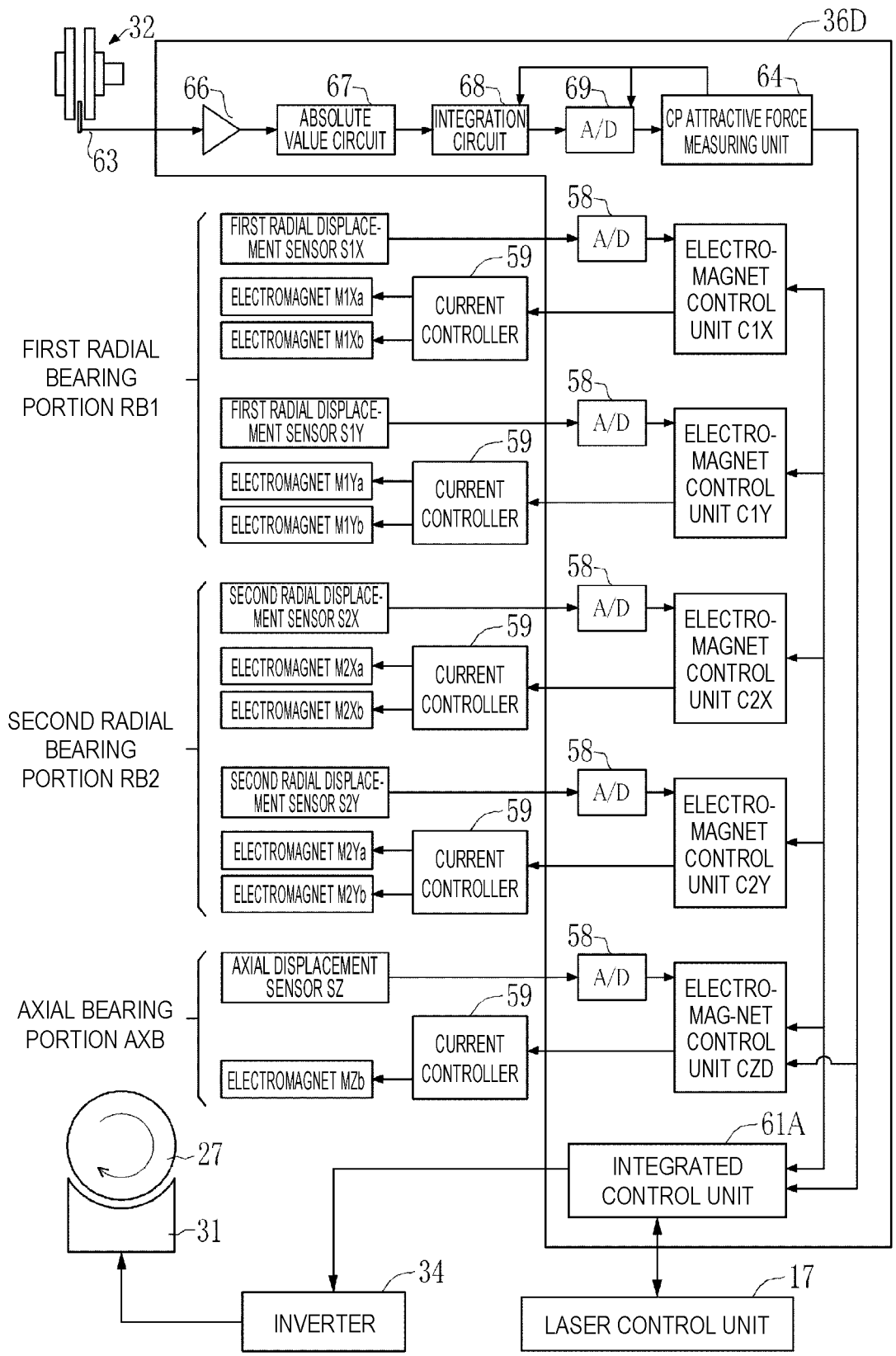
FIG. 62 is a schematic block diagram of an electric configuration of a magnetic bearing control unit according to the fourth embodiment.

As shown in FIG. 62, a magnetic bearing control unit 36D according to the fourth embodiment is different from the magnetic bearing control unit 36A according to the first embodiment in FIG. 26 in including an axial electromagnet control unit CZD instead of the axial electromagnet control unit CZA. The axial electromagnet control unit CZA of the first embodiment controls the positive and negative axial electromagnets MZa, MZb, while the axial electromagnet control unit CZD of the fourth embodiment controls only the negative axial electromagnet MZb.

6.1.2 Balance of Axial Forces

Figure 63:
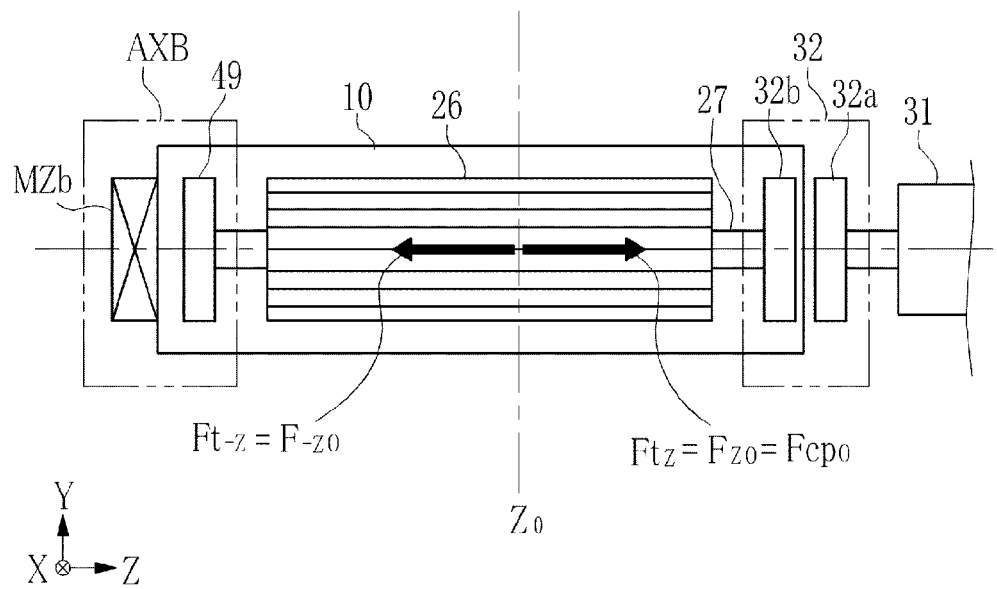
FIG. 63 illustrates a relationship of balance of forces applied to a rotary shaft in an initial state without a phase difference.

FIG. 63 shows a relationship of balance of axial forces applied to the rotary shaft 27 when a rotation speed R of a fan 26 is 0 rpm and a phase difference angle θ is 0. A relationship of balance of forces when the rotary shaft 27 is adjusted to a target position $Z_0$ is expressed by the following expressions (67), (68).

$$Ft_Z = F_{Z0} = Fcp0 \quad (67)$$

$$Ft_Z = Ft_{-Z} = F_{-Z} \quad (68)$$

Figure 64:
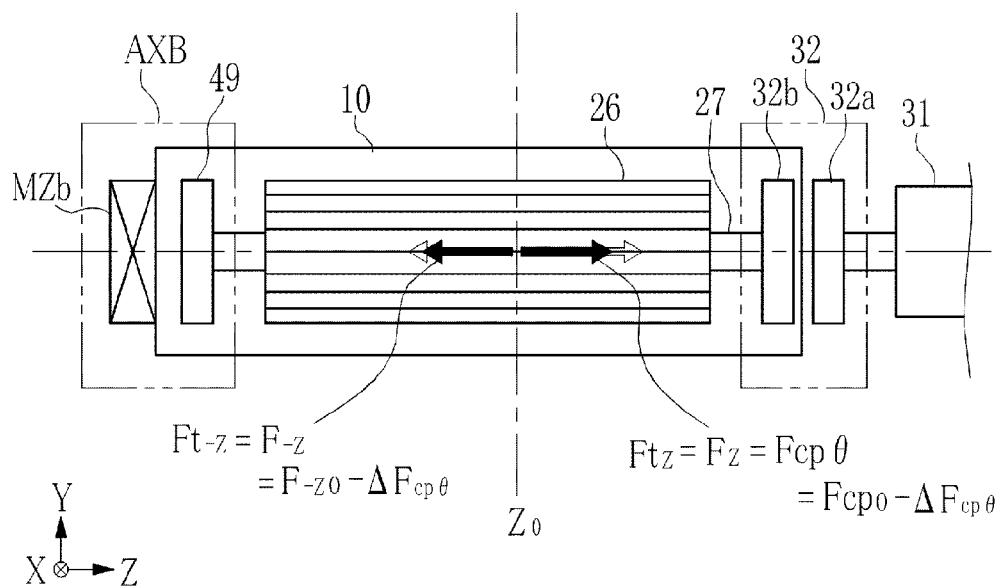
FIG. 64 illustrates a relationship of balance of forces applied to the rotary shaft when correction is performed based on a decrease $\Delta Fcp\theta$ in CP attractive force.

FIG. 64 shows a relationship of balance of axial forces applied to the rotary shaft 27 when the fan 26 rotates and the phase difference angle θ is not equal to 0. A relationship of balance of forces when the rotary shaft 27 is adjusted to the target position $Z_0$ is expressed by the following expressions (69), (70).

$$Ft_Z = F_{Z0} = Fcp\theta - \Delta Fcp\theta \quad (69)$$

$$Ft_Z = Ft_{-Z} = F_{-Z} - \Delta Fcp\theta \quad (70)$$

6.2 Operation of Magnetic Bearing System

An operation of the magnetic bearing system 40D according to the fourth embodiment is different from that of the first embodiment only in a control flow of the axial electromagnet control unit CZD, and others are the same.

6.2.1 Control Flow of Axial Electromagnet Control Unit

Figure 65B:
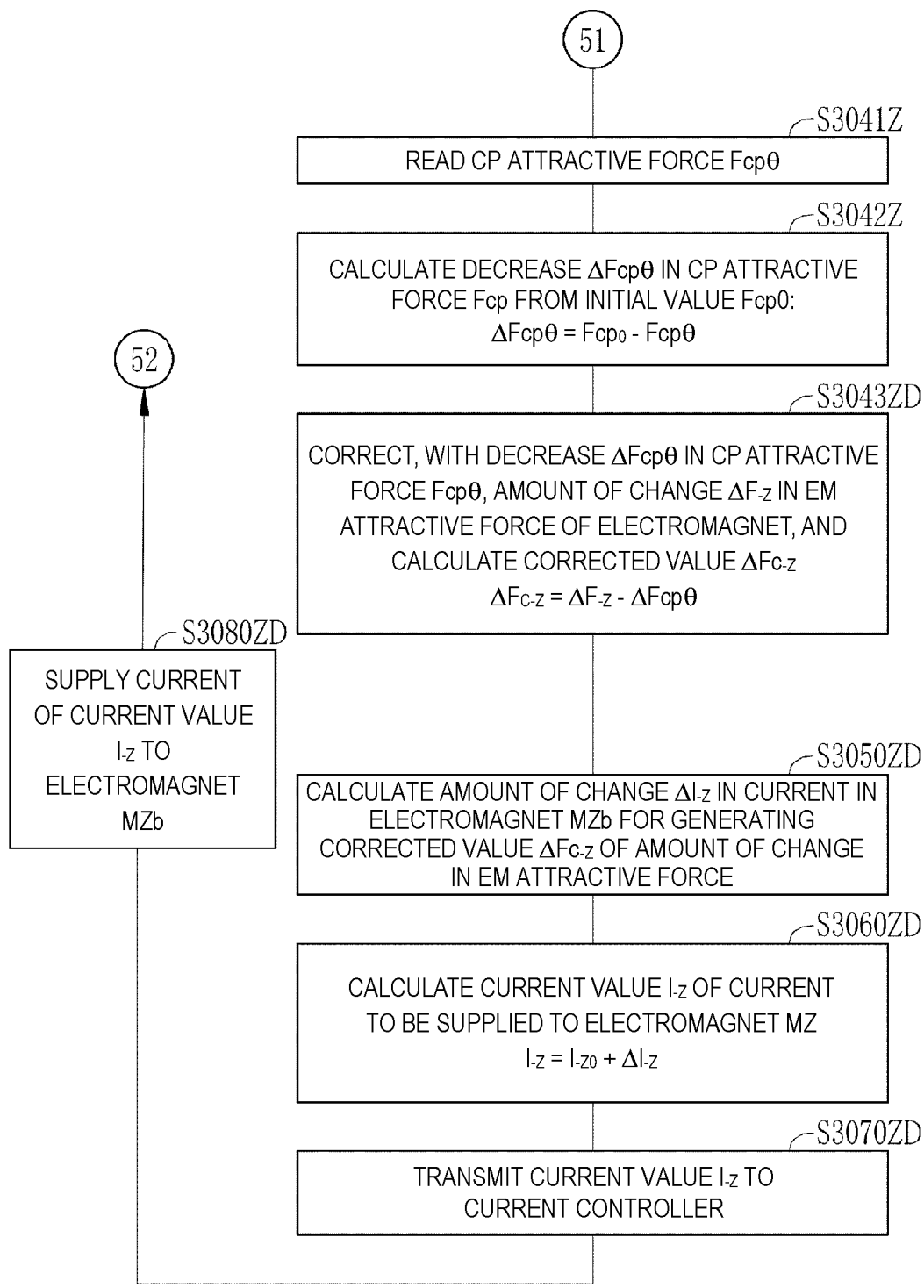
FIG. 65B shows a latter half of the flowchart of the control flow of the axial electromagnet control unit according to the fourth embodiment.

FIGS. 65A and 65B show the control flow of the axial electromagnet control unit CZD. In S3000ZD in FIG. 65A, the axial electromagnet control unit CZD supplies a current of an initial value $I_{Z0}$ to the axial electromagnet MZb to start magnetic levitation. The initial value $I_{Z0}$ is a current value for causing the axial electromagnet MZb to generate an EM attractive force $F_{-Z}$ of the same magnitude as a CP attractive force Fcp of an initial value Fcp0 of the magnetic coupling 32.

In steps up to S3040ZD in a former half in FIG. 65A, when the rotary shaft 27 is displaced from the target position $Z_0$ and a difference ΔZ occurs between the target position $Z_0$ and the present position Z, the axial electromagnet control unit CZD calculates an amount of change $\Delta F_{-Z}$ in the EM attractive force $F_{-Z}$ of the axial electromagnet MZa so as to bring ΔZ close to 0.

In the fourth embodiment, unlike in the first embodiment, the axial electromagnet MZa is not provided that generates an EM attractive force $F_Z$ in the positive direction like the CP attractive force Fcp. Thus, when the present levitated position Z of the rotary shaft 27 is positively displaced from the target position $Z_0$, the amount of change $\Delta F_{-Z}$ is calculated so that the EM attractive force $F_{-Z}$ of the axial electromagnet MZb becomes larger than the CP attractive force Fcp0. On the other hand, when the present levitated position Z of the rotary shaft 27 is negatively displaced from the target position $Z_0$, the amount of change $\Delta F_{-Z}$ is calculated so that the EM attractive force $F_{-Z}$ of the axial electromagnet MZb becomes smaller than the CP attractive force Fcp0.

Then, as shown in FIG. 65B, in S3041Z, the axial electromagnet control unit CZD reads a CP attractive force Fcpθ, and calculates a decrease ΔFcpθ in the CP attractive force Fcp (S3042Z). Then, in S3043ZD, the axial electromagnet control unit CZD corrects the EM attractive force $F_{-Z}$ of the axial electromagnet MZb with the decrease ΔFcpθ according to the following expression (71), and calculates a corrected value $\Delta F_{C-Z}$.

$$\Delta F_{C-Z} = \Delta F_{-Z} = \Delta Fcp\theta \quad (71)$$

As such, the axial electromagnet control unit CZD corrects the EM attractive force $F_{-Z}$ of the axial electromagnet MZb according to the variation in the CP attractive force Fcp measured by the CP attractive force measuring unit 64.

In S3050ZD, the axial electromagnet control unit CZD calculates an amount of change $\Delta I_{-Z}$ in current in the axial electromagnet MZb for generating the corrected value $\Delta F_{C-Z}$. In S3060ZD, a current value $I_{-Z}$ of a current to be supplied to the axial electromagnet MZ is calculated according to the following expression (72).

$$I_Z = I_{-Z0} + \Delta I_{-Z} \quad (72)$$

When the levitated position of the rotary shaft 27 is positively displaced from the target position $Z_0$, the amount of change $\Delta I_{-Z}$ is a positive value, which is added to the initial value $I_{-Z0}$. When the levitated position of the rotary shaft 27 is negatively displaced from the target position $Z_0$, the amount of change $\Delta I_{-Z}$ is a negative value, which is subtracted from the initial value $I_{-Z0}$.

In S3070ZD and S3080ZD, the axial electromagnet control unit CZD supplies a current of the calculated current value $I_{-Z}$ to the axial electromagnet MZ. This allows position adjustment for bringing the rotary shaft 27 close to the target position $Z_0$.

A control flow of an integrated control unit 61A is similar to the control flow in the first embodiment in FIGS. 34A and 34B.

6.3 Effect

In the fourth embodiment, when the CP attractive force Fcp varies in controlling the EM attractive force $F_{-Z}$ according to the displacement of the rotary shaft 27, the EM attractive force $F_{-Z}$ is corrected so as to be balanced with the CP attractive force Fcp. Specifically, when the CP attractive force Fcp decreases from the initial value Fcp0, the EM attractive force $F_{-Z}$ is decreased by a decrease ΔFcpθ.

Thus, even if the CP attractive force Fcp varies, the positive and negative total forces applied to the rotary shaft 27 are balanced, thereby reducing an influence of the variation in the CP attractive force Fcp on the displacement of the rotary shaft 27. This facilitates the control of the position adjustment of the rotary shaft 27.

However, in the fourth embodiment, unlike in the first embodiment, when the CP attractive force Fcp decreases from the initial value Fcp0, the EM attractive force $F_{-z}$ is decreased by the decrease ΔFcpθ accordingly, and thus an initial condition of the balance of forces cannot be maintained.

Thus, in the fourth embodiment, the second effect cannot be obtained, but the first effect and the third effect can be obtained. Also, in the fourth embodiment, only the axial electromagnet MZb is provided without the axial electromagnet MZa, thereby simplifying components and reducing cost.

In the fourth embodiment, the integrated control unit 61A performs the control flow of the first embodiment in FIGS. 34A and 34B. In this control flow, the processes of stopping the motor 31 when the CP attractive force is abnormal in S4041 to S4043 are particularly effective in the fourth embodiment.

This is because, in the fourth embodiment, the axial electromagnet MZa is not provided that generates an EM attractive force in the positive direction like the CP attractive force Fcp of the magnetic coupling 32. Thus, if the magnetic coupling 32 is abnormal and the CP attractive force Fcp becomes too small, the rotary shaft 27 cannot be positively moved using the axial electromagnet MZa. Thus, in the fourth embodiment, the processes in S4041 to S4043 are particularly effective as emergency measures when the CP attractive force is abnormal.

7. Analog Circuit

Figure 66:
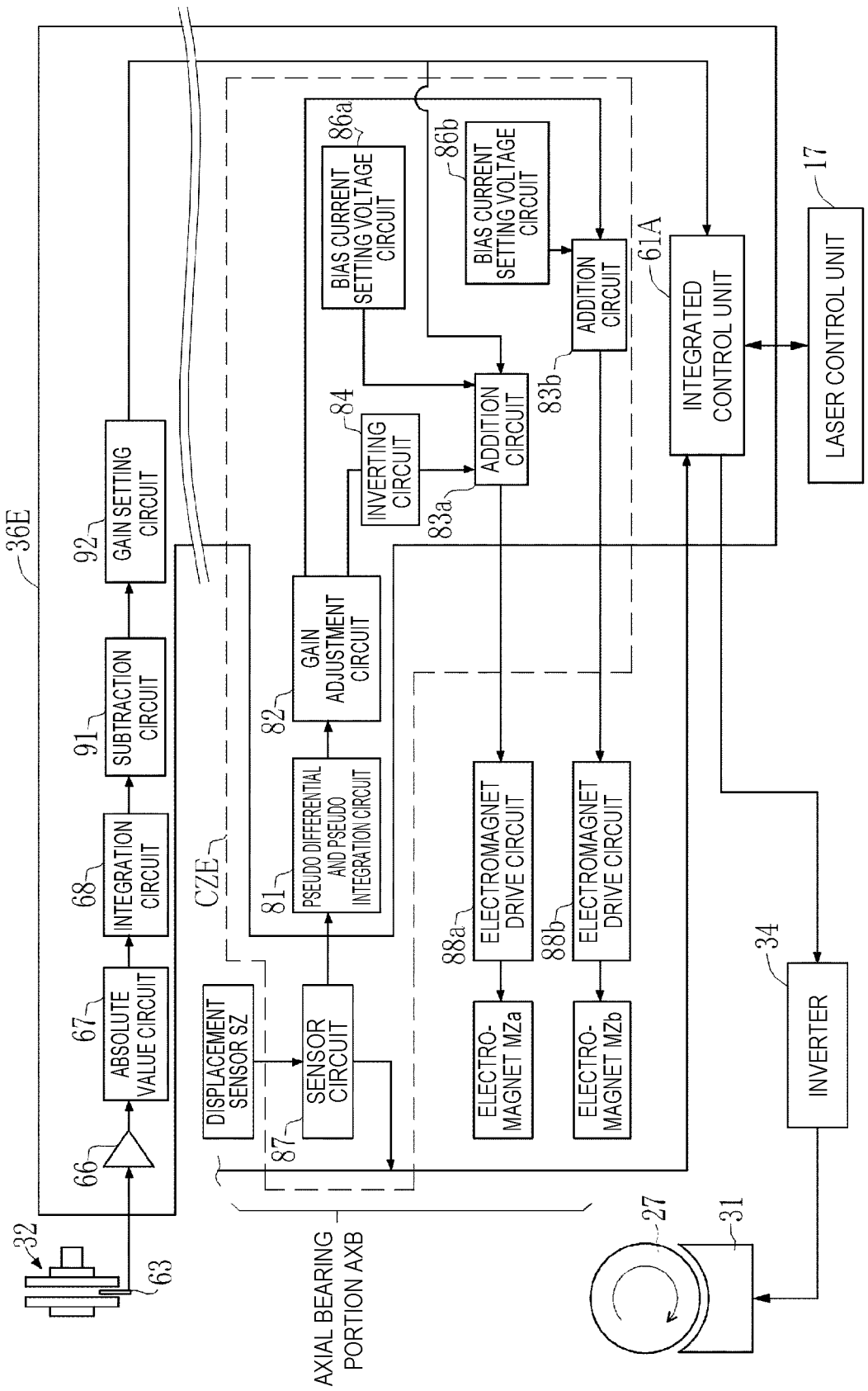
FIG. 66 is a block diagram of a magnetic bearing control unit constituted by analog circuits.

In a magnetic bearing control unit 36E in FIG. 66, the electromagnet control unit and the CP attractive force measuring unit in the magnetic bearing control unit 36A of the first embodiment are constituted by analog circuits. Such analog circuits may be used instead of the digital circuits in the magnetic bearing control unit 36A. In FIG. 66, only an axial electromagnet control unit CZE that controls axial electromagnets MZa, MZb is shown for convenience. However, a first radial electromagnet control unit and a second radial electromagnet control unit are similarly configured as the axial electromagnet control unit CZE, and thus are not shown and descriptions are omitted.

The axial electromagnet control unit CZE includes a pseudo differential and pseudo integration circuit 81, a gain adjustment circuit 82, an addition circuit 83, an inverting circuit 84, a bias current setting voltage circuit 86, and a sensor circuit 87. The sensor circuit 87 is arranged downstream of a displacement sensor SZ. An electromagnet drive circuit 88 is connected to each of the axial electromagnets MZa, MZb.

The addition circuit 83, the bias current setting voltage circuit 86, and the electromagnet drive circuit 88 include an addition circuit 83a, a bias current setting voltage circuit 86a, and an electromagnet drive circuit 88a for the axial electromagnet MZa, and an addition circuit 83b, a bias current setting voltage circuit 86b, and an electromagnet drive circuit 88b for the axial electromagnet MZb. As shown in FIG. 21, the axial electromagnet MZa generates an EM attractive force $F_Z$ in the positive direction like a CP attractive force Fcp of a magnetic coupling 32. The axial electromagnet MZb generates a negative EM attractive force $F_{-z}$. The inverting circuit 84 is connected upstream of the addition circuit 83a for the axial electromagnet MZa.

To the sensor circuit 87, a voltage corresponding to the present position Z of a rotary shaft 27 output from a displacement sensor SZ is input. The sensor circuit 87 outputs a voltage corresponding to a difference ΔZ between the present position Z and a target position $Z_0$ of the rotary shaft 27 based on the voltage input from the displacement sensor SZ. In the sensor circuit 87, the voltage output from the displacement sensor SZ when the rotary shaft 27 is in the target position $Z_0$ is set as a reference voltage. The sensor circuit 87 outputs, as a signal indicating the difference ΔZ, a voltage corresponding to a difference between a sensor output that is the voltage output from the displacement sensor SZ and the reference voltage.

Specifically, when the present position Z of the rotary shaft 27 is the target position $Z_0$, the sensor output from the displacement sensor SZ matches the reference voltage, and thus the sensor circuit 87 outputs a signal treated as 0 in a downstream circuit. Then, when the present position Z of the rotary shaft 27 is on a positive side of the target position $Z_0$, that is, when the sensor output is larger than the reference voltage, the sensor circuit 87 outputs a positive output value according to an absolute value of the difference ΔZ. On the other hand, when the present position Z is on a negative side of the target position $Z_0$, that is, when the sensor output is smaller than the reference voltage, the sensor circuit 87 outputs a negative output value according to an absolute value of the difference ΔZ.

The sensor circuit 87 outputs a signal corresponding to the difference ΔZ to the pseudo differential and pseudo integration circuit 81 and the integrated control unit 61A on the downstream side. The pseudo differential and pseudo integration circuit 81 and the gain adjustment circuit 82 perform the PID control. The pseudo differential and pseudo integration circuit 81 is responsible for differential control and integral control, and the gain adjustment circuit 82 is responsible for proportional control. The pseudo differential and pseudo integration circuit 81 performs the differential control and the integral control based on the signal corresponding to the difference ΔZ, and the gain adjustment circuit 82 performs the proportional control. The gain adjustment circuit 82 outputs a voltage of the difference ΔZ adjusted by the PID control.

The gain adjustment circuit 82 outputs the voltage of the difference ΔZ to the addition circuit 83a for the axial electromagnet MZa and the addition circuit 83b for the axial electromagnet MZb. The inverting circuit 84 is arranged between the gain adjustment circuit 82 and the addition circuit 83a, and thus the voltage of the difference ΔZ with the sign being reversed is input to the addition circuit 83a. Thus, when the voltage of the difference ΔZ output from the gain adjustment circuit 82 is a positive value, the voltage is input as a negative signal to the addition circuit 83a, and input as a positive signal of the same magnitude to the addition circuit 83b. On the other hand, when the voltage of the difference ΔZ is a negative value, the voltage is input as a positive signal to the addition circuit 83a and input as a negative signal to the addition circuit 83b.

The bias current setting voltage circuits 86a, 86b set, in the addition circuits 83a, 83b, bias voltages for supplying bias currents to the axial electromagnets MZa, MZb. The bias currents are currents of initial values $I_{Z0}$, $I_{-Z0}$ as described above, and a bias voltage corresponding to the initial value $I_{Z0}$ is set in the addition circuit 83a, and a bias voltage corresponding to the initial value $I_{-Z0}$ is set in the addition circuit 83b.

For example, as shown in FIG. 31, the axial electromagnet MZa generates the EM attractive force $F_Z$ in the same direction as the CP attractive force Fcp, and the axial electromagnet MZb generates the EM attractive force $F_{-Z}$ corresponding to a total of the CP attractive force Fcp and the EM attractive force $F_Z$. Thus, the bias voltage set by the bias current setting voltage circuit 86a is lower than the bias voltage set by the bias current setting voltage circuit 86b by an initial value Fcp0 of the CP attractive force.

The addition circuit 83a adds, to the bias voltage, the voltage of the difference ΔZ output from the gain adjustment circuit 82 and whose sign has been reversed by the inverting circuit 84. The addition circuit 83b adds, to the bias voltage, the voltage of the difference ΔZ directly input from the gain adjustment circuit 82. The electromagnet drive circuits 88a, 88b supply, to the electromagnets MZa, MZb, drive currents according to the voltages input from the addition circuits 83a, 83b.

As shown in FIG. 21, the axial electromagnet MZa and the axial electromagnet MZb are arranged to oppose each other. In this case, to displace the rotary shaft 27 in one direction, for example, as in S3060Z in FIG. 30B, equal amounts of change $ΔI_Z$, $ΔI_{-Z}$ are added to the bias current supplied to one of the axial electromagnets MZa, MZb, and subtracted from the bias current supplied to the other. The inverting circuit 84 is arranged to assign the equal amounts of change $ΔI_Z$, $ΔI_{-Z}$ with opposite signs to the axial electromagnets MZa, MZb arranged to oppose each other.

For example, when the present position Z of the rotary shaft 27 is on the positive side of the target position $Z_0$, the voltage of the difference ΔZ output from the gain adjustment circuit 82 is a positive value, and thus a negative value whose sign has been reversed by the inverting circuit 84 is input to the addition circuit 83a, and a positive value is input to the addition circuit 83b. Thus, the positive EM attractive force $F_Z$ of the axial electromagnet MZa decreases from an initial EM attractive force $F_{Z0}$ by an amount of change $ΔF_Z$, and the negative EM attractive force $F_Z$ of the axial electromagnet MZb increases from the initial EM attractive force $F_{Z0}$ by the amount of change $ΔF_Z$. As a result, the rotary shaft 27 is negatively moved and brought close to the target position $Z_0$. When the present position Z of the rotary shaft 27 is on the negative side of the target position $Z_0$, conversely, the rotary shaft 27 is positively moved and brought close to the target position $Z_0$.

A subtraction circuit 91 and a gain setting circuit 92 are arranged downstream of the integration circuit 68. A reference voltage corresponding to the CP attractive force Fcp0 is set in the subtraction circuit 91, and the subtraction circuit 91 subtracts, from the reference voltage corresponding to the CP attractive force Fcp0, an output voltage corresponding to a CP attractive force Fcpθ output from the integration circuit 68, and outputs a voltage corresponding to a decrease ΔFcpθ. The gain setting circuit 92 multiplies the output value from the subtraction circuit 91 by a predetermined gain, and sets an output value that can be properly processed by a downstream circuit.

The gain setting circuit 92 is connected to the addition circuit 83a for the axial electromagnet MZa. The gain setting circuit 92 outputs the voltage corresponding to the decrease ΔFcpθ, and thus the addition circuit 83a adds the voltage to the bias voltage. The bias current setting voltage circuit 86a sets a bias voltage corresponding to the EM attractive force $F_Z$ set based on the fact that the magnetic coupling 32 generates the CP attractive force Fcp of the initial value Fcp0. Thus, the voltage input from the gain setting circuit 92 is added to the bias voltage to compensate for the decrease ΔFcpθ with respect to the EM attractive force $F_Z$.

To the integrated control unit 61A, the sensor circuit 87 inputs the signal corresponding to the difference ΔZ. As shown in S4050 in FIG. 34B, the integrated control unit 61A determines whether or not the levitated position of the rotary shaft 27 is within an allowable range based on the difference ΔZ.

As described above, in the magnetic bearing system of the gas laser apparatus 2, quick control of the position adjustment of the rotary shaft 27 is desired. Thus, in the magnetic bearing system of the gas laser apparatus 2, the electromagnet control unit and the CP attractive force measuring unit constituted by the analog circuits are effective for increasing speed of processing.

8. Others

Variants of the embodiments as described below are acceptable. For example, the example has been described in which in the bearing portions RB1, RB2, AXB, the attractive force is used as the magnetic force of each electromagnet to magnetically levitate the rotary shaft 27, but a repulsive force instead of the attractive force may be used as the magnetic force to magnetically levitate the rotary shaft 27. The example only using the electromagnets in the bearing portions RB1, RB2, AXB has been described, but the electromagnets and permanent magnets may be used in combination. In this case, for example, the permanent magnet generates an initial magnetic force corresponding to a bias current, and the electromagnet adjusts an amount of change.

The gas laser apparatus 2 may output, as a pulse laser beam, a natural excitation light whose line width is not narrowed to the exposure apparatus 3. In this case, the gas laser apparatus includes a high reflection mirror instead of the line narrowing module.

The gas laser apparatus 2 does not need to be an excimer laser apparatus. The gas laser apparatus 2 may be a fluorine molecular laser apparatus that uses a laser gas containing a fluorine gas as a halogen gas and a buffer gas. The gas laser apparatus 2 may be combined with a laser processing device and used as a laser beam source of the laser processing device.

The above descriptions are intended to be illustrative only and not restrictive. Thus, it will be apparent to those skilled in the art that modifications may be made in the embodiments of the present disclosure without departing from the scope of the appended claims.

The terms used throughout the specification and the appended claims should be interpreted as "non-limiting." For example, the term "comprising" or "comprised" should be interpreted as "not limited to what has been described as being comprised." The term "having" should be interpreted as "not limited to what has been described as having." Further, the modifier "a/an" described in the specification and the appended claims should be interpreted to mean "at least one" or "one or more."

What is claimed is:

1. A gas laser apparatus comprising:
   A. a laser chamber in which a laser gas is encapsulated;
   B. a pair of discharge electrodes arranged in the laser chamber to oppose each other;
   C. a fan configured to supply the laser gas between the discharge electrodes;

D. a magnetic bearing including an electromagnet capable of controlling a magnetic force, and configured to rotatably support a rotary shaft of the fan in a magnetically levitated state by the magnetic force;

E. an electromagnet control unit configured to control the magnetic force of the electromagnet based on displacement of a levitated position of the rotary shaft and adjust the levitated position;

F. a motor configured to generate torque for rotating the fan;

G. a magnetic coupling configured to couple the rotary shaft and a drive shaft of the motor with a magnetic attractive force and transmit the torque of the motor to the rotary shaft;

H. an attractive force estimating sensor configured to detect a parameter that enables an attractive force of the magnetic coupling to be estimated;

I. an attractive force measuring unit configured to measure the attractive force of the magnetic coupling based on the detected parameter; and J. a correction unit configured to correct the magnetic force of the electromagnet according to a variation in the attractive force measured by the attractive force measuring unit.

2. The gas laser apparatus according to claim 1, wherein the correction unit corrects the magnetic force of the electromagnet included in a first force or a second force according to the variation in the attractive force so that the first force and the second force are balanced, the first force including at least the attractive force of the magnetic coupling out of the magnetic force of the electromagnet and the attractive force of the magnetic coupling and being applied to the rotary shaft, and the second force including at least the magnetic force of the electromagnet and applied to the rotary shaft in a direction opposite to the direction of the first force.

3. The gas laser apparatus according to claim 2, wherein when a relationship of balance of forces applied to the rotary shaft is an initial condition, the relationship of balance of forces being for adjusting the levitated position of the rotary shaft to a target position in a state where the motor is stopped and the attractive force is maintained at a reference value, the correction unit corrects the magnetic force of the electromagnet according to the variation in the attractive force so as to maintain the initial condition.

4. The gas laser apparatus according to claim 1, wherein the magnetic bearing includes a displacement sensor configured to detect the levitated position of the rotary shaft, the electromagnet control unit calculates, based on a difference between the levitated position and the target position, an amount of change in the magnetic force of the electromagnet for bringing the levitated position close to the target position, when the levitated position detected by the displacement sensor is displaced from the target position, and
the correction unit corrects the calculated amount of change according to the variation in the attractive force.

5. The gas laser apparatus according to claim 1, wherein the correction unit calculates an amount of variation in the attractive force that is a difference between the attractive force measured by the attractive force measuring unit and the preset reference value, and corrects the magnetic force of the electromagnet based on the amount of variation.

6. The gas laser apparatus according to claim 5, wherein the reference value of the attractive force is an initial value of the attractive force generated by the magnetic coupling when the motor is stopped, and is a maximum value of the attractive force, and
the amount of variation is a decrease from the initial value.

7. The gas laser apparatus according to claim 1, further comprising:

K. a motor control unit configured to monitor the attractive force of the magnetic coupling during rotation of the fan, and perform control to stop rotation of the motor when the attractive force becomes smaller than a predetermined lower limit value.

8. The gas laser apparatus according to claim 1, wherein the magnetic coupling includes a drive side rotor mounted to the drive shaft of the motor and rotated by the torque of the motor being input from the drive shaft, and a driven side rotor mounted to the rotary shaft of the fan,
the torque is transmitted from the drive side rotor to the driven side rotor by the attractive force generated between the driven side rotor and the drive side rotor, and the driven side rotor is rotated following the drive side rotor.

9. The gas laser apparatus according to claim 8, wherein the parameter is a magnetic flux density between the drive side rotor and the driven side rotor,
the attractive force estimating sensor is a magnetic flux density sensor configured to detect the magnetic flux density, and
the attractive force measuring unit measures the attractive force from the magnetic flux density.

10. The gas laser apparatus according to claim 8, wherein the parameter is a phase difference between the drive side rotor and the driven side rotor,
the attractive force estimating sensor is a phase difference sensor configured to detect the phase difference, and
the attractive force measuring unit measures the attractive force corresponding to the phase difference detected by the phase difference sensor based on a preset correspondence relationship between the attractive force and the phase difference.

11. The gas laser apparatus according to claim 10, wherein the phase difference sensor is a magnetic flux density change sensor configured to detect a change point of the magnetic flux density between the drive side rotor and the driven side rotor.

12. The gas laser apparatus according to claim 11, wherein the phase difference sensor includes a magnetic flux density sensor configured to detect the magnetic flux density between the drive side rotor and the driven side rotor, and a differentiating circuit configured to differentiate a periodically changing signal output from the magnetic flux density sensor, and
detects the change point of the magnetic flux density based on the output from the differentiating circuit.

13. The gas laser apparatus according to claim 10, wherein the phase difference sensor includes a rotation sensor configured to detect rotation of the drive side rotor, and a rotation sensor configured to detect rotation of the driven side rotor, and
detects the phase difference based on detection signals from the rotation sensors.

14. The gas laser apparatus according to claim 8, wherein the magnetic bearing includes a radial bearing portion including a radial electromagnet configured to generate a magnetic force radially of the rotary shaft, and an axial bearing portion including an axial electromagnet configured to generate a magnetic force axially of the rotary shaft, and the electromagnet control unit controls the magnetic force of the radial electromagnet and the magnetic force of the axial electromagnet.

15. The gas laser apparatus according to claim 14, wherein the magnetic coupling axially generates the attractive force between the drive side rotor and the driven side rotor, and
the correction unit corrects the magnetic force of the axial electromagnet according to the variation in the attractive force.

16. The gas laser apparatus according to claim 15, wherein the axial electromagnet includes a first axial electromagnet configured to generate a magnetic force in a first direction identical to the direction of the attractive force, and a second axial electromagnet configured to generate a magnetic force in a second direction opposite to the first direction, and
the correction unit corrects the magnetic force of the first axial electromagnet according to the variation in the attractive force.

17. The gas laser apparatus according to claim 15, wherein the axial electromagnet includes only a second electromagnet configured to generate a magnetic force in a second direction opposite to the direction of the attractive force, and
the correction unit corrects the magnetic force of the second electromagnet according to the variation in the attractive force.

18. The gas laser apparatus according to claim 14, wherein the magnetic coupling radially generates the attractive force between the drive side rotor and the driven side rotor, and
the correction unit corrects the magnetic force of the radial electromagnet according to the variation in the attractive force.

19. The gas laser apparatus according to claim 18, wherein the radial electromagnet includes at least two radial electromagnets arranged to oppose each other circumferentially of the rotary shaft, and
the correction unit corrects magnetic forces of the two radial electromagnets according to the variation in the attractive force.

20. The gas laser apparatus according to claim 1, wherein the electromagnet control unit, the attractive force measuring unit, and the correction unit are constituted by analog circuits.

21. A magnetic bearing control method used in a gas laser apparatus including a laser chamber in which a laser gas is encapsulated, a pair of discharge electrodes arranged in the laser chamber to oppose each other, and a fan configured to supply the laser gas between the discharge electrodes, the magnetic bearing control method being used for controlling a magnetic bearing including an electromagnet capable of controlling a magnetic force, and configured to rotatably support a rotary shaft of the fan in a magnetically levitated state by the magnetic force, comprising:
A. an electromagnet control step of controlling the magnetic force of the electromagnet based on displacement of a levitated position of the rotary shaft and adjusting the levitated position;
B. a fan rotating step of using a magnetic coupling to couple the rotary shaft of the fan and a drive shaft of a motor with a magnetic attractive force and transmitting torque of the motor to the rotary shaft to rotate the fan;
C. a parameter detecting step of detecting a parameter that enables an attractive force of the magnetic coupling to be estimated;
D. an attractive force measuring step of measuring the attractive force of the magnetic coupling based on the detected parameter; and
E. a correction step of correcting the magnetic force of the electromagnet according to a variation in the attractive force measured in the attractive force measuring step.

* * * * *